Sept. 6, 1960  J. A. KRECEK ET AL  2,951,893
TELETYPEWRITER SWITCHING SYSTEM
Filed Nov. 25, 1953  69 Sheets-Sheet 2

INVENTORS J.A. KRECEK
G.A. LOCKE
BY
R.C. Terry
ATTORNEY

Sept. 6, 1960 J. A. KRECEK ET AL 2,951,893
TELETYPEWRITER SWITCHING SYSTEM
Filed Nov. 25, 1953 69 Sheets-Sheet 4

INVENTORS J. A. KRECEK
BY G. A. LOCKE
R. C. Jerry
ATTORNEY

Sept. 6, 1960

J. A. KRECEK ET AL 2,951,893

TELETYPEWRITER SWITCHING SYSTEM

Filed Nov. 25, 1953

INVENTORS J. A. KRECEK
BY G. A. LOCKE

R. C. Terry
ATTORNEY

Sept. 6, 1960

J. A. KRECEK ET AL 2,951,893

TELETYPEWRITER SWITCHING SYSTEM

Filed Nov. 25, 1953

| FIG. 10 | FIG. 11 | FIG. 12 | FIG. 13 | FIG. 14 | FIG. 15 |
|---|---|---|---|---|---|

(figure key map showing FIGS. 10 through 70)

INVENTORS J. A. KRECEK
G. A. LOCKE
BY
R. C. Terry
ATTORNEY

Sept. 6, 1960

J. A. KRECEK ET AL 2,951,893

TELETYPEWRITER SWITCHING SYSTEM

Filed Nov. 25, 1953

INVENTORS J. A. KRECEK
G. A. LOCKE
BY
R.C. Terry
ATTORNEY

Sept. 6, 1960

J. A. KRECEK ET AL 2,951,893

TELETYPEWRITER SWITCHING SYSTEM

Filed Nov. 25, 1953

INVENTORS J. A. KRECEK
G. A. LOCKE
BY
R.C. Terry
ATTORNEY

Sept. 6, 1960

J. A. KRECEK ET AL 2,951,893

TELETYPEWRITER SWITCHING SYSTEM

Filed Nov. 25, 1953

INVENTORS J.A. KRECEK
G.A. LOCKE
BY
R.C. Terry
ATTORNEY

Sept. 6, 1960

J. A. KRECEK ET AL 2,951,893

TELETYPEWRITER SWITCHING SYSTEM

Filed Nov. 25, 1953

INVENTORS J. A. KRECEK
G. A. LOCKE
BY
R.C. Terry
ATTORNEY

Sept. 6, 1960

J. A. KRECEK ET AL 2,951,893

TELETYPEWRITER SWITCHING SYSTEM

Filed Nov. 25, 1953

INVENTORS J. A. KRECEK
G. A. LOCKE
BY
R. C. Terry
ATTORNEY

Sept. 6, 1960  J. A. KRECEK ET AL  2,951,893
TELETYPEWRITER SWITCHING SYSTEM
Filed Nov. 25, 1953  69 Sheets-Sheet 25

INVENTORS J. A. KRECEK
G. A. LOCKE
BY
R.C. Terry
ATTORNEY

Sept. 6, 1960

J. A. KRECEK ET AL 2,951,893

TELETYPEWRITER SWITCHING SYSTEM

Filed Nov. 25, 1953

INVENTORS J. A. KRECEK
G. A. LOCKE
BY
R.C. Terry
ATTORNEY

Sept. 6, 1960 J. A. KRECEK ET AL 2,951,893
TELETYPEWRITER SWITCHING SYSTEM
Filed Nov. 25, 1953 69 Sheets-Sheet 28

INVENTORS J. A. KRECEK
G. A. LOCKE
BY
R.C. Terry
ATTORNEY

Sept. 6, 1960  J. A. KRECEK ET AL  2,951,893
TELETYPEWRITER SWITCHING SYSTEM
Filed Nov. 25, 1953  69 Sheets-Sheet 33

INVENTORS J. A. KRECEK
G. A. LOCKE
BY
R.C. Terry
ATTORNEY

Sept. 6, 1960 — J. A. KRECEK ET AL — 2,951,893
TELETYPEWRITER SWITCHING SYSTEM
Filed Nov. 25, 1953 — 69 Sheets-Sheet 37

INVENTORS
J. A. KRECEK
G. A. LOCKE
BY
ATTORNEY

Sept. 6, 1960 J. A. KRECEK ET AL 2,951,893
TELETYPEWRITER SWITCHING SYSTEM
Filed Nov. 25, 1953 69 Sheets-Sheet 44

INVENTORS J. A. KRECEK
G. A. LOCKE
BY
R.C. Terry
ATTORNEY

Sept. 6, 1960

J. A. KRECEK ET AL 2,951,893

TELETYPEWRITER SWITCHING SYSTEM

Filed Nov. 25, 1953

INVENTORS J. A. KRECEK
G. A. LOCKE
BY
R.C. Terry
ATTORNEY

INVENTORS J. A. KRECEK
G. A. LOCKE
BY
R.C. Terry
ATTORNEY

INVENTORS J. A. KRECEK
G. A. LOCKE
BY
R.C. Terry
ATTORNEY

INVENTORS J.A. KRECEK
G.A. LOCKE
BY
R.C. Terry
ATTORNEY

Sept. 6, 1960   J. A. KRECEK ET AL   2,951,893
TELETYPEWRITER SWITCHING SYSTEM
Filed Nov. 25, 1953   69 Sheets-Sheet 60

INVENTORS J. A. KRECEK
G. A. LOCKE
BY
R.C. Terry
ATTORNEY

Sept. 6, 1960 — J. A. KRECEK ET AL — 2,951,893
TELETYPEWRITER SWITCHING SYSTEM
Filed Nov. 25, 1953 — 69 Sheets-Sheet 61

INVENTORS J. A. KRECEK
G. A. LOCKE
BY R.C. Terry
ATTORNEY

INVENTORS J. A. KRECEK
G. A. LOCKE
BY
R. C. Terry
ATTORNEY

Sept. 6, 1960

J. A. KRECEK ET AL 2,951,893

TELETYPEWRITER SWITCHING SYSTEM

Filed Nov. 25, 1953

INVENTORS J.A. KRECEK
G.A. LOCKE
BY
R.C. Terry
ATTORNEY

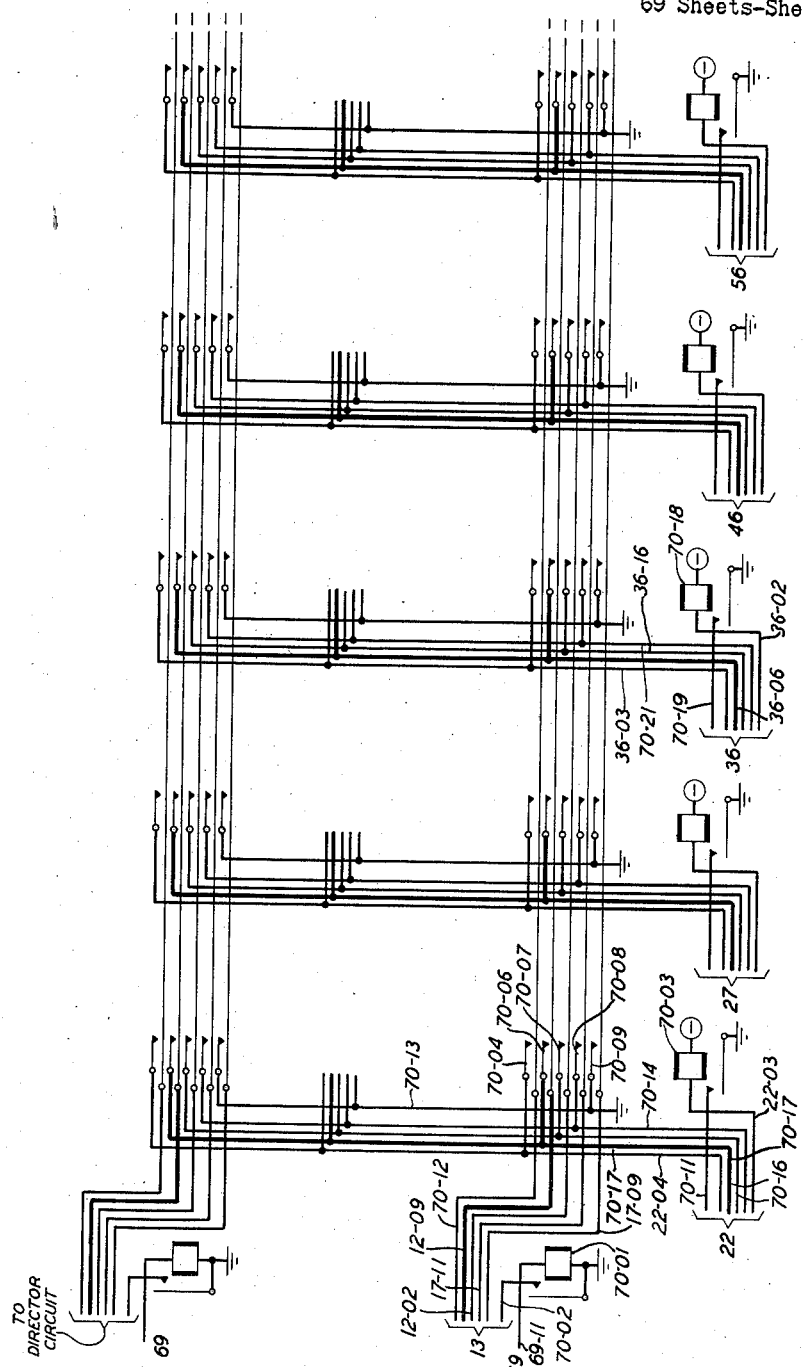

United States Patent Office

2,951,893
Patented Sept. 6, 1960

2,951,893

TELETYPEWRITER SWITCHING SYSTEM

Joseph A. Krecek, New Rochelle, and George A. Locke, Glen Head, N.Y., assignors to Bell Telephone Laboratories, Incorporated, New York, N.Y., a corporation of New York Filed Nov. 25, 1953, Ser. No. 394,339

50 Claims. (Cl. 178—4)

This invention relates to communication systems and particularly to telegraph systems including switching equipment for automatically directing and transmitting messages from a station of origin to a station of destination through one or more switching centers in accordance with and under the control of directing or address characters or code combinations preceding each message, and end-of-message characters or code combinations following each message.

A communication system answering to the above description is disclosed in Patent 2,430,447, granted November 11, 1947, to Branson, Kinkead, Krecek and Locke. An improved system of the same general type is shown in Patent 2,766,318, granted October 9, 1956, to Bacon, Knandel, Krecek and Locke. The present invention is an improvement upon the system shown in the above-identified patents, and particularly upon the system shown in the latter. Accordingly, the disclosure in Patent 2,766,318 is incorporated herein by reference as part of the present specification, and it will be relied upon to a considerable extent in lieu of duplication of its entire disclosure herein.

In the system disclosed in Patent 2,766,318 there are a plurality of switching centers interconnected directly or in tandem by full duplex trunks each having a plurality of full duplex lines terminating therein. The lines may be single station lines or multistation lines.

The incoming channel of each line and trunk terminates in a typing reperforator which records messages preceded by call directing codes designating the destinations to which the messages are to be transmitted, and followed by disconnect signals designating the ends of the messages.

Each reperforator has a transmitter for retransmitting the call directing codes, the messages and the disconnect signals. Each of these transmitters has cooperating with it a director circuit for decoding the call directing codes preceding the messages and for operating a link circuit, specifically a crossbar switch, to establish a cross-office path from the transmitter to the outgoing line or trunk channel over which the message must be transmitted to reach the addressee station designated by the call directing codes.

With the exception of multichannel trunk groups, the outgoing channels of full duplex trunks, and the outgoing channels of full duplex lines are equipped with reperforator-transmitter units. Two such units are associated with each single trunk outgoing channel and with each outgoing line channel. The cross-office path established by a director circuit, as hereinbefore mentioned, connects the transmitter of an incoming line or trunk reperforator-transmitter unit to one or the other of two outgoing line or trunk reperforator-transmitter units of the outgoing channel selected by the director circuit, if such outgoing line or trunk reperforator is idle or when one becomes idle. A cross-office path having been established, the call directing codes are transmitted over that path followed by the body of the message and then the disconnect signal. All of this material is recorded by the reperforator, and the director circuit, decoding the disconnect signal, disconnects the cross-office path and restores to normal. The transmitters of the outgoing line or trunk reperforator-transmitter units have access alternately to the respective channels to transmit the messages that have been recorded by the associated reperforators.

When the outgoing channel, over which the message is retransmitted, is a trunk, the message is received at a remote switching center terminating that trunk channel, at which point the procedure just described is repeated, the message being switched across office and retransmitted, until it reaches a switching center serving the station to which the message is addressed. At such switching center the message is retransmitted over the line with which the addressed station is associated and is received by that station.

In the case of single station lines a message outgoing from a switching center over such line is received by the single station terminating that line. In the case of multistation lines, there are station control circuits which are in the nature of secondary switching centers controlling selectively the association of receiving teletypewriters of the several stations with the transmission channel outgoing from the switching center. These station control circuits respond to the call directing codes preceding the messages transmitted over the channel and connect the addressed stations to receive the message.

One or more of the stations associated with a multistation line may have a tape transmitter for originating messages to be transmitted to the switching center. Since only one of these transmitters may transmit to the switching center at a time, the control of transmission from these transmitters is allocated to the switching center. The control is effected through a transmitter start circuit which is equipped to transmit signals for selectively starting individually the transmitters associated with a single station line. Whenever the incoming channel of a multistation line is idle, the transmitter start circuit interrupts transmission then in progress on the outgoing channel and transmits a sequence of signals, the function of which is to start another of the transmitters associated with the line. The transmitter start sequence or pattern of signals operates through the station control circuits to blind any teletypewriter recorder that has been receiving a message over the outgoing channel, so that recorder will not receive the transmitter start pattern of signals. The station control circuits then respond to the transmitter start signals, and one of those circuits attempts to start the particular transmitter designated by the signals. If the transmitter has a message awaiting transmission, in the form of perforated tape in the transmitter, the transmission of the message will be started. Incident to reception of the end of the transmitter start pattern of signals by the station control circuits, the teletypewriter recorder that was blinded is unblinded and message transmission on the outgoing channel is resumed.

If no message is awaiting transmission at the particular station, the incoming channel will remain idle and after a timed interval the transmitter start circuit will initiate the transmission of another complete transmitter start pattern of signals, seeking to start another transmitter. If this transmitter has a message awaiting transmission, it will be started, otherwise the procedure will be repeated, the stations being polled in rotation for message business until one has been started or until all have been given the opportunity to transmit. If no transmitter is started, the switching center awaits one or more minutes and again calls the roll of transmitters in succession to offer them an opportunity to transmit. When a transmitter that has been called has message material awaiting and begins transmission, the transmitter start circuit remains idle until the end of transmission from that station and in response to an end-of-transmission signal that follows the disconnect signal the transmitter start circuit is set in operation to begin a roll call of stations beginning with the next station in the rotational order.

Copending application Serial No. 392,789, filed November 18, 1953, by W. M. Bacon, D. E. Branson, G. J. Knandel and G. A. Locke, and issued January 27, 1959, as Patent 2,871,266, discloses and claims an improved arrangement for controlling transmission from the transmitters of the stations on a multistation line. One of the features of improvement is that a distinction is made between the priority and non-priority nature of messages awaiting transmission, and the stations are arranged to register one condition when a message awaiting transmission is a priority message and to register a different condition when a message awaiting transmission is a non-priority message. Two different transmitter starting codes are assigned to any station equipped to transmit both priority and non-priority messages, one of which will cause the starting of the transmitter if a priority message is awaiting transmission but will not start it if a non-priority message is awaiting transmission, and the other having the opposite effect on the transmitter. Moreover, each station, upon being called for either priority or non-priority traffic, if it has no traffic awaiting transmission, automatically transmits an answering signal to register the fact that it has no traffic. This eliminates the timed delay in the transmission of successive transmitter start patterns of signals that occurs in the operation of the system described in the hereinbefore identified Patent 2,766,318.

The calling of the roll of transmitters is additionally expedited in the arrangement shown in Patent 2,871,286, by eliminating the repetition of the entire transmitter start pattern for each transmitter called in a roll call, the complete pattern being transmitted only at the beginning of the roll call and the transmitter selecting signals of the stations being transmitted in sequence as fast as each called transmitter returns the answer-back signal until a transmitter is started. When a station responds by the starting of its transmitter, the roll call is suspended and the transmitter start circuit remains dormant until the end-of-transmission signal is received from that transmitter, when the complete transmitter start pattern is again transmitted.

Each time that the transmitter start circuit is activated to initiate a roll call of transmitters it transmits the priority start signals first, beginning with the station next in the sequence after the last previous priority message transmission. If all of the transmitters that are equipped for priority message transmission are polled and none has traffic awaiting transmission, the transmission of non-priority start codes takes place, beginning with the next station in the sequence after the last previous non-priority transmission.

Returning to consideration of the equipment at a switching center in the telegraph switching system shown in Patent 2,766,318, there is a multiple address circuit for the handling of messages preceded by the address codes of two or more destinations. This circuit comprises two storage levels each comprising a reperforator-transmitter, either being seizable, if available, by the director circuit of any incoming line or trunk. A special multiple address code causes messages to be routed to one of the reperforator-transmitters in the multiple address circuit and the message, preceded by its two or more address codes, is recorded. A director circuit cooperates with either of the two multiple address reperforator-transmitter units to connect them to the necessary outlets, whether reperforator-transmitter units associated with single station or multistation outgoing lines or single outgoing trunks, or the channels of multichannel trunks, and upon the seizure of all of the outlets needed to forward the message towards its destination as designated by the address codes the message is transmitted once and simultaneously to those outlets.

There is also an adjunct to the multiple address circuit which is called a group code circuit. The use of this circuit is predicated upon the operating circumstance that certain types of messages are always addressed to certain specific stations. To eliminate the necessity for preceding such messages by the individual address code of each station that is to receive it, an address code is assigned which represents the group comprising all of the stations that are to receive the message, and this code precedes the message. When the multiple address director circuit decodes a group code, it calls upon the group code circuit to seize all of the outlets represented by that code, and when they have been seized the message is transmitted to all of them as in the case of a regular multiple address message. The address codes preceding a multiple address message may include individual address codes as well as group codes, in which case the multiple address director circuit will cause seizure, one by one, of the outlets appropriate to the individual address codes and will call upon the group code circuit to seize all of the outlets appropriate to any group code included among the address codes.

The switching center, as disclosed in Patent 2,766,318, also includes local or multiple outlets comprising a plurality of teletypewriter recorders designated in common and indiscriminately by an individual address code and by one or more group codes. The several recorders of any multiple outlet are available for seizure by any of the director circuits in response to single address or group codes until all are busy. The multiple outlet is similar to the multichannel trunk, but whereas the channels of the latter extend to a remote switching center, the former comprises teletypewriter recorders contained in the switching center or associated with local lines extending from the switching center to nearby stations.

The switching center also includes intercepts, one type being provided for automatically intercepting messages that are preceded by faulty or unassigned address codes, another serving as a destination for messages addressed to stations which are for any reason not in operation or which have troubles on their lines or at their terminating stations, the diversion of the messages to the intercept, which has been designated "wilful," being automatic following the operation of manually operable keys representing the various individual or group address codes. A third intercept is associated exclusively with the multiple address circuit and serves both as a miscellaneous and wilful intercept, to receive messages preceded by any faulty address code or for any destination the traffic for which is being intentionally intercepted.

The present invention is directed particularly to the switching center, and it is a fundamental object of this invention to expedite the establishment of transmission paths through the switching center and the transmission of messages over those cross-office paths. According to one aspect of the foregoing fundamental object, a specific object of this invention is to improve the allotment of access of the director circuits to the link circuit by an improved sequence circuit giving the director circuits opportunity in rotational sequence to establish cross-office paths through the link circuit.

According to another aspect of the fundamental object of the invention hereinbefore recited, a specific object of the invention is to increase the capacity of the switching center to handle multiple address and group code messages by providing a considerable number of multiple address message storage levels to be seized in rotational sequence.

Another object of the invention is to provide for the rapid handling of urgent or priority messages by directing them to special intermediate storage levels in the switching center, comparable with the reperforator-transmitter units of the previously-mentioned multiple address circuit, from which they may be redirected to appropriate outlets in accordance with the address codes on a preferential basis as compared with cross-office routing non-priority messages.

Another object of the invention is to combine the handling of multiple address messages and priority messages in one set of intermediate storage levels comprising reperforator-transmitter units.

Another object of the invention is to allot any number of the intermediate storage levels to priority messages and the remainder to non-priority multiple address messages.

Another object of the invention is to accommodate both single address priority messages and multiple address priority messages in the intermediate storage levels allotted to priority message traffic.

Another object of the invention is to provide a single director circuit to control the routing of messages from any level of the urgent message and multiple address intermediate storage to the appropriate outlet.

Another object of the invention is to provide for the servicing of the priority levels of intermediate storage by the director circuit on a preferential basis in comparison with the non-priority multiple address levels.

Another object of the invention is to supplement the regular two levels of message storage of any single channel outgoing trunk or single station or multistation outgoing line with an extra level of message storage to receive priority messages exclusively.

Another object of the invention is to allot a transmission turn to the priority storage level of the outgoing line or trunk circuit after both of the regular storage levels have had a turn, or after either has had a turn when the other has no traffic awaiting transmission.

Another object of the invention is to cause the transmission of all of the messages stored in the priority storage level of an outgoing line or trunk circuit in any transmission turn allotted thereto.

Another object of the invention is to route priority messages to either regular storage level of an outgoing line or trunk when that outlet is not equipped with a priority storage level.

Another object of the invention is to provide manually operable means for causing the priority storage level of an outgoing line or trunk circuit to appear busy.

Another object of the invention is to cause priority messages to be transmitted to either of the regular storage levels when the priority storage level has been made to appear busy under manual control.

According to still another aspect of the foregoing fundamental object, a specific object of this invention is to provide a rotational sequence for seizure of individual elements of multiple outlets, such as the channels of multichannel trunks and the teletypewriter recorders of multiple local outlets.

According to another aspect of the fundamental object, it is a specific object of the invention to employ multiple outlets for any or all of the several intercept services.

The invention features an arrangement manually conditionable when the supply of tape in a reperforator is running low, and automatically operable at the end of the message being received at the time of the manual conditioning for switching to a spare reperforator.

The invention also features an arrangement manually conditionable after a depleted tape supply in a reperforator has been replenished and automatically operable at the end of the message being received at the time of the manual conditioning for disconnecting the spare reperforator.

The invention also features the use of a crossbar switch as a decoding fan circuit of a director circuit.

The invention also features an electronic hub circuit for cross-office path transmission, providing for voltage variation rather than current variation for the marking and spacing elements of signals, thereby eliminating heavy current flow involved in current transmission of multiple address messages, and eliminating current changes when establishing and disestablishing transmission paths.

A system for accomplishing the foregoing objects and others that may hereinafter be set forth or become apparent and embodying the foregoing features and others which may also be hereinafter set forth or become apparent, may be fully understood by reference to the following detailed description to be interpreted in the light of the accompanying drawings wherein:

Figs. 1 to 7, when arranged in accordance with the pattern of Fig. 8, show in general schematic form a typical system comprising switching centers interconnected by trunks and each having lines which it serves, typical components of one switching center also being represented.

Figs. 10 to 70 are circuit drawings which, when arranged according to the pattern of Fig. 9, show portions of a switching center, which portions are a single channel incoming trunk circuit, a director circuit, a link circuit, an intercept key circuit, an outgoing single channel trunk circuit, a sequence circuit, a multiple address circuit, a group code circuit and a multiple address intercept circuit.

The several circuits, as identified in the foregoing paragraph, are comprised of the following drawings:

Fig. 70 shows the link circuit used by the regular director circuits.

*General description*

Figure 1:
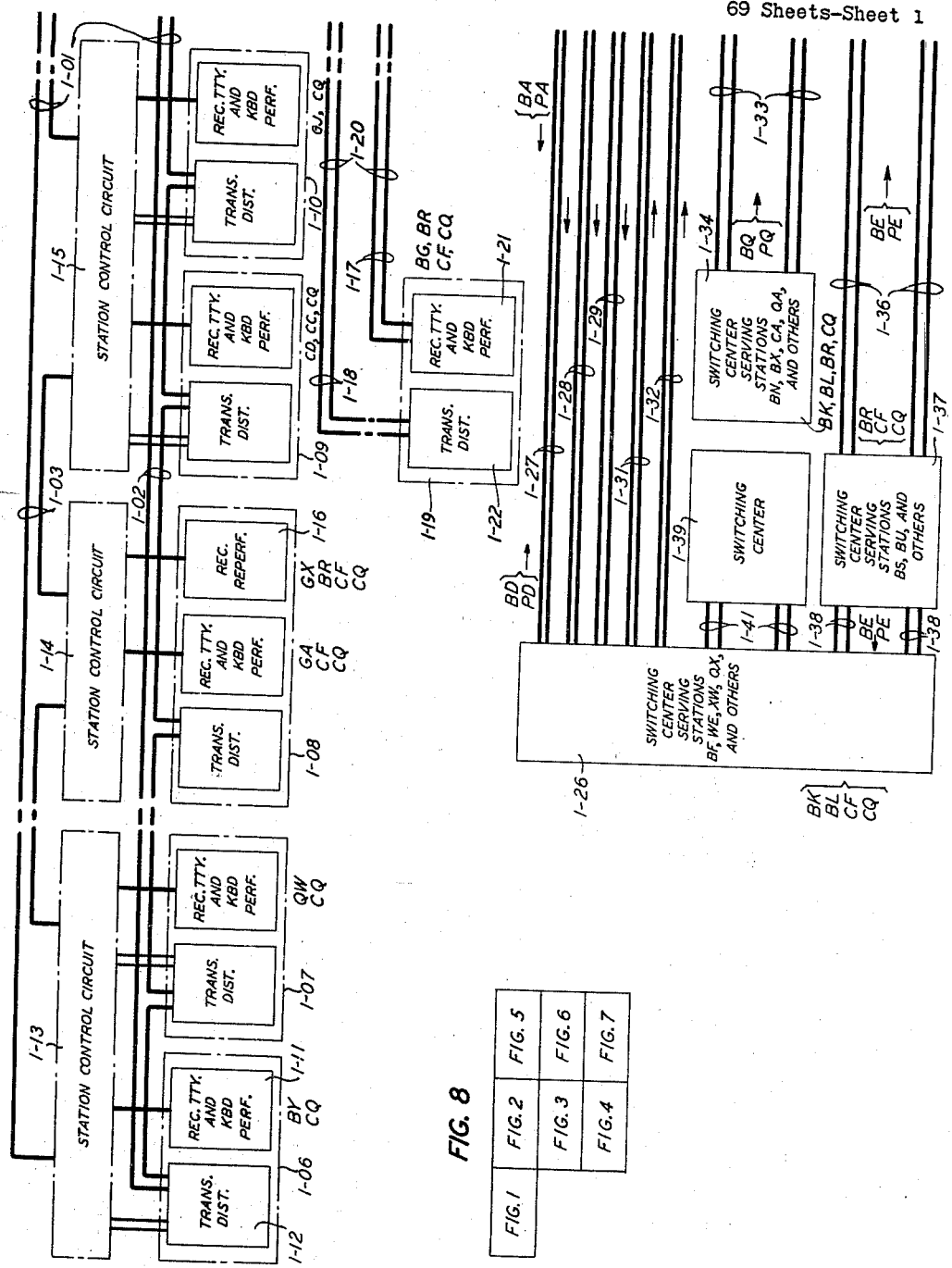

The general features of the system will now be described with reference to Figs. 1 to 7, inclusive, when arranged as shown in Fig. 8. Fig. 1 shows in block diagrammatic form the stations and equipment connected to a typical full duplex party line 1–01. The full duplex party line 1–01 comprises a transmission channel or path 1–02 for transmitting signaling impulses from the outlying subscriber stations to the central switching center shown in Figs. 2 to 7, and a receiving channel 1–03 for transmitting signal impulses from the switching center to the outlying subscriber stations.

The party line 1–01 has been shown in the drawings as comprising two separate and distinct metallic transmission circuits. It is to be understood, however, that these lines or paths may include any of the usual types of transmission systems suitable for the transmission of telegraph permutation code pulses. These two channels may form the two paths of a bridge-type full duplex transmission system, in which case the impulses transmitted to and from the switching center are transmitted over a single line conductor, as is well understood in the art. These lines may also include telegraph channels of composite telephone and telegraph lines, channels of voice frequency carrier current, channels of high frequency carrier current, radio channels and time division multiplex channels, and the method of transmission over these channels may be in accordance with any of the well-known transmission systems, including pulses of current and no current, pulses of positive and negative current, pulses of currents of different magnitudes, pulses of carrier current and no carrier current, pulses of carrier currents of different frequencies, and pulses of current in some portions of the system may be represented by pulse of no current in other portions of the system, as is well understood in the various types of telegraph transmitting systems.

The full duplex telegraph line 1-01 extends to five outlying subscriber stations designated 1-06 through 1-10. Each of these subscriber stations is provided with a receiving teletypewriter and keyboard perforator, represented in the case of station 1-06 by the labeled rectangle 1-11, and is also provided with a tape transmitter-distributor represented, in the case of station 1-06, by the labeled rectangle 1-12. The function of receiving teletypewriter 1-11 is to receive messages transmitted from the switching center. The function of the keyboard perforator associated with the receiving teletypewriter is to prepare a tape by perforating it in accordance with messages to be transmitted from the station to the switching center. The function of the transmitter-distributor 1-12 is to transmit messages under the control of the perforated tape.

While receiving apparatus and transmitting apparatus have been shown at each of the subscriber stations, it will be readily understood by those skilled in the art that receiving-only equipment may be provided at certain stations, and that transmitting apparatus only may be provided at other subscriber stations. Since the receiving and transmitting equipments operate substantially independently of each other, each station may be arranged to transmit or receive or both, in accordance with the subscriber's particular requirements.

Typical apparatus suitable for use in combination with the circuits of the system described herein for receiving messages and perforating tape and transmitting signals in accordance with the perforated tape at the subscriber stations are described in detail in United States Patents 1,965,572, granted July 10, 1934, to C. W. Burcky and A. H. Reiber; 1,965,602, granted July 10, 1934, to R. A. Lake, and 1,969,891, granted August 14, 1934, to R. A. Lake and H. W. Stoelk, and the disclosures of these patents are incorporated herein by reference as part of the present specification.

The receiving and transmitting equipment at each of the subscriber stations is controlled by a secondary or subordinate switching center or station control circuit which may be located in the immediate vicinity or on the premises of one or more outlying subscriber stations.

In Fig. 1 three such secondary switching centers have been shown, the subordinate switching center 1-13, or station control circuit as it is also called, serving the subscriber stations 1-06 and 1-07, the station control circuit 1-14 serving only the one subscriber station 1-08 and the station control circuit 1-15 serving subscriber stations 1-09 and 1-10. The provision of the station control circuit 1-14 serving only the single subscriber station 1-08 is explained by the fact that this subscriber station is provided with two receiving recorders, namely a receiving printer and a tape reperforator which are to receive messages on a selective basis, and the station control circuit is needed in order to effect the selection between them. The reperforator is designated by the reference numeral 1-16, and may be of the type shown in Patent 2,042,788, granted June 2, 1936, to H. L. Krum, or Patent 2,255,794, granted September 16, 1941, to R. A. Lake, and the disclosures of these patents are incorporated herein by reference as part of the present specification.

The station control circuits include a monitoring selector mechanism connected to the receiving channel 1-03 of multistation line 1-01, which selector is provided with numerous contacts that are selectively activated in response to various signals transmitted over the party line. These contacts are employed to control the switching apparatus for connecting the receiving equipment at the several subscriber stations to the receiving channel 1-03 and for controlling the operation of the tape transmitters to transmit signals over the transmission channel 1-02.

The monitoring selector which is employed as an element of the station control circuit may be characterized as a sequentially operated teletypewriter selector. In some instances, as for example in Patent 2,766,318, it has been called a Sotus unit, a word derived from the initial letters of the descriptive title "sequentially operated teletypewriter universal selector." It is arranged to receive permutation code telegraph signals and to operate selectable elements in response to the reception of the code combinations. It is provided with interlocking latches by means of which certain of the selectable elements may respond to their assigned code combinations only upon being unlatched or prepared for operation by the signal responsive operation of a selectable member in response to a different code combination or the same code combination, from which it follows that the first-mentioned selectable member is operable only in response to reception of the particular two code combinations in sequence. In the case of the control of transmitters, single code combinations are employed for effecting the desired controls, whereas the receivers, such as printers, or the reperforator 1-16, are connected selectively to the receiving channel 1-03 by address codes comprising a sequence of two call directing code combinations. Typical address codes are shown in Fig. 1 for the receiving equipment associated with the receiving channel 1-03. Thus the receiving teletypewriter 1-11 at station 1-06 is designated by the individual address code BY, the receiver at station 1-07 has the address code QW, the receiving teletypewriter at station 1-08 has the address code GA and the receiving reperforator at that station has the address code GX, and the receivers at stations 1-09 and 1-10 have been assigned the address codes CD and GJ, respectively.

Any subscriber station, in addition to being connectable by the station control circuit to the receiving channel 1-03 in response to its assigned address code, may also be connected in response to one or more group address codes. These are two-letter codes that are assigned in common to a plurality of stations to which messages of a particular type or character are frequently directed, and the group address code will cause the message to be transmitted to all of the stations, regardless of where located in the system, to which that group address code has been assigned. For example, it is indicated in Fig. 1 that the receiving teletypewriter 1-06 is selectable in response to the group address code CQ as well as in response to its individual address code BY. Similarly, the receiving teletypewriter at station 1-07 is selectable in response to group code CQ in addition to its individual address code QW. The receiving teletypewriter at station 1-08 is responsive to group codes CF and CQ, and the receiving reperforator at that station is responsive to group codes BR, CF, and CQ. The teletypewriter at station 1-09 is responsive to group codes CC and CQ in addition to the individual address code CD and the teletypewriter at station 1-10 is responsive to group code CQ. The station control circuits are provided with properly coded combinations of interlocked first and second selectable members to connect the stations selectively to the receiving channel 1-03 in response to the assigned group codes.

In addition to assigning address codes to the receiving equipment at each of the stations connected to the multistation line 1-01, one or two codes may be assigned to each transmitter connectable thereto, to enable the transmitter to be controlled from the central switching station through the subordinate switching center or station control circuit. One of the two codes that may be assigned to any station represents selection of the station to transmit a priority message and the other represents selection of the station for transmission of a non-priority message. Ten individual codes are assigned for priority message pick-up and ten other individual codes are assigned for non-priority message pick-up. Each station is provided with a key for indicating alternatively that a message tape placed in the transmitter and awaiting transmission is of priority or non-priority degree of urgency. A transmitter will be started in response to its priority start code only if the key has been operated to the priority indicating position. The arrangement for controlling the transmission of priority and non-priority message traffic from party line stations is fully described and shown in the Bacon et al. Patent 2,871,286.

Another full duplex circuit appearing in Fig. 1 is designated by the reference numeral 1–20 and comprises receiving channel 1–17 and transmitting channel 1–18. The full duplex channel 1–20 terminates in a single station 1–19 which has exclusive use of the channel and comprises a receiving teletypewriter combined with a keyboard perforator, this unit being designated 1–21 and connected to receiving channel 1–17, and a tape transmitter 1–22 connected to transmitting channel 1–18. Since the tape transmitter 1–22 has sole and exclusive access to transmitting channel 1–18, it has no transmitter start codes assigned to it as have the transmitters associated with a multistation line, because transmission from station 1–19 is not controlled from the switching center and the station may transmit at any time. There is no station control circuit associated with the station 1–19 because the receiving teletypewriter 1–21 is always connected to receiving channel 1–17 and will receive all signals incoming over that channel. It has been assumed that channel 1–17 is selectable at the switching center by individual address code BG and by group address codes BR, CF and CQ.

The full duplex party line 1–01 and the full duplex single station line 1–20 extend to the switching center which serves those lines, the circuits and apparatus of which are indicated diagrammatically in Figs. 2 to 7. The switching center, in addition to serving the lines indicated, also has connection directly and indirectly by means of trunk circuits with other switching centers. In the middle of Fig. 1 a multiple channel trunk directly connects the switching center shown in Figs. 2 to 7 to a switching center 1–26. It has been assumed that there is sufficient traffic from the switching center in Figs. 2 to 7 to the switching center 1–26 to justify three transmission channels in that direction, and these channels are designated by the reference numerals 1–27, 1–28 and 1–29. It has further been assumed that the volume of traffic in the opposite direction is lighter and that it may be accommodated by two channels designated 1–31 and 1–32. It has been assumed that the switching center 1–26 serves stations having the individual address codes BF, WE, XW, QX and others, and having group codes BK, BL, CF and CQ and others.

When there is still less traffic between two switching centers a simple full duplex trunk, comprising a single transmission channel in each direction, may be provided and two such trunks terminating at the switching center in Figs. 2 to 7 are shown, one designated by the reference numeral 1–33, extending to a switching center 1–34, represented merely by a labeled rectangle and the other, designated by the reference numeral 1–36, extending to a similarly represented switching center designated by the reference numeral 1–37. As indicated in Fig. 1, it has been assumed that switching center 1–34 serves stations having the individual address codes BN, BX, CA, QA and others, and group codes BK, BL, BR and CQ and others, and that the switching center 1–37 serves stations having the individual call directing codes BS and BU and others, and group codes BR, CF and CQ and others.

A full duplex trunk circuit designated 1–38 connects switching center 1–37 to 1–26. Another switching center 1–39, with reference to which no code assignments have been assumed, is connected to switching center 1–26 by full duplex trunk 1–41.

In view of the fact that no other trunk circuits have been shown in association with switching centers 1–34 and 1–39, it is to be assumed that neither has direct connection with the other nor with switching center 1–37, and that the switching center 1–34 cannot directly reach the switching center 1–26 nor can the switching center 1–39 directly reach the switching center shown in Figs. 2 to 7. This arrangement of switching centers is typical of systems of this type.

The terminal equipment for the lines and trunks represented in Fig. 1 is shown in Figs. 2 to 7 which also show diagrammatically other circuits and equipment at the switching center. Considering first the terminal equipment of party line 1–01, the transmitting channel 1–02 terminates in an incoming line circuit indicated generally by reference numeral 2–01. This incoming line circuit controls the reperforator 2–02 and the receiving-only teletypewriter 2–03. The incoming line circuit recognizes certain address codes preceding messages and causes those that are directed to the switching center as a destination to be recorded on the receiving-only teletypewriter 2–03. If the message is to be transmitted to another station, in addition to being recorded on teletypewriter 2–03, it will be recorded also on the reperforator 2–02. If the message is not to be printed for the use of the switching center, it will be recorded only on the reperforator 2–02. A transmitter 2–04 is combined with the reperforator 2–02 to form a unit 2–06. Reperforator-transmitter unit 2–06 may be of the type shown in E. A. Gubisch Patent 2,348,214, granted May 9, 1944, and may include a tape feed indicating contact mechanism such as that disclosed in T. L. Corwin Patent 2,418,464, granted April 8, 1947. Transmitter 2–04 is connected to a director circuit 2–07 which, under the control of transmitter 2–04, decodes the address portion of a message and then, under the supervision of a sequence circuit 4–01, operates a select magnet 5–01 individual to that director, and thereafter operates a hold magnet associated with the channel over which the message is to be transmitted.

The switching apparatus employed in the typical embodiment of this invention and described herein makes use of a link circuit or switch having a plurality of groups of contacts arranged in a rectangular coordinate pattern. Switches of this type are frequently called crossbar switches and are arranged so that any set of contacts may be selected and actuated by operating mechanism comprising select and hold magnets representing the coordinates of the group of contacts to be operated. For example, the usual arrangement is to provide the sets of contacts in rows and columns and to select and operate any set of contacts by operating a select magnet which is common to a row of sets of contacts, and then to operate a hold magnet which is common to a column of sets of contacts. Only that set of contacts which represents the intersection of the row and the column will be operated.

Figure 5:
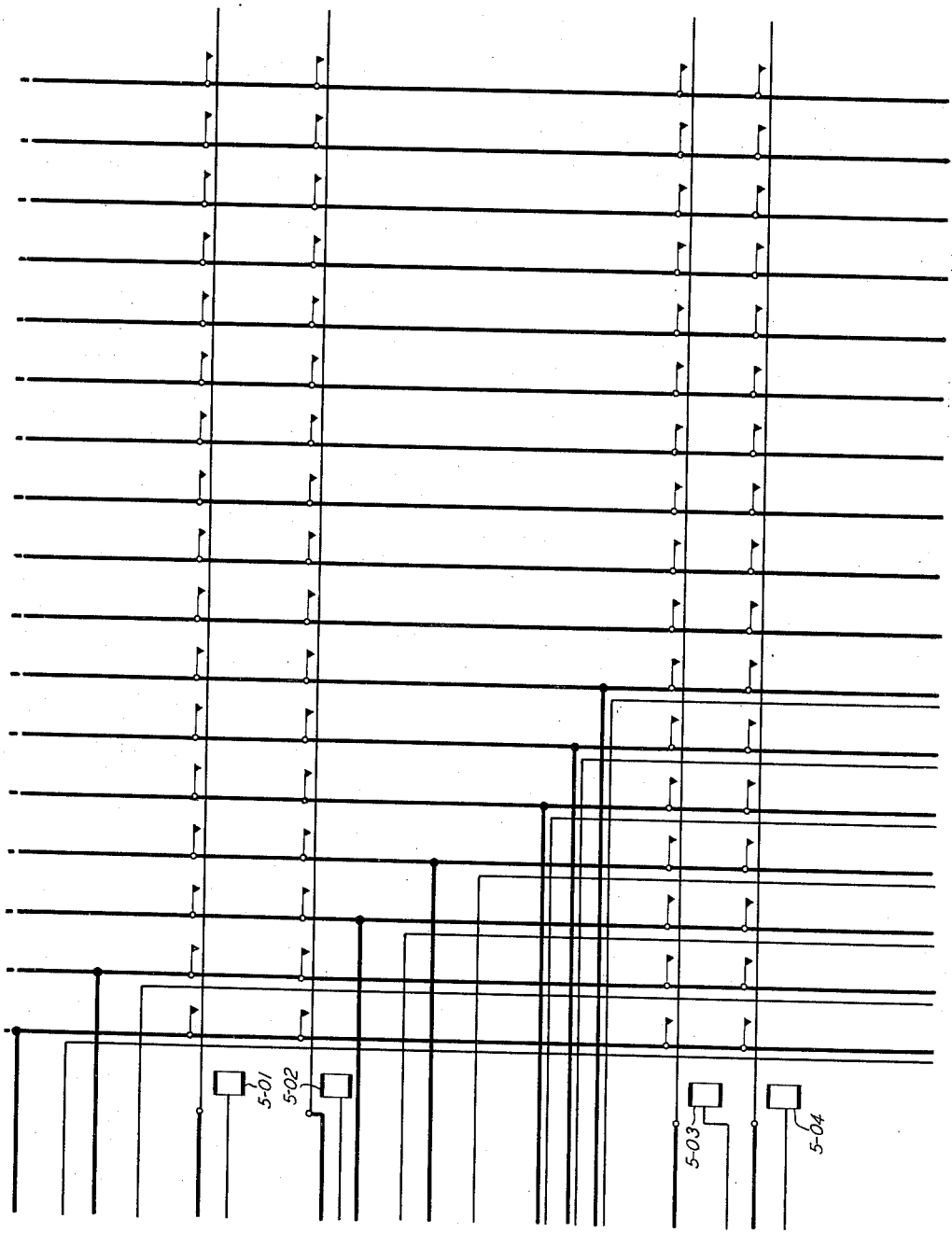
Figure 6:
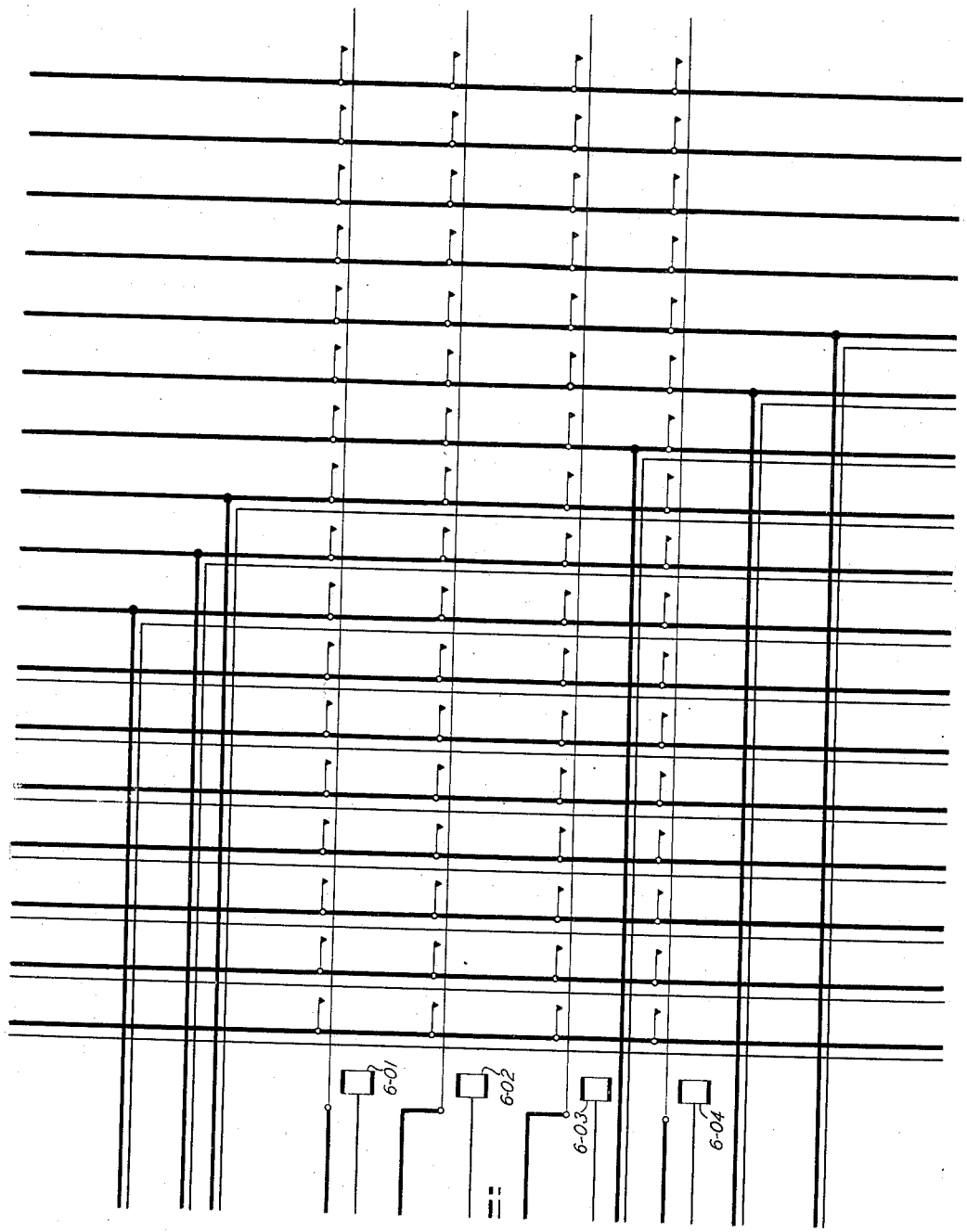
Figure 7:
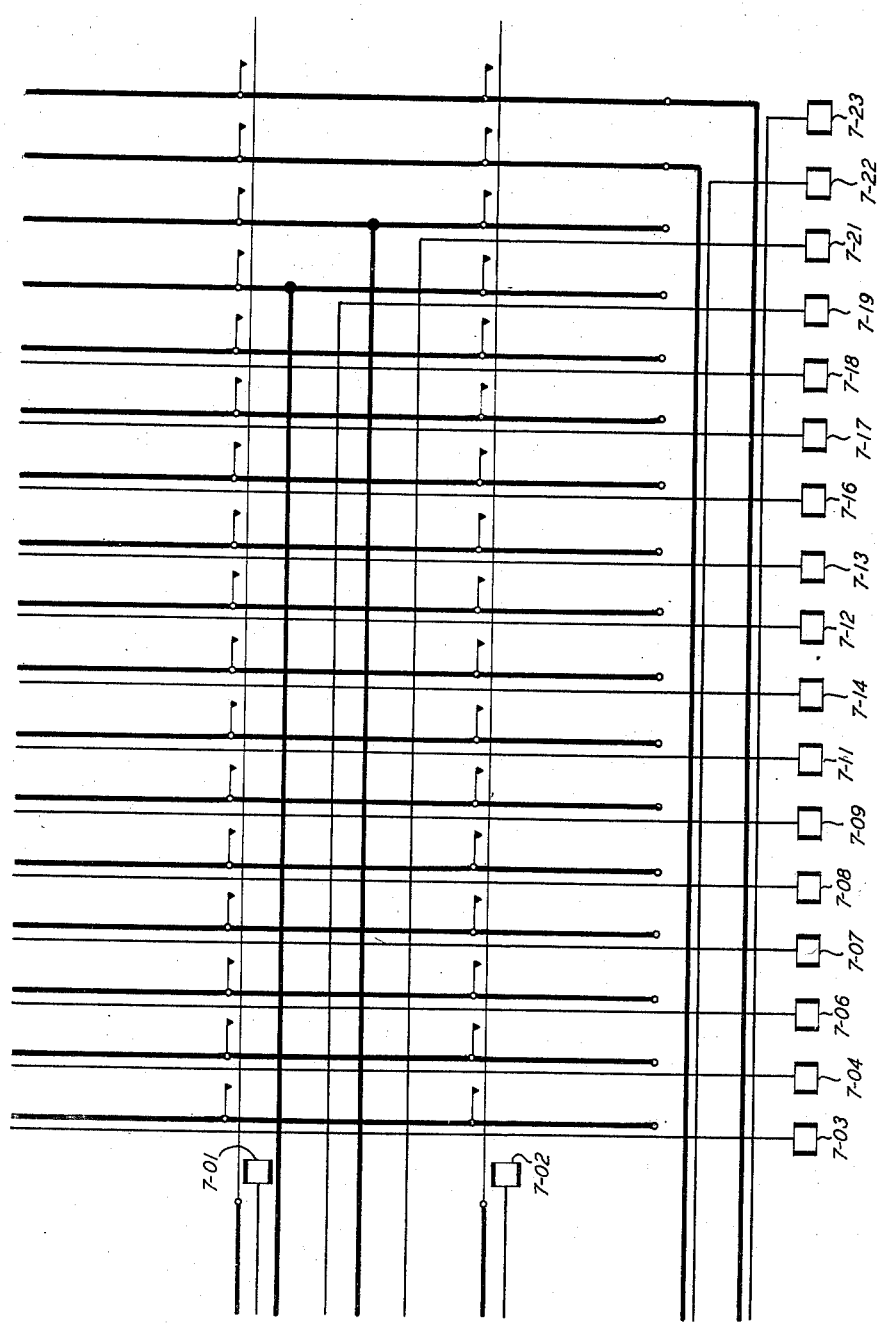

Figs. 5, 6 and 7 contain a schematic representation of a crossbar switch. The select magnets for the incoming channel of the party line 1–01, single station line 1–20, trunk 1–33 and trunk 1–36 are identified by reference numerals 5–01, 5–02, 7–01 and 7–02, respectively. Select magnets for the incoming channels 1–31 and 1–32 of the multichannel trunk are designated by reference numerals 5–03 and 5–04. Select magnets for other sources of messages to be routed through the switching center are shown in Fig. 6 as will be described hereinafter.

Access to the channel 1–03 of the full duplex party line 1–01, this being the channel over which the stations of that line receive messages from the switching center, is had through the instrumentality of two reperforator-transmitter units 2–08 and 2–09 which may be similar to the reperforator-transmitter unit 2–06. Each of the reperforator transmitter units 2-08 and 2-09 has its own set of input control relays 2-11 and 2-12, respectively, and these sets of relays cooperate mutually with each other and individually with their respective reperforator-transmitter units to control the selective establishment of a connection to one or the other of the reperforators, if idle, through the crossbar switch. Hold magnets 7-03 and 7-04, when operated, establish transmission paths to the reperforator units 2-08 and 2-09, respectively.

The transmitting portions of reperforator-transmitter units 2-08 and 2-09 are associated with outgoing channel 1-03 which has hereinbefore been identified as the receiving channel from the standpoint of the subscriber stations of party line 1-01. These transmitters have sets of control relays 2-13 and 2-14, respectively, and there is also a common set of control relays 2-16, the three sets of relays cooperating to give one or the other of the transmitters access to the outgoing channel 1-03.

A transmitter start circuit, identified by reference numeral 2-17, which is described in full in previously identified Patent 2,871,286, cooperates with the incoming line circuit 2-01 and the set of control relays 2-16 to cause the transmission to the outgoing channel 1-03 of code signals for starting any of the transmitters associated with party line 1-01. Transmitter start circuit 2-17 is arranged for automatic operation to cause the several transmitters associated with the party line to obtain transmitting access thereto in rotation.

Transmitting channel 1-18 of the single station line 1-20 is connected at the switching center to an incoming line circuit 2-18 which has associated with it a reperforator-transmitter unit 2-19 and a receiving-only teletypewriter 2-21, either or both of which may be connected to receive a message from station 1-19 according to the address codes preceding the message. A director circuit 2-22 is associated with the transmitter of reperforator-transmitter set 2-19 for decoding the address codes preceding a message and for operating under the supervision of sequence circuit 4-01, its selector magnet 5-02, and thereafter one of the hold magnets according to the destination of the message as determined by the director circuit.

On the outgoing side the single station line has the reperforator-transmitter sets 2-23 and 2-24 and their associated sets of control relays 2-26 and 2-27, respectively, pertaining to the admission of an outgoing message into one or the other of the reperforators, and the individual sets of control relays 2-28 and 2-29 supervised by the common set of control relays 2-31 pertaining to the operation of one or the other of the two transmitters to transmit a message over outgoing channel 1-17 of the single station line. Hold magnets 7-06 and 7-07 give access to reperforator-transmitter units 2-23 and 2-24, respectively.

The two incoming channels 1-31 and 1-32 of the multichannel trunk terminate in the same kind of equipment as the incoming channel of single station line 1-20, namely in an incoming trunk circuit 2-32, reperforator-transmitter unit 2-33 and director circuit 2-34 in the case of incoming channel 1-31 and incoming trunk circuit 2-36, reperforator-transmitter unit 2-37 and director circuit 2-38 in the case of incoming trunk channel 1-32. There is nothing about the termination of channels 1-31 and 1-32 that identifies them as being interrelated at their point of origin in switching center 1-26 as channels of a multiple channel trunk and to all intents and purposes they are merely incoming trunks. Director circuits 2-34 and 2-38 have their individual select magnets 5-03 and 5-04, respectively, which they operate when establishing a connection through the crossbar switch to an outgoing line or trunk. The incoming trunk circuit may or may not be provided with receiving-only teletypewriters, and have been shown as not being so equipped.

The multichannel outgoing trunk comprising channels 1-27, 1-28 and 1-29 differs from the equipment associated with the single channel outgoing trunks in that there is no reperforator-transmitter unit included in the equipment as in the case of outgoing single channel trunks and outgoing single station and multistation lines. Instead, there is certain equipment common to all of the outgoing channels, designated by the reference numeral 2-39 and other equipment individual to each of the outgoing channels designated 2-41, 2-42 and 2-43. When one of the director circuits decodes an address code of a station which is served by or reached through the switching center 1-26, it will seize one of the outgoing channels of the multichannel trunk, if there is an idle channel, and the message will be transmitted from the transmitter associated with the incoming line or trunk circuit over which the message arrived, directly across the office and over the seized channel of the outgoing multichannel trunk to the switching center at the opposite end of that trunk. When all of the channels are busy, a director circuit that seeks access to them will receive a busy signal. Because of the fact that the channels of the outgoing multichannel trunk have no reperforator to provide a permanent record of outgoing transmission that is provided by the reperforators associated with outgoing lines and single channel trunks, each of the outgoing multichannel trunks is provided with a receiving-only printer which records outgoing traffic and provides a record to which reference may be had when any question arises as to loss of message or other irregularity. Hold magnets 7-08, 7-09 and 7-11 give access to the outgoing multichannel trunk channels.

It may be desirable to have one or more message receiving stations located in the switching center itself, or at one or more nearby points which may be considered as being local in character. The provision of direct lines from the switching office to such local stations avoids the necessity of receiving the messages at the switching center and sending them to their ultimate local destination by messenger. Since there may be sufficient traffic for such local outlets, whether located in the switching center or at a distance therefrom, to require more than one receiving recorder, the principle of the multichannel trunk has been applied to the service of providing local outlets, a message for any such outlet being switched directly through the crossbar switch and across the office to one of a plurality of receiving-only printers, providing a printer of the outlet is idle. This arrangement is exemplified in Fig. 3 by a common set of control relays represented by the rectangle 3-01 and sets of control relays represented by the rectangles designated 3-02 and 3-03 individual to the receiving-only teletypewriters 3-04 and 3-06. The local outlet 3-01 has been assigned the individual address code CR and this outlet is also included in the group of stations that receives messages preceded by the group code BL, and of course the outlet also receives any message preceded by the universal group code CQ. Two receiving printers have been indicated and their individual sets of control relays have been designated to indicate that they are the first and fourth of a plurality of printers comprising the outlet. It has been found convenient and feasible to expand such an outlet to as many as ten receiving printers when traffic conditions warrant that many. Hold magnets 7-12 and 7-13 give access to the two indicated recorders of local outlet 3-01.

As many different local outlets as are required may be provided, it being understood that each local outlet is designated by a different individual address code, in addition to any group codes and it being also understood that each such outlet may comprise a plurality of recorders, any of which, when idle, is available to record a message. A second local outlet is indicated by the common set of relays 3-07, an individual set of relays 3-08 and a typing reperforator 3-09. This local outlet which has the individual address code GD and which is also responsive to the group codes BL, BR and CQ has been indicated as comprising only one recorder but it may be expanded by the addition of recorders and their individual sets of control relays. The typing reperforator may be provided under the circumstances that it may be desirable to retransmit the received message over some other system, or that within the discretion of an attendant it may be desirable to retransmit the message within the system herein disclosed, by the addition to the perforated message tape of the address code of a station to which the message is to be transmitted and the introduction of the message into the system at an originating station, which is a facility that will be described hereinafter. It will be apparent that a local outlet may comprise receiving-only printers or typing reperforators but that it should not include both, for the reason that there is no selective choice as between one or the other of the recorders or receivers of a local outlet and it would not be possible to direct a message to one or the other of the two types of recorders within a local outlet. Hold magnet 7–14 gives access to local outlet 3–07.

Figure 3:
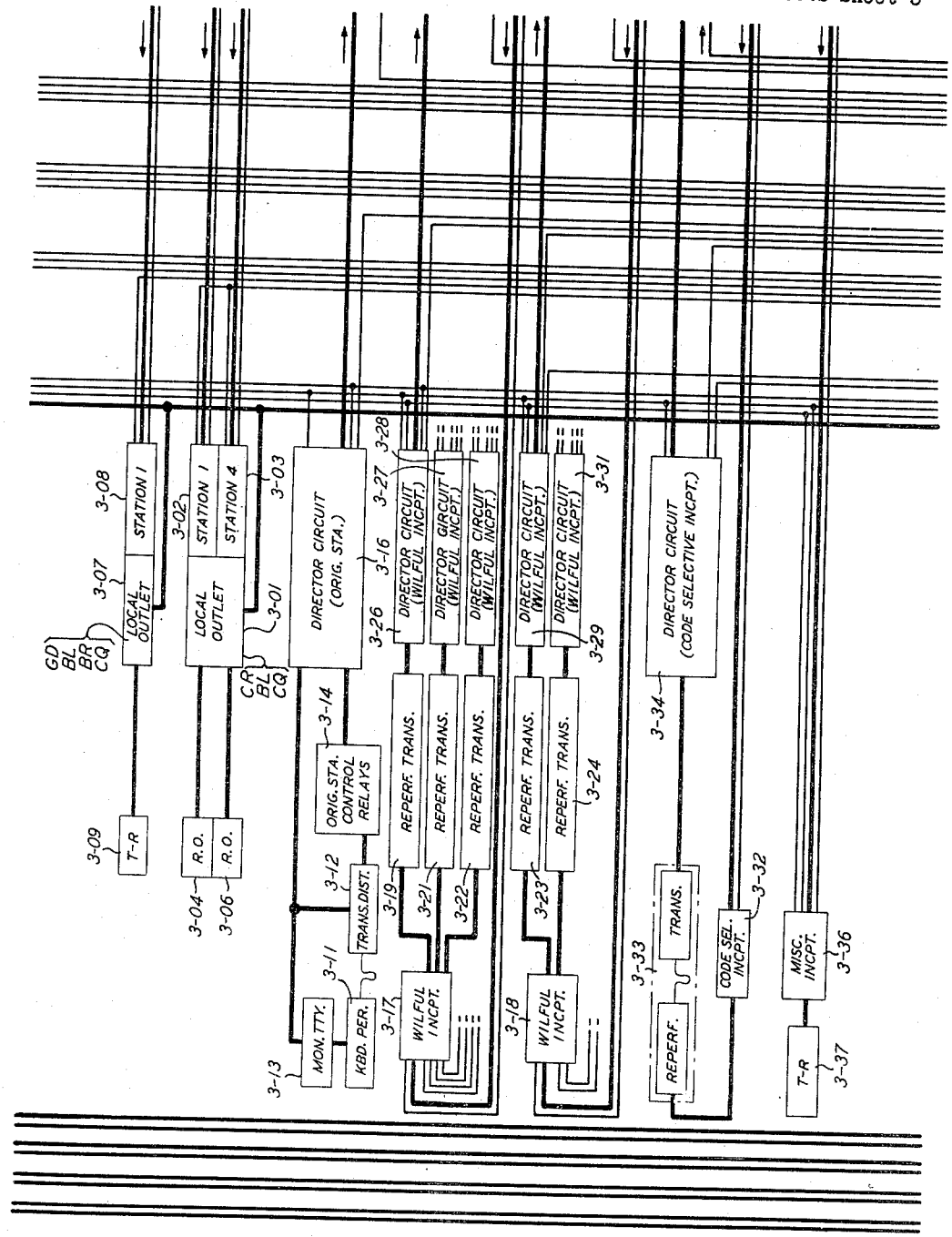

In addition to the lines and trunks terminating at each switching center as hereinbefore described, message originating equipment is provided to enable the switching center, as an originating station, to transmit messages selectively to any or all of the stations of the system by properly addressing the messages in the same manner that they are addressed and transmitted by an outlying subscriber's station. The originating equipment is shown in Fig. 3 and comprises a keyboard perforator 3–11 and a transmitter-distributor 3–12 controlled by tape perforated in the keyboard perforator or by tape produced in some other perforator as, for example, a miscellaneous intercept perforator which will be described hereinafter. A monitoring teletypewriter printer 3–13 is provided and is so arranged that it may monitor the message as it is perforated in the tape or as it is transmitted by transmitter-distributor 3–12. The perforating equipment, the transmitting distributor and the monitoring printer are similar to the equipment located at remote subscriber stations, such as any of the stations associated with the party line. A set of control relays 3–14 is associated with transmitter-distributor 3–12 and also with a director circuit 3–16 for the originating station and the transmitter-distributor 3–12 is arranged to transmit in cooperation with and under the control of director circuit 3–16. This director circuit controls its individual select magnet 6–01 and selectively controls any of the hold magnets in Fig. 7 for directing a message to an outgoing line or trunk in accordance with the address code preceding the message. The originating station may be considered as a transmitting-only station local to the switching center.

The switching center is also provided with intercept equipment shown in Fig. 3. Two of these intercept circuits have been designated as wilful intercept and are indicated by the reference numerals 3–17 and 3–18. These circuits are arranged to receive messages which are properly addressed and transmitted through the switching equipment but which, for some reason, it is desired to intercept and to prevent their being transmitted immediately to their respective stations of address. This is convenient in case certain stations are idle during certain hours or days when other stations are not idle, and not only would there be little or no point in transmitting to stations that are not open for the transaction of business, but such stations might be completely closed down, unattended and therefore incapable of receiving messages. Similarly, in case of trouble conditions arising at any station, it might be desirable to route messages addressed to that station to intercept until the trouble has been cleared and thus prevent those messages from being lost or from interfering with the operation of the system or the transmission of messages to other stations not in trouble. Each wilful intercept may comprise a plurality of recording instrumentalities that are interrelated in the same manner as the several recorders of a local outlet or the several channels of an outgoing multichannel trunk. They may be seized one by one until all are busy. Wilful intercept 3–17 has been indicated as comprising three recording instrumentalities 3–19, 3–21 and 3–22, and wilful intercept 3–18 has been indicated as comprising two recording instrumentalities designated 3–23 and 3–24.

The switching of messages into either of the wilful intercept circuits instead of to the appropriate line or trunk circuit over which the address station is reached, is accomplished by means of a set of intercept keys represented by the labeled rectangle designated by the reference numeral 4–02. This set may include a key for each station served by the particular switching center, for each outgoing trunk, for the local outlets, and for the various group address codes. Ordinarily a switching center will not have intercept keys for individual stations served by other switching centers because the most reliable information as to whether or not a station is closed down is likely to be available at the switching center serving that station, and in addition it is desirable to permit traffic to proceed as far as possible toward its destination rather than to wilfully intercept it at a switching center other than that serving the addressed subscriber station. None of the hold magnets giving access to wilful intercept 3–17 has been shown. One of those giving access to intercept 3–18, designated 7–16, is shown.

Each of the recording instrumentalities of the wilful intercept circuits is a reperforator-transmitter unit of the type associated with incoming lines or trunk channels, such as the reperforator-transmitter units 2–06, 2–19, 2–33 and 2–37. Messages directed to wilful intercept are properly addressed and accordingly they may be retransmitted through the switching system without any further attention by the operator, which is the reason for providing the automatically operating reperforator-transmitter units. Each of those units has associated with it a director circuit, this being designated by the reference numerals 3–26, 3–27, 3–28, 3–29 and 3–31. Only the select magnets for the directors 3–26 and 3–29 have been indicated in Fig. 6, this being the select magnets 6–02 and 6–03. The transmitters of the wilful intercept circuits thus have access to all outgoing lines and trunks and to the local outlet circuits when there is no longer any necessity for intercepting messages addressed to particular destinations, and their intercept keys have been restored.

Another intercept circuit, which is a special purpose intercept and is reached on a code selective basis, is designated by the reference numeral 3–32. The code selective intercept circuit is seized in response to particular address codes preceding messages received over lines or trunks. This intercept circuit is provided with a reperforator-transmitter unit 3–33 and the transmitter has associated with it a director circuit 3–34 which controls select magnet 6–04. Certain types of messages, particularly of a lengthy and usually routine character, such as reports or orders, are routed to the code selective intercept 3–32 by special address codes and the retransmission of those messages under the control of director circuit 3–34 takes place in such a manner as not to interfere with normal message transmission to the various outlets, the messages being retransmitted when the outlets are not heavily loaded. Such a code selective intercept arrangement is fully described in Patent 2,766,318. Hold magnet 7–17 gives access to code selective intercept 3–32.

Still another type of intercept circuit is labeled as a miscellaneous intercept and is designated by reference numeral 3–36. This intercept circuit has, as its recording intrumentality, a typing reperforator 3–37 which does not have any transmitter or director associated with it. The switching equipment is so arranged that messages improperly addressed, or messages preceded by an address code which has been mutilated, or messages for which the switching equipment has improperly responded to the address code are directed to the miscellaneous intercept circuit. Thus, if messages are preceded by code combinations which are not assigned to any receiving device or station, they will be routed to the miscellaneous intercept circuit. Inasmuch as the address codes of messages received in the miscellaneous intercept circuit are usually faulty, they will require the attention of an operator to correct them, so that there would be no point in providing for the automatic retransmission of the intercept messages through the system. If the operator can supply or obtain the necessary information for correcting the address codes of the messages received in the miscellaneous intercept, the tapes containing those messages may be removed from the typing reperforator, placed in keyboard perforator 3–11 of the originating station to have the correct address codes perforated therein, if necessary by splicing a blank piece of tape to the message tape at the head end of the message and perforating the proper address code in the spliced tape segment, and the corrected tape may then be placed in transmitter-distributor 3–12 of the originating station for transmission. Hold magnet 7–18 gives access to miscellaneous intercept 3–36. It should be understood that the code selective and miscellaneous intercepts may consist of multiple recorders arranged in the same manner as the local outlet and the wilful intercepts.

As previously stated, a single channel trunk 1–33 interconnects the switching center shown in Figs. 2 to 7, inclusive, with the switching center 1–34 in Fig. 1. As in the case of the incoming multichannel trunks and the incoming single station line, the incoming channel of the single channel trunk terminates in an incoming trunk circuit 4–03 which is closely similar to incoming line circuits 2–01 and 2–18 and is identical with incoming trunk circuits 2–32 and 2–36. Incoming trunk circuit 4–03 has associated with it a reperforator-transmitter unit 4–04 which cooperates with a director circuit 4–06 that controls the crossbar switch through select magnet 7–01. The incoming line circuit 4–03 and reperforator-transmitter unit are shown in full in Figs. 10 and 11 and the director circuit 4–06 is shown in Figs. 12 to 19, 24 and 29, this being the only detailed showing herein of an incoming channel terminating circuit and associated director circuit. The outgoing circuit including reperforator-transmitter units and control relays for the outgoing channel of trunk 1–33 is represented by the rectangular designated by reference numeral 4–07. This equipment may be identical with the apparatus associated with outgoing channel 1–17 of single station line 1–20.

The incoming channel of single channel trunk 1–36, which extends to switching center 1–37, terminates in apparatus identical with that terminating the incoming channel of single channel trunk 1–33, including the reperforator-transmitter unit and the director circuit associated with the incoming trunk circuit and these elements have been indicated by interconnected rectangles designated 4–08, 4–09 and 4–11.

The apparatus associated with the outgoing channel of single channel trunk 1–36 comprises not two but three reperforator-transmitter units designated by the reference numerals 4–12, 4–13 and 4–14. Each of the reperforator-transmitter units has an associated set of control relays, designated by the reference numerals 4–16, 4–17 and 4–18 for providing access to the reperforator-transmitter units. The transmitter portions of those units have individual sets of control relays 4–19, 4–21 and 4–22 and, in addition, there is a set of control relays 4–23 common to all three of the transmitters for controlling access of the transmitters to the outgoing trunk channel.

Figure 4:
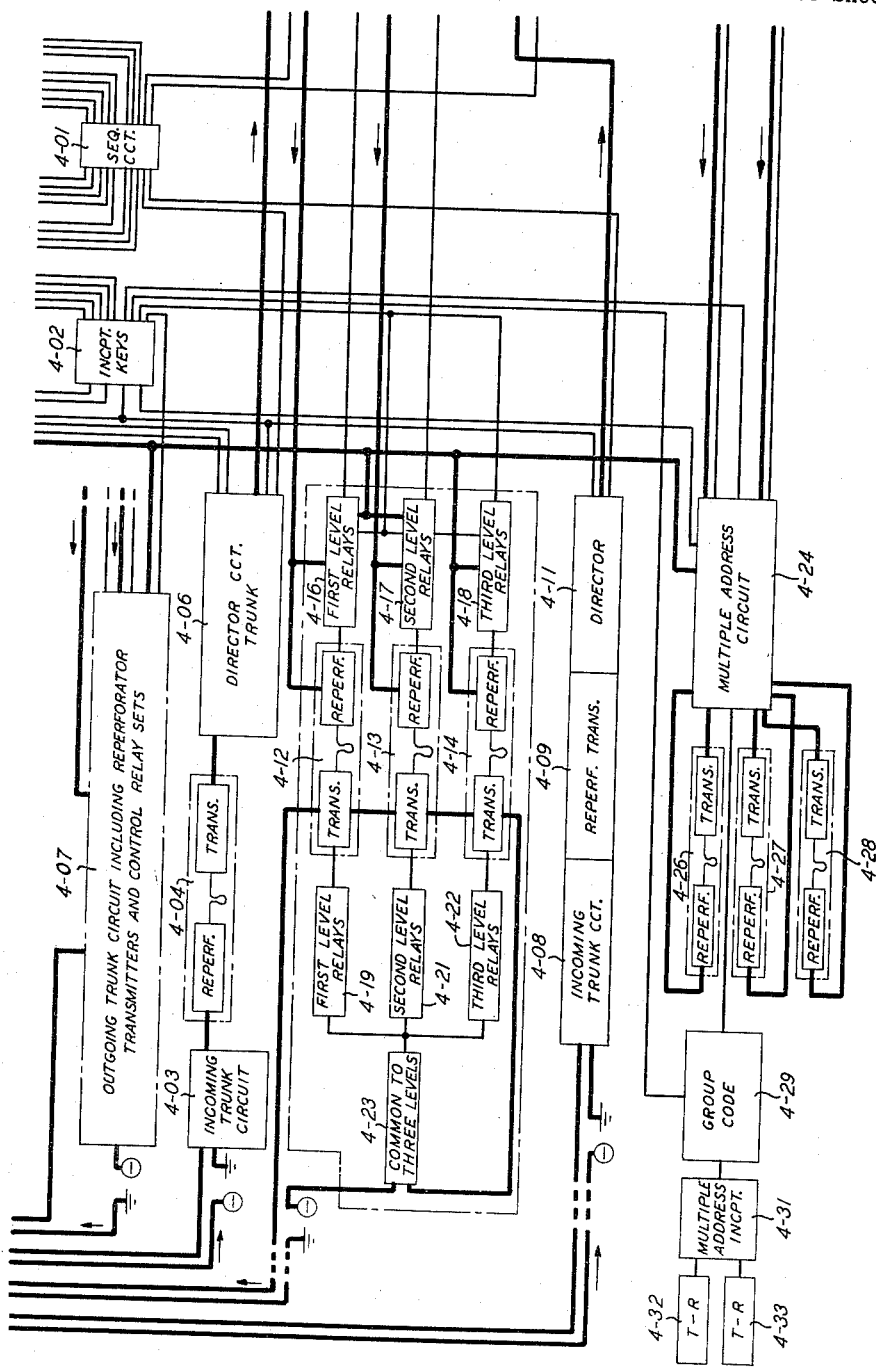

Reperforator-transmitter 4–14 is provided for the recording of messages that are of an urgent character and such messages are designated as urgent by a special priority code preceding them. No messages not so indicated will be routed to reperforator 4–14, nor does any of the director circuits hereinbefore mentioned have access to reperforator-transmitter unit 4–14. Instead, reperforator-transmitter unit 4–14 is seizable only from the multiple address circuit as will be described hereinafter. It may be stated, however, that whenever any outlet is not provided with a third reperforator-transmitter unit for urgent messages, or when such a reperforator is temporarily out of service, urgent messages will be routed to either of the other two reperforator-transmitter units which ordinarily received only regular messages. Hold magnets 7–19 and 7–21 give access to reperforator-transmitter units 4–12 and 4–13, respectively. A single channel outgoing trunk circuit complete with three storage levels, and corresponding to the one represented in Fig. 4, is shown in Figs. 20 to 23, 25 to 28, and 30 to 33.

The transmitter portion of reperforator-transmitter unit 4–14 has access to the outgoing trunk channel in rotation with the other two transmitter units when all three have message tapes in storage awaiting transmission but the priority transmitter, having gained access to the outgoing trunk channel, transmits all message material in storage before relinquishing the channel to the other two transmitters, whereas, each of those transmitters, having gained access to the channel, relinquishes it after transmitting only one message if the other regular transmitter or the priority transmitter has message material awaiting transmission. In the case of outlets equipped with only two reperforator-transmitter units, such as the outlet serving single station line 1–20, the transmitter units have access to the outgoing channel alternately for the transmission of a single message in each transmission turn.

As disclosed in Patent 2,766,318, the switching center may be provided with a multiple address circuit seizable on a selective basis by the director associated with any incoming line or trunk, or with the originating station circuit, for the purpose of effecting the transmission of a message to a plurality of outlets simultaneously. The multiple address circuit disclosed in that application comprises two reperforator-transmitter units either of which, when idle, may be seized by any director circuit for the purpose of storing a multiple address message. A multiple address director circuit cooperates with either of the multiple address reperforator-transmitter units to decode the address codes of destinations to which the multiple address message is to be transmitted, and seizes the proper outlets, such as the outgoing reperforator-transmitter units of single station or multistation lines or single channel trunks, or an outgoing channel of multichannel trunks or one of the recorders of a local or multiple outlet, the retransmission of the message to these outlets being initiated after they have been seized.

The multiple address circuit according to the present invention, designated by reference numeral 4–24, has a considerably greater message handling capacity than the one disclosed in the Patent 2,766,318, in that it may have a larger number of reperforator-transmitter units for storing and retransmitting multiple address messages. In addition, one or more of the reperforator-transmitter units may be allocated to the handling of priority or urgent messages. Three reperforator-transmitter units for the multiple address circuit have been indicated in Fig. 4 and they are designated by the reference numerals 4–26, 4–27 and 4–28. It might be assumed that reperforator-transmitter units 4–26 and 4–27 are allocated to the handling of regular multiple address messages and that reperforator-transmitter unit 4–28 is allocated to the handling of urgent messages which may be either single or multiple address messages. Two of the hold magnets for giving access to the multiple address circuit, designated by the reference numerals 7–22 and 7–23, have been represented in Fig. 7.

Regular multiple address messages are preceded by a special address code indicative of their characteristic as such and they are routed by that code to an idle one of the reperforator-transmitter units designated for non-priority multiple address messages, which might be the reperforator-transmitter units 4–26 and 4–27. Priority messages are routed to the multiple address circuit by a special priority address code which causes them to be routed to those reperforator-transmitter units in the multiple address circuit that are designated for priority message service, either single or multiple address. Reperforator-transmitter unit 4-28 might be allocated to priority message handling.

The multiple address circuit includes a director circuit which serves all of the reperforator-transmitter units of the multiple address circuit for the purpose of decoding the address codes preceding messages and causing the seizure of the appropriate outlets. The multiple address director circuit serves the priority message storage reperforator-transmitter units on a preferential basis, cooperating with the regular multiple address reperforator-transmitter units only when no priority message reperforator-transmitter unit is waiting for access to outlets. The multiple address director circuit gives the priority message reperforator-transmitter units, such as reperforator-transmitter unit 4-28, access to the priority reperforator-transmitter unit of any outlet so equipped, such as the reperforator-transmitter unit 4-14. If a priority message is addressed to an outlet not so equipped, or if the priority message reperforator-transmitter unit of the outlet is out of service, the message is routed to either of the regular reperforator-transmitter units of the outlet, such as reperforator-transmitter units 4-12 and 4-13. Access to the multiple address circuit is gained through the crossbar switch shown in Figs. 5, 6 and 7, and the reperforator-transmitter units of the multiple address circuit gain access to the outlets through a separate crossbar switch included in the multiple address circuit. The multiple address circuit with its storage levels, director and link circuit is shown in Figs. 35 to 43, 45 to 53 and 55 to 59.

As in the case of the multiple address circuit shown in Patent 2,766,318, the multiple address circuit disclosed herein includes a group code circuit 4-29, the function of which is to seize a plurality of outlets in response to a group code appearing alone or among the address codes preceding a message routed to one of the reperforator-transmitter units of the multiple address circuit. There is also associated with the multiple address circuit a multiple address intercept circuit 4-31 in which is recorded for subsequent retransmission any message routed to the multiple address circuit that includes among its address codes a faulty or unassigned address code, this interception corresponding to routing of regular messages to the miscellaneous intercept circuit, or any message including among its address codes one for which an intercept key of the intercept key circuit 4-02 has been operated, this interception corresponding to interception of regular messages of the wilful intercept circuit. Multiple address intercept circuit 4-31 is provided with typing reperforator units, two having been indicated, designated by reference numerals 4-32 and 4-33. The multiple address intercept circuit 4-31 is identical with the wilful intercept circuits and the local outlet circuits, in the manner of giving access to its several typing reperforator units as long as there is an idle one. Typing reperforators are used in the multiple address circuit instead of reperforator-transmitter units because messages recorded in that intercept usually require attention by an operator, either to correct address codes, in the case of messages intercepted on a miscellaneous basis, or to eliminate address codes designating outlets not under interception and to which the message has actually been transmitted. The necessity for the elimination of address codes from messages recorded in the multiple address intercept arises from the fact that all address codes following the one that causes the routing of a message to multiple address intercept are recorded in intercept although the corresponding outlets may be seized and the message transmitted thereto. If the messages recorded in multiple address intercept were to be given automatic and unsupervised handling, as in the case of the wilful intercept circuits, repetitious transmission of a message to some stations would result. The group code circuit is shown in Figs. 62, 63, 66 and 67, and the multiple address intercept circuit is shown in Figs. 60, 61, 64 and 65.

*Typical method of operation of the system*

In operating systems of this general class or type it is necessary for the subscribers to perforate tape in a particular manner especially at the beginning and end of each message. It is also desirable for the subscriber to perforate special signals prior to the message signals and the addresses thereof when transmission is first started and after a number of messages have been perforated in the tape. In order to aid the subscriber in properly perforating the various addresses and other control signals in the tape, various routine or operating procedures are usually established.

It is to be understood that, depending upon the requirements and traffic conditions, various types of operating procedures may be established in accordance with the requirements to be specified. A typical operating procedure will be described for the system shown in the drawings. It is to be understood, however, that the system may be operated in other manners and that departures from the typical operating procedures may be employed to meet special conditions when they are encountered.

Figure 2:
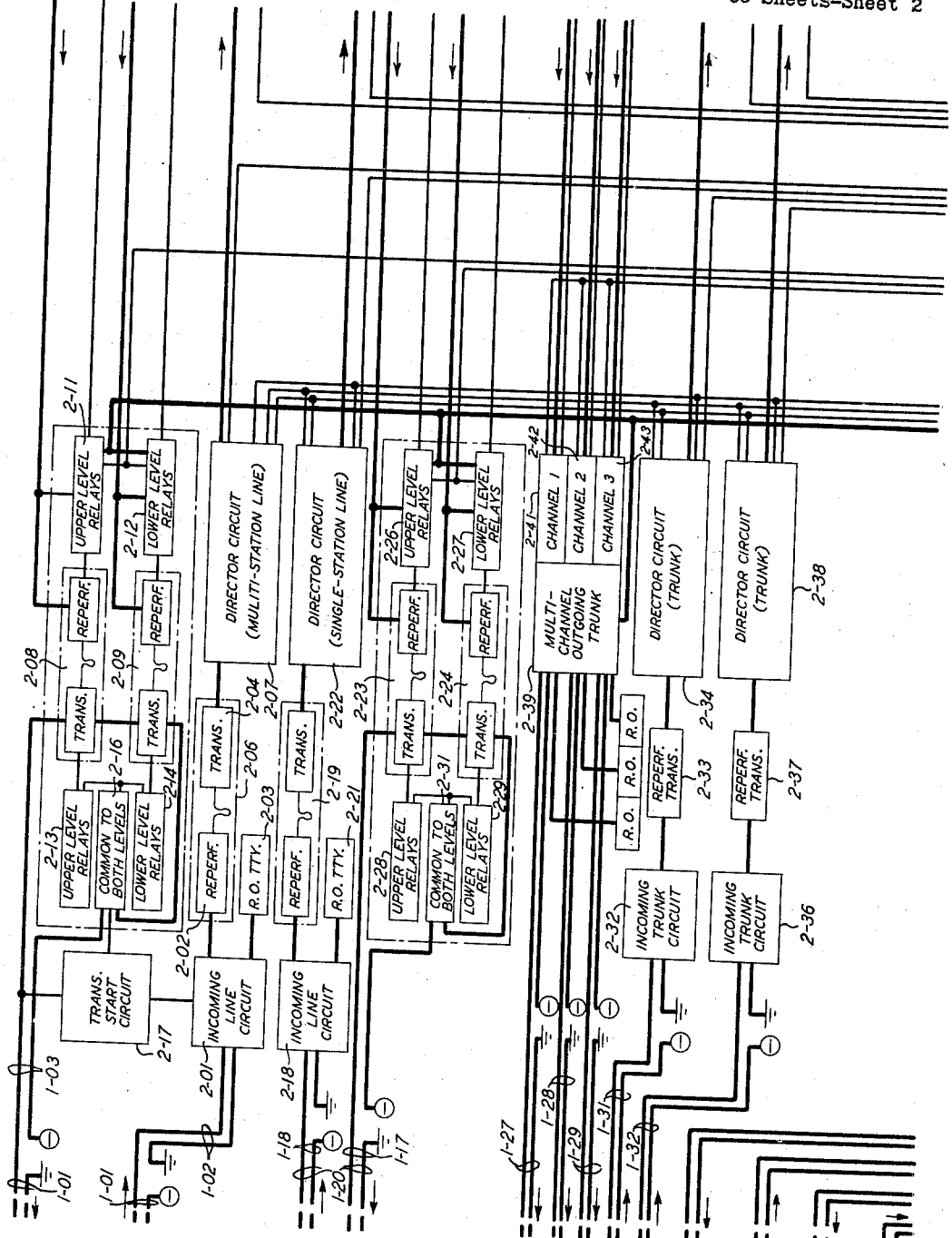
Figure 10:
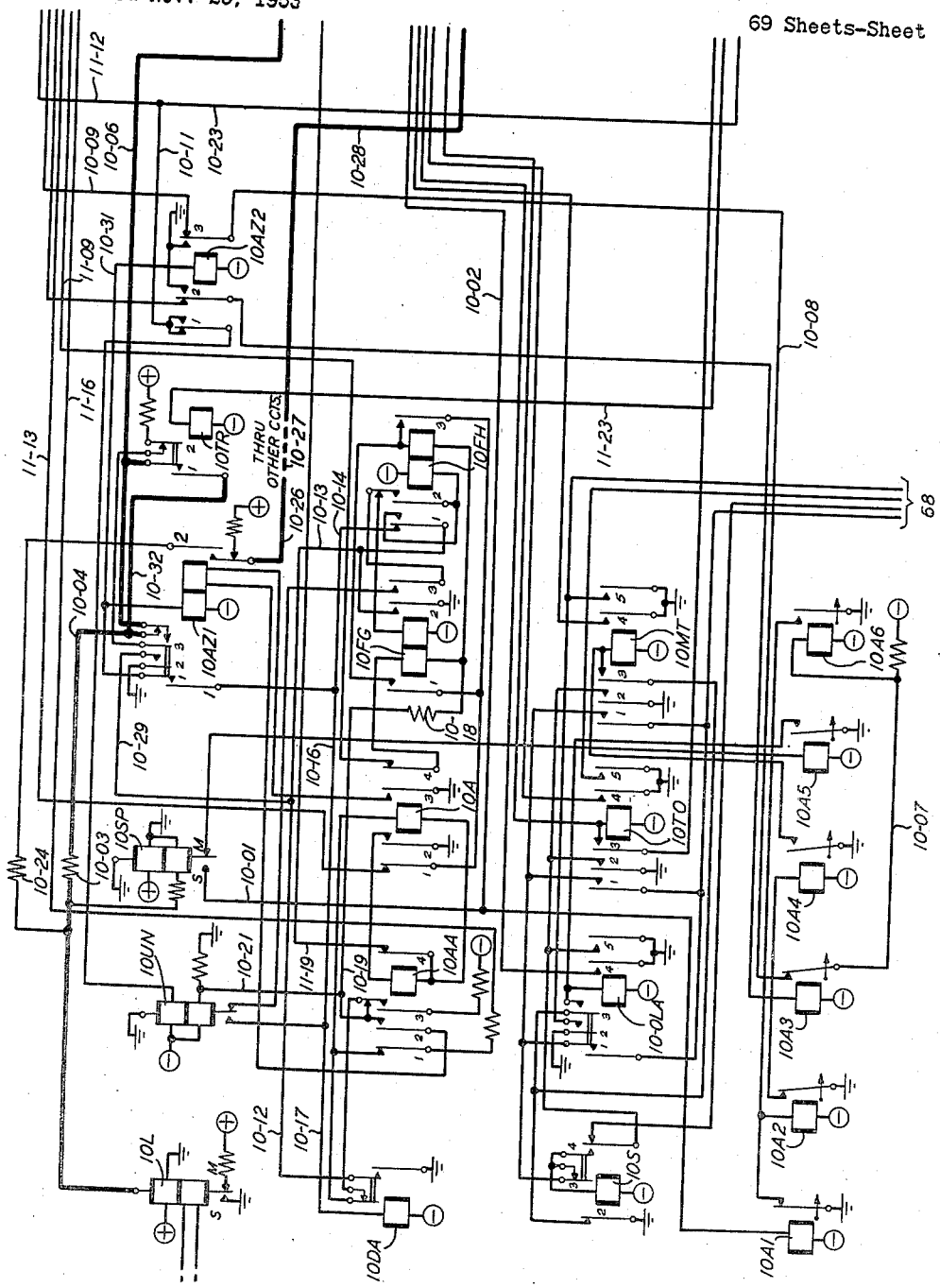
Figs. 10 and 11 show the incoming single channel trunk circuit.

The circuit drawings comprising Figs. 10 to 70 show the complete circuits of those portions of the apparatus in a switching center that are indicated schematically in Fig. 4. Specifically, one incoming single channel trunk terminating circuit and one outgoing single channel trunk termination circuit, the former with its director circuit, are shown. These are assumed to be associated with different trunks, and the description of the operation will be predicated upon assumed transmission incoming over one of the trunks and outgoing to the other trunk. The incoming trunk termination shown in the circuit drawings may be considered as representative of all incoming line or trunk terminations not only in Fig. 4 but also in Fig. 2. Similarly, the outgoing single channel trunk termination shown in the circuit drawings may be considered to be representative of all outgoing line and trunk terminations not only in Fig. 4 but also in Fig. 2, an exception being the outgoing multichannel trunk termination in Fig. 2. The multichannel outgoing trunk terminating circuit in Fig. 2, the local outlets and the intercepts in Fig. 3, being outlets having a plurality of paths terminating in or beyond the switching center in recording instrumentalities, which paths are available on a non-selective basis among them in response to a common address code or codes, do not differ significantly from the multiple address intercept circuit, indicated in Fig. 4 and the circuits of which are included among the circuit drawings, specifically in Figs. 60, 61, 64 and 65. From this it will be apparent that circuits represented by almost any of the instrumentalities indicated in Figs. 2 and 3 are shown in Figs. 10 to 70. Exceptions are the originating station circuit 3-14 and the outgoing line circuit of a mutistation line, having a transmitter start circuit associated therewith, and circuits for all of those instrumentalities are contained in the aforementioned patent, 2,766,318.

Although it is not absolutely necessary, it is desirable that a subscriber, in preparing a message tape on his keyboard perforator, first perforate a number of letters signals in the tape to provide a short length of tape ahead of the message which may be readily inserted in the tape transmitter and fitted to the tape feed mechanism thereof so that the tape will feed properly and bring the message addresses and text portions to the sensing position in a proper manner. Following the letters signals it is desirable for the subscriber to perforate a disconnect or end-of-message signal in the tape which, in the specific embodiment of the invention disclosed herein, is a figures signal followed by an H signal which in turn is followed by a letters signal. It is desirable that this be done in order to clear out any off-normal condition of the switching equipment and to condition it to receive and properly respond to the address codes and message signals. The letters signal following the H signal affords time for the switching apparatus to function properly at the switching center and two or more letters signals may be inserted. Letters signals may be inserted at various times by the subscriber to provide sufficient time following or between various directing or control signals to assure that the equipment will respond properly and will fully establish the necessary circuits so that none of the following message signals will be mutilated or lost. Following the letters signals, the subscriber will perforate two characters in the tape which are assigned to the station for which the message is intended. These two character signals are sometimes called directing codes or address codes. Following the address code the subscriber will generally perforate a letters signal and in the case of a multiple address message each address code of two characters will be followed by a letters signal. After the letters signal following the last address code, the carriage return and line feed signals and another letters signal will be perforated after which the message will be perforated in the tape. In order to facilitate the checking of the system and messages, the address of the station to which the message is directed and the sender's address are generally included as a portion of the message. If it is considered desirable, the two characters comprising the address code may be repeated, and under certain circumstances the second code may be useful if the first one becomes lost or mutilated.

At the end of the message the subscriber will perforate another disconnect signal comprising a figures signal, an H signal and a letters signal or several letters signals. If the subscriber has another message to transmit he may perforate the two characters comprising the address code of the message immediately following the letters signal, it being unnecessary to repeat the figures and H signals to clear out off-normal conditions since the disconnect or end-of-message signed will be transmitted immediately ahead of the address codes of the next message. As in the case of the first message the subscriber will perforate, after the address code, the letters signal, the carriage return signal, the line feed signal, the letters signal and the message. At the end of the message the subscriber again perforates the disconnect signal comprising the figures signal, the H signal and the letters signal. If the subscriber has no other message to be transmitted at that time he will, in the case of a subscriber on a multistation line, perforate an H signal following the letters signal of the disconnect, the second H signal comprising an end-of-transmission signal signifying that the subscriber has no further messages to be transmitted at that time and to inform the transmitter start circuit that the line is available to another station for message transmission.

Specific examples of typical message tapes prepared in accordance with the suggested operating procedures and embodying the various switching capabilities of the system will now be given. It will be assumed first that a message is received from switching center 1-34 and is addressed to the subscriber station served by switching center 1-37 that is assigned the address code BU. The message will comprise the signals for the characters BU, a letters signal, the carriage return signal, a line feed signal, a letters signal, signals comprising the full address of the addressee station and of the originating station, the text of the message and the disconnect signal comprising the figures signal, an H signal and a letters signal.

It will next be assumed that station 1-19 on the single station line has a multiple address message for destinations including the station identified by the address code BS served by switching center 1-37, the station identified by the address code BU and served by the same switching center 1-37 and the station 1-10 on the multistation line, which has the address code GJ. The tape as prepared at station 1-19 will comprise with the signals for figures, H and letters, the address code BC which is the multiple address code used by any subscriber station preceding the addresses of the stations to which the message is to be transmitted, the address code BS and a letters signal, the address code BU and a letters signal, the address code GJ and a letters signal, signals for carriage return, line feed and letters, the text of the message and the disconnect signals, figures, H and letters.

It will next be assumed that a priority message is received from switching center 1-34 addressed to the subscriber station served by switching center 1-37 that is assigned the address code BU. The message will comprise the signals for the characters PQ which is the priority message code used by the switching center 1-34 preceding any priority message transmitted from that switching center, this code being automatically substituted by the switching center for the priority message code PC preceding such message as received from the subscriber station at which the message originated, the address code BU, the signals for carriage return line feed and letters, the text of the message and the disconnect signal, figures, H and letters.

It will next be assumed that a group code message is received from switching center 1-34, there being no individual address codes but only the single group code. The signals comprising this message as transmitted from switching center 1-34 will be the address code BQ which is the multiple address code used by switching center 1-34 preceding any multiple address message transmitted from that switching center, this code being automatically substituted by the switching center for the multiple address code BC preceding such message as received from the subscriber station at which the message originated, the address code BR which is a group code, the signals for the carriage return, line feed and letters, the text of the message, and the disconect signal, figures, H and letters.

It will next be assumed that a multiple address message including a group code is received from switching center 1-34, the message being addressed to station 1-07 on the party line having the address code QW, to the stations assigned the group code CF, this being the subscriber station 1-08 on the party line, the station 1-19 on the single station line, and stations served by switching centers 1-26 and 1-37, and to local outlet 3-01 having the individual address code CR. The signals comprising this message as transmitted from switching center 1-34 will be the office identification code BQ, the address code QW, the group code CF, the address code CR, the signals for carriage return, line feed and letters, the text of the message and the disconnect signals, comprising figures, H and letters.

Finally, it will be assumed that a priority multiple address message including a group code is received from switching center 1-34. The signals comprising this message as transmitted from switching center 1-34 will be the address code PQ, above identified, the individual station address BU, assuming that the message is addressed to the same station as the preceding message, a group code such as BR, the signals for carriage return line feed and letters, the text of the message and the disconnect signals, figures, H and letters.

The manner in which the circuits and apparatus are constructed and function to accomplish the operations involved in the reception and retransmission of messages addressed as assumed above will now be described by reference to the detailed circuits of typical components of a switching center embodying the invention as disclosed in Figs. 10 to 70, inclusive.

Initial condition of the system

Figs. 10 to 70, inclusive, when arranged as shown in Fig. 9, show details of typical circuits and equipment which cooperate to achieve or comprise a typical switching center in accordance with this invention. When power is first applied to the system after it has been installed, the first thing in the morning if it has been closed down during the night, the relays and equipment will assume the positions and conditions shown in Figs. 10 to 70. It is to be understood that suitable driving motors are provided for the various devices and that these are all started into operation by connecting them to a suitable source of power. Numerous motors and sources of power have been shown in the drawings. However, a number of other devices employ motors which are not shown in the drawings because it is well understood by those skilled in the art that such devices require and will be supplied with driving motors. Receiving and transmitting equipment, such as reperforators and transmitter-distributors, at the switching center is provided with driving motors, most of which have been illustrated in the drawings, it being understood that all are connected to sources of power and are continuously in operation when the system itself is in operation so that the equipment is at all times ready to respond to received signals. The relays and other equipment at the switching center are in and remain in the condition shown in the drawings when power is applied and until signals are transmitted over the system for energizing the circuits, as will be described hereinafter. All transmitters and all receiving devices, including teletypewriter printers and printing reperforators, are in the stop or rest condition. The selector magnets of receiving teletypewriters are energized, which is the marking condition. All transmission circuits extending from point to point are in the marking condition and the receiving or repeating relays associated therewith have their armatures held in engagement with their marking contacts.

Reception of message by switching center

The first assumed message is received from switching center 1–34 and is addressed to the subscriber station served by switching center 1–37 that is identified by the address code BU. It was stated previously that any message that has originated at a subscriber station may be preceded by the disconnect signal comprising the codes for figures, H and letters, in order to ascertain that the switching mechanism at the switching center shall be in the normal condition to be properly responsive to switching codes representing the station or stations to which the message is addressed. These signals are absorbed or discarded in the switching center serving the subscriber station at which the message originates, when they precede a message and there is no connected outlet to which they could be transmitted. Since the message now to be considered is assumed to be received from switching center 1–34, the first character received will be the signal for the character B which is the first character of the two-character address code BU. The manner in which the disconnect codes are discarded is fully described in the Bacon et al. Patent 2,766,318, as hereinbefore set forth.

The incoming channel of trunk 1–33 terminates in line relay 10L and in response to the start pulse preceding the code combination for the character B, the armature of that relay is operated from its marking contact, which it normally engages, to its spacing contact. It thus substitutes a ground connection for a battery connection to the lower winding of relay 10SP, which causes the armature of that relay to be operated by current in the upper winding to the left-hand contact. Relay 10SP interrupts the energizing circuit for slow-release relay 10A5 and completes the energizing circuit for relay 10A1 which opens the circuit of slow-release relay 10A2. The release times of relays 10A1 and 10A5 are longer than spacing intervals normally occurring in telegraph transmission so that neither of those relays will release. Relay 10A2 is also slow release and it will not release immediately.

At its spacing contact relay 10SP also extends ground over conductor 10–02 to lamp 11–03 so that the lamp will follow received signals under the control of relay 10SP as it responds to operation of relay 10L.

Relay 10L repeats the received spacing signal from its armature over a branch path paralleling the lower winding of relay 10SP, the path including resistor 10–03, conductor 10–04, break contacts controlled by armature 3 of relay 10AZ1, conductor 10–06 and winding of selector magnet 11–01 of reperforator 11–02. Incident to response of the reperforator to the code combination received by selector magnet 11–01, an energizing circuit for relay 10A6 is completed, from battery through the winding of that relay, conductor 10–07, armature and front contact of normally operated relay 10A3, conductor 10–08, right-hand armature and back contact of relay 10AZ2, conductor 10–09 and swinger and make contact 11–04 and normally closed tape feed indicating contacts 11–06 to ground. Relay 10A6 operates to provide a holding circuit for relay 10A2 in substitution for the one interrupted at the back contact of relay 10A1 so that relay 10A2 will remain operated providing tape feed indicating contacts 11–06 remain closed and universal transfer contacts 11–04 close on the make side frequently enough to hold slow-release relay 10A6 operated. When the universal transfer contacts 11–04 operate, universal make contacts 11–11 also operate momentarily, connecting ground over conductors 11–12 and 10–11, back contact and armature 1 of relay 10AZ2 and upper winding of relay 10UN to battery to operate the armature of relay 10UN to its left-hand contact. This causes relay 10DA to operate in a circuit traced from ground through the armature and left-hand contact of relay 10UN, conductor 10–17, and winding of relay 10DA to battery. The relay operates and locks in a circuit traced from ground through its armature and front contact, conductors 10–12 and 10–13, armature 1 and back contact of relay 10FH and conductors 10–14, 10–16 and 10–17, and the winding of relay 10DA to battery. At its break contacts the relay 10DA interrupts a possible energizing circuit for relay 10A.

Selector magnet 11–01 of reperforator 11–02 continues to respond to the signals received by relay 10L from switching center 1–34 and the signals are recorded in tape 11–07. The armature of relay 10UN engages its left-hand contact during closure of universal contacts 11–11 in each receiving cycle. In response to the figures signal of the disconnect code following the message, contacts 11–08 of the reperforator close, connecting ground over conductor 11–09, back contact and armature 4 of relay 10A, winding of relay 10FG, resistor 10–18, conductors 10–19 and 10–21, and lower winding of relay 10UN to battery. Relay 10FG operates, and the operating current through the lower winding of relay 10UN prevents the armature from operating to the left-hand contact in spite of energization of the upper winding of the latter relay through the universal make contacts. Relay 10FG locks through its right-hand winding, break contacts controlled by armature 2 of relay 10FH, armature 3 and front contact of relay 10FG and right-hand contact and armature of relay 10UN to ground, this circuit being established because the armature of relay 10UN remains in engagement with its right-hand contact as stated. Relay 10FG connects ground to conductor 10–13 in the energizing circuit for relay 10DA but the latter relay has already been operated and is locked. At its armature 1, relay 10FG prepares an energizing circuit for relay 10FH. In response to the H signal which follows the figures signal, contacts 11–12 of reperforator 11–02 close and connect ground over conductor 11–13, back contact and armature 1 of relay 10A, armature 1 and front contact of relay 10FG, right-hand winding of relay 10FH, resistor 10–18, conductors 10–19 and 10–21, and lower winding of relay 10UN to negative battery.

Relay 10FH locks through its right-hand winding and front contact and armature 3 to the path over which it was energized, by-passing, however, the armature 1 and front contact of relay 10FG. At its armatures 1 and 2, the relay 10FH interrupts the locking circuits for relays 10DA and 10FG, and those relays release. Upon the opening of the contacts 11-12, which occurs before the end of the receiving cycle in which the H signal was received, the locking circuit of relay 10FH in interrupted, and that relay releases. In response to the letters signal that follows the H signal and concludes the message, ground is connected through contacts 11-14 and over conductor 11-16, armature 1 and back contact of relay 10AA, break contacts controlled by the armature of relay 10DA, break contacts controlled by armature 3 of relay 1OAA and conductor 10-21 and the lower winding of relay 10UN to hold the armature of that relay in engagement with the right-hand contact.

Assuming that no further messages are received by relay 10L for an interval, relay 10SP will remain in the marking condition, interrupting the circuit of relay 10A1 which will release after its delay interval, providing a circuit for holding relay 10A2 operated. Periodic closure of the circuit of relay 10A6 at the universal transfer contacts 11-04 will cease, and that relay will release, thus restoring the circuit to the initial condition.

The incoming line circuit shown in Fig. 10 has relay 10-OLA for giving an alarm in response to a prolonged open condition of the incoming trunk channel terminated by line relay 10L, tape-out alarm relay 10TO which operates when the tape supply in reperforator 11-02 runs low, machine trouble alarm relay 10MT which operates when the reperforator develops a trouble preventing it from operating properly, and an alarm silencing relay 10S for silencing an audible alarm that is set in operation when any of the above-mentioned trouble conditions occurs. The operation of these relays is described in the Bacon et al. Patent 2,766,318 and will not be repeated in the present specification.

An arrangement is included in the incoming line circuit disclosed herein for automatically diverting incoming traffic to a spare reperforator at the end of a message when the tape supply from the regular reperforator 11-02 runs low.

When the attendant notes that the supply of tape is running low, key 11-17 is operated to close the left-hand contacts. When the end-of-message signals terminating a message then being recorded by reperforator 11-02 are received, the relay 10DA releases and relays 10FG and 10FH operate and release, as previously described, and upon connection of ground through universal make contacts 11-11 to conductor 11-12 the ground connection is extended over conductor 10-23, closed left-hand contacts of key 11-17, conductor 11-19, back contact and armature 4 of relay 10AA, winding of relay 10A, break contacts controlled by the armature of relay 10DA, break contacts controlled by armature 3 of relay 10AA, conductor 10-21 and lower winding of relay 10UN to battery, relay 10A operating over this circuit and the current through the lower winding of relay 10UN holding the armature of that relay on its right-hand contact. Relay 10A prepares, at its armature 2 and front contact, a path for energizing relay 10AA and for locking that relay and itself. Upon the opening of the universal make contacts 11-06, the prepared circuit becomes effective, being traced from ground through the armature 2 and front contact of relay 10A, winding of relay 10AA, winding of relay 10A, break contacts of relay 10DA, break contacts controlled by armature 3 of relay 10AA, conductor 10-21 and lower winding of relay 10UN to negative battery. Relay 10AA substitutes at its armature 3 and front contact a battery connection to hold relays 10A and 10AA operated, this being the locking circuit.

With relays 10A and 10AA operated, a circuit for operating relay 10AZ1 is completed from ground through armature 3 and front contact of relay 10A, right-hand winding of relay 10AZ1, armature 2 and front contact of relay 10AA, conductor 10-21 and lower winding of relay 10UN to battery, and relay 10AZ1 operates over this circuit. At its armature 2, relay 10AZ1 establishes a transmission connection from the armature of relay 10L through resistor 10-24, armature 2 and front contact of relay 10AZ1, thereby interrupting in make-before-break manner the break contacts, conductor 10-26 which extends through break contacts controlled by the corresponding armature of relay 10AZ1 in other incoming line circuits, as indicated by the dotted section 10-27, conductor 10-28 and selector magnet 11-21 of a typing reperforator 11-22. Reperforator 11-22 is provided for the purpose of recording incoming messages during the time that the supply of tape is being replenished in a regular typing reperforator associated with any of the incoming lines or trunks. It is available to any of a plurality of incoming line or trunk circuits as indicated by the dotted conductor section 10-27, but to only one at a time, from which it follows that an attendant will operate the left-hand contacts of key 11-17 in only one incoming line circuit at a time. The break contacts controlled by armature 2 of relay 10AZ1 disconnect the battery termination for holding selector magnet 11-21 of reperforator 11-22 energized when the reperforator is not under seizure by any incoming line circuit. At make-before-break contacts 3 controlled by armature 1 of relay 10AZ1, conductor 10-04 is disconnected from the path to selector magnet 11-01 of typing reperforator 11-02 and the path is connected intstead through break contacts controlled by the armature of relay 10TR to a battery termination for holding selector magnet 11-01 energized. At the make contacts 2 controlled by armature 1 of relay 10AZ1, ground is connected over conductors 10-29 and 10-13, armature 1 and back contact of relay 10FH, conductors 10-14, 10-16 and 10-17 to the winding of relay 10DA which operates. The ground connection on conductor 10-14 is extended over armature 1 and front contact of relay 10AZ1 to the left-hand winding of that relay, thereby locking it, and also over conductor 10-31 to the winding of relay 10AZ2, operating the latter relay. Relay 10DA interrupts the locking circuit for relay 10AA and that relay releases.

By virtue of the foregoing operations, reperforator 11-02 has been disconnected from line relay 10L, and reperforator 11-22 has been connected to that relay. Messages thereafter received will be recorded by the latter reperforator. As will be described hereinafter, reperforator 11-02 has associated therewith a transmitter by means of which messages recorded in tape 11-07 are routed, through the cooperation of a director circuit, to a proper outlet in accordance with address codes preceding the message, and are automatically transmitted to that outlet. Reperforator 11-22 might also be equipped with a similar transmitter and director circuit for effecting the automatic retransmission of recorded messages. Since its purpose is merely to serve as an intercept during the time that the regular reperforator-transmitter is out of service for replenishment of the tape supply, reperforator 11-22 will be used somewhat infrequently in comparison with regular incoming line reperforators, and the provision of a transmitter mechanism and a director circuit is not justifiable. Since the messages recorded by reperforator 11-22 are complete, including the directing codes preceding them, these messages may be reintroduced into the system by placing the tapes in the tape transmitter of the originating station circuit in the same manner that tapes produced in the miscellaneous intercept circuit are reintroduced into the system.

When the supply of tape in reperforator 11-02 has been replenished, the attendant operates key 11-17 from left to right, opening the left-hand contacts and closing the right-hand contacts. Key 11–17 locks on either side and, accordingly, connects ground through the right-hand contacts, conductor 11–23, and winding of relay 10TR to battery. At the break contacts controlled by relay 10TR, the battery connection, which has been holding selector magnet 11–01 of reperforator 11–02 steadily energized, is disconnected, and at the armature and front contact of relay 10TR the selector magnet is reconnected to the armature of line relay 10L, the path being traced from the latter armature through resistor 10–03, conductors 10–04 and 10–32, and the armature and front contact of relay 10TR to conductor 10–06. At the instant of operation of relay 10TR, reperforator 11–02 begins to record signals incoming to line relay 10L, reperforator 11–22 continuing to record. When the disconnect signals are received at the end of the message, relay 10DA releases in the manner previously described, interrupting the locking circuit for relay 10AZ1 which releases, in turn releasing relay 10AZ2. When these relays release, the selector magnet of auxiliary reperforator 11–22 is disconnected from the armature of line relay 10L and is reconnected to a terminating battery through the break contacts controlled by the armature 2 of relay 10AZ1. When the attendant has observed that auxiliary reperforator 11–22 is no longer recording, key 11–17 is restored to its initial condition, opening the right-hand contacts and thereby releasing relay 10TR.

When the attendant places a new reel of tape in reperforator 11–02 and threads the leading end of the tape into the punch block of the reperforator, the end is preferably left free rather than being immediately threaded into the tape sensing head 11–24 as well. This does not interfere in any way with the recording of the message fragment resulting from reconnection of selector magnet 11–01 to the armature of line relay 10L nor the recording of messages following, because the leading end of the tape merely feeds out of the punch block and dangles free. At the time of restoring key 11–17 to its initial condition, the attendant may thread the tape into the tape sensing head 11–24 with the letters code combination of the disconnect signal at the end of the message fragment in registry with the tape sensing pins. In this way the message fragment is discarded, as it should be, because the complete message is recorded in a tape produced by the auxiliary reperforator, and by means of the latter tape the message may be reintroduced into the switching system in the manner previously described.

*Routing of received message*

Tape 11–07 now contains the message preceded by the address code BU. Reperforator-transmitter 11–02 may be of the type shown in detail in Patent 1,965,572, granted July 10, 1934, to C. W. Burcky, Patent 1,965,-602, granted July 10, 1934, to R. A. Lake, and Patent 1,969,891, granted August 14, 1934, to R. A. Lake et al. The disclosures of these patents are incorporated herein by reference as part of the present specification. As is fully disclosed in those patents, the transmitting head 11–24 of the transmitter will normally be resting against the perforating head of reperforator 11–02 due to previous transmission up to and including the last character previously perforated in the tape. It is a characteristic of the reperforator-transmitter unit that when tape is being perforated, but not transmitted, the tape emitted from the reperforator pushes the transmitting or tape sensing head 11–24 away from the perforating head a predetermined distance as limited by a stop, after which tape continuing to emerge from the reperforator unit forms a depending loop. When tape is no longer being perforated but signals are being transmitted therefrom, the transmitting or tape sensing head 11–24 steps the tape with respect to itself, thereby taking up the loop of tape until the loop has been exhausted and the tape is taut. Further operation of the tape stepping mechanism of the transmitting head causes the head to move with respect to the tape and toward the perforating head until the last code combination is reached and transmitted, and in this condition the tape sensing or transmitting head 11–24 rests against the reperforator head.

Figure 11:
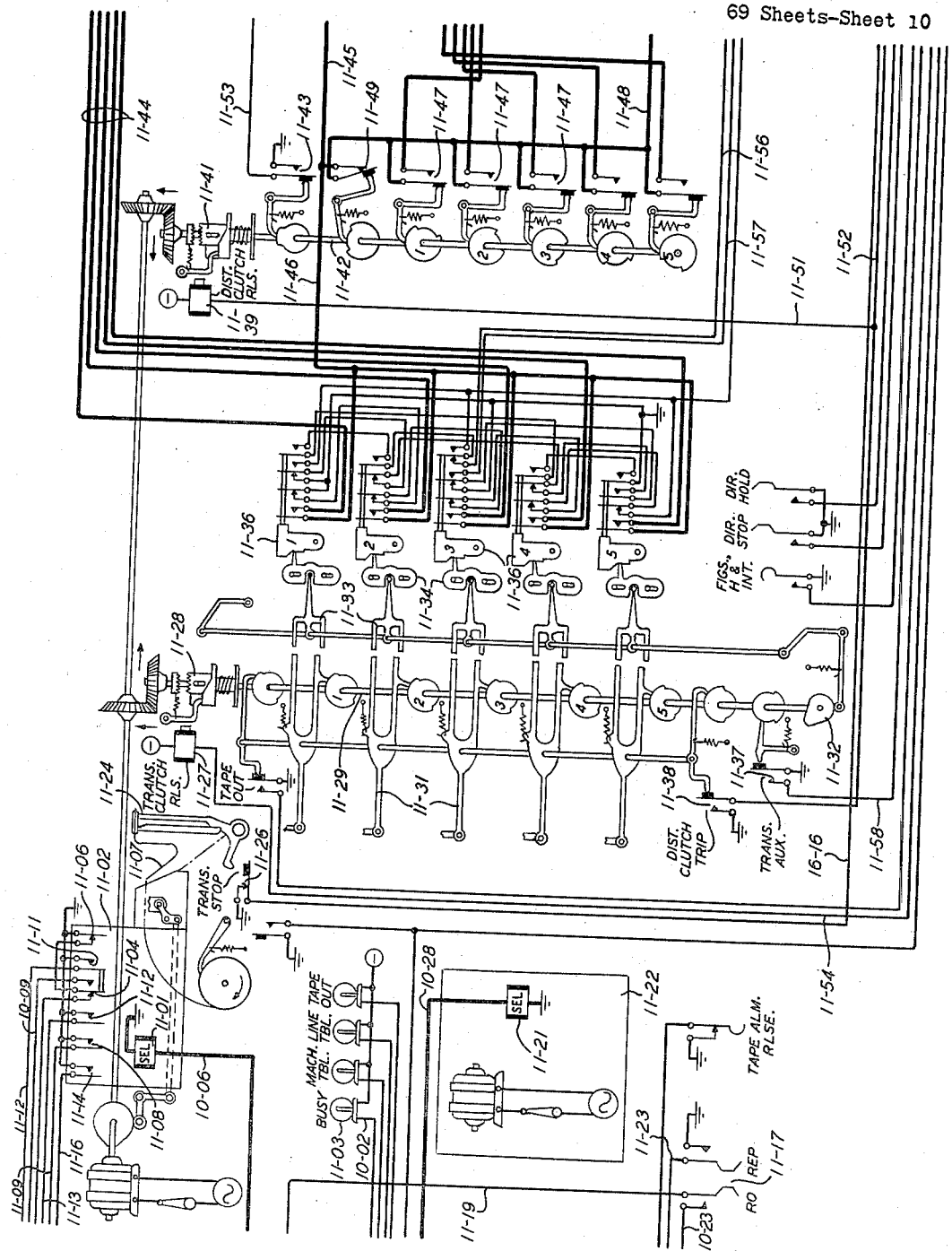

Consequently the tape sensing or transmitting head 11–24 will be in that position prior to reception of signals, but as soon as signals begin to be recorded in tape 11–07 by reperforator 11–02 the tape sensing head 11–24 will be moved clockwise as viewed in Fig. 11, and contacts 11–26 which it controls will be permitted to close. These contacts are shown closed in Fig. 11. The closure of these contacts will complete the circuits for controlling the transmitting and switching equipment, and in particular the operation of a director circuit, the function of which is to decode address codes and selectively establish a cross-office transmission path in accordance with the address codes. A director circuit is shown in Figs. 12 to 19, 24 and 29. This director circuit is very similar to the one shown in Branson et al. Patent 2,430,447 and in Bacon et al. Patent 2,766,318, hereinbefore more completely identified, for which reason the operation of the director circuit will be described only in a general way, with detailed consideration of the few differences between the two circuits.

When contacts 11–26 close, indicating the availability of tape, a circuit is completed for a search relay 13SE, and this relay operates. Relay 13SE completes the circuit of transmitter clutch release magnet 11–27 of the transmitter portion of the transmitter-distributor unit, which trips clutch 11–28 for driving shaft 11–29. Shaft 11–29 carries cams which cause the perforations in tape 11–07 to be sensed by sensing levers 11–31, and through transfer cam 11–32 it causes transfer levers 11–33 to test the setting of sensing levers 11–31 and to position slide members 11–34 in accordance with the signal condition, the slide members 11–34 being shifted to their uppermost positions for a marking condition and to their lowermost positions for a spacing condition. The slide members 11–34 in turn control contact operating members 11–36, camming those members rightwardly for a marking condition and leaving them presented leftwardly for a spacing condition. After the shaft 11–29 has rotated through part of a revolution, transmitter auxiliary contacts 11–37 close and complete the circuit of relay 17CR which locks and interrupts the circuit of transmitter clutch release magnet 11–27 releasing it so that shaft 11–29 will be arrested at the end of one revolution. A cam on shaft 11–29 also closes contacts 11–38 which complete the circuit of distributor clutch release magnet 11–39, energizing it and permitting clutch 11–41 to become engaged to drive shaft 11–42. Shortly after shaft 11–42 begins to rotate, distributor auxiliary contacts 11–43 close and operate relay 17DA through an armature and front contact of relay 17CR which is operated. Relay 17DA prepares a locking path for itself from ground through the armature 2 and back contact of relay 16DC, winding of relay 16DB, conductor 16–01, and its own armature 3 and front contact. Relay 17DA also prepares an energizing circuit for discard relay 16DC. Before shaft 11–29 completes a revolution and comes to rest, it permits contacts 11–38 to open, thereby releasing distributor clutch release magnet 11–39 so that rotation of shaft 11–42 will be restricted to one revolution. Before shaft 11–42 comes to rest, contacts 11–43 open, thereby permitting relay 16DB to operate in series with relay 17DA, thereby locking both relays.

The operation of relay 16DB and locking of relay 17DA is prevented if discard relay 16DC should operate. The latter relay is operable from any one of several paths that may be set up in decoding contacts controlled by slides 11–36 when the slides are set in accordance with certain codes that precede address codes and are to be discarded, among which are the codes for figures, H and letters. Because it has been assumed that the message has been received over a trunk and the remote switching center will have discarded any such codes, discard relay 16DC will not operate and the director circuit will interpret the first two codes as comprising an address code.

Relay 16DB, which is energized in the locking circuit for relay 17DA as previously stated, completes the circuit for relay 13FC, the circuit including the back contact and armature 1 of relay 13FL, conductor 13–01, armature 3 and front contact of relay 16DB, conductors 16–02 and 13–02, back contact and armature 2 of relay 13M1, back contact and armature 2 of relay 13W1, conductor 13–03, back contact and armature 4 of relay 16DC, conductor 16–03, back contact and armature 7 of relay 17HM, conductor 17–01, and back contact and armature 4 of relay 13SE to ground. Relay 13FC locks to the same ground connection from the junction of conductors 13–02 and 16–02 over conductor 13–04, front contact and armature 7 of relay 13FC, conductor 13–06 and armature 1 and back contact of relay 13FL. Relay 13FC completes the circuit of relay 16RC which operates, interrupts the circuit of relay 17PB which, although not previously mentioned, was operated by relay 13SE without producing any significant result. Relay 17PB has a slow-release characteristic and during the time that it is releasing, several other operations occur. Relay 16RC, operated by relay 13FC, unlocks and releases relay 17CR which in turn releases relays 17DA and 16DB. Relay 13FC also connects the transmitter contacts, which are the extreme left-hand pairs of contacts controlled by contact operating members 11–36, over a set of five conductors 11–44, armatures 1 to 5, inclusive, of relay 13FC and conductors 13–07 to the windings of relays 14F1, 14F2, 14F3, 14F4, 14F5 and 14F6, the latter being connected to the same one of the five conductors 13–07 as relay 14F3. The other contact spring of each of the pairs of transmitting contacts is connected over common conductors 11–46, 11–45 and 12–05 and armature 1 and back contact of relay 12ST to ground. This causes the relays 14F1 to 14F6 to be operated in correspondence with the code combination sensed by the tape and transferred to contact operating members 11–36. It has been assumed that the first character of the call directing code is the letter B which has elements 1, 4 and 5 of marking nature so that relays 14F1, 14F4 and 14F5 will be operated. These relays lock through their respective windings and over common locking conductor 14–01, armature 3 and back contact of relay 16DC, and back contact and armature 3 of relay 12TC to ground.

Still another operation performed by relay 13FC is the testing of the sequence circuit to determine whether or not it is busy. When relay 13SE operated it operated relay 17BT, not previously mentioned, and this relay removed a shunt around resistor 17–02 in the energizing circuit of relay 17SB. Accordingly, the circuit of that relay is now traced from battery through its winding, resistor 17–02, conductor 17–03, back contact and armature 6 of relay 16DH, back contact and armature 5 of relay 16AL, conductors 16–04, 17–04 and 17–06, front contact and armature 6 of relay 13FC, conductors 13–08, 13–09 and 13–11, front contact and armature 2 of relay 13SE, armature and back contact of relay 13RS to conductor 13–12, which is bracketed to Fig. 69 which contains the sequence circuit, and in which conductor 13–12 will be assumed to be the left-hand one of a group of three conductors 69–01 representing sufficient conductors to serve all of the regular directors in the switching center, there being one conductor per director.

The normal condition of the sequence circuit is that tube 69–02 is conducting, and relays 69C, 69E, 69D, 69A and 69H are operated. Those relays, and others hereinafter to be identified, are common to all of the director circuits served by the sequence circuit, whereas relays 69SS1 and 69SE1 are individual to the director circuit associated with the sequence circuit through conductor 13–12, and corresponding relays are allotted to other directors. The energizing path for relay 17SB is continued in Fig. 69 over conductor 13–12, armature 5 and back contact of relay 69G if the sequence circuit is not busy, and winding of relay 69SE1 to ground. Relay 17SB operates in this circuit but the current through resistor 17–02 is insufficient to permit relay 69SE1 to operate, the relay 17BT being held operated by relay 13SE. If the sequence circuit is then busy serving another director, the operation of relay 17SB will be delayed. Relay 17SB, when it operates, transfers the energizing path for relay 17BT to the right-hand armature of relay 17PB, now in the process of releasing, and relay 17BT is held operated during the transit time of the armature of relay 17SB by charging current for condenser 17–16 through resistor 17–17. At the end of the delay interval for the release of relay 17PB, that relay will be released, and a circuit is traced, if relay 17SB has operated, from battery through the winding of relay 17BT, armature and front contact of relay 17SB, right-hand armature and back contact of relay 17PB, back contact and left-hand armature of relay 17GA, conductor 17–07, armature 1 and back contact of relay 13W1, armature 3 and back contact of relay 13M1, break contacts controlled by armature 2 of relay 13FL, conductor 13–13, which serves as the apex of a fan circuit controlled by relays 14F1 to 14F6, armature 3 and back contact of relay 14F2, front contact and armature 2 of relay 14F1, armature 2 and back contact of relay 14F3, armature 2 and front contact of relay 14F4, armature 4 and front contact of relay 14F5, conductor 14–02, relay 15B, conductor 15–01, right-hand break contacts of test key 13–14, and winding of relay 13FA to ground. Relay 17BT remains operated in this circuit and relay 13FA operates, the path for inserting relay 15B in series with relay 13FA having been selected by relays 14F1 to 14F6 upon the decoding of the code combination representing the character B.

Had there been no relay terminating the path completed through the fan circuit controlled by relays 14F1 to 14F6 in response to the signal for the letter B, this would have signified that that code was unassigned or for some reason was not a valid switching code, and relay 13FA would not have operated.

Relay 13FA operates relay 13FL. The current that flows through relay 15B to operate relay 13FA is insufficient to operate the relay 15B, but when relay 13FL operates, it substitutes, at its armature 2 and front contact, a battery connection through resistor 13–16 for the battery connection supplied through the winding of relay 17BT, and the current through resistor 13–16 is sufficient to operate relay 15B. With relay 13FL operated, the path traced from the winding of relay 17BT to the break contacts associated with the armature 2 of relay 13FL is extended through the front contact and armature 3 of that relay, and armature 7 and back contact of relay 13SC to ground, to hold relay 17BT operated. At its armature 1, relay 13FL interrupts the circuit of relay 13FC which releases and prepares a path for operating relay 13SC. Relay 13FC need remain operated no longer because the relays in Fig. 14, which were energized under the control of marking impulse conditions of the signal, remain locked. Relay 13FC, upon releasing, releases relay 17SB which holds relay 17BT operated to relay 13SE, which holds relay 17BT independently of relay 13FC. Relay 13FC also releases relay 16RC, and reoperates relay 17PB. With relay 16RC released, and relay 17PB reoperated, the circuit of transmitter clutch release magnet 11–27 is again completed and this relay operates to cause shaft 11–29 to be rotated through another revolution, to advance the next code combination into sensing position, and to transfer that code combination upon being sensed, to the contacts controlled by contact operating members 11–36. This code combination is assumed to be the second letter of the address code preceding the message, namely the letter U.

Figure 69:
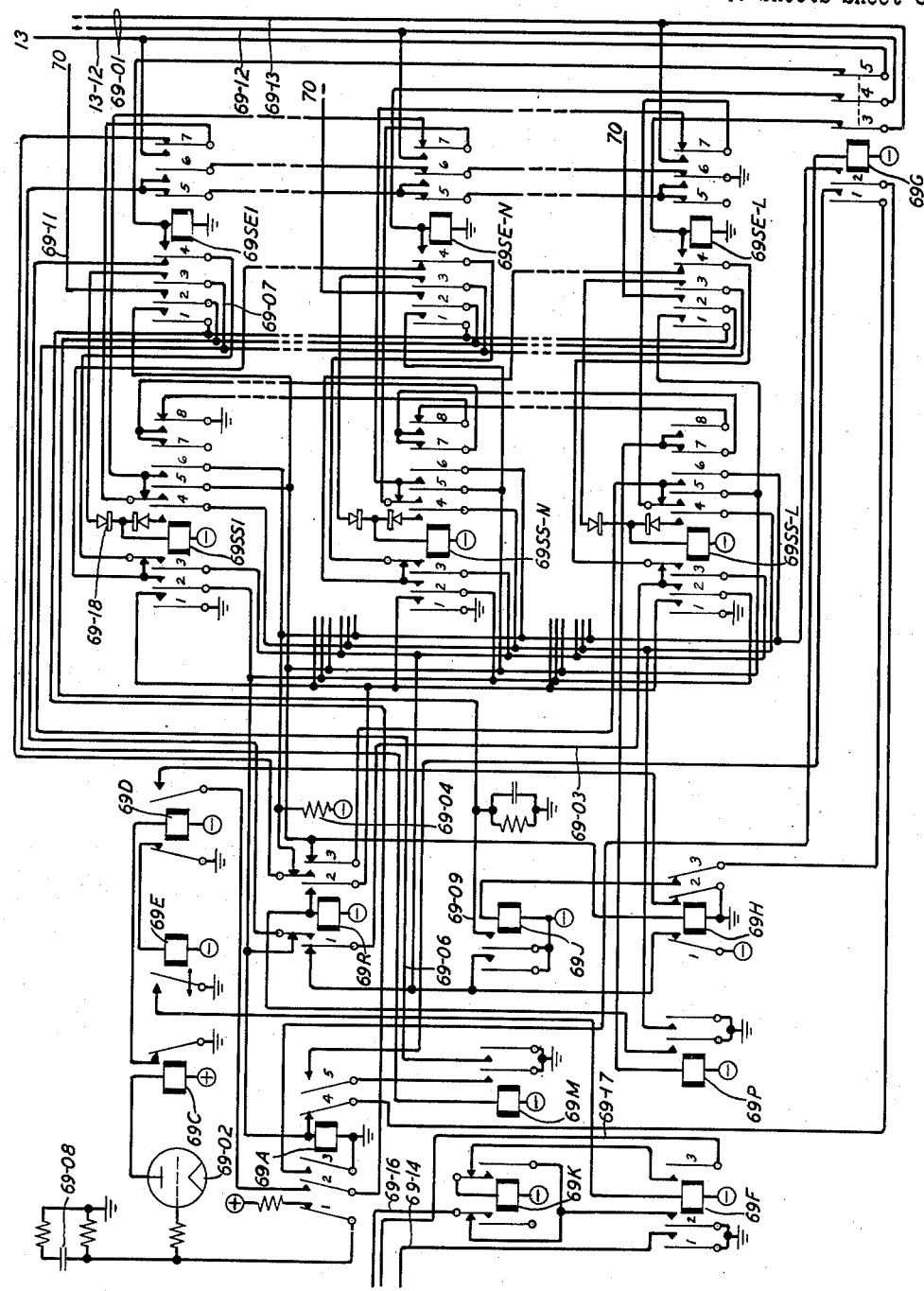
Fig. 69 shows the sequence circuit.

The same sequence of operations as previously described takes place down to and including the operation and locking of relay 17DA and the operation of relay 16DB. When relay 13FL released, relay 13FC had prepared the energizing circuit for relay 13SC, and relay 16DB, upon operating, operates relay 13SC. The latter relay completes conductive paths from conductors 11–44 through its front contacts and armatures 1, 2, 3, 4 and 5, and conductors 13–17 to relays 18S1, 18S2, 18S3, 18S4 and 18S5. The code combination for the letter U has the first, second and third elements marking, and the fourth and fifth elements spacing. Accordingly, relays 18S1, 18S2 and 18S3 will be energized through the transmitter contacts, and relays 18S4 and 18S5 will remain released. Relay 13SC also reoperates relay 17SB, if the sequence circuit in Fig. 69 is not busy, and it will be assumed that it is not busy, relay 17SB in operating putting relay 17BT under the control of relay 17PB, as in the case of the decoding of the first character. Relay 69SE1 again is prevented from operating by resistor 17–02. Relay 13SC also interrupts the energizing circuit of slow-release relay 17PB. Upon releasing, the latter relay extends a path for relay 17BT from battery through the winding of that relay, armature and front contact of relay 17SB, right-hand armature and back contact of relay 17PB, back contact and left-hand armature of relay 17GA, conductor 17–07, armature 1 and back contact of relay 13W1, armature 3 and back contact of relay 13M1, front contact and armature 3 of relay 13FL, armature 7 and front contact of relay 13SC, left-hand break contacts of test keys 13–14, conductors 13–18, 18–01 and 18–02, armature 7 and front contact of relay 18S3, armature 6 and back contact of relay 18S4, armature 5 and back contact of relay 18S5, armature 5 and front contact of relay 18S1, armature 5 and front contact of relay 18S2, conductors 18–03 and 19–01, armature BU of relay 15B, conductor 15–02, break contacts of intercept keys 54–01 and 54–02 to conductor 54–03. The establishment of the path from the winding of relay 17BT to conductor 54–03 represents the selection of the outlet represented by the two letter code BU.

*Selected outlet tested for availability*

Since the station having the address code BU is served by switching center 1–37, the message is to be retransmitted over outgoing trunk 1–36 which is reached through the outgoing trunk circuit shown in Figs. 20 to 23, 25 to 28 and 30 to 33. The test lead 54–03 extends into Fig. 23, and the path is traced through the upper armature and back contact of relay 22BR, armature 6 and back contact of relay 22LA1, armature 2 and back contact of relay 22LB1 to branching paths, one extending through resistor 22–01 to negative battery and the other extending through the winding of relay 22J1 to negative battery. It is to be noted that if relay 22BR had been operated, the path would have been traced through the upper armature and front contact and from that point through conductor 22–02, armature 5 and back contact of relay 27LA2, armature 2 and back contact of relay 27LB2, armature 2 and back contact of relay 27C2, armature 4 and back contact of relay 27B2, armature 1 and back contact of relay 27E2 and in parallel paths through resistor 27–01 and winding of relay 27J2 to negative battery.

Figure 20:
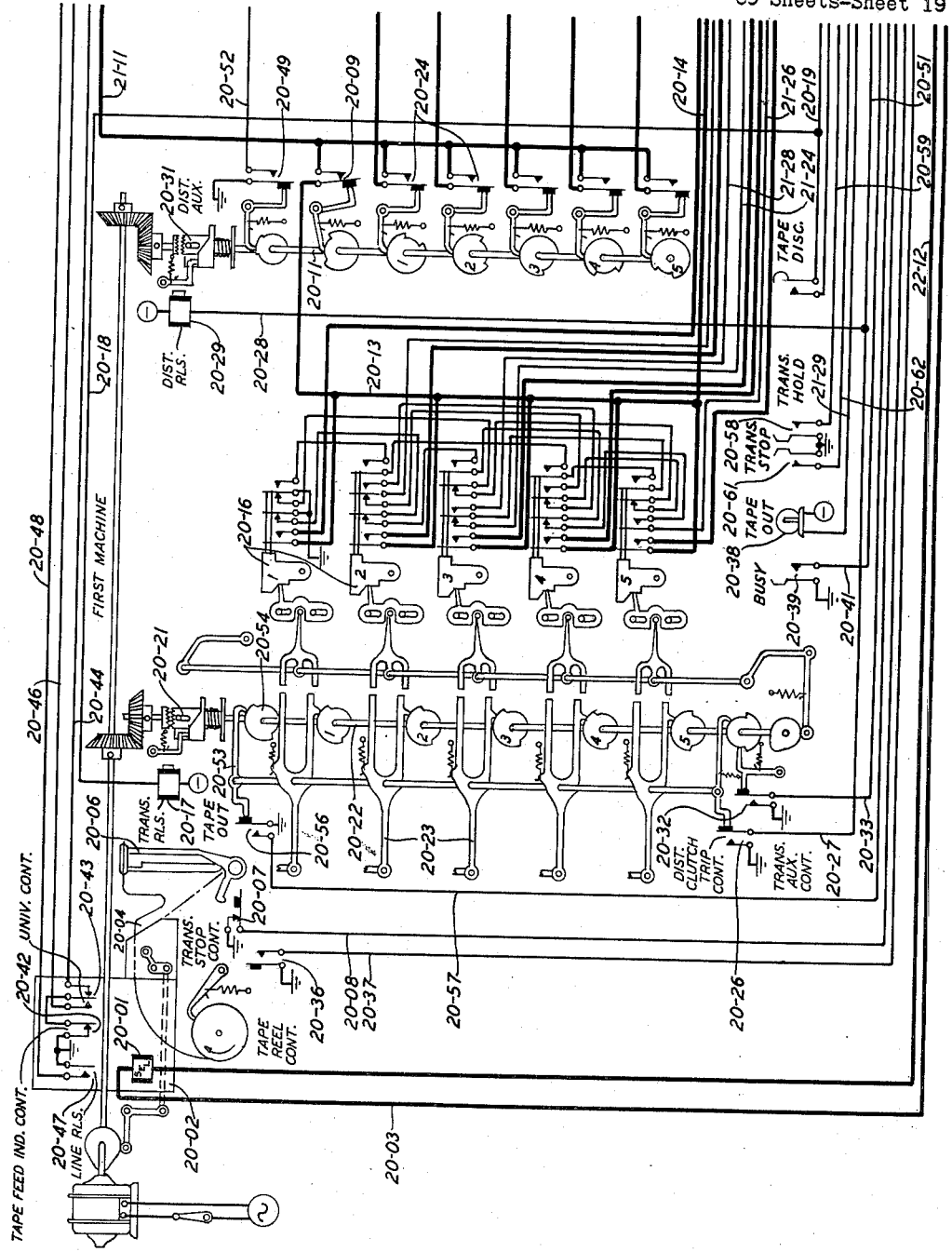
Figs. 20 to 23, 25 to 28 and 30 to 33 show the single channel outgoing trunk circuit.
Figure 21:
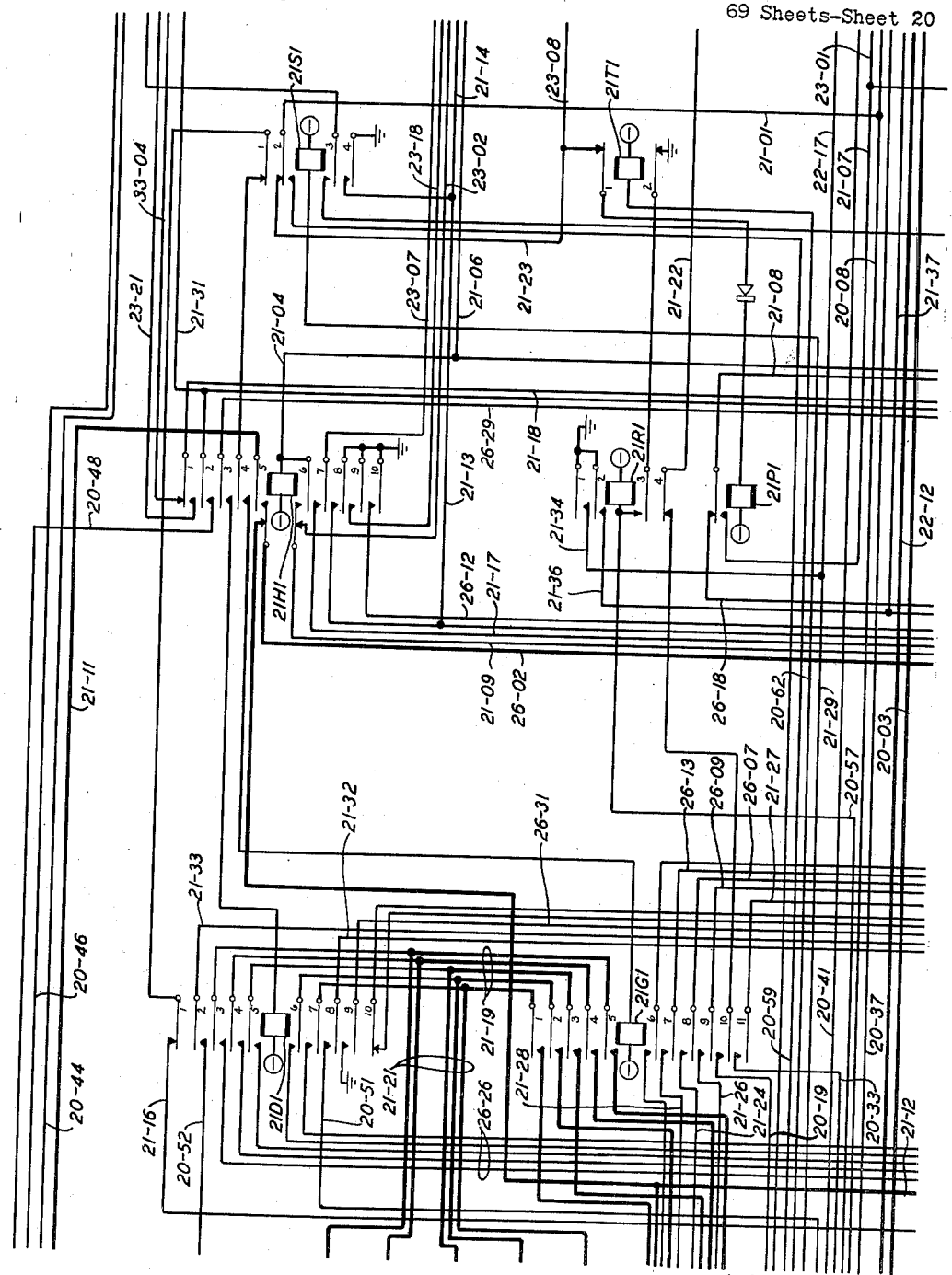
Figure 25:
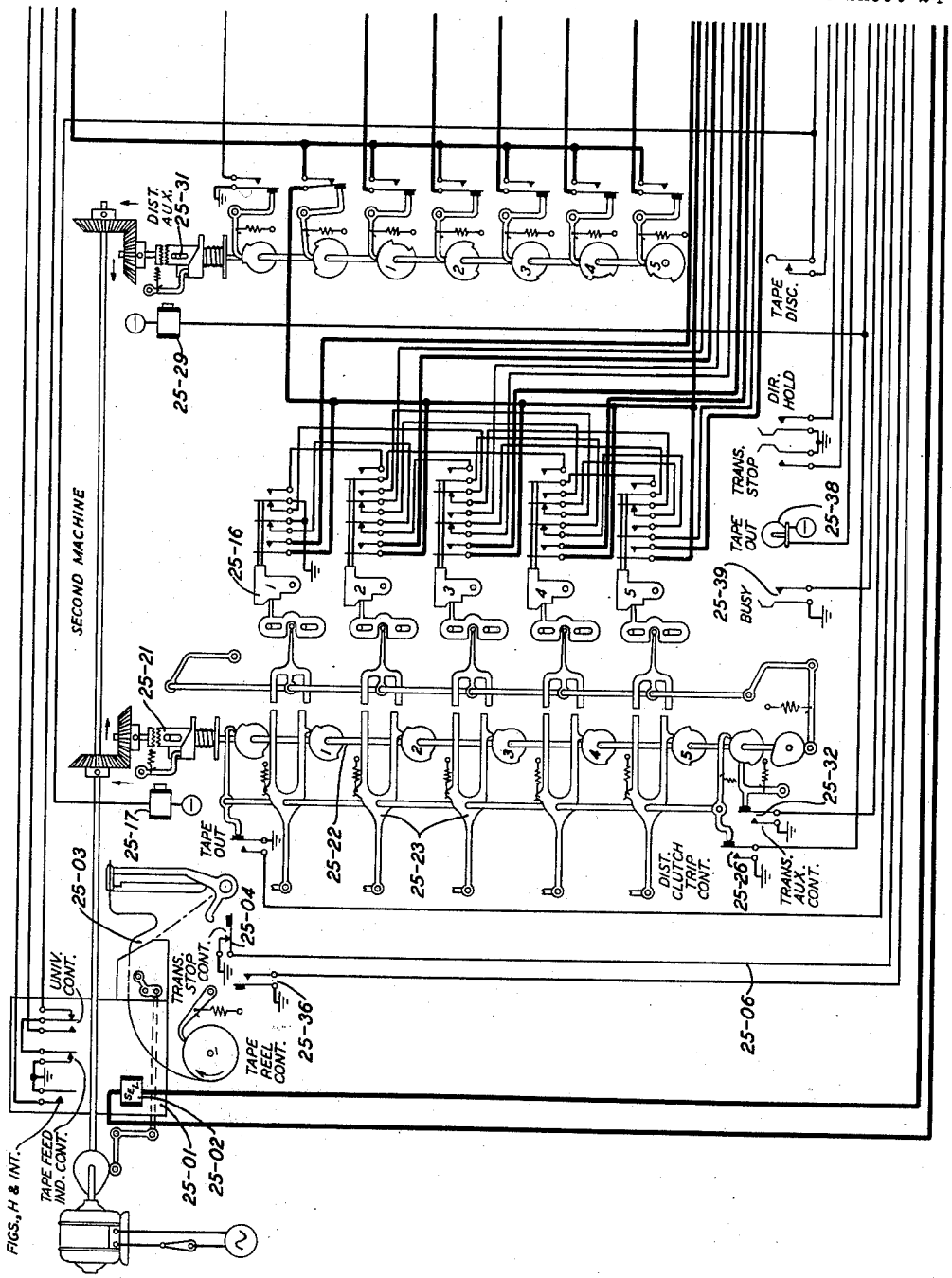
Figure 30:
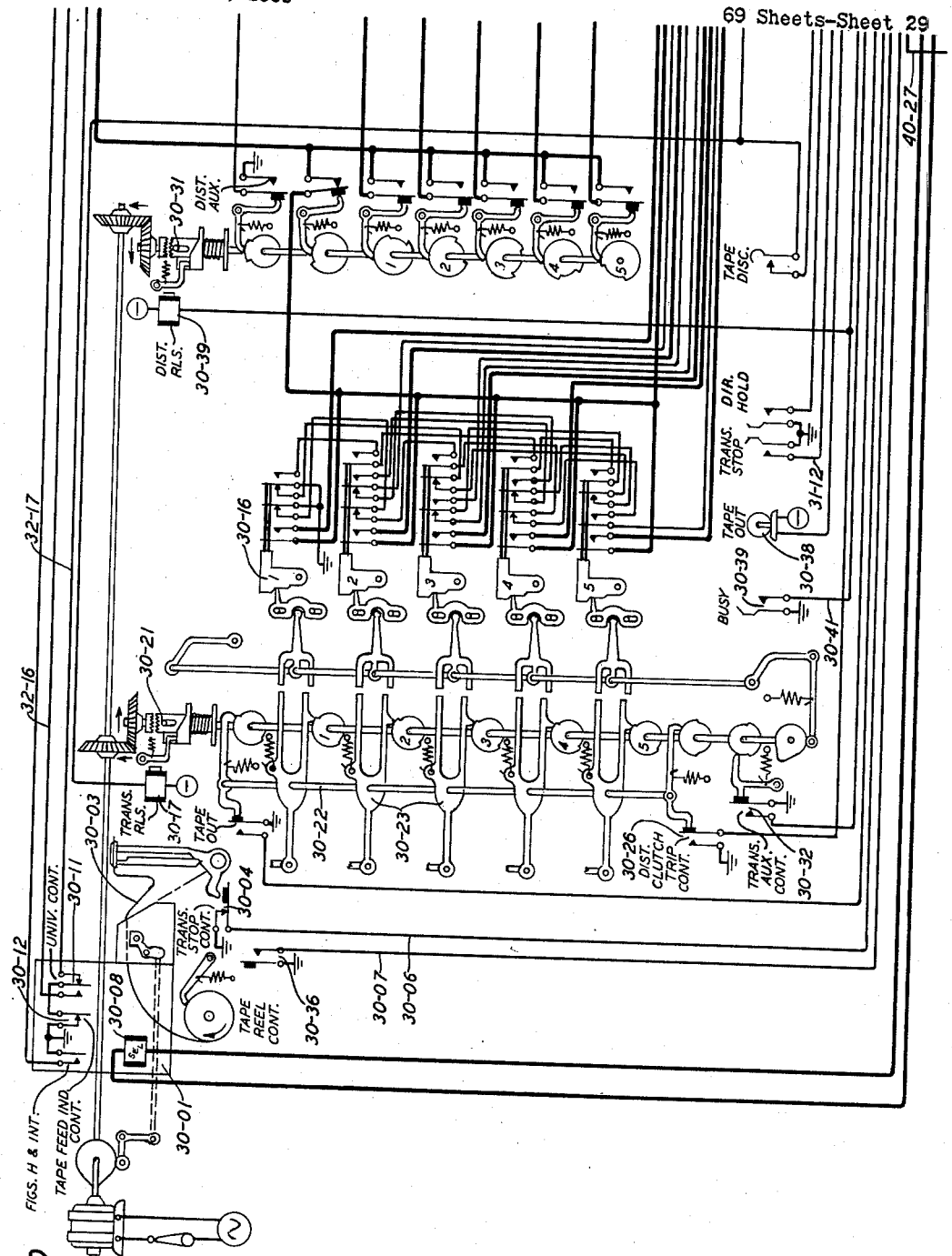
Figure 31:
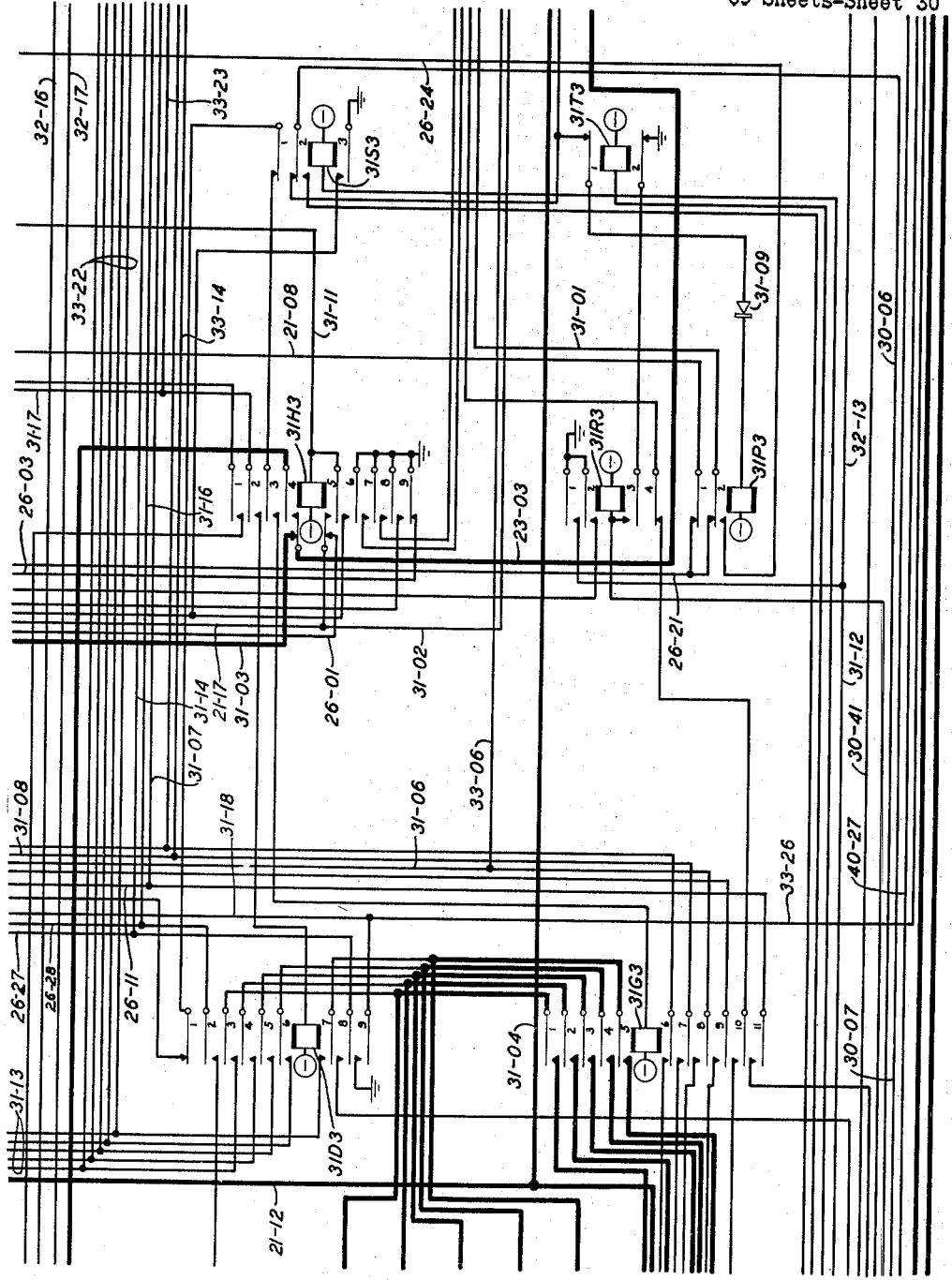

As previously stated, the outgoing trunk circuit for the trunk extending to switching center 1–37 has three reperforator-transmitter units, one for urgent or priority messages and the other two for regular message traffic. The reperforator-transmitter units shown in Figs. 20 and 25 are for regular message traffic, and either of them may be seized by a director for establishment of a cross-office path and transmission of a message thereto. The reperforator-transmitter unit shown in Fig. 30 is seizable only through the multiple address circuit as will be described hereinafter for the establishment of a cross-office path to the reperforator-transmitter for the transmission of a priority message. When the reperforator-transmitter unit in Fig. 20 is connected through a cross-office path and is receiving a message, and the reperforator-transmitter unit in Fig. 25 is idle, relay 22BR will be operated. When both reperforators are idle but the one shown in Fig. 20 was the last to receive a message, relay 22BR will be operated. Conversely, when the reperforator in Fig. 25 is receiving a message or was the last to receive a message and the reperforator in Fig. 20 is idle, relay 22BR will be released. For the present purposes it will be assumed that relay 22BR is released so that the connection to negative battery through resistor 22–01 and through relay 22J1 is of interest.

When both reperforators are busy, or if one is busy and the tape supply for the other is low, the test conductor path 54–03 will not be extended through to the multiple negative battery connections, but will have instead a ground connection, such as at the armature 6 and front contact of relay 22LA1 or at the armature 2 and front contact of relay 22LB1 which, being extended back to relay 17BT, causes that relay to remain operated as an indication of the busy condition. Assuming that there is no such ground connection, that relay 22BR is unoperated and that the reperforator unit in Fig. 20 is idle, relay 17BT will release upon the connection of its winding through the right-hand armature and back contact of relay 17PB, through the fan circuit path established by relays in Fig. 18, and through resistor 22–01 and the winding of relay 22J1 in parallel to battery. Relay 17BT short-circuits resistor 17–02 in a path traced from battery through the winding of relay 17SB, armature 2 and back contact of relay 17BT shunting resistor 17–02, conductor 17–03, back contact and armature 6 of relay 16DH, back contact and armature 5 of relay 16AL, conductors 16–04, 17–04 and 17–06, front contact and armature 6 of relay 13SC, conductors 13–09 and 13–11, front contact and armature 2 of relay 13SE, armature and back contact of relay 13RS, conductor 13–12 to Fig. 69 and through armature 5 and back contact of relay 69G, and winding of relay 69SE1 to ground. With resistor 17–02 shunted at the right-hand armature and back contact of relay 17BT, sufficient current flows to energize relay 69SE1, and that relay operates. Relay 69SE1 locks through its front contact and armature 4 the break contacts controlled by armature 3 of relay 69SS1 and a chain circuit through corresponding contacts of all other relays similarly designated, conductor 69–03, left-hand armature and back contact of relay 69R, and left-hand armature and front contact of relay 69H to battery. It will be apparent that if any other relay 69SE– had been operated, this locking circuit could not have been completed. Relay 69SE1 provides a circuit for holding relay 69H operated, the circuit being traced through the winding of relay 69H, back contact and armature 3 of relay 69R, break contacts controlled by armature 5 of the lowermost or last relay corresponding to relay 69SS1, designated 69SS–L, armature 7 and back contact of the last relay corresponding to relay 69SE1, designated 69SE–L, chain circuit through corresponding break contacts of all other sets of relays allocated to other director circuits, designated 69SS–N and 69SE–N, break contacts controlled by armature 5 of relay 69SS1, armature 7 and front contact of relay 69SE1 to conductor 13–12. Prior to operation of relay 69SE1, the path for holding relay 69H operated was extended through the back contact associated with armature 7 and resistor 69–04 to battery. Relay 69SE1 operates relay 69M in a circuit traced from battery through the winding of that relay, front contact and armature 6 of relay 69SE1 and chain circuit through back contacts and corresponding armatures of relays 69SE-N and the relay 69SE-L to ground. Relay 69M completes a circuit from ground through its outer armature and front contact, conductor 69-06, branching conductor 69-07, armature 3 and front contact of relay 69SE1, varistor 69-18, and winding of relay 69SS1 to battery. Relay 69SS1 interrupts at the break contacts controlled by its armature 5 the previously traced path for holding relay 69H operated, but it supplies another path which is independent of relay 69R and of all other relays of the 69SS- and 69SE- series except those now operated, the circuit being traced from ground through the winding of relay 69H, armature 5 and front contact of relay 69SS1, and armature 7 and front contact of relay 69SE to conductor 13-12.

Relay 69SS1 completes the circuit of relay 69P, traced from battery through the winding of that relay, back contact and armature 7 of relay 69SS-L, chain circuit through corresponding back contacts and armatures of other relays 69SS-N, and front contact and armature 8 of relay 69SS1 to ground. Relay 69P in turn operates relay 69R in a circuit traced from battery through the winding of that relay, and the front contact and inner armature of relay 69P to ground. Relay 69R locks through its front contact and armature 2, and front contact and armature 1 of relay 69SS1 to ground, and effects controls which will be described hereinafter.

Returning to consideration of relay 69SE1, it interrupts the circuit for relay 69A, that circuit being traced from ground through the winding of that relay, break contacts controlled by armature 1 of relay 69R, and back contact and armature 4 of relay 69SE1, and relay 69A releases. At its armature 1, relay 69A disconnects positive battery from the grid of tube 69-02 and from condenser 69-08, and the condenser begins to discharge. Relay 69A also establishes a circuit from ground through its armature 3 and back contact and the winding of relay 69G to battery, to operate that relay. It will be understood that the number of directors and levels of relays corresponding to relays 69SS1 and 69SE1 in the sequence circuit may exceed the capabilities of a single relay 69G, in which case there would be a plurality of those relays operable in parallel from armature 3 of relay 69A.

Relay 69G interrupts at its right-hand armatures all of the paths from other directors to their relays in the SE series so that those directors cannot have access at this time to the sequence circuit. Relay 69G also completes an operating circuit for relay 69J traced from battery through the winding of the latter relay, front contact and armature 3 of relay 69H, armature 1 and front contact of relay 69G, back contact and armature 5 of relay 69A, and front contact and inner armature of relay 69M to ground. Relay 69M was operated by relay 69SE1.

Relay 69J connects battery through its right-hand armature and front contact to conductor 69-09 from which a branching conductor is connected to the armature 2 of relay 69SE1, and to the corresponding armature of all other relays in the SE series. Only the relay 69SE1 is operated, and the battery connection is extended over conductor 69-11 to Fig. 70, and there through the winding of select magnet 70-01. Select magnet 70-01 operates and prepares for operation all of the crossbar switch contacts associated with the horizontal level that has conductors connected to the director circuit contained in Figs. 12 to 19, 24 and 29, that serves the incoming channel of trunk 1-33. At the armature and front contact of select magnet 70-01, ground is connected to conductor 70-02 which is contained in a group of conductors bracketed to Fig. 13. Conductor 70-02 appears in Fig. 13 and extends through the winding of relay 17GA to battery, and that relay operates. At its left-hand armature the relay 17GA establishes a path for holding the armature of relay 17MG in engagement with its right-hand contact and for energizing relay 17SM, the path being traced from ground through the lower winding of relay 17MG, the winding of relay 17SM, front contact and left-hand armature of relay 17PT, which was operated over conductor 17-01 through the right-hand armature and back contact of relay 17GA when relay 13SE operated, a fact not previously stated, to the front contact associated with the left-hand armature of relay 17GA. Although relay 17GA has interrupted at its right-hand armature the energizing circuit for relay 17PT, the latter relay has a slow-release characteristic and does not immediately release. The path of relay 17SM and the lower winding of relay 17MG is continued over the left-hand armature of relay 17GA to conductor 17-07 and over a path previously traced, including conductor 13-18, to the apex of the second fan circuit in Fig. 18 which is the path over which the outgoing trunk was selected and tested for busy or idle condition, the path terminating in Fig. 22 at the winding of relay 22J1 and at negative battery through resistor 22-01. The current in this circuit is sufficient to operate the relays 17SM and 22J1 but is not sufficient to operate the armature of relay 17MG away from its right-hand contact, on which the armature is held by current through the upper winding to ground supplied over conductor 17-01 from relay 13SE. Relay 17SM completes an energizing circuit for relay 17CN, traced from battery through the winding of the latter relay, front contact and armature of relay 17SM, right-hand contact and armature of relay 17MG, front contact and right-hand armature of relay 17GA and over conductor 17-01 to ground supplied by relay 13SE. Relay 17CN locks through its right-hand armature and front contact, shunting the armature and front contact of relay 17SM and the right-hand contact and armature of relay 17MG. The function of relay 17CN will be described later.

In the outgoing trunk circuit the relay 22J1, at its armature 2 and front contact, connects ground through the back contact and armature 1 of relay 22LE1, break contacts controlled by the lower armature of relay 22A1 to conductor 22-03 included in a group of conductors bracketed to Fig. 70 in which conductor 22-03 reappears and continues through the winding of hold magnet 70-03 to battery. Hold magnet 70-03 operates and causes the operation of those of the contacts in its vertical contact array that have been prepared by operation of select magnet 70-01, these being the contacts 70-04, 70-06, 70-07, 70-08 and 70-09, thereby connecting four conductors in the group bracketed to Fig. 22, in the outgoing trunk circuit, to four conductors bracketed to Fig. 13, in the director circuit, and grounding another of the conductors in the group bracketed to Fig. 13.

Figure 13:
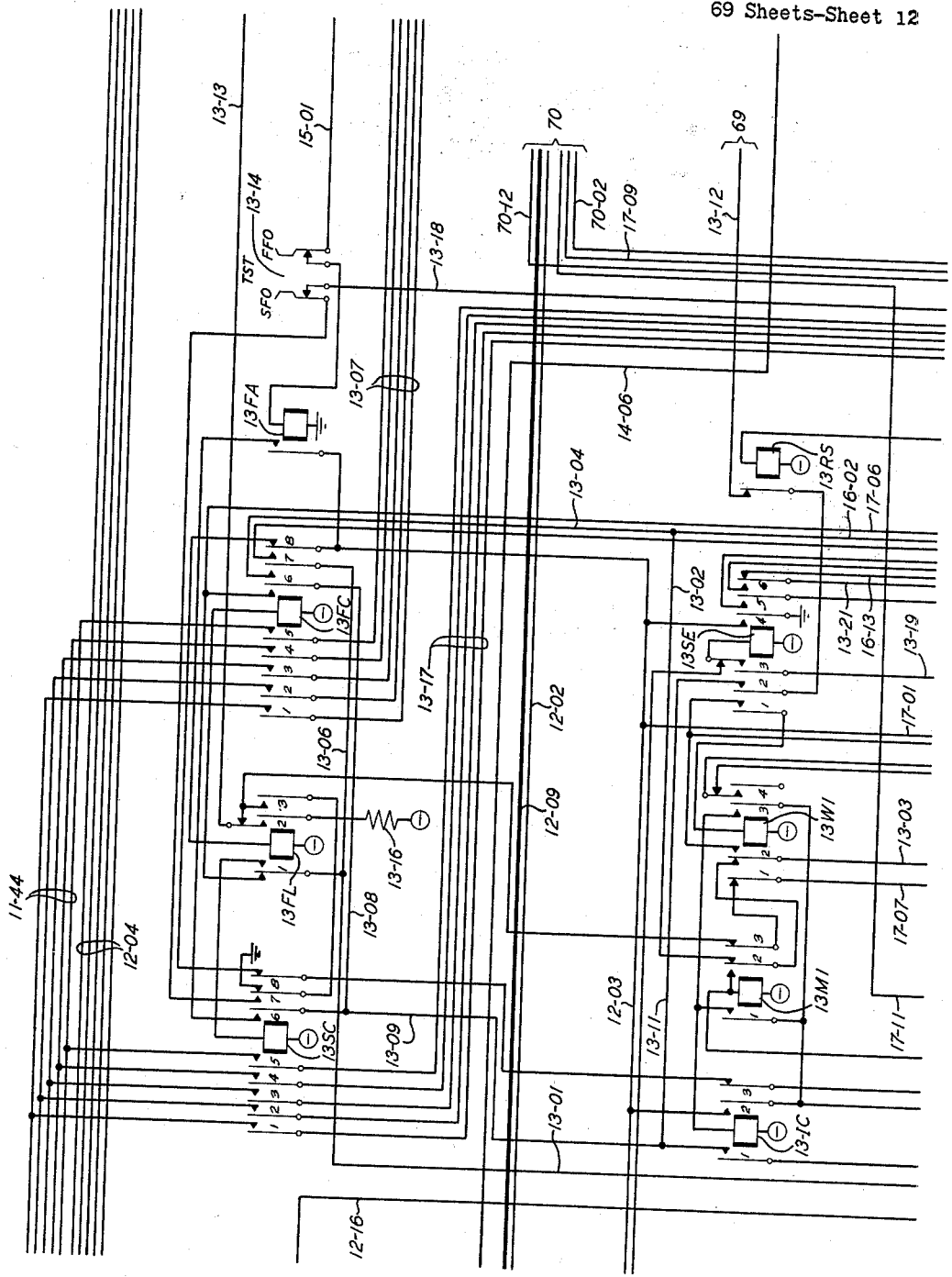
Figure 17:
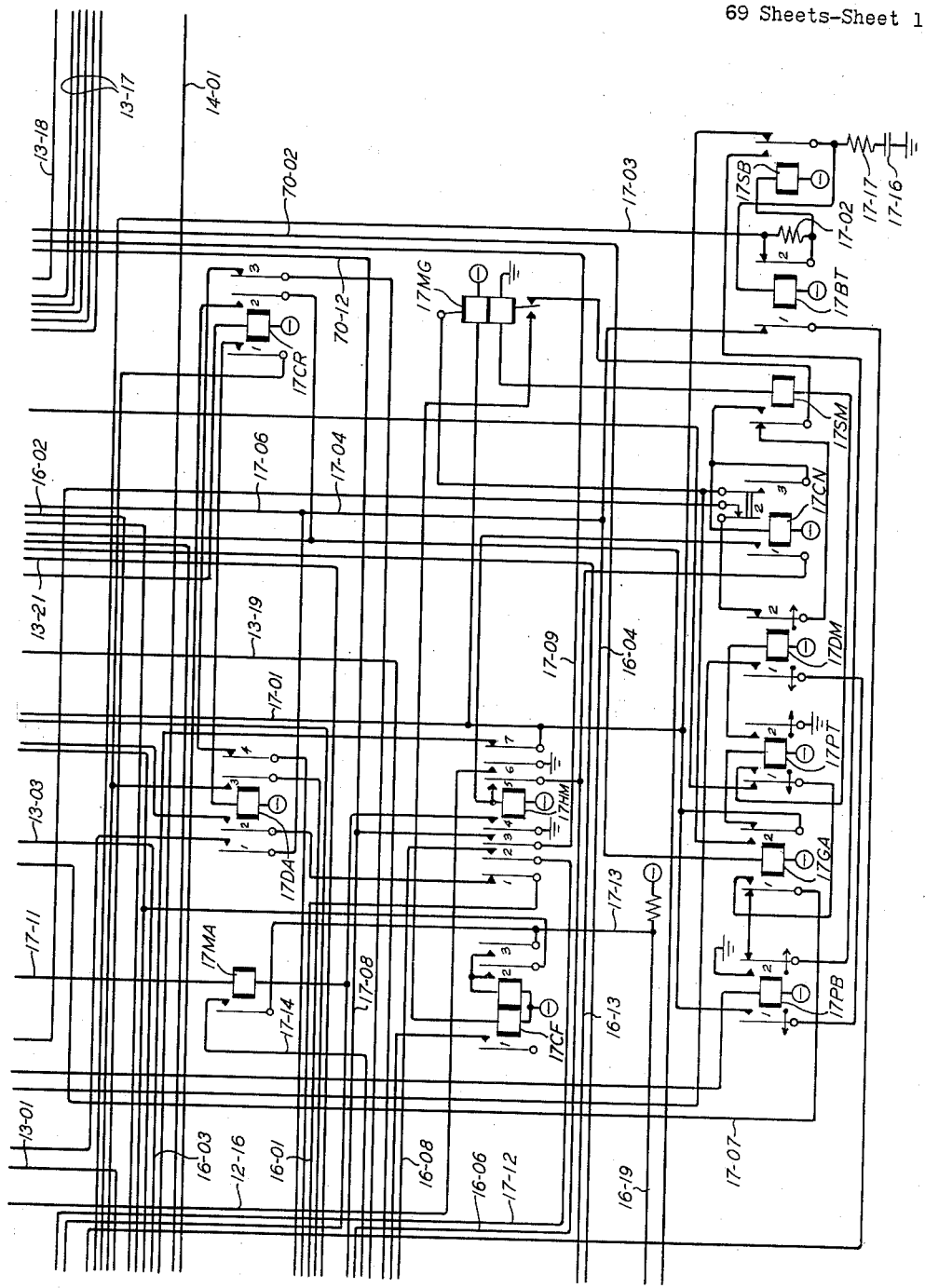
Figure 22:
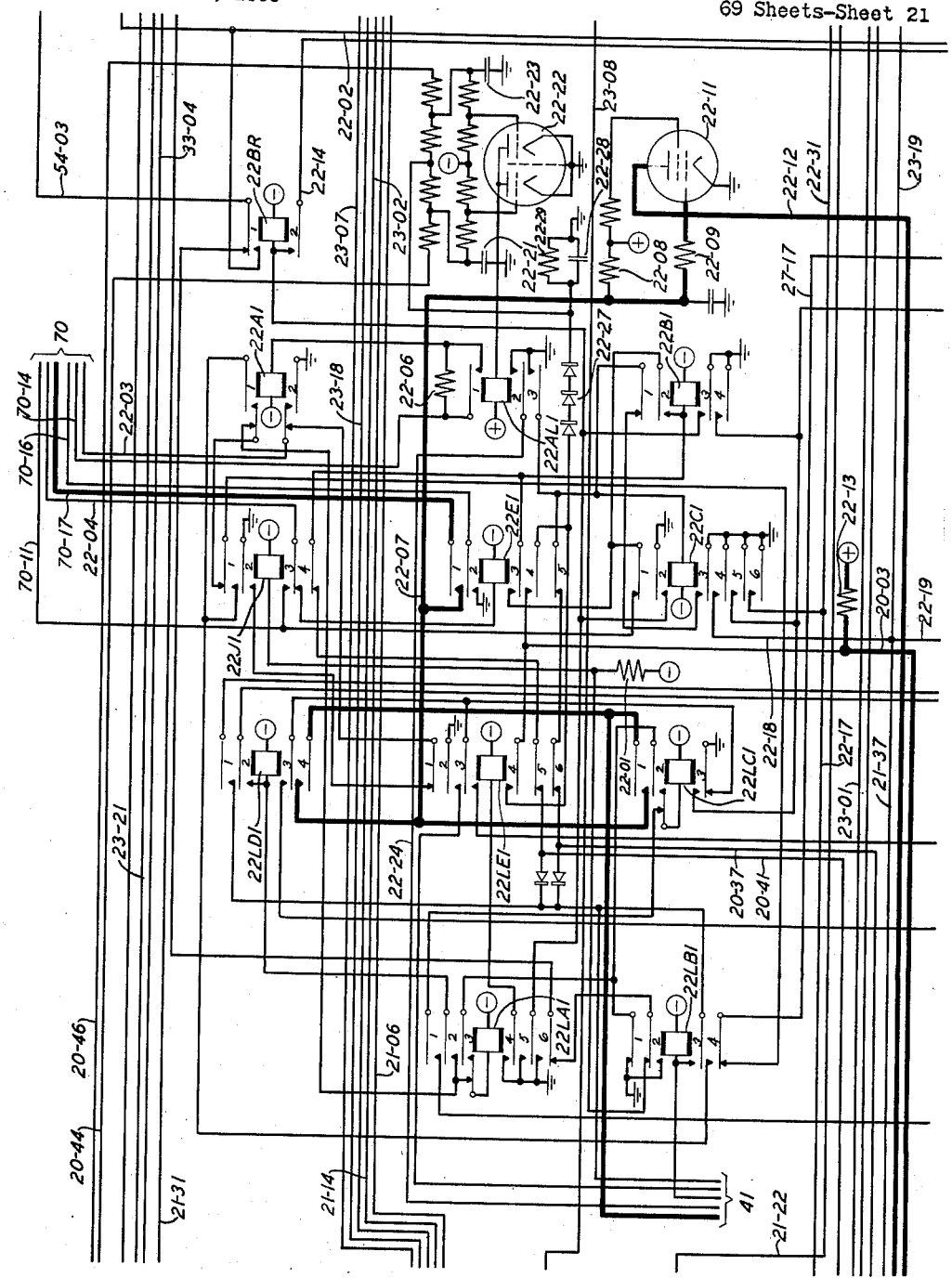
Figure 23:
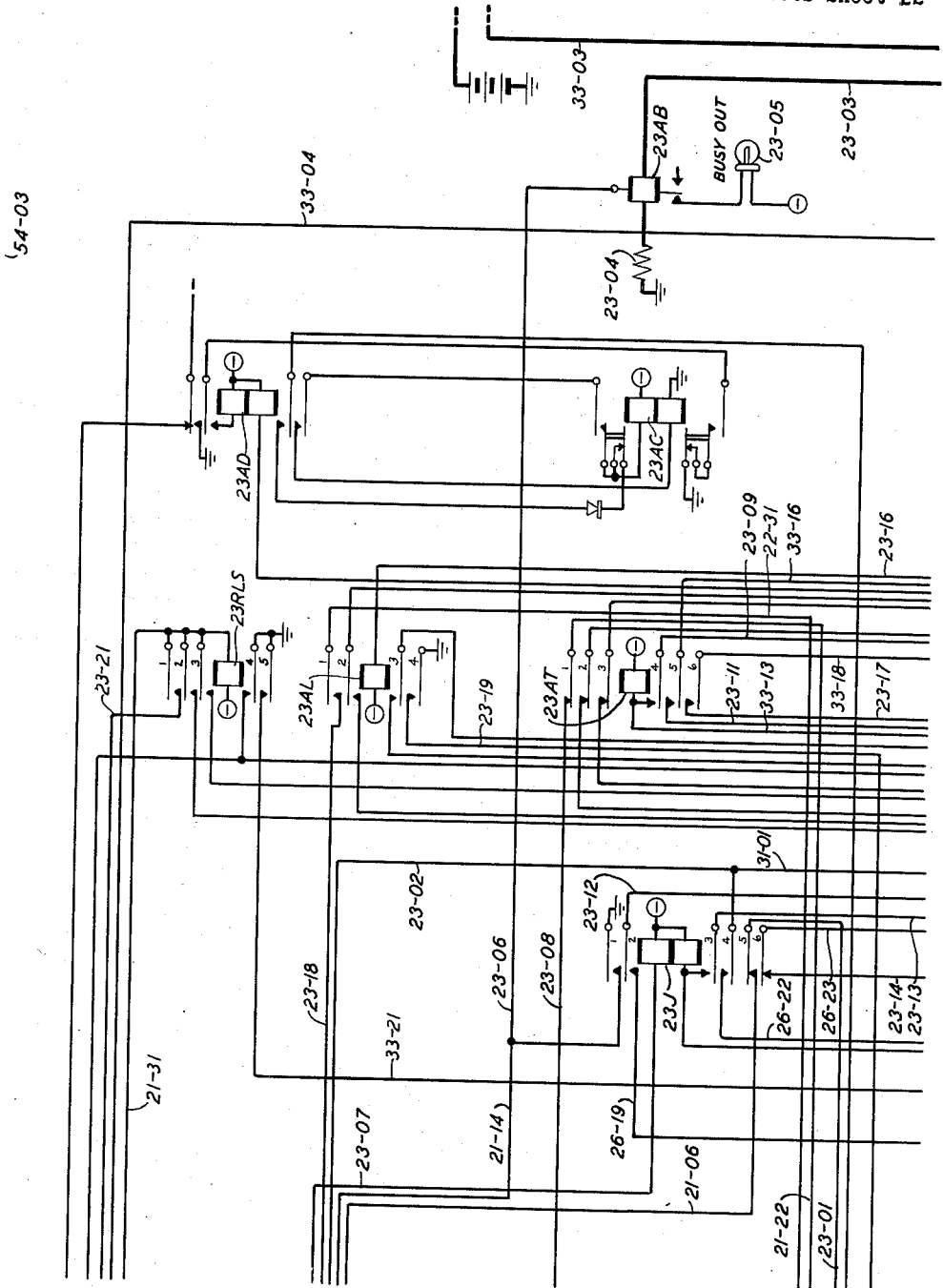
Figure 24:
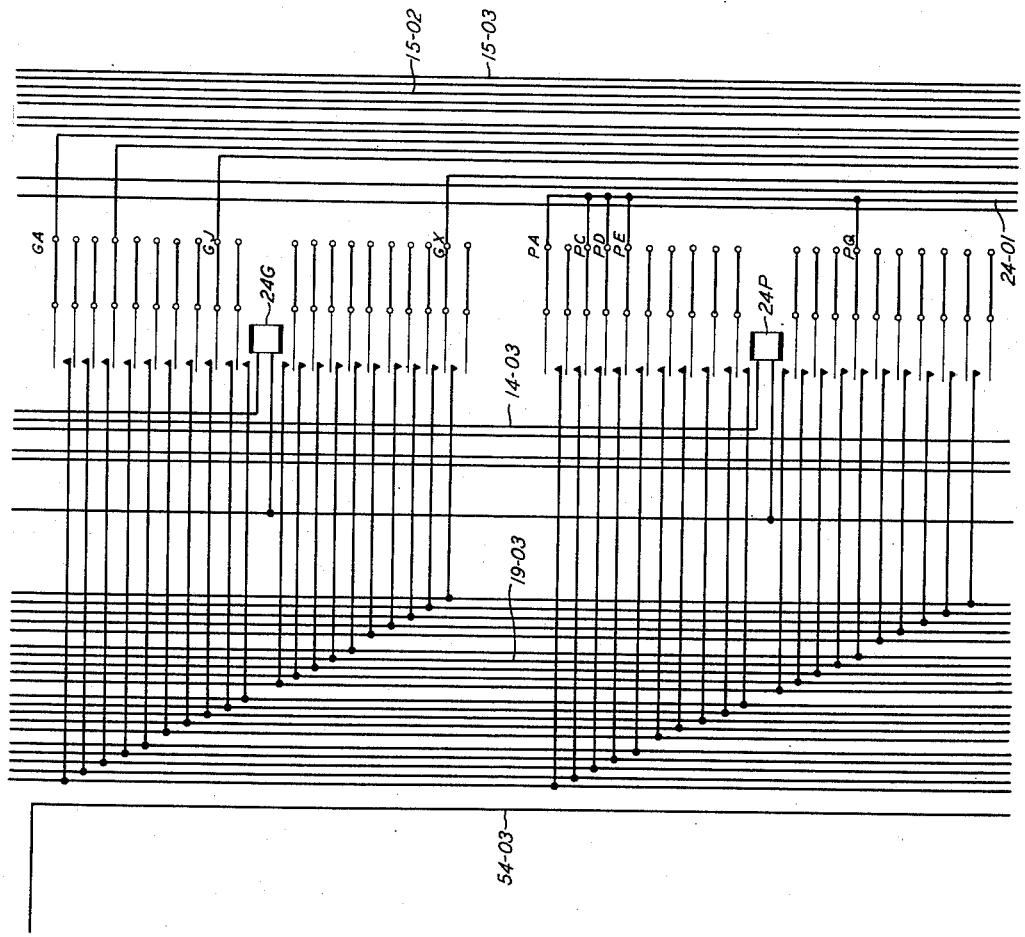

Hold magnet 70-03 connects ground through its armature and front contact to conductor 70-11 which is one of the conductors bracketed to Fig. 22 in which conductor 70-11 appears, and the path is extended through the front contact and armature 3 of relay 22J1 to conductor 22-04 bracketed from Fig. 22 to Fig. 70, in which conductor 22-04 appears as one of the crossbar switch verticals, and is connected through crossbar switch contacts 70-04 to crossbar switch horizontal conductor 70-12 included in the group bracketed from Fig. 70 to Fig. 13, in which the path continues into Fig. 17 and over conductor 17-08, break contacts controlled by armature 4 of relay 16CT, conductor 16-06, armature 1 and front contact of relay 17CN and winding of relay 17HM to battery and the latter relay operates. Relay 17HM locks through its front contact and armature 5, conductor 16-06, break contacts controlled by armature 4 of relay 16CT, conductor 17-08, front contact and armature 3 of relay 17HM, conductor 17-09 which is one of the group bracketed from Fig. 13 to Fig. 70 in which conductor 17-09 reappears as one of the crossbar switch horizontals and is connected through contacts 70-09 to grounded crossbar switch vertical conductor 70-13.

At its armature 4 and front contact the relay 17HM connects ground through the winding of relay 17MA and conductor 17–11, which is one of the group of conductors bracketed from Fig. 13 to Fig. 70, conductor 17–11 being connected to one of the crossbar switch horizontals and through contacts 70–08 to crossbar switch vertical conductor 70–14 included in the group bracketed to Fig. 22 where the path extends through resistor 22–06, it being assumed that alarm relay 22AL1, which can shunt resistor 22–06 by means of its armature 1 and front contact, is not operated, the path continuing through the winding of relay 22A1 to battery. The current which flows under the restrictive control of resistor 22–06 is sufficient to operate relay 22A1 but is not sufficient to operate relay 17MA. At its lower armature and front contact, relay 22A1 connects ground to conductor 22–03, thereby locking hold magnet 70–03 under the exclusive control of relay 22A1.

At its armature 7 and back contact, relay 17HM interrupts the locking circuit for relay 13SC. At its armatures 1 to 5, relay 13SC releases those of the relays in Fig. 18 that were operated in accordance with the second character of the address code. At its armature 7, the relay 13SC interrupts the circuit of relay 17SM, the energizing circuit of which will also be interrupted at the left-hand armature and front contact of relay 17PT when that slow-release relay releases. Relay 13SC reoperates relay 17PB in a circuit including armature 3 and back contact of relay 13IC, armature 8 and back contact of relay 13SC, back contact and armature 8 of relay 13FC, and front contact and armature 4 of relay 13SC to ground. Relay 13SC interrupts the energizing circuit of relay 22J1, which releases and initiates a sequence of operations to be described hereinafter. Relay 13SC also interrupts, at its armature 6 and front contact, the battery connection applied over conductor 13–12 such as holding relay 69H in the sequence circuit operated. Relay 69H interrupts the energizing circuit for relay 69J which releases. Relay 69J interrupts, at its left-hand armature and back contact, the locking circuit for relay 69SE1 which releases. Relay 69SE1 interrupts at its front contact and armature 6, the circuit of relay 69M. Relay 69SE1 reestablishes an operating circuit for relay 69H traced from ground through the winding of the latter relay, armature 5 and front contact of relay 69SS1, armature 7 and back contact of relay 69SE1, armature 3 and front contact of relay 69R, break contacts controlled by armatures 5 of other relays in the SS series and armature 7 and back contacts of other relays in the SE series, alternating between the relays of the two series, armature 6 and front contact of relay 69SS1 and resistor 69–04 to battery. Relay 69H reoperates relay 69A in a circuit traced from ground through the winding of the latter relay, armature 2 and front contact of relay 69SS1, back contacts and armatures 4 of relays in the SE series other than relay 69SE1 and break contacts controlled by armatures 3 of other relays in the SS series, alternating between the two series of relays, conductor 69–03, armature 1 and front contact of relay 69R, back contact and armature 4 of relay 69SE1, front contact and armature 3 of relay 69SS1 and front contact and armature 1 of relay 69H to battery. Relay 69A locks in a circuit through its front contact and armature 4, armature 2 and front contact of relay 69G and resistor 69–04 to battery. Relay 69A, in operating, interrupts at its back contact and armature 3 the energizing circuit for relay 69G, and that relay releases, interrupting the locking circuit just traced. However, relay 69A remains energized over the operating path previously traced.

At its front contact and armature 1 relay 69A reconnects positive battery to the grid of tube 69–02 and to condenser 69–08, thus recharging the condenser and preventing tube 69–02 from cutting off. The purpose in activating the timing circuit, comprising condenser 69–08 and tube 69–02, is to time the interval during which the sequence circuit is under seizure by a director circuit, and to dismiss a director that holds the sequence circuit longer than a predetermined interval, perhaps of the order of three seconds. The operations resulting from the cutting off of tube 69–02 will be described hereinafter. Whereas the initial idle condition of the sequence circuit was described as including the operated condition of relays 69A, 69C, 69D, 69E, and 69H, the present condition of the sequence circuit, a connection having been established by a director circuit to an outgoing trunk circuit, is that, in addition, relays 69P, 69R and 69SS1 are operated, relay 69R being locked to relay 69SS1 and relay 69SS1 being locked to relay 69P which is held energized by relay 69SS1 through back contacts of other relays in the SS series. As previously stated, relays 69P and 69R and the relays 69A, 69D, 69E, 69H and 69C are common to all of the sets of relays 69SS1 and 69SE1. Relay 69SS1, remaining operated, indicates the last director circuit that used the sequence circuit to establish a connection, namely the director associated with the incoming channel of trunk 1–33.

The release of relay 69SE1 by relay 69J was previously described. The latter relay also releases select magnet 70–01 by disconnecting battery from conductor 69–09 at the right-hand armature and front contact of relay 69J. Select magnet 70–01 need not remain energized because the contacts 70–04, 70–06, 70–07, 70–08 and 70–09 are held operated by hold magnet 70–03, and all other contacts controllable by select magnet 70–01 should be deconditioned so that they will not be operated when some other hold magnet operates to establish another cross-office path.

Select magnet 70–01 interrupts, at its armature and front contact, the energizing circuit for relay 17GA in the director circuit and that relay releases, interrupting the holding circuit for relay 17CN which also releases. With relay 17GA released, the energizing circuit for relay 17PT is reestablished at the back contact and armature 2 of relay 17GA, and in the normal operation of the system the interval during which relay 17GA will have been operated will be less than the release time for relay 17PT, and that relay will not, in fact, release.

Before proceeding to consider the operations resulting from the release of relay 22J1 in the outgoing trunk circuit, the operation of the sequence circuit in Fig. 69 under various circumstances will be considered. It will be assumed that following the release of relay 69G, as previously described, another director, perhaps the one having allocated to it the intermediate sequence seize relay 69SE–N, bids, or makes a request, for use of the sequence circuit by connecting battery to conductor 69–12 through an armature and back contact of the director relay corresponding to relay 17BT, thereby shunting the resistor corresponding to relay 17–02. Relay 69SE–N operates because the shunt around the resistor permits sufficient current to flow, and the relay 69SE–N locks through the break contacts controlled by armature 3 of associated relay 69SS–N and the chain circuit through contacts of other relays in the SE and SS series, excluding relays 69SE1 and 69SS1 to battery supplied through armature 1 and front contact of relay 69H. As in the case of operation of relay 69SE1, the relay 69SE–N operates relay 69M, holds relay 69H operated and releases relay 69A to initiate the timing of tube 69–02. With relay 69SE–N operated and relay 69–A released, relay 69G operates, thereby preventing any other directors from operating their associated relays in the SE series.

With relay 69M again operated, relay 69SS–N operates in the circuit traced from battery through its winding, front contact and armature 3 of relay 69SE–N, conductor 69–06, and front contact and outer right-hand armature of relay 69M to ground. Relay 69SS–N provides a locking circuit for relay 69R, through the armature 1 and front contact of relay 69SS–N, additional to the one provided through the armature 1 and front contact of relay 69SS1. Relay 69SS-N interrupts at its armature 8 and back contact the circuit of relay 69P which releases. Relay 69P in turn interrupts at its outer armature the locking circuit for relay 69SS1 which releases. The latter relay reestablishes at its armature 8 and back contact the energizing circuit for relay 69P which reoperates. With relay 69P reoperated, a locking circuit for relay 69SS-N is established through the armature 4 and front contact of that relay.

The operations for establishing a connection from the director to an outlet, initiated by the operation and locking of relay 69SE-N, proceed in the manner described with respect to relay 69SE1, the relay 69SE-N ultimately releasing and relay 69G also releasing, leaving the relays in the condition previously described and relay 69SS-N locked.

It will now be assumed that with relay 69SS-N locked to indicate the last director that was served by the sequence circuit, battery is simultaneously connected by directors to conductors 13-12 and 69-13, both directors seeking the services of the sequence circuit in routing a call. The battery connection on conductor 13-12 is extended through armature 5 and back contact of relay 69G and the winding of relay 69SE1, which is the first relay in the sequence, as previously described, and this relay locks through its front contact and armature 4, break contacts controlled by armature 3 of relay 69SS1, back contact and armature 4 of relay 69SE-N, front contact and armature 3 of relay 69SS-N, and front contact and armature 1 of relay 69H to battery. Similarly, the battery connection on conductor 69-13 operates relay 69SE-L which is the last relay in the SE sequence. The locking path for this relay is traced through its front contact and armature 4, break contacts controlled by armature 3 of associated relay 69SS-L, armature 1 and front contact of relay 69R to the back contact associated with armature 4 of relay 69SE1. Since relay 69SE1 is operated, the path terminates at this point and relay 69SE-L will not lock. With relays 69SE1 and 69SE-L operated, relay 69M is unable to operate and remains released. Relay 69SE1 holds relay 69H operated. Relay 69SE-L interrupts the circuit of relay 69A which releases and initiates operation of the timing circuit. Relay 69A also operates relay 69G which interrupts the energizing circuit of relay 69SE-L, which has not locked, and the latter relay releases. With relay 69SE-L released, the circuit of relay 69M is reestablished at the armature 6 and back contact of relay 69SE-L, and the sequence circuit proceeds in the manner previously described to establish a connection for the director served by relay 69SE1. During this process, relay 69SS-N is unlocked and releases, and relay 69SS1 operates. After the connection has been established, the sequence circuit completes its operation by releasing relay 69G. Assuming that the director which made a bid for the sequence circuit competitively with the one that caused the operation of relay 69SE1, will still be bidding, relay 69SE-L will operate. Any other director that may then be bidding for the use of the sequence circuit will operate its corresponding relay in the SE series.

Reference is made to the fact that when relays 69SE1 and 69SE-L operated simultaneously and competitively for the services of the sequence circuit, relay 69SE1 was locked and relay 69SE-L did not lock. The situation will now be examined upon the assumption that with relay 69SS1 operated and locked, the relays 69SE-N and 69SE-L operate simultaneously. Relay 69SE-L seeks to lock over a path including its front contact and armature 4, the break contacts controlled by armature 3 of relay 69SS-L, armature 1 and front contact of relay 69R, back contact and armature 4 of relay 69SE1, armature 3 and front contact of relay 69SS1, and front contact and armature 1 of relay 69H to battery. It will be apparent that the relay 69SE-L finds a locking circuit. The locking path for relay 69SE-N is traced through its front contact and armature 4, break contacts controlled by armature 3 of relay 69SS-N to the back contact associated with armature 4 of relay 69SE-L where the path terminates. As between relay 69SE-N and relay 69SE-L, the latter relay succeeds in locking. The operation may be summarized by stating that when more than one connection is in demand the first director preceding the one used for the last connection will have priority. This priority will progress, as connections are made, to the lowest numbered director, and will repeat, beginning with the highest numbered director. Applying this statement to the previous description of the circuits in Fig. 69, relay 69SE-1 prevailed over relay 69SE-L in obtaining a locking circuit because relay 69SS-N was locked, indicating the last director that was served and the relays 69SS1 and 69SE1 are the lowest numbered relays in their respective series. When relays 69SE-N and 69SE-L were competing for a locking circuit, relay 69SE-L succeeded because relay 69SS1 was then locked and the highest numbered relay in the SE series has immediate priority over any lower numbered relay in the series when the lowest numbered was the last to be operated. When several successive relays in the SE series are operated by virtue of bids for the services of the sequence circuit, they will be effective in a descending order of preference in successive cycles of the sequence circuit.

It will now be supposed that the sequence circuit has performed all necessary operations for establishing a connection, but that due to a delay in the operation of the director circuit the sequence circuit is not restored to normal. The description will be predicted upon the initially described cycle of the sequence circuit, involving relays 69SE1 and 69SS1. The condition of the sequence circuit at that time is that relays 69C, 69D, 69E, 69H, 69R, 69P, 69SE1, 69M, 69G, 69SS1 and 69J are operated. Relay 69A is released, and tube 69-02 is timing out. The sequence circuit has operated relay 17GA in the director circuit and is awaiting removal of battery from conductor 13-12 which should result from the release of relay 13SC in the director circuit. At the end of its timing interval, which may be a few seconds, tube 69-02 cuts off and releases relay 69C. This relay in turn releases relay 69D. Relay 69D interrupts the energizing circuit for relay 69E which has a slow-release characteristic and does not immediately release. At its right-hand armature relay 69D connects ground, supplied through the armature 2 and front contact of relay 69H through its own back contact and right-hand armature, back contact and armature 2 of relay 69A, armature 1 and front contact of relay 69SE1 to the armature 5 of relay 69SS1 and to the upper terminal of the winding of relay 69H. This shunts and thereby releases relay 69H and connects a direct ground over armature 5 and front contact of relay 69SS1, and armature 7 and front contact of relay 69SE1 to conductor 13-12 instead of the ground supplied through the winding of relay 69H. This ground connection produces a sequence of operations in the director circuit which will be described later.

Relay 69H, released, initiates the same sequence of operations that it does when released in the normal way under the control of the director circuit as previously described. It releases the relay 69J which releases the select magnet in the crossbar switch, the magnet in turn releasing relay 17GA in the director circuit. Relay 69J also releases relay 69SE1, which completes the locking circuit for relay 69SS1 and releases relay 69M. Relay 69SE1 reoperates relay 69H. Relay 69H reoperates relay 69A which releases relay 69G and restores conductivity in tube 69-02. The discharge current in the tube operates relay 69C which reoperates relay 69D, the latter relay in turn reestablishing the energizing circuit for relay 69E. The reenergization of the latter relay should normally occur before its armature has had an opportunity to release.

It may happen that due to a trouble in the sequence circuit it fails to complete the restoration to normal following the establishment of a connection between a director circuit and an outlet, such failure including failure of relay 69A to reoperate, the reoperation of that relay and the release of relay 69G being the last steps in the restoration of the sequence circuit to normal. Under those circumstances, tubes 69–02 cuts off and releases relay 69C, which in turn releases relay 69D. It may be assumed that the sequence circuit will be incapable of restoring to normal under the stimulus furnished by the release of relay 69D involving the shunting of the winding of relay 69H at the right-hand armature and back contact of relay 69D, since the sequence circuit has not restored in response to the stimulus supplied by the director circuit. Accordingly, relay 69D will remain released long enough for relay 69E to release, and the latter relay completes the circuit of relay 69F which operates. Relay 69F connects ground on its armature 1 through the associated front contact and conductor 69–14 to operate relay 68DC in the alarm circuit. Relay 68DC operates lamps 68–01 and 68–02 to indicate the location and nature of the trouble condition. At its armature 2, the relay 69F connects ground through its front contact, break contacts controlled by the left-hand armature of relay 69K, conductor 69–16 to operate relay 69ST. The latter relay completes the filament circuit of vacuum tube 68–03 and when that tube becomes conductive it operates relay 68P2, which in turn operates relay 68P3 which operates an audible signal device 68–04. At its armature 3 and front contact, relay 69F prepares an energizing circuit for relay 69K, traced from battery through the winding of the latter relay, break contacts controlled by its right-hand armature, front contact and armature 3 of relay 69F, conductor 69–17 to conductor 68–06. A manually operable key 68–07 for suppressing operation of the audible alarm is effective, when operated, to ground conductor 69–17, thereby completing the circuit of relay 69K. Relay 69K locks to the ground supplied through the armature 2 and front contact of relay 69F and interrupts the energizing circuit for relay 68ST, thereby cutting off tube 68–03 to release relays 68P2 and 68P3.

Because of the fact that relay 69A has not reoperated, relay 69G remains operated and none of the director circuits can obtain access to the sequence circuit. When the trouble which resulted in the failure of the sequence circuit has been remedied, relay 69A will operate, releasing relay 69G and reoperating tube 69–02. Relays 69C, 69D and 69E reoperate in sequence, and relay 69E releases relay 69F. The latter relay interrupts the locking circuit for relay 69K, thereby releasing it and the sequence circuit is thus restored to condition to serve the director circuits.

*Initiation of cross-office transmission*

As previously mentioned, one of the operations resulting from the release of relay 13SC is the release of relay 22J1 in the outgoing trunk circuit. This relay completes a circuit for relay 22E1, traced from battery through the winding of that relay, back contact and armature 3 of relay 22J1, conductor 22–04, contact 70–04 of the crossbar switch, conductor 70–12, and front contact and armature 3 of relay 17HM, conductor 17–09 which is one of the group bracketed from Fig. 13 to Fig. 70, in which conductor 17–09 reappears as one of the crossbar switch horizontals, and is connected through contact 70–09 to grounded crossbar switch vertical conductor 70–13. A circuit for relay 22B1 is established by relay 22E1, the circuit being traced from battery through the winding of relay 22B1, armature 3 and front contact of relay 22E1, armature 1 and back contact of relay 22C1, conductor 70–11 and front contact and armature of hold magnet 70–03 to ground. Relay 22B1 locks through its front contact and armature 2 and armature 1 and back contact of relay 22C1 to conductor 70–11, this locking circuit bypassing the armature 3 and front contact of relay 22E1.

Relay 22B1, at its armature 3 and front contact, completes an energizing circuit for relay 22BR which operates. At its armature 4 and front contact, it completes an energizing circuit for relay 27BM which operates. The functions of these two relays will be described hereinafter.

Relay 22E1 also completes an energizing circuit for start relay 12ST in the director circuit, the energizing path being traced from battery through the winding of relay 12ST, conductor 12–01, front contact and armature 2 of relay 16DB which was operated under the control of relay 17DA, as previously described, the path being continued over conductor 17–07, conductor 12–02 which is one of the group of conductors bracketed to Fig. 70, in which the path continues through crossbar switch contact 70–07 and conductor 70–16 which is one of the group of conductors bracketed to Fig. 22, the path continuing through the armature 2 and front contact of relay 22E1 to ground. Relay 12ST locks through its front contact and armature 5 to conductor 12–02, shunting the portion of its energizing path that included the armature 2 and front contact of relay 16DB. Relay 12ST completes an energizing circuit for relay 12TS, traced from battery through the winding of that relay, back contact and armature 6 of relay 12TB, make contacts 4 controlled by armature 1 of relay 12ST, conductor 12–03 and front contact and armature 4 of relay 13SE to ground.

Figure 12:
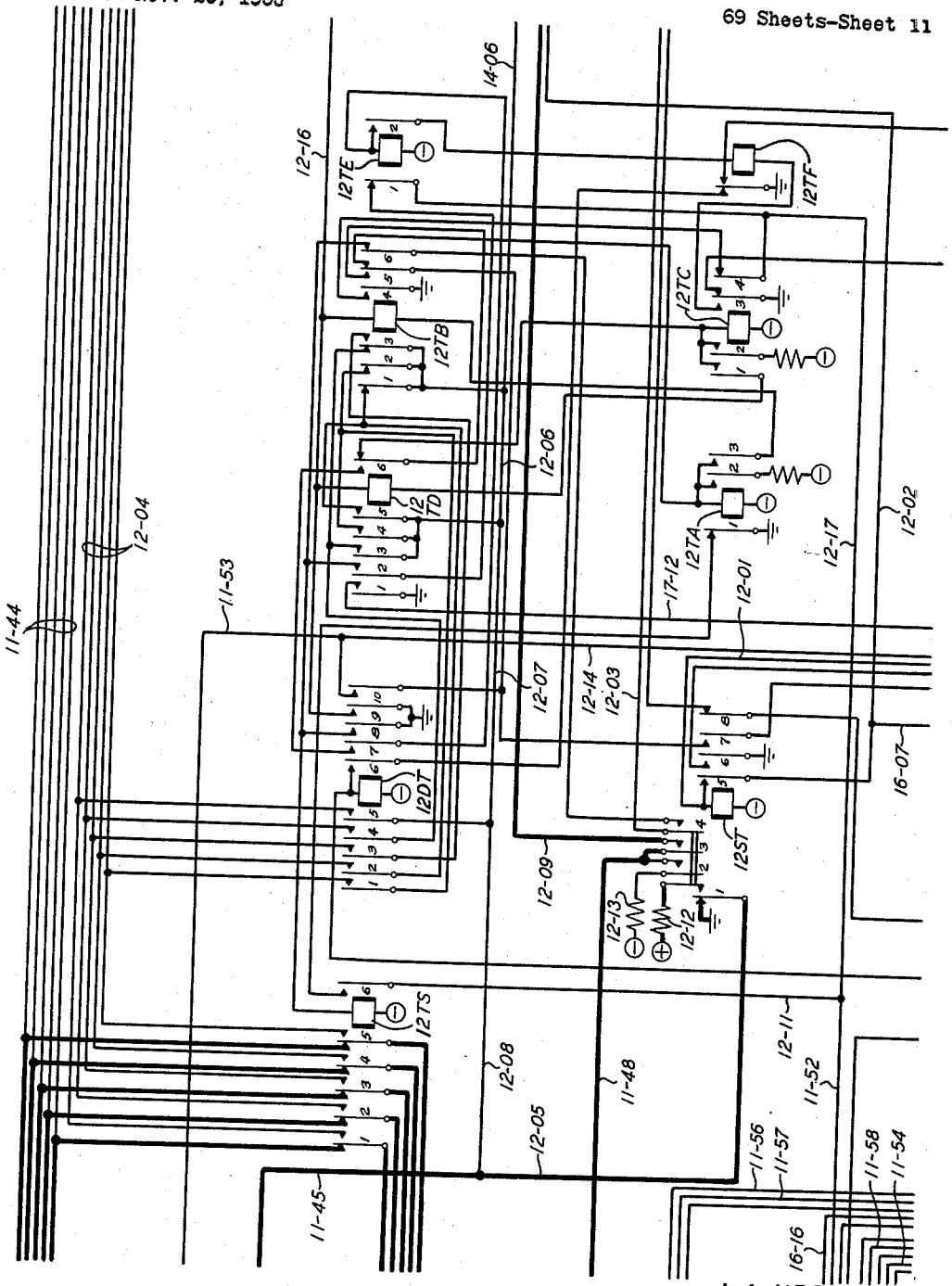
Figs. 12 to 19, 24 and 29 show the director circuit for the single channel incoming trunk circuit.
Figure 14:
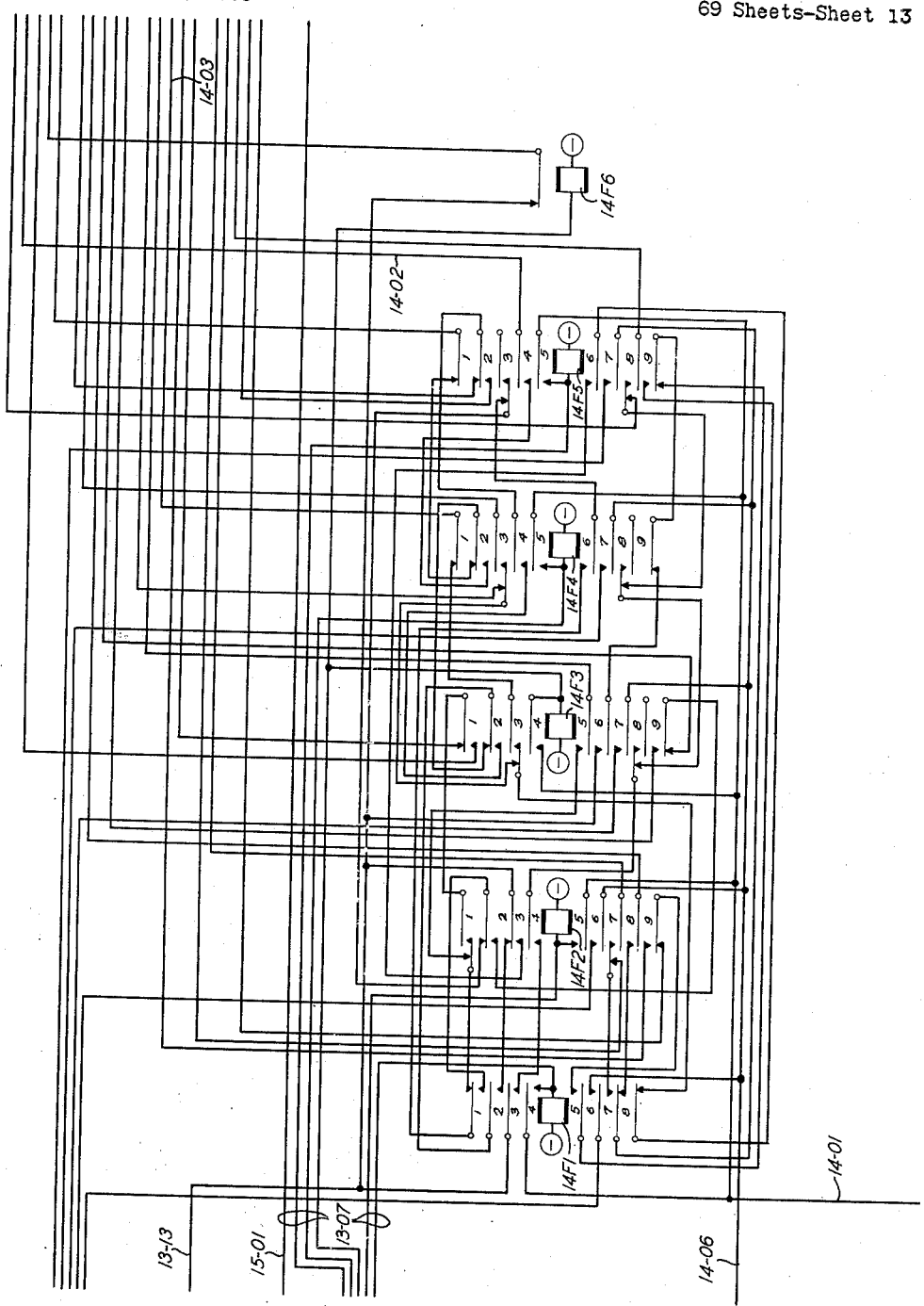
Figure 15:
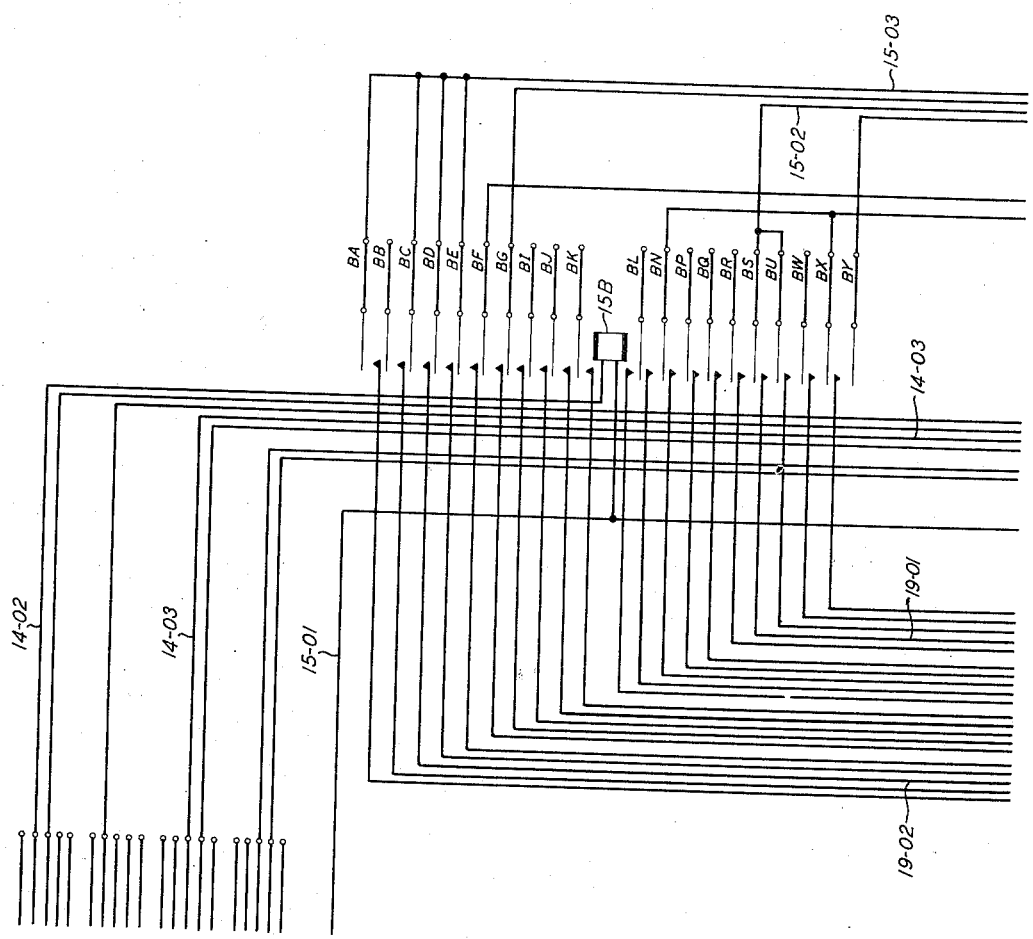
Figure 16:
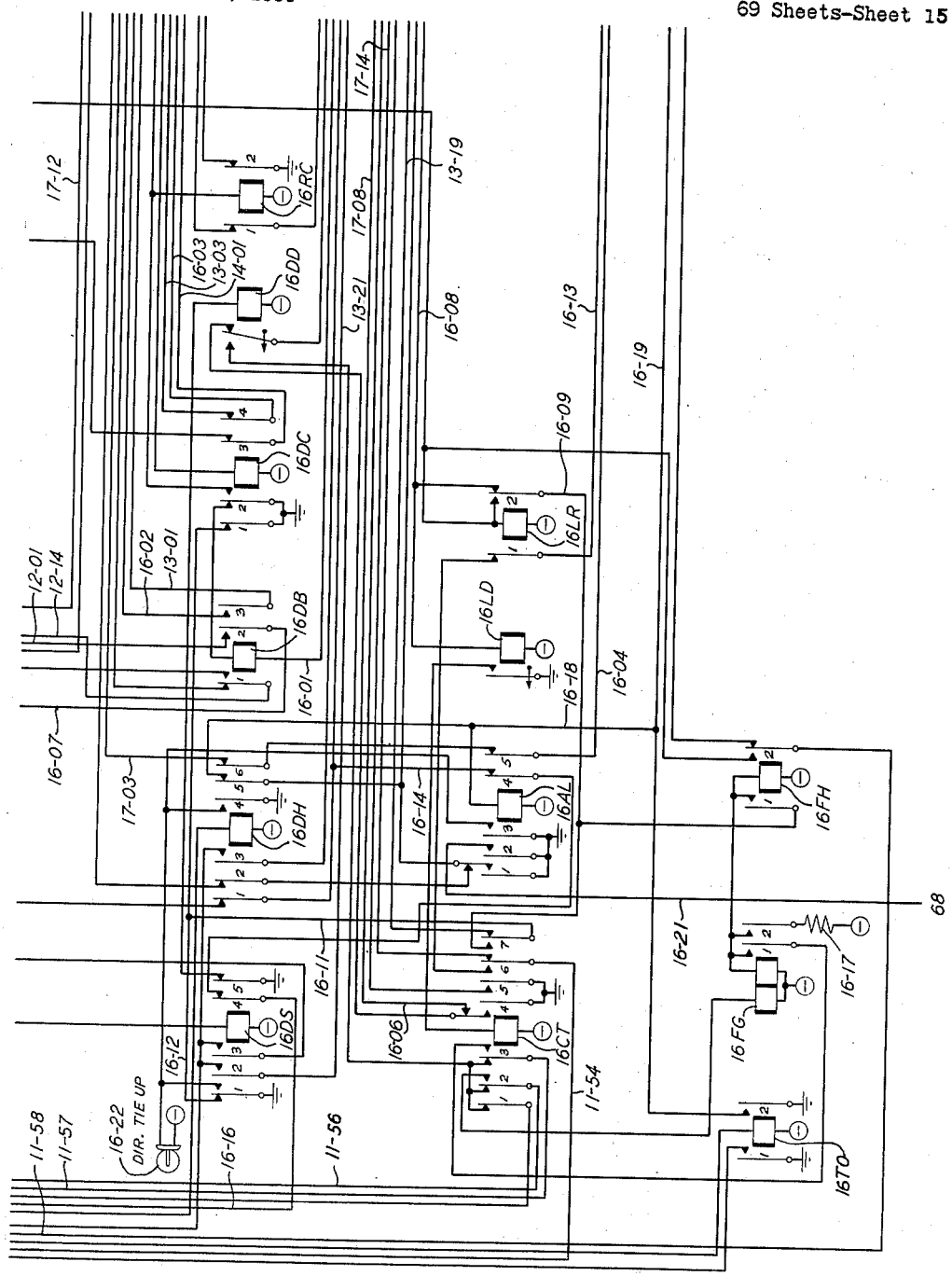

At its armatures 1 to 5 and front contacts, relay 12TS extends conductive paths from the distributor contacts 11–47 to a group of conductors 12–04 which extends to Fig. 14 where each conductor is connectable through make contacts of one of the relays 14F1, 14F2, 14F3, 14F4 and 14F5 to conductor 14–06 over which the path is extended to Fig. 12, and thence over conductors 12–06, 12–07, 12–08 and 12–05 to armature 1 of relay 12ST which is now connected to positive battery through its front contact, relay 12ST being energized. Relays 14F1 to 14F5 are operated in accordance with the first address code, which was the code for the character B, relays 14F1, 14F4 and 14F5 being operated, and the result of operation of relay 12TS is to impress on the distributor contacts 11–47, in preparation for operation of distributor shaft 11–42, the code combination that is stored on relays 14F1 to 14F5. On the opposite side distributor contacts 11–47 are connected over conductor 11–48 to make contacts 2 controlled by armature 1 of relay 12ST, through which negative battery is impressed on conductor 11–48 and through make contacts 3 controlled by armature 1 of relay 12ST over conductor 12–09, included in the group of conductors bracketed to Fig. 70, crossbar switch contacts 70–06, crossbar switch vertical conductor 70–17, included in the group bracketed to Fig. 22, armature 1 and front contact of relay 22E1 and conductor 22–07 through resistor 22–08 to positive battery, and through resistor 22–09 to the grid of vacuum tube 22–11. The cathode of tube 22–11 is grounded, and the anode is connected over conductor 22–12 through the winding of selector magnet 20–01 of outgoing line reperforator 20–02, the path returning over conductor 20–03 to positive battery through resistor 22–13. It will be apparent from this that conductors 12–09 and 70–17 comprise a transmission path over which signals will be transmitted from the distributor in Fig. 11. Prior to the operation of relay 22E1, there was no circuit extending away from resistor 22–09 connected to the grid of tube 22–11, and the battery supplied through resistor 22–08 causes tube 22–11 to conduct, the discharge current flowing through the winding of selector magnet 20–01 and energizing that magnet, which is the rest or marking condition. Following the operation of relay 22E1, a path was extended back to the make contacts 3 controlled by armature 1 of relay 12ST. Before the operation of the latter relay, the path terminated at that point. Upon the operation of the relay, negative battery was connected to conductor 12–09 through the make contacts 2 and 3 of relay 12ST, but positive battery was also connected thereto through the front contact and armature 1 of relay 12ST, conductors 12–05 and 11–45, start-stop signal generating contacts 11–49 of the distributor, and conductor 11–48 to conductor 12–09. The potential applied to conductor 12–09 with relay 12ST operated and start-stop contacts 11–49 of the distributor closed is substantially ground potential, thereby causing a flow of current through resistor 22–08 but maintaining the grid of tube 22–11 no more negative than ground potential so that the tube 22–11 remains conductive.

In addition to impressing the first character of the address code on the distributor contacts, relay 12TS completes the energizing circuit for distributor clutch release magnet 11–39, the path being traced from battery through the winding of the magnet, conductors 11–51, 11–52 and 12–11, armature 6 and front contact of relay 12TS, and back contact and armature 1 of relay 12TA to ground. Shaft 11–42 is thus released to effect the transmission of the first character which is stored on relays 14F1 to 14F5. When start-stop contacts 11–49 open, positive battery is disconnected from conductor 12–09 leaving only negative battery connected thereto. The resistors 12–12 and 12–13 through which the positive and negative battery connections, respectively, are applied to contacts of relay 12ST are substantially equal and may be of the order of 1200 to 1500 ohms, whereas resistor 22–08 connected between positive potential and the grid of tube 22–11 is of high value and may be of the order of 1 megohm. With positive battery supplied through resistor 12–12 disconnected from conductor 12–09, there is a flow of current through resistors 12–13 and 22–08, in series, with almost the entire voltage drop across resistor 22–08, so that the grid of tube 22–11 is swung nearly to full negative potential to cut off tube 22–11, thereby impressing the start element on selector magnet 20–01 of reperforator 20–02. As the first, fourth and fifth of the distributor contacts 11–47 close, positive battery is reconnected through resistor 12–12 to conductor 12–09 to impress marking condition on the grid of tube 22–11. During the time that the second and third of the distributor contacts 11–47 close, a spacing condition is impressed on conductor 12–09 because the path is open at front contacts of unoperated relays 14F3 and 14F4. After the final significant element of the code combination, contacts 11–49 are reclosed for the transmission of the stop signal.

During the rotation of distributor shaft 11–42, the distributor auxiliary contacts 11–43 close, connecting ground over conductors 11–53 and 12–14, armature 1 and front contact of relay 16DB, armature 7 and front contact of relay 12ST, armature 5 and back contact of relay 12TB and winding of relay 12TA to battery, and that relay operates, interrupting the energizing circuit for distributor clutch release magnet 11–39 which releases to arrest distributor shaft 11–42 at the end of one revolution. At its armature 3 and front contact relay 12TA prepares an energizing circuit for relay 12TB traced through the front contact and armature 3 of relay 12TA, winding of relay 12TB, conductor 12–16 and front contact and armature 6 of relay 17HM to ground. During the time that distributor auxiliary contacts 11–43 are closed, the ground on the upper terminal of the winding of relay 12TA prevents the completion of that circuit. Upon the opening of the distributor auxiliary contacts, relay 12TA locks through the winding of relay 12TB and that relay operates.

Relay 12TB interrupts the energizing circuit for relay 12TS, which releases. Relay 12TB also completes the circuit of distributor clutch release magnet 11–39 traced from conductor 11–52 through conductor 12–17, armature 4 and back contact of relay 12TC and front contact and armature 4 of relay 12TB to ground. With relay 12TS released, the distributor contacts are reconnected to conductor group 11–44, and thus to the transmitter contacts controlled by contact operating members 11–36, thereby impressing upon the distributor contacts the code combination for the second character of the address code, which is stored in the transmitter contacts. This is the code combination for the character U, as previously assumed, and is transmitted over conductor 12–09 to the outgoing trunk reperforator 20–02. Upon the closure of distributor auxiliary contacts 11–43, the ground which previously operated relay 12TA through the armature 5 and back contact of relay 12TB is applied through that armature and front contact and armature 6 and back contact of relay 12TD to the winding of relay 12TC which operates. Relay 12TC interrupts the locking circuits of the relays in Fig. 14 and those relays release, in turn releasing relays 15B and 13FA. The latter relay releases relay 13FL. Upon the opening of distributor auxiliary contacts 11–43, an energizing circuit for relay 12TD, prepared at the armature 1 and front contact of relay 12TC, is completed through the winding of relay 12TD to grounded conductor 12–16, and relay 12TD operates in series with the winding of relay 12TC. Relay 12TD completes an energizing circuit for relay 16LD traced from battery through the winding of that relay, conductor 16–08, front contact and armature 2 of relay of 17HM, conductor 17–12 and front contact and armature 1 of relay 12TD to ground. Relay 16LD completes the circuit of relay 16CT which operates.

With relay 16CT operated, relay 16LD locks in a circuit through its winding, back contact and right-hand armature of relay 16LR, conductor 16–09, front contact and armature 7 of relay 16CT, conductors 16–11 and 16–12, and back contact and armature 1 of relay 16DS to ground. At the break contacts controlled by armature 4 of relay 16CT the locking circuit of relay 17HM is released. Relay 17HM, at its armature 6 and front contact, interrupts the locking circuits for relays 12TA, 12TB, 12TC and 12TD, and those relays release. At its armature 4 and front contact relay 16CT connects ground over conductor 17–08 to conductor 70–12, to hold relay 22E1 operated. At its armature 7 and back contact relay 16CT interrupts the locking circuit for relay 13SE, traced from battery through the winding of the latter relay, front contact and armature 3, and conductor 13–19 to the back contact associated with armature 7 of relay 16CT, and relay 13SE releases.

At its armature 5 relay 13SE interrupts the energizing circuit for relay 17CR. Relay 17CR releases and interrupts the energizing circuits of relay 17DA and 16DB, and those relays release. Relay 13SE also interrupts the circuits of relays 17BT, 17PB and 17PT, and those relays release. At its armature 6 and front contact relay 16CT completes the energizing circuit for transmitter clutch release magnet 11–27, the circuit being traced from battery through the winding of that magnet, conductor 11–54, armature 6 and front contact of relay 16CT, back contact and left-hand armature of relay 16LR, conductor 16–13, back contact and armature 6 of relay 13SE, conductors 13–21 and 16–14, back contact and armature 4 of relay 16AL, back contact and armature 4 of relay 16DS conductor 16—16 and tape available contacts 11–26 to ground. Magnet 11–27 trips clutch 11–28 to cause shaft 11–29 to rotate continuously.

With shaft 11–29 in operation, the transmission of signals from tape 11–07 to select magnet 20–01 of outgoing trunk reperforator 20–02 proceeds uninterruptedly, the signals being sensed by the tape sensing levers 11–31 transferred to the transmitter contacts controlled by contact operating members 11–36, and in connection with each revolution of the shaft 11–29 the distributor clutch magnet 11–39 being operated by contacts 11–38 to cause the distributor contacts to transmit the signals stored in the transmitter contacts. When the figures signal occurs in the text of the message, ground is connected through the maze contacts controlled by contact operating members 11–36 and over conductor 11–56, armature 2 and front contact of relay 16CT to the winding of relay 16FG, operating that relay. If the next code combination is other than the figures signal or an H signal, the ground connection applied to conductor 11–56 will be removed when the code combination is transferred to the transmitting contacts and the maze contacts, and relay 16FG will release. Relay 16FG has a slow-release characteristic, imparted by resistor 16–17 which is connected in shunt with the right-hand winding of the relay through its armature 2 and front contact when the relay is operated. When an H signal immediately follows the figures signal, that sequence is, as previously mentioned, the end-of-message signal. When the H signal is transferred to the maze contacts, ground is connected over conductor 11–57, armature 3 and front contact of relay 16CT, armature 1 and front contact of relay 16FG, which has not yet had an opportunity to release, and winding of relay 16FH to battery, and relay 16FH operates. Both relays lock through the front contact and armature 1 of relay 16FH, the front contact and armature 7 of relay 16CT, conductors 16–11 and 16–12, and back contact and armature 1 of relay 16DS to ground. Relay 16FH prepares, at its armature 2 and front contact, an energizing circuit for relay 16LR.

The signal following the H signal should be a letters signal, which transmitter shaft 11–29 transfers to the transmitter contacts. During the revolution of shaft 11–29, the transmitter auxiliary contacts 11–37 close and complete a circuit from ground through conductor 11–58, armature 2 and front contact of relay 16FH to the winding of relay 16LR which operates and locks to the same ground connection that is holding relays 16FG and 16FH operated. Relay 16LR interrupts at its left-hand armature the energizing circuit for transmitter clutch release magnet 11–27, thereby causing transmitter shaft 11–29 to be arrested at the end of the revolution. Relay 16LR also interrupts the energizing circuit for relay 16LD which has a slow-release characteristic. Upon releasing, the relay 16LD releases relay 16CT. This relay releases relays 16FG, 16FH and 16LR and also removes ground from conductor 17–08, thereby removing ground from conductor 22–04 and releasing relay 22E1 in the outgoing trunk circuit. Relay 22E1 disconnects transmission conductor 70–17 from the grid of tube 22–12, thereby effectively disconnecting the incoming trunk transmitter-distributor from the outgoing trunk reperforator. Reperforator selector magnet 20–01 remains in marking condition because of the bias supplied to the grid of tube 22–11 from positive battery through resistors 22–08 and 22–09. Relay 22E1 also disconnects ground from conductor 70–16 which is included in the locking circuit for relay 12ST. Accordingly, relay 12ST releases and disconnects ground from conductor 17–11 in the energizing path for relay 22A1 in the outgoing trunk circuit. Relay 22A1 disconnects ground from conductor 22–03, thereby releasing hold magnet 70–03 in the crossbar switch. The hold magnet releases, releasing contacts 70–04, 70–06, 70–07, 70–08 and 70–09, and disconnecting ground from conductor 70–11. Conductor 70–11 is part of the locking circuit for relay 22B1, and that relay releases. The outgoing trunk circuit has now been restored to initial condition except that relay 22BR, which was operated by relay 22B1, is locked through its front contact and armature 2, conductor 22–14, armature 6 and back contact of relay 27LA2, armature 1 and back contact of relay 27B2, back contact and armature 3 of relay 27C2 to ground. Relay 27BM which was also operated by relay 22B1 is locked through conductor 27–02, back contact and armature 5 of relay 27LC2, armature 6 and back contact of relay 27B2, and back contact and armature 5 of relay 27C2 to ground. These relays remaining locked, transfer the busy test lead 54–03 to the second level of storage of the outgoing trunk circuit, comprising Figs. 25, 26 and 27, so that the next message shall be routed to reperforator 25–01. In this way the director circuit, the link circuit and the outgoing trunk circuit are restored to normal, in the case of the latter circuit the restoration relating to the transmission of signals to selector magnet 20–01 of reperforator 20–02, it being understood that other parts of the outgoing line circuit may be off-normal in connection with the retransmission of the message from tape 20–04, which will be described later.

*Retransmission of stored messages from outgoing trunk circuit*

When tape 20–04 begins to be fed out of reperforator 20–02 in the recording of the message to be retransmitted over the outgoing channel of trunk 1–36, the transmitter head 20–06 is moved away from the punch block, permitting contacts 20–07 to close. These contacts connect ground over conductors 20–08 and 21–01, armature 2 and back contact of relay 21S1, conductor 21–23, back contact and armature 1 of relay 21T1 and winding of relay 21P1 to battery, and the latter relay operates. Relay 21P1 completes, through its armature and front contact, an energizing circuit for relay 21H1, traced from battery through the winding of the latter relay, conductors 21–04 and 21–06, back contact and armature 5 of relay 23J, conductors 23–01 and 21–07, front contact and armature of relay 21P1, conductor 21–08, armature 1 and back contact, back contact and armature 2 of relay 31P3, conductors 31–01 and 23–02, break contacts controlled by armature 6 of relay 21H1, conductor 21–09, break contacts controlled by armature 6 of relay 26H2, conductor 26–01, break contacts controlled by armature 5 of relay 31H3, conductor 31–02, and front contact and armature 3 of relay 33N to ground, this relay being normally energized. Relay 21H1 operates and locks through its armature 6 and front contact, conductor 21–09, and over the remainder of the energizing path just traced to armature 3 of relay 33N. One of the operations performed by relay 21H1 is to connect the distributor contacts of the transmitter-distributor in Fig. 20 to the outgoing channel of trunk 1–36. This is accomplished at the armature 5 and front contact of relay 21H1. The outgoing channel appears on Fig. 23 with one conductor thereof connected to battery. The path from the ground return of the other conductor is traced through resistor 23–04, winding of relay 23AB, conductor 23–03, break contacts controlled by armature 4 of relay 31H3, conductor 31–03, break contacts controlled by armature 5 of relay 26H2, conductor 26–02, front contact and armature 5 of relay 21H1, conductor 21–11, normally closed start-stop contacts 20–09 driven by distributor shaft 20–11, conductors 20–13, 20–14, 21–12, 31–04, 33–01, 33–02 and 33–03, the later being the other conductor of the outgoing channel of trunk 1–36. At its break contacts controlled by armature 6, relay 21H1 interrupts the operating path for relays 26H2 and 31H3 so that neither of these relays can operate. At its armature 8 and front contact, the relay 21H1 connects ground over conductors 21–13, 21–14 and 23–06, and the armature and left-hand contact of relay 23AB to lamp 23–05, to light that lamp.

Another operation performed by relay 21H1 is the completion of the energizing circuit for relay 23J. The circuit is traced from battery through the upper winding, conductor 23–07, armature 7 and front contact of relay 21H1, conductors 21–17 and 31–02 to ground, through the front contact and armature 3 of relay 33N. Relay 23J opens, at its back contact and armature 7, the path over which relay 21H1 was originally operated. It places the energizing circuit for relay 26H2 under the control of relay 21H1, so that relay 26H2 cannot operate until relay 21H1 has released. It prevents the operation of relay 31H3. Finally, it connects ground through its armature 1 and front contact, and conductor 23–06 to the armature of relay 23AB, supplementing the ground supplied over conductor 21–14 for operating lamp 23–05.

Still another operation performed by relay 21H1 is the interruption of the circuit of normally energized relay 33TC, the circuit being traced from battery through the winding of relay 33TC, conductor 33–04, back contact and armature 1 of relay 21H1 where the interruption of the circuit has occurred, the path to ground being continued over conductor 21–18, armature 1 and back contact of relay 26H2, conductor 26–03, and back contact and armature 9 of relay 31H3 to ground. Relay 33TC has a slow-release characteristic, and upon releasing it completes the energizing circuit for relay 21G1, traced from battery through the winding of that relay, front contact and armature 4 of relay 21H1, back contact and armature 1 of relay 21S1, armature 1 and back contact of relay 21D1, conductors 21–16, 26–04 and 26–06, and back contact and armature 4 of relay 33TC to ground. At its armatures 1 to 5, the relay 21G1 connects the transmitter contacts controlled by contact operating members 20–16, these being the extreme left-hand contacts, and being five in number, to a group of five conductors 21–19 from which a group of five branching conductors 21–21 are connected to the distributor contacts controlled by distributor shaft 20–11. At its armatures 6, 7, 8 and 9, relay 21G extends control paths from the maze contact circuits controlled by contact operating members 20–16. At its armature 10, relay 21G completes the circuit for transmitter clutch release magnet 20–17 over a path traced from battery through the winding of that magnet, conductors 20–18 and 20–19, front contact and armature 10 of relay 21G1, back contact and armature 4 of relay 21R1, conductor 21–22, armature 1 and back contact of relay 23AT, conductors 23–08 and 21–23, back contact and armature 2 of relay 21S1, and conductors 21–01 and 20–08 to the tape available contacts 20–07 which are closed. Magnet 20–17 trips clutch 20–21 to initiate the operation of transmitter shaft 20–22.

Shaft 20–22 rotates continuously and operates tape sensing levers 20–23 to cause the code combinations in tape 20–04 to be set up on the transmitter contacts controlled by contact operating members 20–16. These code combinations are impressed through armatures 1 to 5 of relay 21G1 upon distributor contacts 20–24. During each cycle of the transmitter shaft 20–22, distributor clutch trip contacts 20–26 close, and connect ground over conductors 20–27 and 20–28 to energize distributor clutch release magnet 20–29. This magnet trips clutch 20–31 to cause rotation to be imparted to shaft 20–11. Thus the code combinations contained in tape 20–04, beginning with the address code BU, are transmitted to the outgoing channel of trunk 1–36, and since relay 23AB is included in the transmission circuit the lamp 23–05 flashes as the signals are transmitted.

The condition of the circuit during the transmission of the message, and assuming that neither of the other two reperforators has received or is receiving a message, is that relays 33N, 23J and 21H1 are operated and locked, relays 21P1 and 21G1 are operated but not locked, and relay 23AB is following signals. The message ends with the disconnect signal comprising figures, H and letters. In response to the figures signal, a circuit is completed through the maze contacts for operating relay 33K, the circuit being traced from battery through the upper winding of that relay, conductors 33–06, 31–06 and 26–07, armature 8 and front contact of relay 21G1, conductor 21–24, and through the maze contacts conditioned in accordance with the figures signal to ground. In response to the H signal following the letters signal, a circuit through the maze contacts for the lower winding of relay 33K is completed, the circuit being traced through the lower winding and front contact and armature 2 of relay 33K, conductor 33–07, left-hand armature and back contact of relay 28AX1, conductors 28–01, 26–08 and 26–09, armature 9 and front contact of relay 21G1, and conductor 21–26 to ground through the maze contacts. Relay 33K remains operated and locked over this circuit, the ground connection which caused the energization of its upper winding being disconnected when the code combination for the character H is transferred to the maze contacts. At the same time that the holding circuit through the lower winding of relay 33K is completed, a circuit for energizing relay 33L is completed through the front contact and armature 3 of relay 33K, and the winding of relay 33L to battery. At its armature 3, relay 33L completes the circuit of relay 33FH, traced from ground through the front contact and armature 3 of relay 33L and winding of relay 33FH to battery, and relay 33FH operates, locking through its armature 3 and front contact to ground. Following the operation of relays 33L and 33FH, in response to the establishment of a circuit through the maze contacts in accordance with the H signal, the transmitter auxiliary contacts 20–32 close, connecting ground over conductor 20–33, front contact and armature 11 of relay 21G1, conductors 21–27, 26–11 and 31–07, armature 2 and front contact of relay 33FH, conductor 33–09, left-hand armature and back contact of relay 28AX6, back contact and left-hand armature of relay 28AX2, and winding of relay 28AX1 to battery. At its right-hand armature, the relay 28AX1 prepares a locking circuit through the winding of relay 28AX2, and the back contact and right-hand armature of relay 28AX6 to ground. This circuit will not be effective until the transmitter auxiliary contacts open and disconnect the ground from which relay 28AX1 was energized. Relay 28AX1 interrupts at its left-hand armature the locking circuit for relay 33K which releases, opening the energizing circuit for relay 33L. The winding of relay 33L is shunted by resistor 33–11 which makes that relay slow release. The ground connection over conductor 31–07, from which relay 28AX1 was energized, is extended over conductor 33–12, front contact and armature 2 of relay 33L, conductor 33–13, and winding of relay 23AT to battery. This relay operates and locks through its front contact and armature 4, conductors 23–09, 28–02 and 26–12, and front contact and armature 10 of relay 21H1 to ground. Relay 23AT interrupts, at its armature 1 and back contact, the energizing circuit for transmitter clutch release magnet 20–17. When this occurs, shaft 20–22 will already have entered upon the cycle in which the letters signal following the H signal will be sensed and transferred to contact operating members 20–16, the letters signal being the final code of the disconnect signal. Upon the opening of the transmitter auxiliary contacts, the direct ground connection is removed from the winding of relay 28AX1 and the locking circuit for that relay becomes effective, relay 28AX2 being operated in that circuit. Upon the transfer of the letters signal to the code contacts, the maze contact circuit that was established in response to the H signal is interrupted, and a circuit for energizing relay 33LT is completed through the maze contacts when set in accordance with the letters signal, the circuit being traced from battery through the winding of relay 33LT, front contact and armature 4 of relay 33FH, conductors 33–14, 31–08 and 26–13, armature 7 and front contact of relay 21G1, conductor 21–28 and a path through the maze contacts to ground. Relay 33LT completes an energizing circuit for relay 33M, traced from battery through the winding of the latter relay, conductor 33–16, armature 5 and front contact of relay 23AT, conductor 23–11, and front contact and armature 2 of relay 33LT to ground. Relay 33M locks through its front contact and armature 2, conductor 3–17 to conductor 28–02 over which relay 23AT is also locked. At its armature 3, relay 33M interrupts the locking circuit of relay 33N which is slow release, and releases after a delay interval. When relay 33N releases, it connects ground through its armature 3 and back contact to the winding of relay 33TC to reoperate that relay. The disconnection of ground from the front contact associated with the armature 3 of relay 33N results in the release of relay 21H1.

Relay 21H1 disconnects the distributor contact transmission conductor 21-11 from the outgoing trunk circuit, establishes a locking circuit for relay 33TC through conductor 33-04, back contact and armature 1 of relay 21H1, conductor 21-18, armature 1 and back contact of relay 26H2, conductor 26-03, back contact and armature 9 of relay 31H3 to ground. Relay 21H1 also releases relays 23AT and 33M. With relay 33M released, and relay 33TC reoperated, relay 33N reoperates through its winding, armature 3 and front contact of relay 33TC, and armature 3 and back contact of relay 33M to ground. Relay 33N locks through its front contact and armature 2, and the armature 3 and back contact of relay 33M. With relay 21G1 released, the circuit for relay 33LT is interrupted at the armature 7 and front contact of relay 21G1, and relay 33LT releases. The maze contacts remain set in accordance with the letters signal, which was the last signal sensed and transmitted, until the initiation of transmission of the next message from the same transmitter occurs. Relay 33FH remains locked so that upon the operation of relay 21G1 in preparation for transmission of the next message, which occurs before the first character of the message is sensed and transferred, relay 33LT will reoperate. No significance attaches to such reoperation of that relay.

The outgoing trunk circuit is now in condition for seizure of the outgoing transmission channel by one of the other transmitter units. Relays that remain operated after the transmitter in Fig. 20 has been disconnected from the outgoing transmission channel are the relays 33N, 33TC, 33FH, 28AX1, 28AX2 and 23J. The operated condition of relay 23J is indicative of the fact that the transmitter in Fig. 20 last had access to the outgoing trunk channel.

*Routing of message to multiple address circuit*

Figure 18:
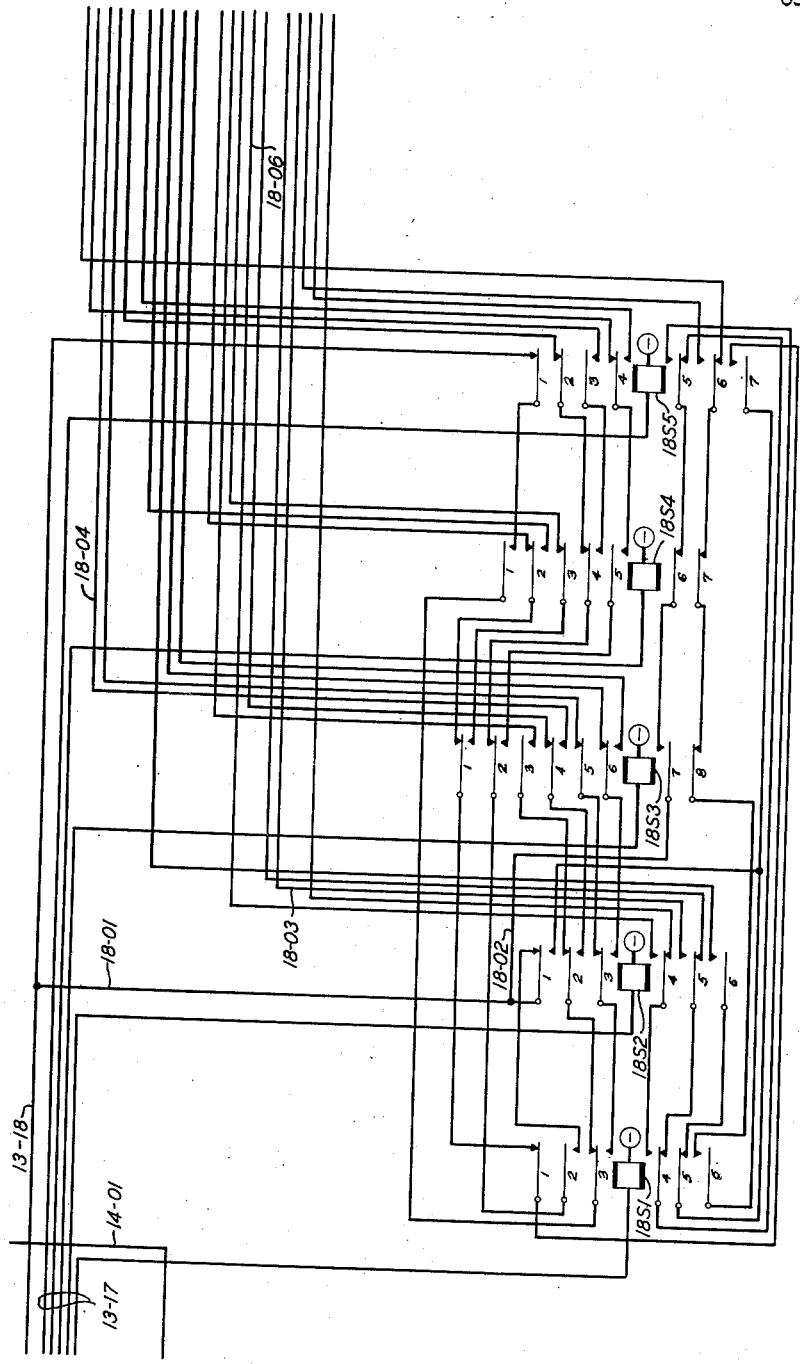
Figure 19:
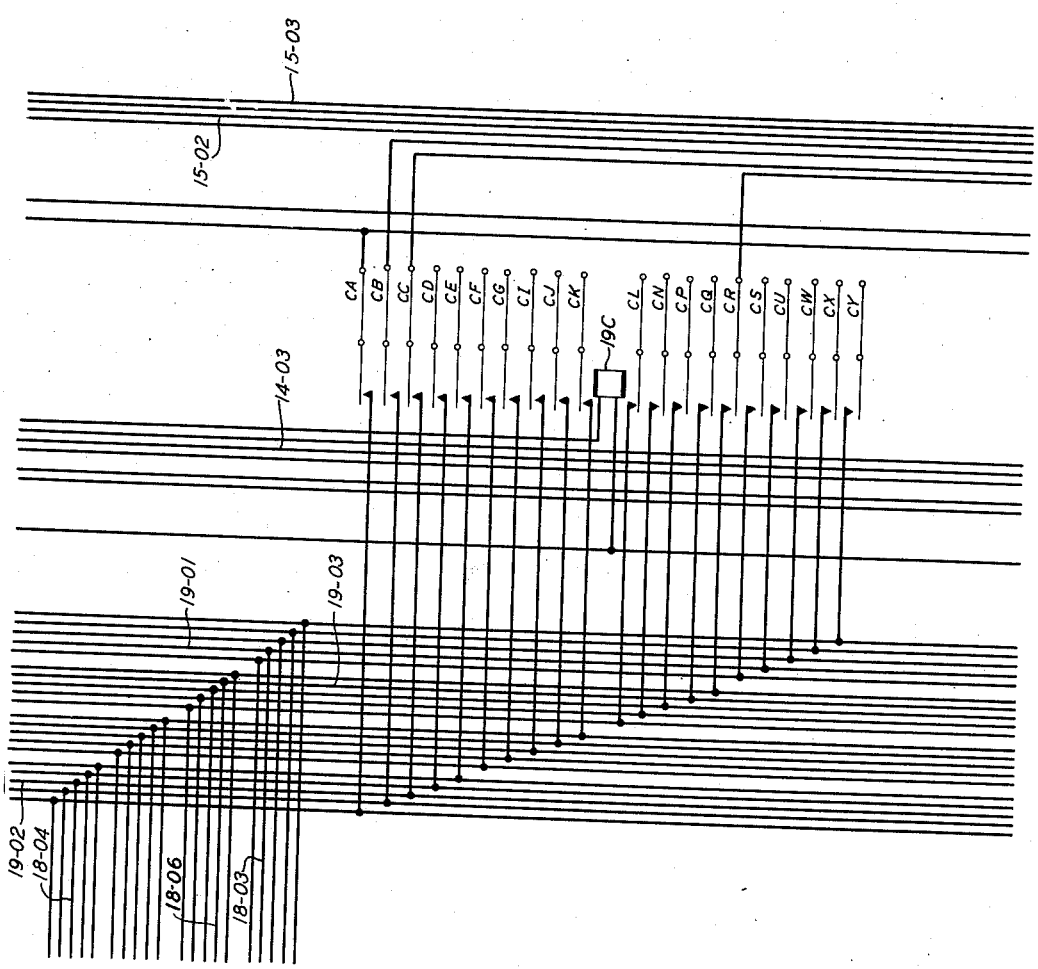

The second typical message was assumed to be received over the single station line 1-20 and to be preceded by the signals for figures, H and letters, to assure conditioning of the switching circuits to properly control the routing of the message, the address code BC designating the message as multiple address, the address codes BS and BU representing stations served by switching center 1-37 and the address code GJ representing station 1-10 associated with the multistation line. The incoming line circuit and the director circuit for the single station line are not shown, but the operation will be the same as the operation of the previously described director circuit, with the exception that that director circuit did not find the disconnect signals, figures, H and letters preceding the first address code. As previously stated, and as fully described in Bacon et al. Patent 2,766,318, when a director circuit is searching a tape for address codes it discards certain codes that may appear in the tape, among these being the disconnect signal. Accordingly, the director circuit would discard the disconnect signal that it found preceding the address code BC, and upon encountering that address code in the tape it would store the signals in the first and second fan circuit relays, thereby selecting a path for testing the multiple address circuit for busy or idle condition. Assuming for the moment that the circuits of Figs. 14 and 18 are the first and second fan circuits, respectively, of the director circuit associated with the incoming line circuit of the single station line, the first fan circuit would select relay 15B, and the second fan circuit would establish a fan circuit path under the control of the second fan circuit relays over conductor 18-04, the path continuing over conductor 19-02, the third armature of relay 15B, designated BC, and conductor 15-03, upper break contacts of intercept keys 54-06 and 54-07, conductor 54-08, contactor and first contact of the left-hand contact bank of stepping switch 38-01, the path being continued over conductor 38-02, armature 2 and back contact of relay 36B, and armature 1 and back contact of relay 36C to battery through resistor 36-01, and to battery through the winding of relay 36J. The appearance of connection to battery through resistive paths on armature 1 of relay 36C represents idle and available condition of one of several receiving levels of the multiple address circuit, that level being associated with the first contact of the left-hand contact bank of stepping switch 38-01. Had that level been busy, relay 36B would be operated to apply a direct ground through its armature 2 to conductor 38-02 and, as will be described hereinafter, the contactor would not be engaging the contact allocated to the first multiple address storage level. It should be understood that before the test is made for busy or idle condition of one of the levels of the multiple address circuit, the director circuit has gained access to the sequence circuit and, in the manner previously described, had received permission of the sequence circuit to proceed with the routing of the call. The sequence circuit has operated the select magnet of the crossbar switch allocated to the particular director. The fact that four conductive paths are shown connected to the first four contacts of the left-hand contact bank of stepping switch 38-01 indicates that four storage or receiving levels for multiple address messages are provided in the multiple address circuit.

Relay 36J operates from the ground supplied over the test path previously traced and connects ground through its armature 1 and front contact, and through the break contacts controlled by the armature of relay 36A to conductor 36-02 which is included in a group of conductors bracketed to Fig. 70, in which conductor 36-02 reappears and is connected through the winding of hold magnet 70-18 to battery. Relay 36J, in operating, also interrupts at its armature 2 and back contact, the path for energizing relay 36B, and interrupts at its back contact associated with armature 3 the path over which relay 36E is energizable.

Hold magnet 70-18 operates the crossbar switch contacts that have been prepared by the operated select magnet. At its amature and front contact, hold magnet 70-18 connects ground to conductor 70-19 which is included in the group bracketed to Fig. 36, in which conductor 70-19 reappears and is traced through the front contact and armature 3 of relay 36J to conductor 36-03 which is included in the group bracketed to Fig. 70. Conductor 36-03 is one of the crossbar switch vertical conductors from which a path is extended through the operated contact for operating the relay in the director circuit corresponding to relay 17HM. This relay operates to maintain a ground on conductor 36-03 and to connect a ground through another one of the operated crossbar switch contacts to crossbar switch vertical conductor 70-21 which is included in the group bracketed to Fig. 36, in which conductor 70-21 reappears and a path is traced through resistor 36-04 and the winding of relay 36A to battery. Relay 36A operates and grounds conductor 36-02 directly for holding hold magnet 70-18 operated independently of relay 36J. Under the control of the relay in the director circuit corresponding to relay 17HM, the director circuit proceeds to dismiss the sequence circuit and that circuit removes ground from the conductive path traced through the second fan circuit, through the break contacts of keys 54-06, conductor 54-08, the left-hand contact bank of stepping switch 38-01 and conductor 38-02 and winding of relay 36J, and that relay releases. The ground connection on conductor 36-03, applied thereto from the director circuit, is extended through the armature 3 and back contact of relay 36J, upon the release of that relay to the winding of relay 36E which operates.

At its armature 5 and front contact, relay 36E connects conductor 36-06 which is one of the group bracketed to Fig. 70, and is the transmission conductor from the director circuit, to the grid of electron discharge tube 36–07. This tube normally has positive bias on its grid through resistor 36–08, and is rendered conductive for marking signals and non-conductive for spacing signals, in the same manner as tube 22–11 in the outgoing trunk circuit previously described. The anode of tube 36–07 is connected by conductor 36–09 through the winding of selector magnet 35–01 of reperforator 35–02, the path continuing over conductor 35–03 and resistor 36–11 to positive battery. At its armature 4 and front contact, relay 36E connects the junction of conductors 35–03 and resistor 36–11 through varistor 36–12 to the grid circuits of electron discharge tube 36–13 for conditioning an alarm circuit as will be described hereinafter. At its armature 2 and front contact, relay 36E lights lamp 36–14. At its armature 3 and front contact, relay 36E grounds conductor 36–16, which is included in the group bracketed to Fig. 70, this being the conductor over which the start relay in the director circuit, corresponding to relay 12ST, is operated. This relay operates to initiate cross-office transmission to reperforator 35–02. Relay 36E also extends ground through its armature 1 and front contact, and the back contact and armature 2 of relay 36J and winding of relay 36B to operate that relay.

Figure 35:
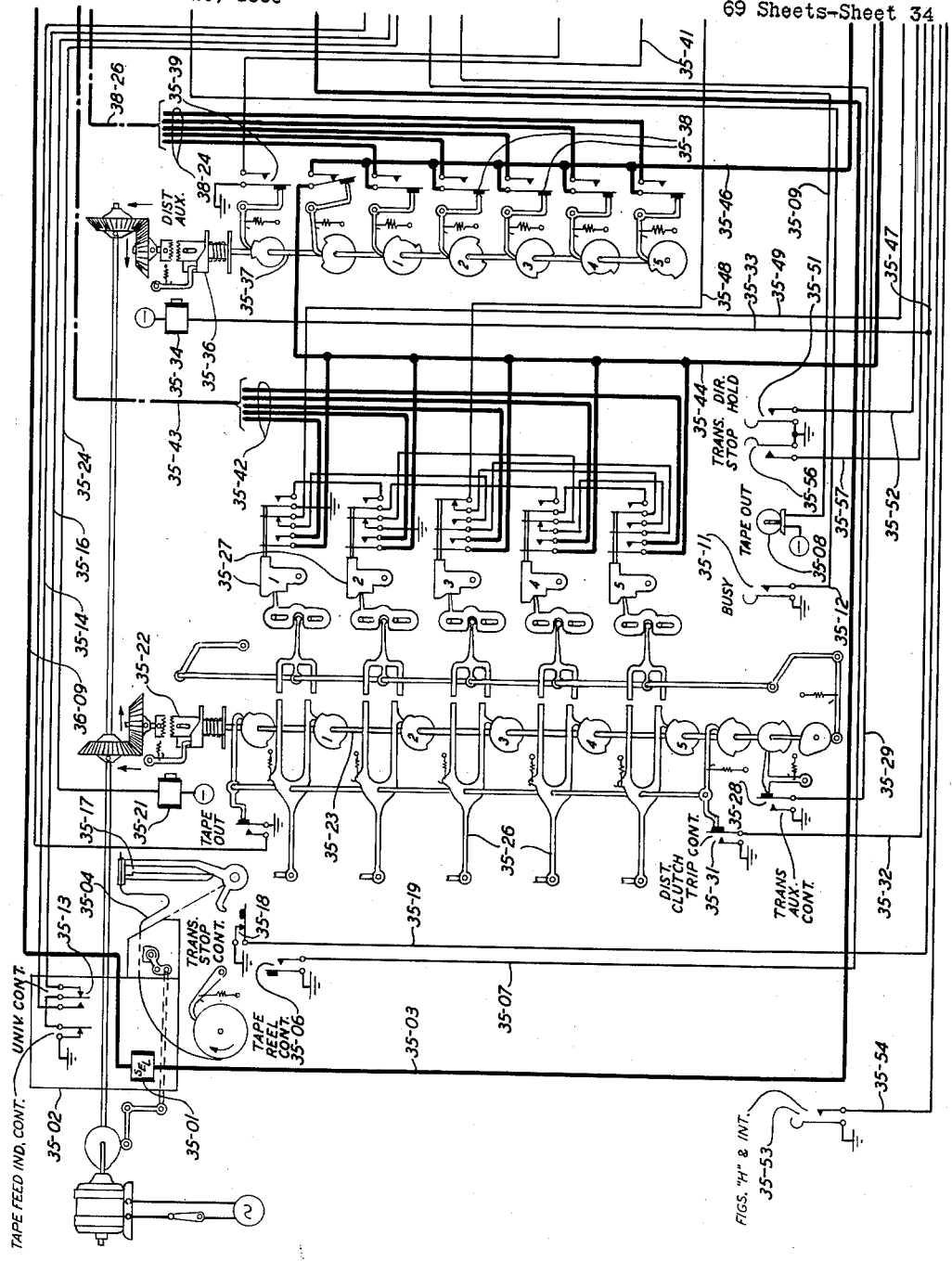
Figs. 35 to 43, 45 to 53 and 55 to 59 show the multiple address circuit and its link circuit.
Figure 36:
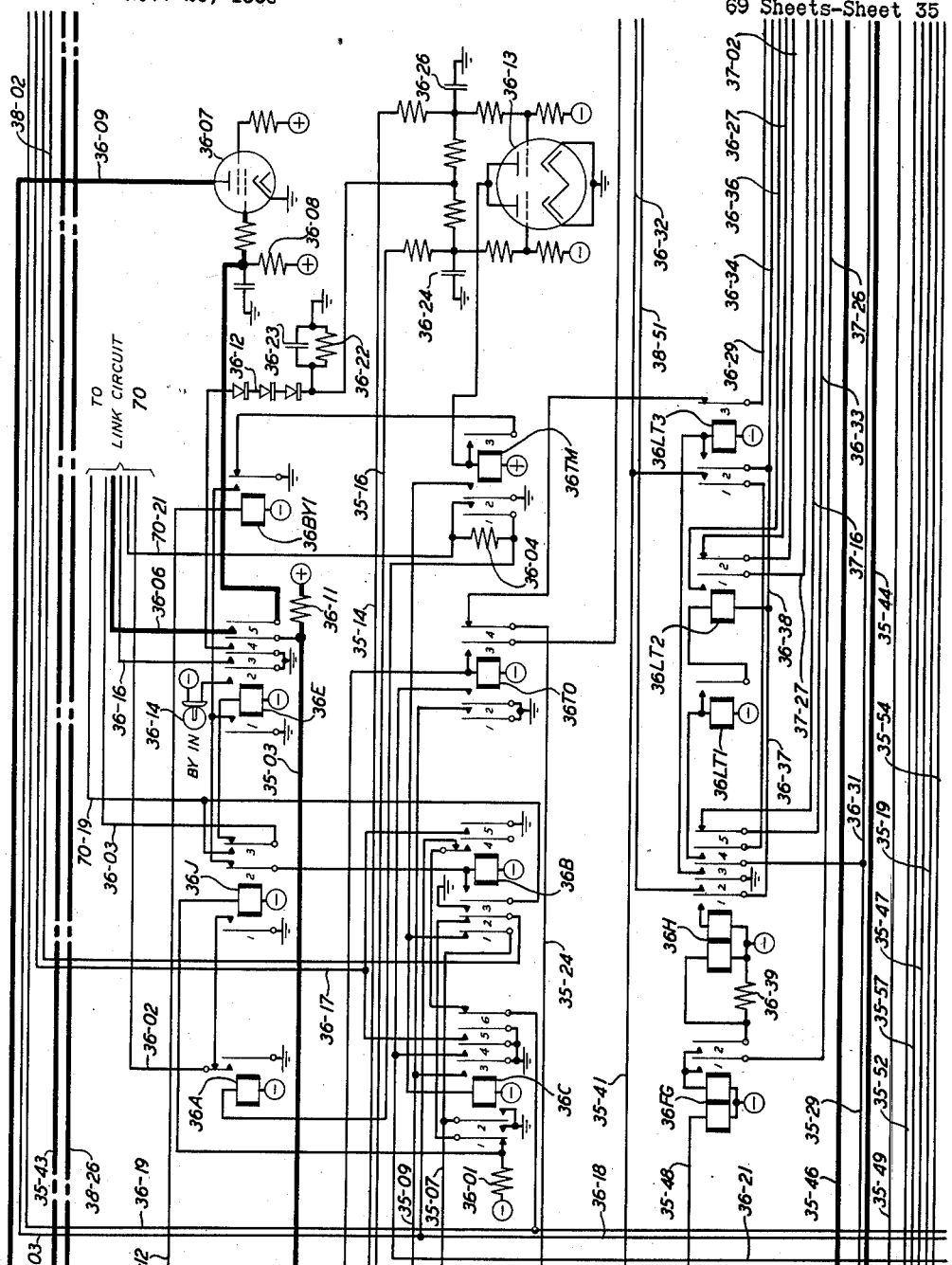
Figure 37:
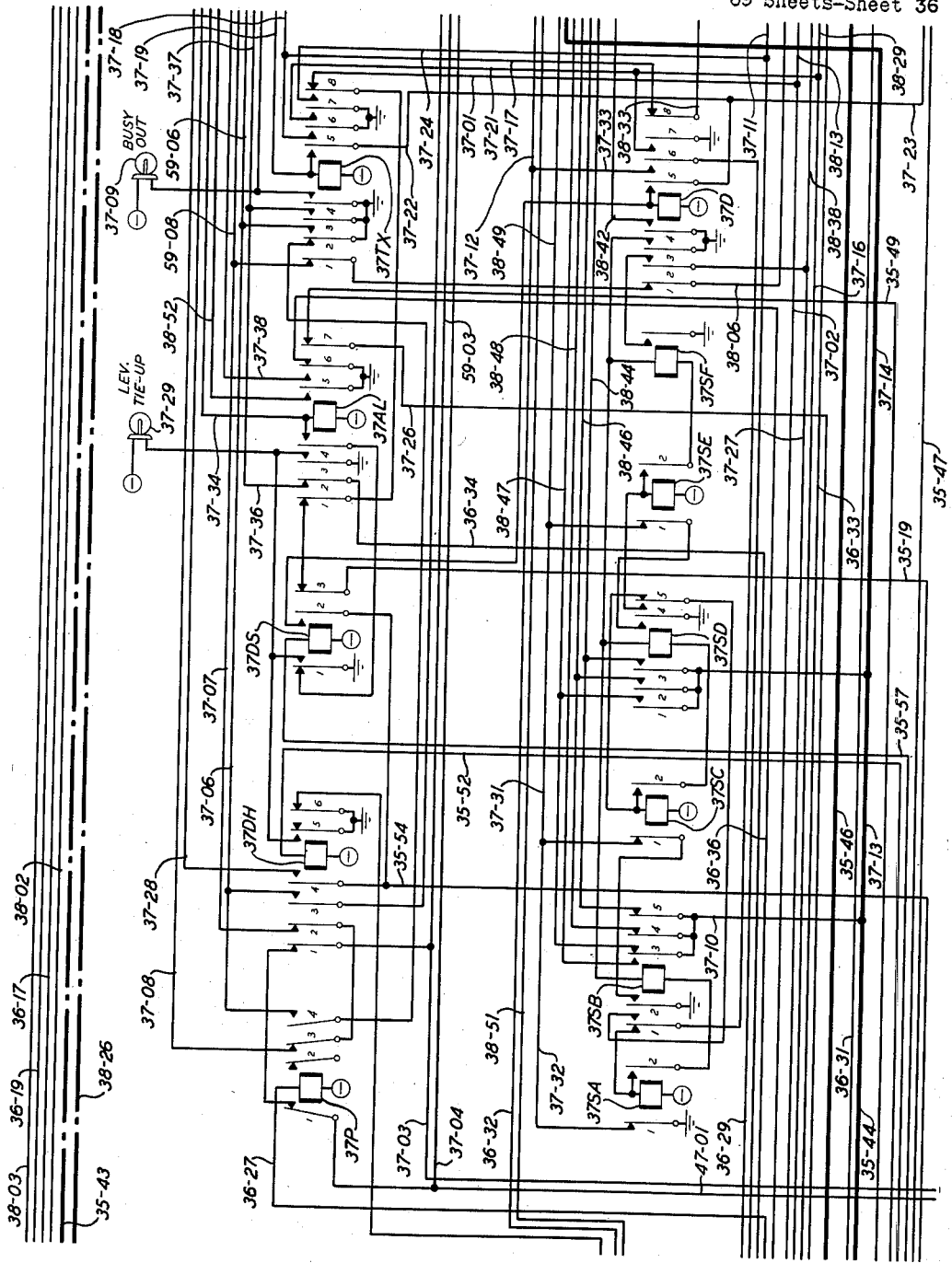
Figure 38:
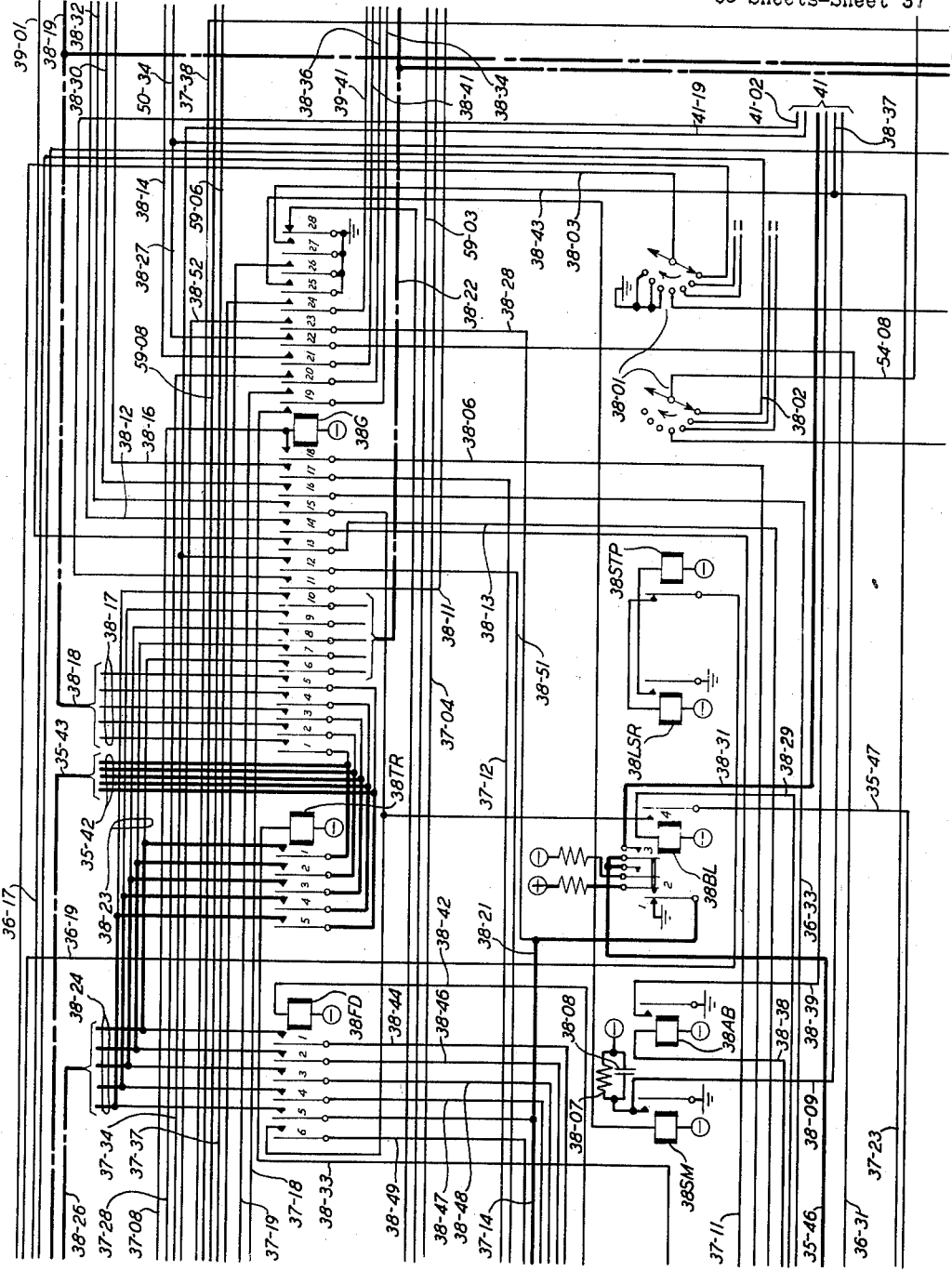
Figure 39:
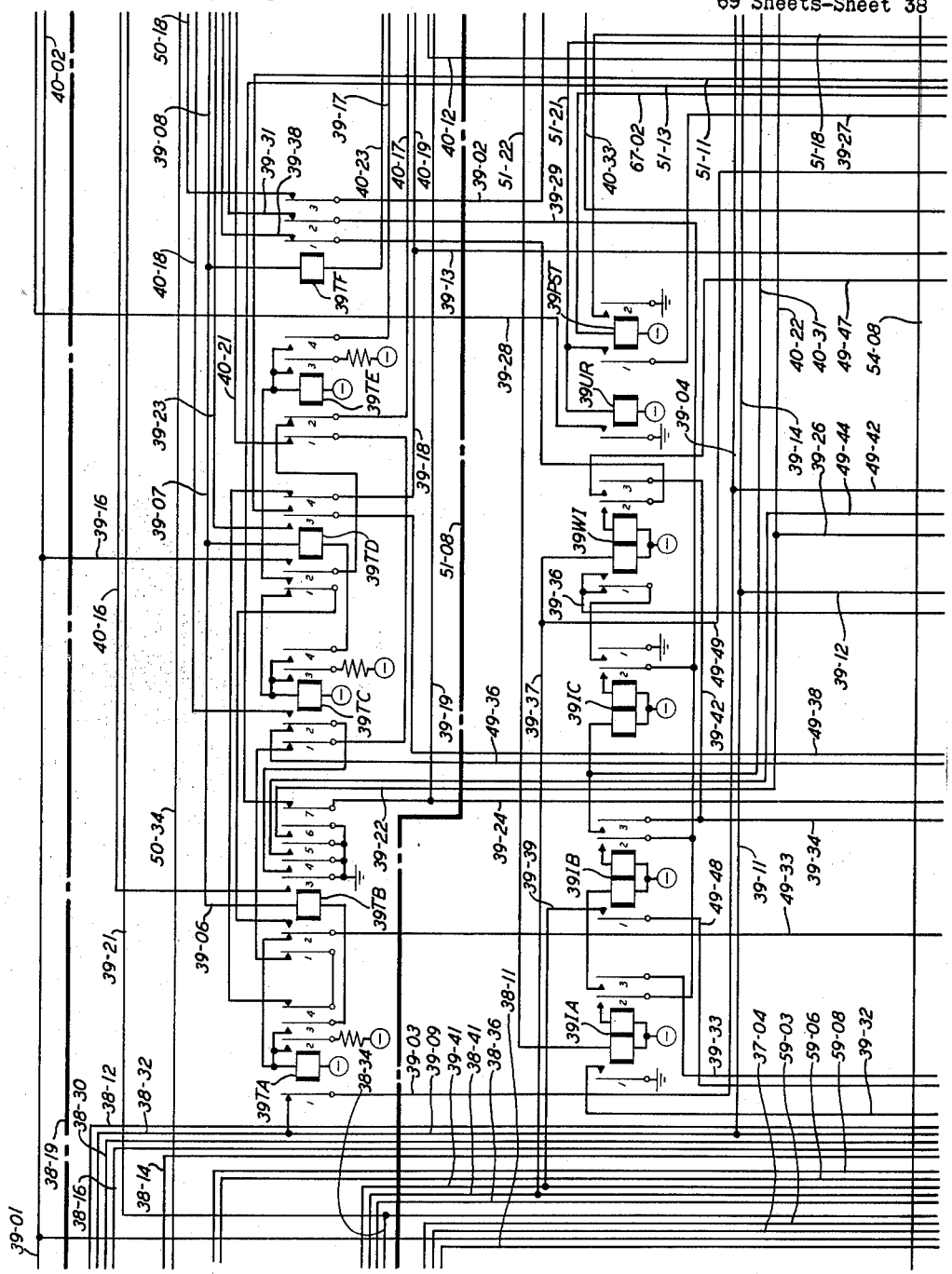
Figure 40:
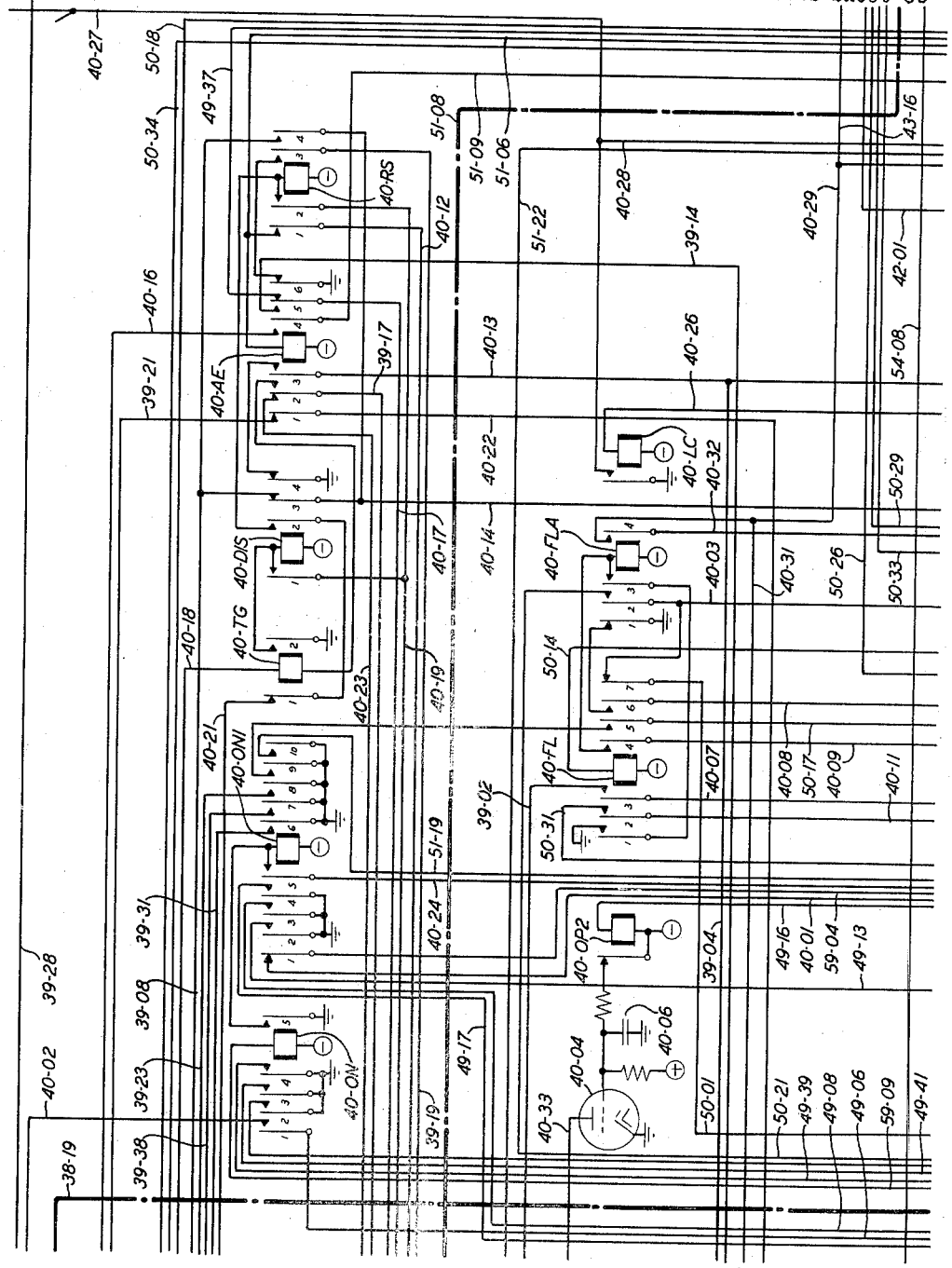
Figure 45:
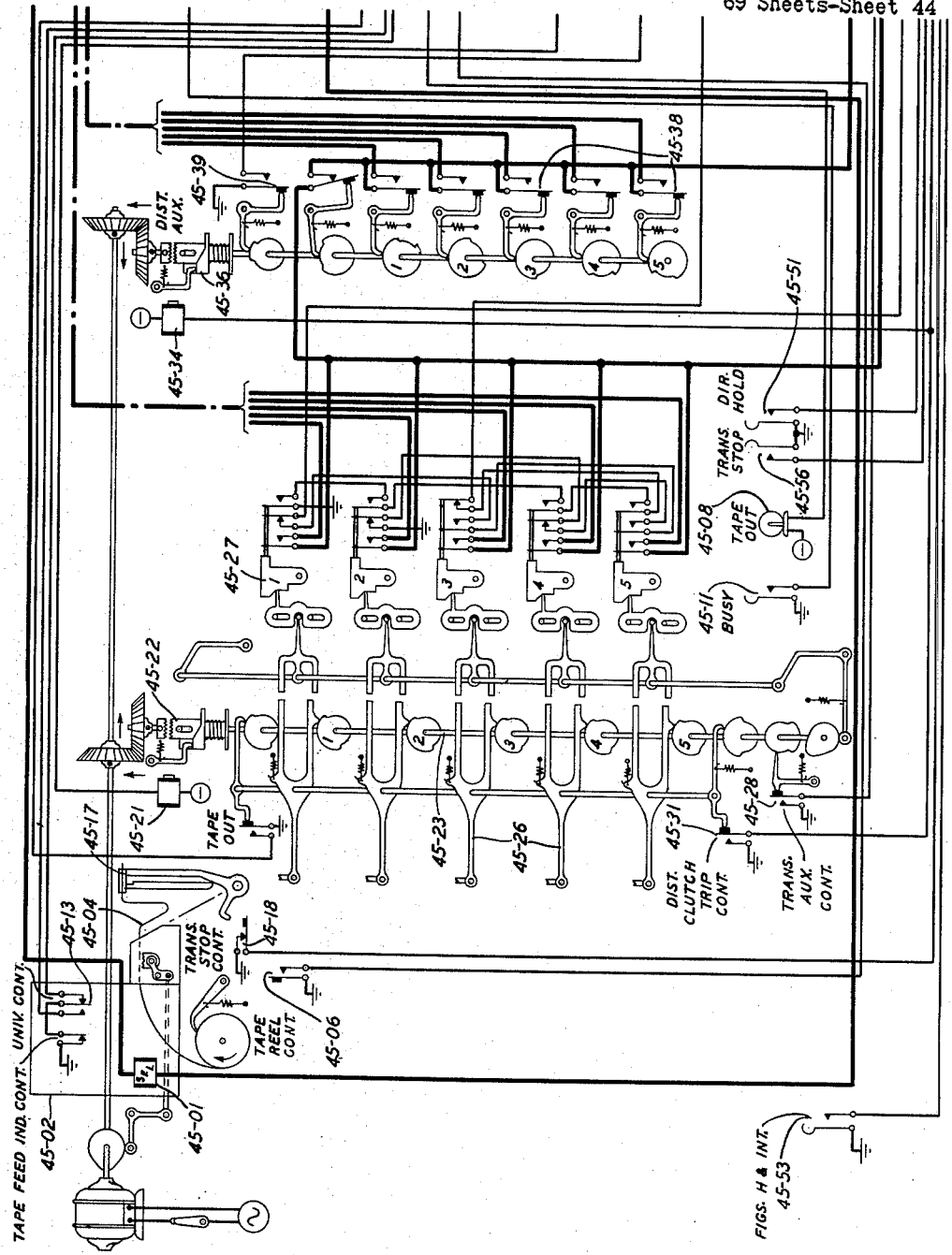
Figure 46:
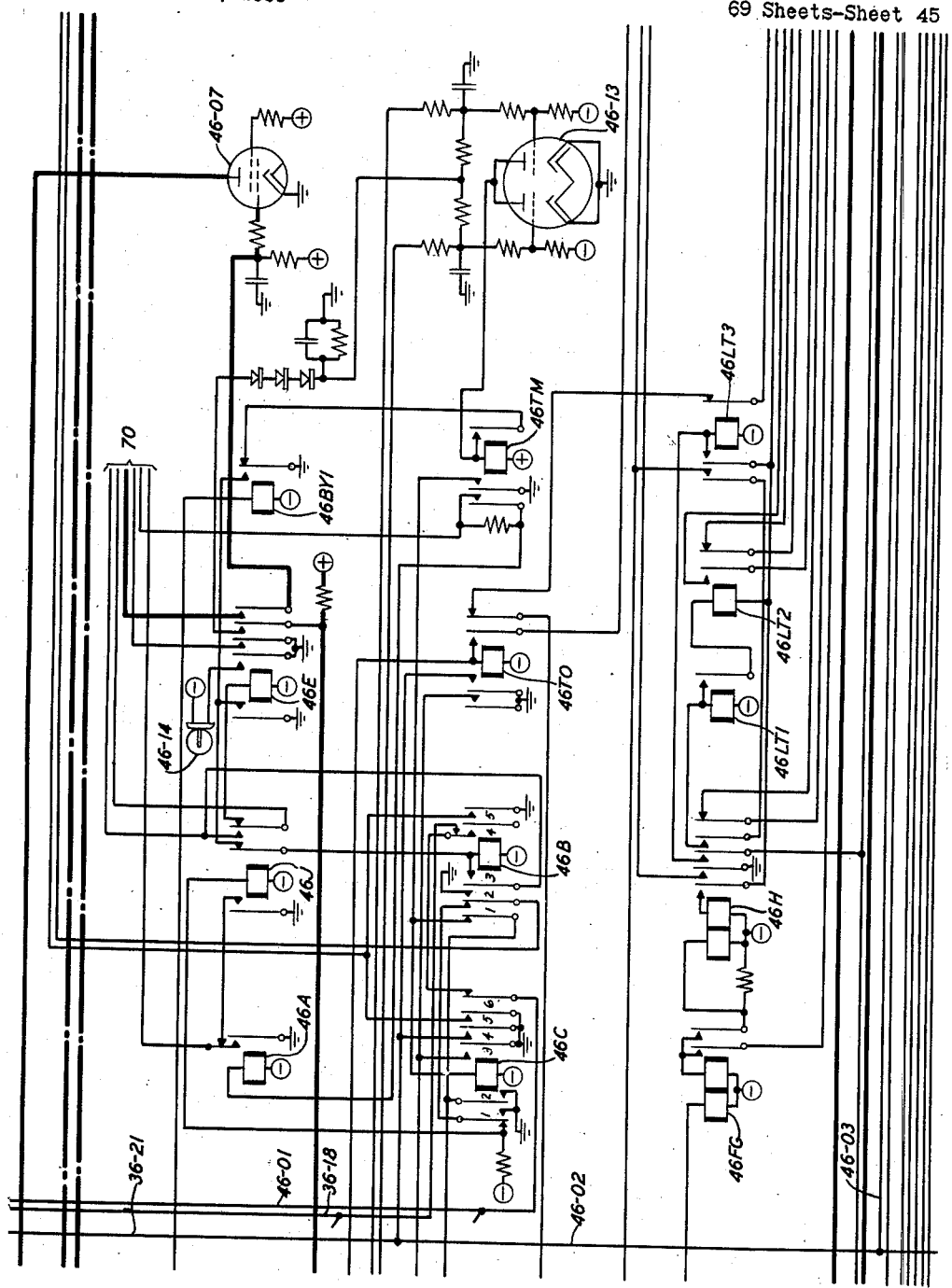
Figure 47:
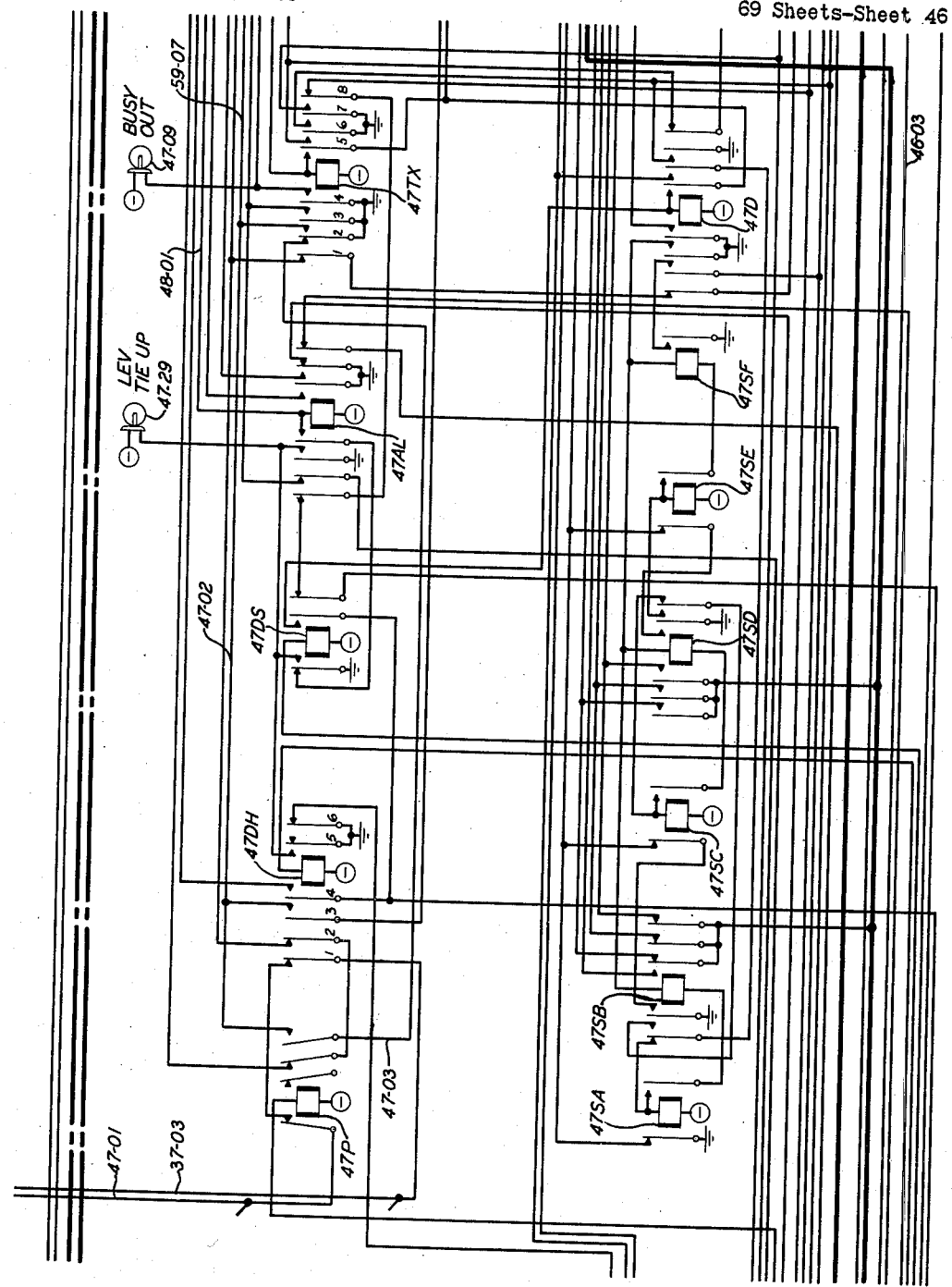
Figure 48:
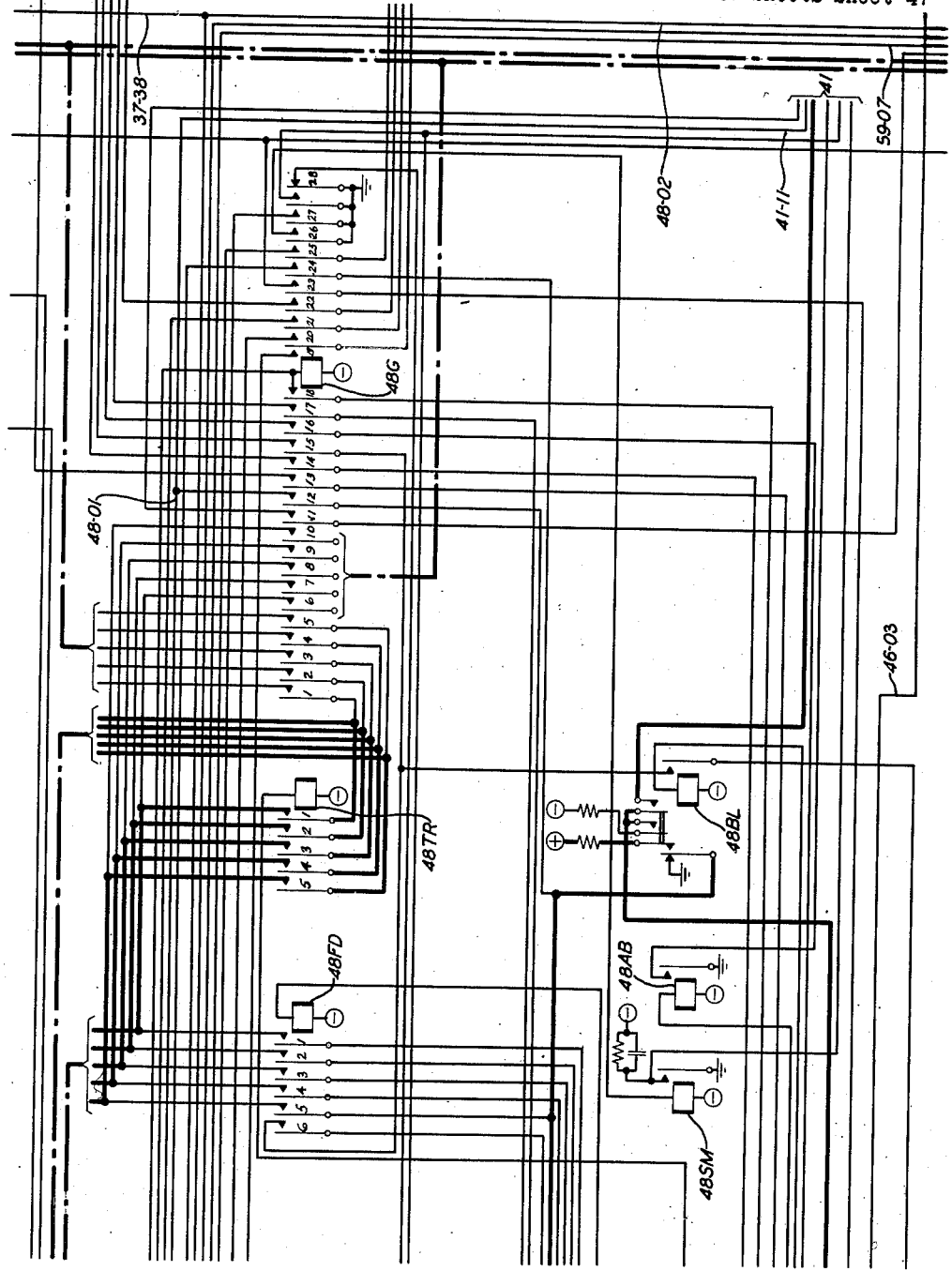

Relay 36B blocks through its front contact and armature 3 to conductor 70–19 which is grounded at the front contact and armature of hold magnet 70–18. At its front contact and armature 2, relay 36B grounds conductor 38–02 which is connected to the first contact of the left-hand contact bank of stepping switch 38–01, thus registering a busy condition of the first storage level of the multiple address circuit, as previously mentioned. At its armature 5 and front contact, relay 36B connects ground to conductor 36–17 which is connected to the first contact of the righthand contact bank of stepping switch 38–01, and the path is extended through the contactor, conductors 38–03 and 36–18, break contacts controlled by armature 4 of relay 46B, back contact and armature 6 of relay 46C, conductors 46–01 and 36–19, armature and back contact of stepping magnet 38STP of stepping switch 38–01, and winding of relay 38LSR to battery. The relay 38LSR operates, energizing stepping magnet 38STP. The magnet 38STP operates to advance the contactors of switch 38–01 one step, and interrupts the energizing circuit of relay 38LSR which releases. This permits stepping magnet 38STP to release. If there is a ground on the second contact of the left-hand contact bank of stepping switch 38–01, indicating that the second receiving level of the multiple address circuit is busy, relay 38LSR will be reoperated to advance the contactors another step. If the second level is not busy, relay 38LSR will remain released, offering access to the second level to any director seeking a connection to the multiple address circuit. The storage levels in Figs. 35 and 45 are the first and last of a plurality of levels, indicated by the connections to the first four contacts of the left-hand contact bank of stepping switch 38–01 as being four in number. The second and third levels are not shown. When all levels are busy, the relays, corresponding to relays 36B and 46B, will be operated, and there will be no path for energizing control relay 38LSR thereby enabling stepping magnet 38STP. Stub connections on conductors 36–18 and 46–01 indicate multiple connections through break contacts of relays in intermediate levels corresponding to relays 46B and 46C. As soon as any level becomes idle, relay 38LSR will become operated due to release of one of the relays 36B or 46B or corresponding relays, and the stepping switch will be advanced to a contact which is not grounded. If the level that becomes idle happens to correspond to the one on which the contactors of the stepping switch are then resting, the switch will not be advanced.

Transmission of the message to the seized level of the multiple address circuit proceeds, the message being recorded by reperforator 35–02 on tape 35–04. When the director circuit responds to the disconnect signal, it removes the ground that is holding relay 36E operated over conductor 36–03, thereby releasing that relay. Relay 36E disconnects the grid of tube 36–07 from the transmission path, extinguishes lamp 36–14, disconnects the grids of alarm circuit control tube 36–13 from conductor 35–03 and resistor 36–11, and disconnects ground from start conductor 36–16 extending to the director circuit. The director, as a result of the release of the start relay corresponding to relay 12ST, disconnects ground from conductor 70–21, thereby releasing relay 36A. Relay 36A disconnects ground from conductor 36–02, thereby releasing hold magnet 70–18, which in turn disconnects ground from conductor 70–19, releasing relay 36B. The receiving level of the multiple address circuit is thereby released and restored to normal.

Before describing the retransmission of the message recorded in reperforator 35–02, the operation of certain alarms will be considered. An alarm arrangement is provided for indicating when the supply of tape in reperforator 35–02 is running low. When the tape supply runs low contacts 35–06 close, connecting ground over conductor 35–07 to the armature 1 of relay 36B. It is to be presumed that the relay 36B is operated and that a message is being received so that tape is being withdrawn from the supply reel. When the relay 36B releases at the end of the message, the ground connection supplied over conductor 35–07 is extended through the armature 1 and back contact of relay 36B and the winding of relay 36C, and relay 36C operates. It locks through its front contact and armature 2, and the armature 1 and back contact of relay 36B. It connects ground over its front contact and armature 1, and the back contact and armature 2 of relay 36B to conductor 38–02 to impose a busy indication on this level of the multiple address circuit and prevent its seizure by a director circuit. It interrupts, at its armature 6 and back contact, a path for operating stepping switch control relay 38LSR. It lights tape-out lamp 35–08 in a circuit traced from battery through that lamp, conductor 35–09, and front contact and armature 3 to ground. At its armature 5 and front contact, it connects ground over conductor 36–17 to the first contact of the right-hand contact bank of stepping switch 38–01, as part of the busy indication. At its armature 4 and front contact, relay 36C extends a ground connection to the alarm circuit over a path comprising conductors 36–21, 46–02, 46–03, 60–01 and 64–01, and winding of alarm relay 68–OL. Relay 68–OL lights pilot light 68–01 and tape-out alarm lamp 68–08. Relay 68–OL also extends a connection over its armature 2 and front contact, break contacts controlled by the right-hand armature of relay 68–OS to the winding of relay 68ST to operate an audible alarm, as previously described. The audible alarm may be suppressed by the operation of key 68–07 which connects ground through the armature 1 and front contact of relay 68–OL and the break contacts controlled by the left-hand armature of relay 68–OS to the winding of that relay. Relay 68–OS locks to the front contact and armature 2 of relay 68–OL and releases relay 68ST.

Before replenishing the tape supply, the attendant operats locking busy key 35–11, extending ground over conductor 35–12 to the winding of relay 36BY1 which operates. This relay connects ground through its armature and front contact, and back contact and armature 2 of relay 36B to battery. Relay 36B interrupts the locking circuit of relay 36C which releases, and a busy indication is continued on conductor 38–02 by relay 36B at its front contact and armature 2. When the tape supply has been replenished, key 35–11 is released and relay 36BY1 releases, in turn releasing relay 36B. With relay 36C released, the operating circuit of relay 68–OL is interrupted and that relay releases, unlocking relay 68–OS which releases. In this way, the particular receiving level of the multiple address circuit is restored to normal with a fresh supply of tape, and the alarm circuit is restored to normal.

An arrangement is also provided for bringing in an alarm in the event that reperforator 35-02 fails to function properly. It will be assumed for the purpose of this description that a connection has been established to the first level of storage of the multiple address circuit by the operation of hold magnet 70-18, and that relay 36E is operated but transmission is not yet begun. The circuit for energizing selector magnet 35-01 of reperforator 35-02 was traced from the anode of tube 36-07 over conductor 36-09, the winding of the selector magnet, conductor 35-03 and resistor 36-11 to positive battery with a branching path through armature 4 and front contact, and varistor 36-12 to the grids of tube 36-13. The latter path has a branching path through resistor 36-22 shunted by condenser 36-23 to ground. The voltage drop across resistor 36-22, with tube 36-07 conductive, is of the order of 20 volts. Tube 36-13 has been shown as a twin triode with the grids returned to negative battery. With only 20 volts across resistor 36-22, the grids of the tube are of negative potential and tube 36-13 is cut off.

Upon response of tube 36-07 to the first spacing signal element, tube 36-07 will be cut off, raising the potential across resistor 36-22 and condenser 36-23 to substantially 120 volts. This potential tends to charge condensers 36-24 and 36-26 to a positive value, and in the absence of any other influence they would become charged in an interval of the order of 250 milliseconds. As reperforator 35-02 responds to each code combination, the swinger of universal transfer contacts 35-13 operates between its two contacts which are connected by conductors 35-14 and 35-16 to the condensers 36-24 and 36-26 to discharge those condensers alternately. The repetitious discharging of the condensers prevents tube 36-13 from becoming conductive.

Upon the occurrence of a machine trouble, preventing the recorder from recording code combinations, the swinger of universal contacts 35-13 will remain on one or the other of its contacts, holding one of the condensers 36-24 and 36-26 discharged but permitting the other to charge continuously. Varistor 36-12 prevents the charge on condenser 36-23 from leaking off through its charging circuit, and charging current flows to replace leakage through resistor 36-22 in response to each spacing element received by tube 36-07. After approximately 250 milliseconds of continuous charging of one of the condensers 36-24 and 36-26, the associated grid of tube 36-13 is swung toward positive sufficiently to render the tube conductive, and relay 36TM operates on the discharge current through the tube, locking through its right-hand armature and front contact, and the back contact and armature of relay 36BY1 to ground. Relay 36TM shunts resistor 36-04 to cause sufficient current to flow in the circuit of relay 36A, and the relay in the director circuit, corresponding to relay 17MA, to operate the latter relay, the result being that an alarm is registered in the director circuit and transmission is stopped. With the suspension of transmission, tube 36-07 remains in marking condition, the charge on condenser 36-23 leaks off through resistor 36-22, and tube 36-13 cuts off. At its armature 2 and front contact, relay 36TM operates relay 36C which performs the functions previously described. As a result of the alarm registered in the director circuit, an attendant manually initiates a disconnect operation, and in response to that operation, relays 36A, 36B and 36E and the hold magnet 70-18 are released. Relay 36TM is releasable by the operation of relay 36BY1 under the control of busy key 35-11 which should be operated by an attendant to render the particular level of the multiple address circuit busy to directors seeking access to the multiple address circuit, until the trouble in reperforator 35-02 has been cleared.

Relay 36BY1 completes the circuit of relay 36B if relay 36J is unoperated, and relay 36B releases relay 36C.

*Routing of multiple address message to proper outlets*

As soon as tape containing a message begins to emerge from reperforator 35-02, it swings tape sensing head 35-17 clockwise, closing the transmitter stop contacts 35-18. Ground is thus connected over conductor 35-19, armature 3 and back contact of relay 37DS, back contact and armature 1 of relay 37AL, armature 8 and back contact of relay 37TX, conductors 37-01 and 37-02, armature 2 and back contact of relay 36LT2, conductor 36-27 and winding of relay 37P, and that relay operates. Relay 37P has been shown operated because contacts 35-18 are shown in the closed condition. At its armature 1 and front contact, relay 37P prepares a circuit for energizing a stepping switch driving relay 59DR, the path being traced from battery through the winding of that relay, break contacts controlled by stepping magnet 59-01 of stepping switch 59-02, which comprises three banks of contacts, conductor 59-03, armature 1 and back contact of relay 37DH, the path also being extended over conductor 37-03 to the armature 1 of relay 47DH and to the corresponding relay of either of the two intermediate multiple address storage levels, the path continuing from the back contact of armature 1 of relay 37DH and corresponding relays through the front contact and armature 1 of relay 37P and corresponding relays, for example, if relay 47P were also operated due to availability of tape in the reperforator-transmitter of that level through conductor 47-01 to conductor 37-04 where all paths through armature 1 and front contact of relays 37P, 47P and other corresponding relays rejoin, the path continuing over conductor 37-04, back contact and armature 5 of relay 59PRL, conductor 59-04, armature 1 and back contact of auxiliary off-normal relay 40-ON1, conductor 40-01, armature 3 and back contact of relay 59PRL to the contactor of the left contact bank of stepping switch 59-02. The contactor, to which the path has been traced, is shown engaging the first contact of the contact bank from which a path is traced over conductors 59-06 and 37-06, to the front contact associated with armature 3 of relay 37DH, and to the back contact associated with armature 4 of relay 37P. The latter relay is operated and the former relay is not operated so that the path terminates at this point. Assuming that the contactor associated with the left-hand contact bank were engaging the fourth contact, a path would be traced over conductors 59-07 and 47-02, back contact and armature 4 of relay 47P, it being assumed that that receiving level of the multiple address circuit has no tape awaiting transmission, conductor 47-03, and back contact and armature 2 of relay 47TX to ground. This would cause the completion of the circuit of relay 59DR which would complete the circuit of stepping magnet 59-01. The stepping magnet would advance the contactors of stepping switch 59-02 one step, and would interrupt the energizing circuit of relay 59DR. Relay 59DR would release stepping magnet 59-01, and with ground on the fifth contact as indicated, relay 59DR would again be energized to advance the contactors of stepping switch 59-02 to the sixth contact which is also grounded, and then to the first contact where relay 59DR would find no circuit because relay 57P is operated. In this way stepping switch 59-02 seeks levels of the multiple address circuit awaiting access to the multiple address director circuit for the purpose of routing messages to outlets designated by address codes preceding the messages.

With the contactors of stepping switch 59-02 engaging the first contacts of their respective contact banks, a circuit is established from ground through armature 1 and back contact of relay 59PRL, the winding of relay 59PRC, the contactor and first contact of the right-hand contact bank of the stepping switch, conductors 59-08 and 37-07, back contact and armature 2 of relay 37DH, armature 3 and front contact of relay 37P, conductor 37-08, to the winding of relay 38G which operates. This relay locks through its front contact and armature 18, conductor 38-06, armature 1 and back contact of relay 37D, armature 1 and back contact of relay 37TX to conductor 59-08, thereby eliminating relays 37P and 37DH from control of the locking circuit of relay 38G. Relay 59PRC also operates and locks in series with relay 38G.

Relay 59PRC interrupts the path to the winding of relay 59PRL. Relay 38G performs a number of functions, the details of which will be described hereinafter, including connection of the multiple address director circuit to the first level of storage in the multiple address circuit, and preparation of locking circuits for relays 37TX, 37D, 36H, 36LT1 and 36LT3. At its armature 27 and front contact, relay 38G completes the circuit of busy indicating lamp 37-09 which lights. Relay 38G also completes the operating circuit for relay 38SM, traced from battery through the winding of that relay, and the front contact and armature 26 of relay 38G.

Figure 41:
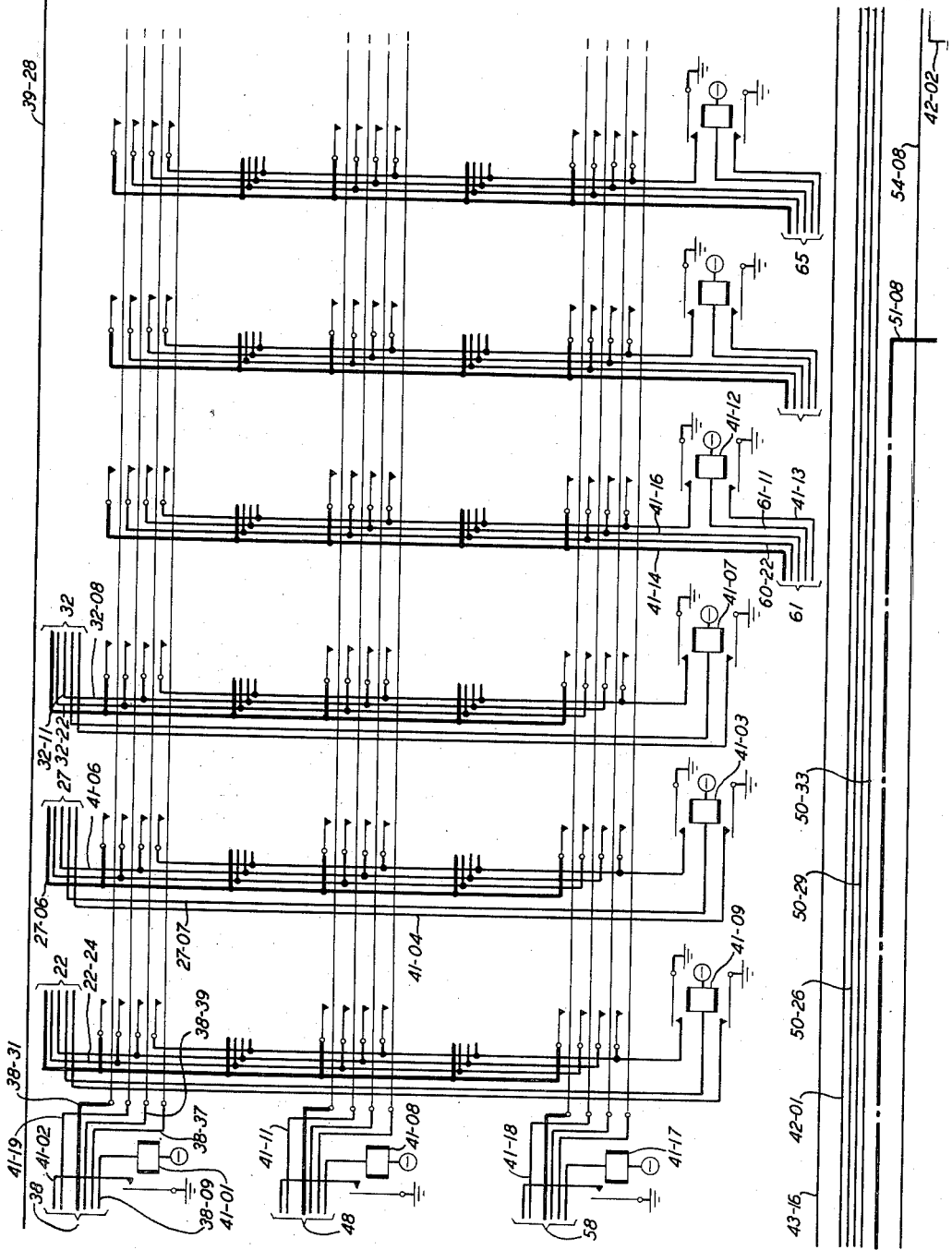

Relay 38SM connects ground through resistor 38-07 shunted by condenser 38-08 to battery and over conductor 38-09 which is included in a group of conductors bracketed to Fig. 41, in which conductor 38-09 reappears and is traced through the winding of select magnet 41-01 of a crossbar switch which serves as a link circuit by means of which the multiple address circuit establishes transmission connections to outlets in accordance with address codes preceding messages. Select magnet 41-01 is allocated to the first storage level of the multiple address circuit and prepares for operation all of the contacts in that horizontal level of the crossbar switch. Select magnet 41-01 connects ground over conductor 41-02 which is included in the group of conductors bracketed to Fig. 38, in which conductor 41-02 reappears, and is traced through the front contact and armature 11 of relay 38G, conductor 38-11, first contact and contactor of the middle contact bank of stepping switch 59-02, back contact and armature 2 of relay 59PRL, conductor 59-09, and winding of off-normal relay 40-ON which operates. At its armature 5 and front contact, relay 40-ON completes the circuit of relay 40-ON1 which also operates. Relays 40-ON and 40-ON1 provide grounds for operation of various relays in the multiple address director circuit, as will be more specifically identified hereinafter. Relay 40-ON1 also interrupts the stepping circuit for stepping switch 59-02 preventing, for the time being, the operation of that stepping switch. Relay 40-ON completes the energizing circuit for transmitter clutch release magnet 35-21, tripping clutch 35-22, and causing rotation to be imparted to transmitter shaft 35-23. The energizing circuit for transmitter clutch release magnet 35-21 is traced from battery through the winding of that magnet, conductor 35-24, armature 4 and back contact of relay 36TO, back contact and armature 3 of relay 36LT3, conductors 36-29 and 37-11, armature 14 and front contact of relay 38G, conductors 38-12, 49-01 and 49-02, back contact and armature 1 of relay 49CR, conductors 49-03 and 49-04, back contact and armature 8 of relay 49STL, back contact and armature 1 of relay 49STT, armature 1 and back contact of relay 49DA, break contacts controlled by armature 2 of relay 49RC, conductor 49-06, armature 1 and front contact of relay 40-ON, conductors 40-02 and 39-01, front contact and armature 13 of relay 38G, conductor 38-13, and thence over conductor 37-01, back contact and armature 8 of relay 37TX, armature 1 and back contact of relay 37AL, back contact and armature 3 of relay 37DS, conductor 35-19, and transmitter stop contacts 35-18 to ground.

Tape sensing levers 35-26 sense the first code combination in tape 35-04 which is the code for the character B, and the code combination is transferred to contact controlling members 35-27, all under the control of shaft 35-23. The shaft also closes transmitter auxiliary contacts 35-28, connecting ground over conductors 35-29 and 36-31, armature 22 and front contact of relay 38G, conductors 38-14 and 49-07, and winding of relay 49CR to battery. Relay 49CR locks through its front contact and armature 3, armature 1 and back contact of relay 49CRA, back contact and armature 1 of relay 49RC, conductor 49-08, and front contact and armature 3 of relay 40-ON1 to ground. Relay 49CR interrupts the energizing circuit for transmitter clutch release magnet 35-21 so that the magnet will release and limit the rotation of shaft 35-23 to one revolution. During that one revolution, distributor clutch release magnet contacts 35-31 close, extending ground over conductors 35-32 and 35-33 to energize distributor clutch release magnet 35-34. Clutch 35-36 is thus tripped to cause rotation to be imparted to distributor shaft 35-37. Distributor contacts 35-38 are thus operated, but the operation is idle because the transmission path has not been extended from them nor have connections from the transmitter contacts been extended to them. During the rotation of shaft 35-37, the distributor auxiliary contacts 35-39 close and extend ground over conductors 35-41, 36-32 and 37-12, armature 17 and front contact of relay 38G, conductors 38-16, 49-09 and 49-11, armature 1 and back contact of relay 49STL, armature 2 and back contact of relay 49STT, armature 6 and back contact of relay 49DB and winding of relay 49DA to battery, and that relay operates. Relay 49DA additionally interrupts the energizing circuit for transmitter clutch release magnet 35-21 and completes an operating circuit for relay 50-FC, traced from battery through the winding of that relay, conductor 50-01, armature 7 and back contact of relay 40-FL, conductor 40-03, back contact and armature 12 of relay 49CL, and armature 5 and front contact of relay 49DA to ground. Relay 50-FC establishes connections from the transmitter contacts in Fig. 35 over a group of conductors 35-42 which are represented by dot-and-dash line 35-43, traced to Fig. 38 where the group of conductors 35-42 reappears, and where paths from the conductors of that group are extended over armatures 1 to 5 and front contacts of relay 38G to a group of five conductors 38-17 represented by dot-and-dash lines 38-18 and 38-19 which extends to Fig. 50 in which conductors 38-17 reappear and are connected through front contacts and armatures 1 to 5 of relay 50-FC to first fan circuit relays 50-F1, 50-F2, 50-F3, 50-F4 and 50-F5. The paths through the windings of relays 50-F1 to 50-F5 terminate on battery. The common portion of the path for operating those relays is traced from the transmitter contacts in Fig. 35 over conductors 35-44, 37-13, 37-14 and 38-21, and armature 1 and back contact of relay 38BL to ground. Relays 50-F1 to 50-F5 operate in accordance with the code combination on the transmitter contacts in Fig. 35, the code combination for the character B which is the first of the two-character code by which the message is routed to the multiple address circuit. Upon the opening of the distributor auxiliary contacts 35-36, relay 49DA locks, and relay 49DB operates in a circuit traced from the winding of relay 49DA, conductor 49-12, front contact and armature 2 of relay 49CR, front contact and armature 3 of relay 49DA, winding of relay 49DB, conductor 49-13, and front contact and armature 2 of relay 40-01 to ground.

It will be remembered that in the regular director circuits multiple contact relays are employed for selecting outlets under the control of the address codes preceding messages, the first fan circuit, upon decoding the first character, selecting and operating a relay and the second fan circuit, upon decoding the second character, selecting a path through one of the armatures of the operated relay. In the multiple address director circuit, crossbar switch mechanism is employed for routing messages to the desired outlets under the control of the first and second fan circuit relays.

The theory of selection involved in the arrangement employing crossbar switches will be described beginning with Fig. 52 in which there are eight sets of crossbar switch contacts, and the sets have been designated I, II, III, IV, V, VI, VII and VIII. Four select magnets and four hold magnets control the operation of the eight sets of contacts. Either of two select magnets, responsive individually in accordance with the nature of element No. 1 of a code combination as marking or spacing, prepares contact sets I and II or III and IV for operation. The other two select magnets respond similarly to element No. 2 and prepare contact sets V and VI or VII and VIII for operation. Two hold magnets responsive individually to the marking or spacing nature of element No. 3 of the code combination operate one of the contact sets I, II, III and IV, and the other two hold magnets respond similarly to code element No. 5 and operate one of the contact sets V, VI, VII and VIII. A selection has been made when two sets of contacts have been operated, but the selective nature of code element No. 4 has not entered into the selection. The four code elements that have entered into the selection give rise to sixteen selections each representing two characters or functions. The characters and contact groups that are operated in response to their codes are shown in Table A.

TABLE A

| | |
|---|---|
| A and J | II and VI |
| B and Z | II and VII |
| C and I | III and VI |
| D and E | II and VIII |
| F and S | I and VIII |
| G and L | IV and V |
| H and M | III and VII |
| K and U | I and VI |
| N and space | III and VIII |
| O and T | IV and VII |
| P and V | III and V |
| Q and letters | I and V |
| R and line feed | IV and VI |
| W and figures | II and V |
| X and Y | I and VII |
| Blank and carriage return | IV and VIII |

Figure 43:
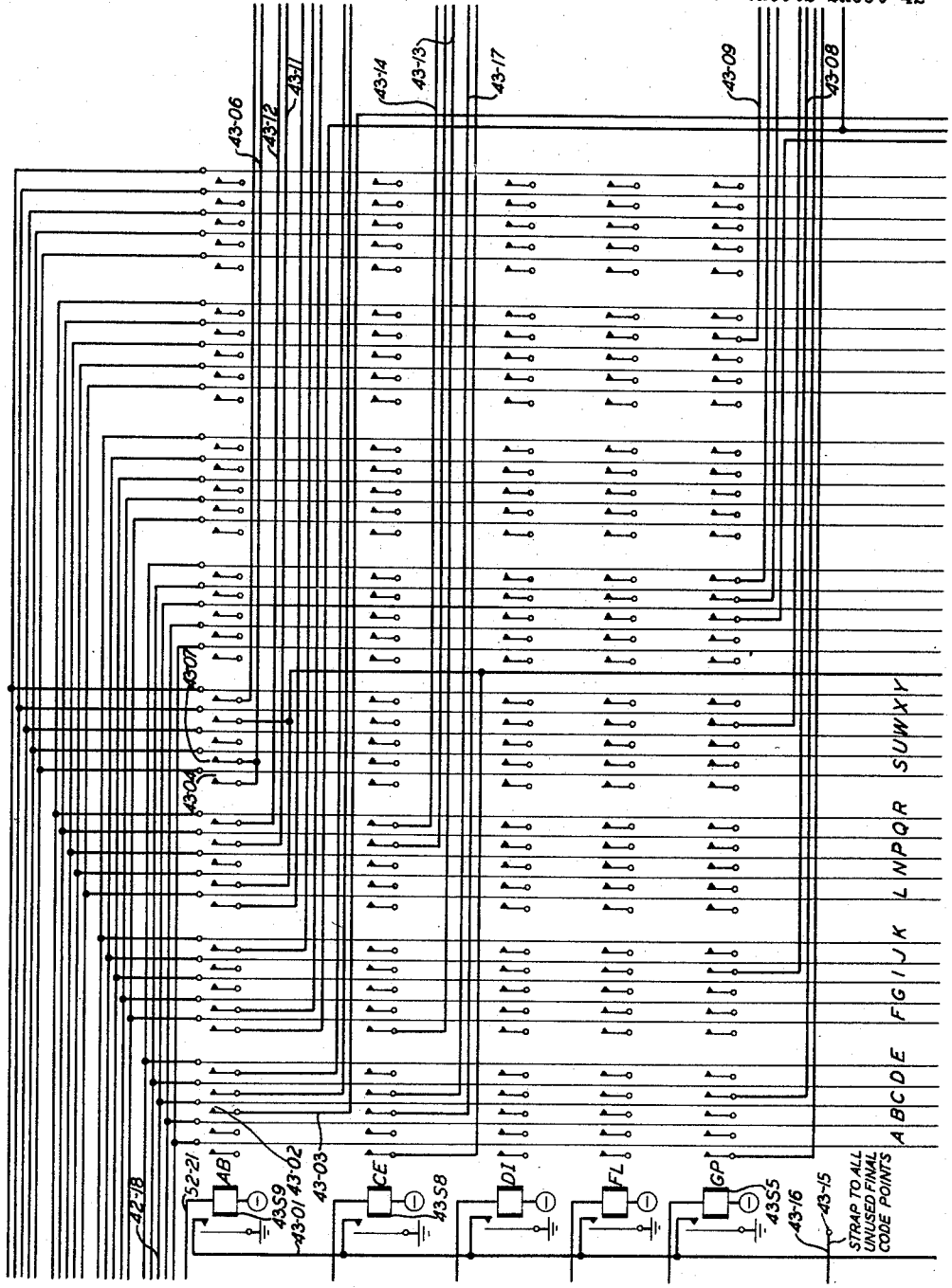
Figure 44:
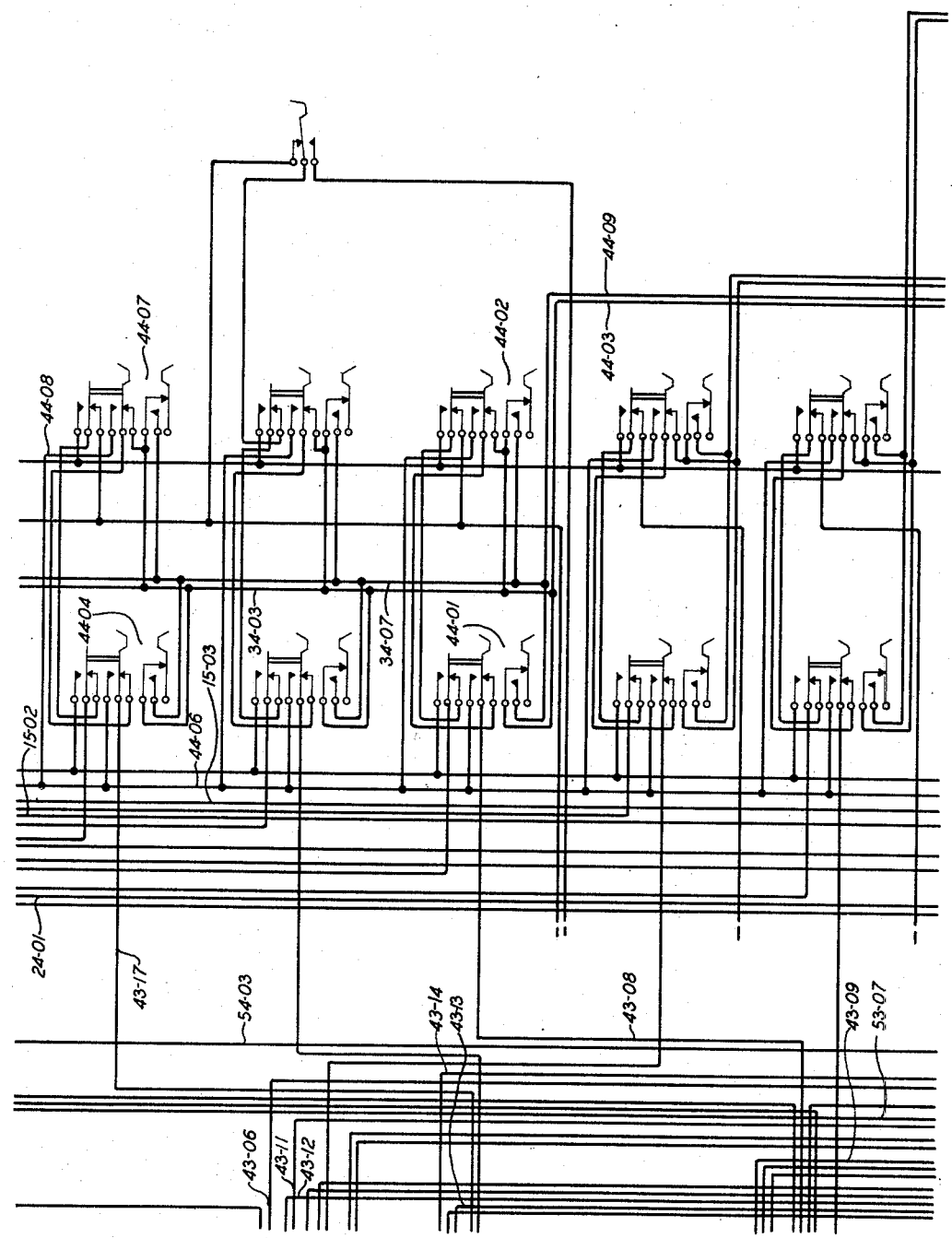

Two paths of entry to the fan circuits comprising the interconnections among the contacts are provided. One path represents the marking condition of code element No. 4 and the other represents the spacing condition. From each of these entry paths a total of sixteen paths may fan out, affording the full selective capability of the five-unit code, which is thirty-two selections. Only twenty of the thirty-two code combinations which produce these selections are used as address codes, some of the remaining twelve being used for control funtcions, such as disconnect, and others being generally less reliable as switching codes because of greater possibility of error, among these being the so-called space-to-mark single-transition codes for the characters T, O, M and V. Accordingly only twenty fan circuit paths are brought out of the contact sets I to VIII. However, these twenty paths are interconnected in pairs, each pair comprising a path originating at each of the two paths of entry so that ten paths emerge from the selection circuit in Fig. 52. The reason for combining the paths is that a crossbar switch, shown in Figs. 43 and 53, is used for combining the selective attributes of the two characters comprising an address code. The usual crossbar switch has a ten-by-ten array of select magnets and hold magnets, the set of contacts controlled by any one select magnet and any one hold magnet numbering at least five. Thus there are at least five hundred contacts, amply adequate for the four hundred selections that dual combinations of twenty codes afford. The reduction of the number of paths brought out of the fan circuit in Fig. 52 to ten, each representing two selections, enables the use of those ten paths to control the ten select magnets of the combining switch, as shown in Figs. 43 and 53. The characters that the select magnets in Figs. 43 and 53 represent have been indicated opposite the magnets. It will be noted that they do not correspond to the character groupings in Table A. It was stated above that the two characters represented by any selector magnet in Figs. 43 and 53 have codes that are unlike in the nature of their No. 4 elements. In order to expand the diminished ten selections of the select magnets in Figs. 43 and 53 to the original twenty, the hold magnets of the crossbar switch in Figs. 43 and 53 are connected in two groups of at least four each. One or the other of the groups is operable, following the operation of one of the select magnets, in accordance with the marking or spacing character of element No. 4 of the code that has been decoded in the circuit of Fig. 52. Stated otherwise, the energizing circuits for the two groups of hold magnets correspond to the two paths of entry to the fan circuits in Fig. 52. Each group of four hold magnets closes twenty of the forty contacts prepared by the operated select magnet, to connect twenty final code selection points to the twenty verticals of those four hold magnets.

Figure 42:
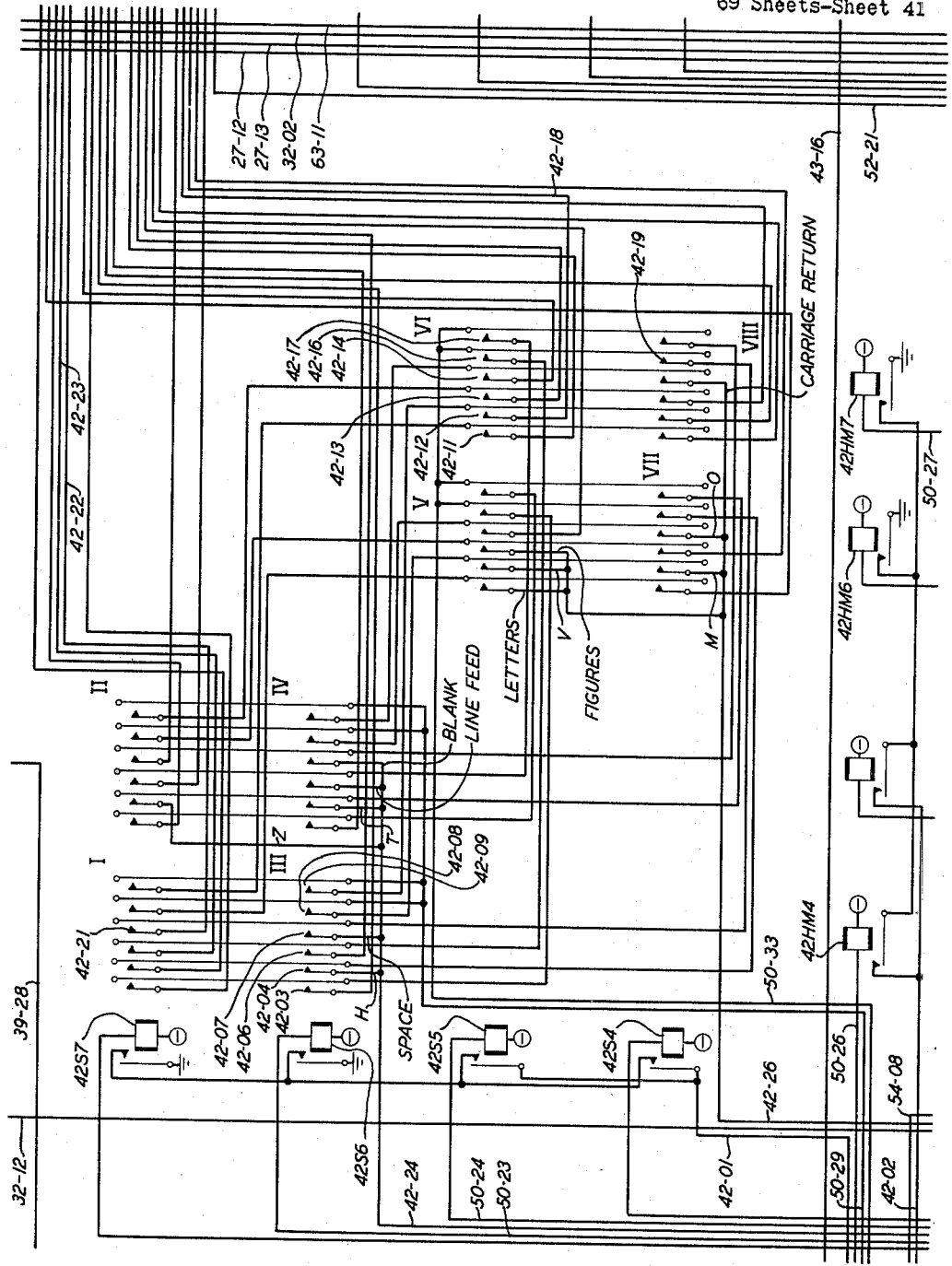

The circuit for decoding the second character of the address code is contained in Fig. 42. It is like the circuit of Fig. 52, having two paths of entry to two fan circuits. Selection between the two paths is made in accordance with the nature of the No. 4 element of the code. All twenty of the selectable paths are brought out of the circuit and are connected in multiple to the verticals of the two sets of hold magnets in Fig. 53, so that each path has access through either of two verticals to ten final code points.

Returning to detailed consideration of the circuits, and as previously stated, the first fan circuit relays are set in accordance with the code for the character B. This code has its first, fourth and fifth elements of marking nature so that relays 50–F1, 50–F4 and 50–F5 are operated. With relay 49DB operated, ground is applied through its armature 3 and front contact, conductor 49–14, front contact and armature 6 of relay 50–FC to armatures 3 of relays 50–F1 and 50–F2. Relay 50–F1 is energized so that the ground connection is extended over conductor 50–02 to operate select magnet 52S3 of the crossbar switch in Fig. 52 which has additional select magnets 52S2, 52S1 and 52S0, and which has hold magnets 52HM0, 52HM1, 52HM2 and 52HM3. The same ground connection is extended through armature 3 and back contact of relay 50–F2, conductor 50–03, and winding of select magnet 52S0 to battery. Had relay 50–F1 been unoperated and relay 50–F2 operated, responsive to a signal having its first and second elements of spacing and marking nature, respectively, the ground connections would have been extended over conductors 50–04 and 50–06 to operate select magnets 52S2 and 52S1. The two select magnets that are operated connect ground over conductors 52–01 and 51–01 to the armatures 3 of relays 50–F3 and 50–F5. The ground connection is also extended from conductors 52–01 through the break contacts of relay 51–OP1, left-hand armature and back contact of relay 51BF, back contact and right-hand armature of relay 51BS, conductor 51–02, armature 1 and back contact of relay 49DC, conductor 49–16 and winding of relay 40–OP2 to battery, and that relay operates to initiate a timing operation of a circuit comprising discharge tube 40–04 and condenser 40–06. The function of the timing circuit under the circumstance that it times out, will be described later.

The third element of the code combination for the character B being spacing, relay 50–F3 is unoperated and the ground connection on its armature 3 is extended over conductor 50–07 to the winding of hold magnet 52HM1. Had relay 50–F3 been operated, the ground would have been extended over conductor 50–08 to operate hold magnet 52HM0. The ground connection on conductor 51–01 is extended through the armature 3 and front contact of relay 50–F5, and conductor 50–09 to the winding of hold magnet 52HM2 which operates. Had relay 50–F5 been unoperated, the ground would have been extended over conductor 50–11 to the winding of hold magnet 52HM3. With select magnet 52S3 operated, the hold magnet 52HM1, upon operating, causes the closure of contacts 52–02, 52–03, 52–04, 52–06, 52–07 and 52–08, comprising crossbar switch contact set II. With select magnet 52S0 operated, the hold magnet 52HM2 causes the closure of contacts 52–09, 52–11, 52–12, 52–13, 52–14 and 52–16, comprising crossbar switch contact set VII. The operated hold magnets connect ground over conductor 52–17, armature 4 and front contact of relay 50–F4, which is operated because the fourth element of the code for the character B is marking, conductor 50–12, to crossbar switch contacts 52–07 and 52–08 operated by hold magnet 52HM1. Contact 52–08 extends to a vertical of hold magnet 52HM3 which is not operated. From contacts 52–07 the path continues through a crossbar switch vertical of hold magnet 52HM2, contacts 52–12, conductors 52–19 and 52–21, and the winding of select magnet 43S9 to battery. Select magnet 43S9 is contained in another crossbar switch shown in Figs. 43 and 53. Thus relays 50–F1 to 50–F5 have caused two hold magnets, 52HM1 and 52HM2 to operate contacts prepared by operated select magnets 52S3 and 52S0 respectively, and the contacts have conjointly selected and operated select magnet 43S9 as a result of the decoding of the code for the character B. Select magnet 43S9 is also selectable in response to the code for the character A, as may be determined by tracing selection circuits established with relays 50–F1 and 50–F2 operated, and relays 50–F3 to 50–F5 unoperated, responsive to the code having elements 1 and 2 marking, and 3, 4 and 5 spacing.

Select magnet 43S9 prepares eight sets of crossbar switch contacts for operation and extends ground over conductors 43–01 and 53–01, armature 1 and front contact of operated relay 50–F4, and conductor 50–13 to operate hold magnets 53H0, 53H1, 53H2 and 53H3 of the crossbar switch in Figs. 43 and 53. These magnets operate half of the contacts prepared by select magnet 43S9, the left-hand four sets of five contacts each, totaling twenty contacts. The operation of hold magnets 53H0, 53H1, 53H2 and 53H3 completes the decoding of the first character of the address code. Each of the other select magnets in Figs. 43 and 53 is selectable in response to each of two-character codes, and, as previously stated, the characters have been indicated on the drawings opposite those select magnets.

At the armatures and front contacts of hold magnets 53H0, 53H1, 53H2 and 53H3, ground is connected through a chain circuit to conductor 53–02 and over that conductor, and conductor 50–14 to the winding of relay 40–FL which operates. This relay provides a locking circuit for the operated ones of relays 50–F1 to 50–F5, traced from the windings of those relays through front contacts and armatures, conductors 50–16 and 50–17, armature 5 and front contact of relay 40–FL, and front contact and armature 9 of relay 40–ON1 to ground. Relay 40–FL establishes a path for holding the hold magnets 52HM1 and 52HM2 operated, traced from conductor 51–01, to which the armatures 3 of relays 50–F3 and 50–F5 are connected, over conductor 50–18, back contact and armature 3 of relay 39TF, conductor 39–02, front contact and armature 3 of relay 40–FL, conductor 40–07, break contacts controlled by armature 4 of relay 49DC, conductor 49–17, and front contact and armature 4 of relay 40–ON1 to ground. This ground connection is also extended from conductor 51–01 through the break contacts of relay 51–OP1, armature and back contact of relay 51BF, back contact and right-hand armature of relay 51BS, conductor 51–02, armature 1 and back contact of relay 49DC, and conductor 49–16 to the winding of relay 40–OP2 to hold that relay operated. At its armature 7 and back contact, relay 40–FL releases relay 50–FC which in turn releases select magnets 52S0 and 52S3. Since the hold magnets in Fig. 52 are held operated by relay 40–FL, the contacts that were prepared by the select magnets and operated by the hold magnets remain operated. At its armature 4, relay 40–FL prepares an energizing circuit for relay 40–FLA, and at its armature 1, it prepares a locking circuit for that relay. At its armature 6, relay 40–FL completes the circuit of relay 49RC, traced from ground on the armature 1 of relay 40–FLA through the back contact associated therewith, front contact and armature 6 of relay 40–FL, conductors 40–08, 49–18, 49–19 and 49–21, and winding of relay 49RC to battery.

At its armature 1, relay 49RC interrupts the locking circuit of relay 49CR which releases. At its armature 2, the relay 49RC interrupts the energizing circuit for distributor clutch magnet 35–21 to cause the arrestment of shaft 35–23 at the end of the revolution then in progress. Relay 49RC establishes an additional locking circuit for relays 50–F1 to 50–F5, traced from conductor 50–16 over conductors 50–19 and 49–22, front contact and armature 4 of relay 49RC to conductor 47–17 which was previously traced through the front contact and armature 4 of relay 40–ON1 to ground.

Relay 49CR releases relays 49DA and 49DB. With these relays released, relay 40–FLA operates and the circuit is traced from battery through the winding of the relay, front contact and armature 4 of relay 40–FL, conductor 40–09, armature 1 and back contact of relay 49DB, and break contacts controlled by armature 4 of relay 49DA to ground. Relay 40–FLA locks through its front contact and armature 3, and armature 1 and front contact of relay 40–FL to ground. It interrupts, at its armature 1, the energizing circuit for relay 49RC which releases.

Relay 49RC, upon releasing, recloses the energizing circuit for transmitter clutch release magnet 35–21, previously traced. The magnet intiates a second revolution of shaft 35–23, transferring the code combination for the character C to the transmitter contacts. Transmitter auxiliary contacts 35–23 again close, energizing relay 49CR which locks and interrupts the circuit of the transmitter clutch release magnet. Distributor clutch trip contacts 35–31 close, energizing distributor clutch release magnet 35–34 and initiating a revolution of distributor shaft 35–37. Distributor auxiliary contacts 35–39 close, completing the circuit of relay 49DA, as before. With relay 40–FLA operated, the relay 49DA operates relay 50–SR, traced from battery through the winding of that relay, conductor 50–21, front contact and armature 2 of relay 40–FLA, conductor 40–03, back contact and armature 12 of relay 49CL, and armature 5 and front contact of relay 49DA to ground. At its armatures 1 to 5, relay 50–SR connects the group of five conductors 38–17 to the windings of relays 50–S1, 50–S2, 50–S3, 50–S4 and 50–S5, and those relays operate in accordance with the code combination transferred to the transmitter code contacts, which is the code combination for the character C having elements 2, 3 and 4 of marking nature, and elements 1 and 5 of spacing nature. Accordingly, relays 50–S2, 50–S3 and 50–S4 operate. Upon the opening of distributor auxiliary contacts 35–39 before shaft 35–37 completes a revolution, the circuit of relay 49DB is completed through the winding of relay 49DA, as before, locking the relay 49DA. Relay 49DB grounds conductor 49–14, and the ground connection is extended from conductor 49–14 over conductor 50–22, front contact and armature 6 of relay 50–SR, to the lower armatures of relays 50–S1 and 50–S2. Relay 50–S1 is unoperated so that the ground connection is extended over conductor 50–23 to the winding of select magnet 42S6, and that magnet operates. The ground connection is extended through the lower armature and front contact of relay 50–S2, conductor 50–24 to the winding of select magnet 42S5 which operates. The two operated select magnets ground conductor 42–01 which extends to the lower armatures of relays 50–S3 and 50–S5. Relay 50–S3 is operated, and the ground connection is extended over conductor 50–26 to the winding of hold magnet 42HM4 which operates. The ground connection is extended through the lower armature and back contact of relay 50–S5, conductor 50–27, and winding of hold magnet 42HM7 which operates.

Hold magnet 42HM4 operates contacts 42–03, 42–04, 42–06, 42–07, 42–08 and 42–09, comprising crossbar switch contact set III, which were prepared by select magnet 42S6, and hold magnet 42HM7 operates contacts 42–11, 42–12, 42–13, 42–14, 42–16 and 42–17, comprising crossbar switch contact set VI, that were prepared by select magnet 42S5. The operated hold magnets 42HM4 and 42HM7 ground the conductor 42–02, which extends through the winding of relay 51–OP1 to conductor 51–03 and thence over conductor 50–28, lower armature and front contact of relay 50–S4 which is operated, conductor 50–29, contacts 42–08 and 42–09, the former extending the path to a crossbar switch vertical associated with unoperated hold magnet 42HM6, and the latter extending the path to contacts 42–12, from which the path continues over conductor 42–18, crossbar switch contacts 43–02 prepared by select magnet 43S9 and operated by hold magnet 53H0, conductors 43–03, 53–03, 52–21 and 49–23 to the winding of discard relay 49DC which operates. Conductor 42–18, which was selected under the cooperative decoding effort of select magnet 42S6 and hold magnet 42HM7, is one of twenty conductors emerging from Fig. 42, and represents the decoding of the character C. The twenty conductors have been designated in Fig. 43 by the characters which they represent, applied to verticals of the crossbar switch in Figs. 43 and 53 to which the conductors are connected. Relay 51–OP1 was included in the energizing circuit of relay 49DC and operates in that circuit to release relay 40–OP2, which was operated in parallel with select magnets 52S0 and 52S3. This stops the timing circuit comprising tube 40–04 and condenser 40–06.

Relay 49DC locks through its front contact and armature 3, conductor 49–24 to conductor 51–03, over which its operating ground was supplied through the winding of relay 51–OP1 by hold magnets 42HM4 and 42HM7. At its armature 1 and back contact, relay 49DC additionally opens the circuit of relay 40–OP2. At its armature 2, the relay 49DC locks select magnets 42S6 and 42S5 in a path traced from the lower armatures of relays 50–S1 and 50–S2, over which the select magnets were energized, conductor 50–31, front contact and armature 2 of relay 40–FL, conductor 40–11, front contact and armature 2 of relay 49DC, conductors 49–26, 49–27, 49–28 and 42–01 to the ground supplied through the armatures of select magnets 42S6 and 42S5. Relay 49DC operates relay 49RC in a circuit through the winding of the latter relay, conductor 49–21, and front contact and armature 5 of relay 49DC to ground. As in the case of the previously-described operation of relay 49RC, it provides a locking circuit for relays 50–F1, 50–F4 and 50–F5 which have remained operated. It also provides a locking circuit for relays 50–S2, 50–S3 and 50–S4, traced through the windings, front contacts and upper armatures of those relays, conductor 50–32, front contact and armature 5 of relay 49RC, conductors 49–15 and 49–17, and front contact and armature 4 of relay 40–ON1 to ground. Relay 49RC interrupts the locking circuit of relay 49CR, which it had previously released, but which was reoperated by the transmitter auxiliary contacts and locked. Relay 49CR releases relays 49DA and 49DB, and the former releases relay 50–SR. Relay 49RC also interrupts the energizing circuit for transmitter clutch release magnet 35–21 to limit the rotation of transmitter shaft 35–22 to the single revolution in which it transferred the code combination representing the character C to the transmitter contacts.

Finally, at its break contacts controlled by armature 4, relay 49DC interrupts the holding circuit for hold magnets 52HM1 and 52HM3 in the first fan circuit, and those magnets release, disconnecting ground from conductor 52–17 which was included in the energizing path for select magnet 43S9, which releases. That magnet disconnects ground from conductors 43–01 and 53–01 over which the four hold magnets 53H0, 53H1, 53H2 and 53H3 were energized. Those magnets release, disconnecting ground from conductor 53–02, over which relay 40–FL was operated. That relay releases, unlocking relay 40–FLA which also releases. Relay 40–FL interrupts, at its armature 2, the circuit for holding select magnets 42S6 and 42S5 operated, and those magnets release. Select magnets 42S6 and 42S5 disconnect ground from the locking circuit of hold magnets 42HM4 and 42HM6, releasing them. The latter magnets unlock relays 49DC and 51–OP1, releasing those relays. Relay 49DC releases relay 49RC, which unlocks relays 50–F1, 50–F4 and 50–F5, discharging the B code combination stored on those relays, and releases relays 50–S2, 50–S3 and 50–S4, discarding the C code combination stored on the latter relays. The latter code combination is still on the transmitter contacts.

With relay 49RC released, the circuit of transmitter clutch release magnet 35–21 is reestablished, in the manner previously described, to initiate another cycle of transmitter shaft 35–23, in the course of which the letters signal following the address code BC will be transferred to the transmitter contacts. Transmitter auxiliary contacts 35–28 reoperate relay 49CR which interrupts the energizing circuit for transmitter clutch magnet 35–21 to limit the rotation of shaft 35–23 to one cycle. Distributor clutch trip contacts 35–21 close to initiate a cycle of distributor shaft 35–37, and during the rotation of that shaft, distributor auxiliary contacts 35–39 close, completing the circuit of relay 49DA, as before. Relay 49DA operates relay 50–FC, also as before, to connect the transmitter contacts to first fan relays 50–F1 to 50–F5. Because the letters code combination has all five elements marking, all five of the relays 50–F1 to 50–F5 operate. Upon the opening of the distributor auxiliary contacts, relay 49DA locks, and relay 49DB operates. The relays 50–F1 to 50–F5 operate select magnets 52S3 and 52S1 and hold magnets 52HM0 and 52HM2 to operate contact groups I and V as indicated in Table A. Because relay 50–F4 is operated, the path of entry to the fan circuits is conductor 50–12, and the path is traced through crossbar switch contacts 52–22 and 52–23 to conductor 52–21. Conductor 52–21 is traced to the winding of discard relay 49DC which operates to initiate the same sequence of operations that it did in response to the decoding of the address code BC, namely the discarding of the letters code combination stored in relays 50–F1 to 50–F5. That code combination replaced the code for the character C on the transmitter contacts and remains on those contacts after the release of relays 50–F1 to 50–F5.

*Selection of outlets for multiple address message*

The next two signals represent the characters B and S which together comprise the address code of a station served by switching center 1–37. The multiple address director circuit decodes these signals in succession and obtains a selection of a single final code point under the joint control of the two-character signals, repeating the sequence of operations that were performed under the control of the address code BC. Contact groups II and VII in Fig. 52 will be operated, in accordance with Table A, to operate select magnet 43S9, and hold magnets 53H0, 53H1, 53H2 and 53H3 will be operated. In Fig. 42 contact groups I and VIII will be operated as indicated in Table A to cause the ground connection on the lower armature of relay 50–S4 to be extended over entry path 50–33 and contacts 42–19 and 42–21, conductor 42–22, crossbar switch contacts 43–04, final code point conductor 43–06, inner upper break contacts of intercept keys 54–01 and 54–02 to conductor 54–09, back contact and armature 2 of relay 63–05, conductor 63–11, armature 2 and back contact of relay 32PR, conductor 32–01, upper armature and front contact of relay 27BM, armature 4 and back contact of relay 27LB2, armature 4 and back contact of relay 27LC2, armature 6 and back contact of relay 27C2, armature 5 and back contact of relay 27B2, armature 1 and back contact of relay 27J2, break contacts controlled by the upper armature of relay 27A2, break contacts controlled by the armature 3 of relay 27LA2 and winding of that relay to battery. Relay 27BM, through the upper armature and front contact of which the path was traced, is assumed to be operated because the last message addressed to a station served by the trunk was routed to the upper level, and the relay 27BM was operated and locked to cause the routing of the next message to the lower level.

Relay 27LA2 locks through its front contact and armature 3, and through the armature 1 and back contact of relay 27LB2 to ground. At its armature 6, it interrupts the locking circuit for relay 22BR which releases, to cause the next message from one of the regular director circuits to be routed to the upper level contained in Figs. 20 to 22. Relay 27LA2 completes the circuit of relay 27LD2, traced from battery through the winding of the latter relay, armature 2 and front contact of relay 27LA2, to the same path over which relay 27LA2 was operated. Relay 27LD2 locks through its front contact and armature 2, conductors 27–03 and 32–02, armature 3 and back contact of relay 63–05, conductor 63–12, winding of relay 51–OP1, conductor 42–02, and front contacts and armatures of hold magnets 42HM4 and 42HM7 in series to ground. Relay 27LD2 connects the grid of signal repeating tube 27–04, which operates in the same manner as tube 22–11, to repeat signals to reperforator 25–01, over the front contact and armature 4 of the relay to conductor 27–06 which is included in a group bracketed to Fig. 41, in which conductor 27–06 appears as one of the verticals of a crossbar switch by means of which the multiple address circuit gains access to the various outlets, this switch being entirely independent of the crossbar switch in Fig. 70 through which regular directors gain access to the outlets.

Relay 27LA2 also operates relay 27LE2, from ground through the front contact and armature 4 of relay 27LA2 to the winding of relay 27LE2. Relay 27LE2 connects ground through its armature 2 and front contact to conductor 27–07 which is one of the group of conductors bracketed to Fig. 41, in which conductor 27–07 reappears, and continues to the winding of hold magnet 41–03. Select magnet 41–01 was operated by relay 38SM, as previously described, so that when hold magnet 41–03 operates under the control of relay 27LE2 the crossbar switch contacts common to the select magnet and hold magnet operate. Hold magnet 41–03 connects ground over its lower armature and front contact, conductor 41–04 in a group of conductors bracketed to Fig. 27, in which conductor 41–04 reappears, and thence over conductors 27–08 and 27–09, front contact and armature 1 of relay 27LD2, upper armature and back contact of relay 27BC2 and winding of relay 27BC1 to battery, and the latter relay operates. It prepares a locking circuit through its front contact and armature 2, the winding of relay 27BC2, conductor 27–11, front contact and armature 3 of relay 27LE2, and armature 3 and back contact of relay 27LC2 to ground. The locking circuit is not effective while the energizing circuit is maintained through the front contact and armature 1 of relay 27LD2 because the winding of relay 27BC2 is short-circuited. Relay 27BC1 establishes a circuit traced from the ground to which it will ultimately lock at the back contact associated with the armature 3 of relay 27LC2 through those contacts, armature 3 and front contact of relay 27LD2, armature 1 and front contact of relay 27BC1, lower armature and back contact of relay 27BC2, conductor 27–12, armature 6 and back contact of relay 63–05, conductors 63–13 and 63–14 and winding of trunk transmission start relay 49STT to battery, and that relay operates.

Relay 49STT relates to a feature disclosed in Bacon et al. Patent 2,766,318. That feature relates to the generation and transmission of a routing code or switching center identifying code when a multiple address message must be retransmitted over a trunk circuit to a remote switching center in order to reach an addressed station. A multiple address message is always handled at all points in the system as a multiple address message even though it may be retransmitted over a trunk to a remote switching center for further retransmission to a single addressed station served by that switching center or to still another switching center so that when it reaches such remote switching center or centers it is, in effect, a single address message. It has been set forth that the address code BC used by any station served by a switching center to route a multiple address message into the multiple address circuit at that switching center is discarded under the control of relay 49DC upon the decoding of that code by the multiple address circuit. The same address code, such as BC, is used by any outlying station to route a multiple address message into the multiple address circuit of the switching center serving that station. Since the code is discarded, it is necessary for the switching center to generate and retransmit, when seizing a trunk circuit, a routing or switching center identification code which is effective, upon being received at any other switching center, to direct the message into the multiple address circuit at such other switching center in the same manner that messages are so directed that have originated with outlying stations and are preceded by the address code BC. The routing code serves the additional purpose, in the case of group codes, as described in the Bacon et al. patent, of preventing revertive transmission of a message addressed by a group code to a switching center which has received and retransmitted the message, and preventing the retransmission of a message to a switching center by more than one other switching center. The operation of relay 49STT initiates the generation and retransmission of the office identification code. Had an outgoing line been seized instead of a trunk, line transmission starting relay 49STL would have been operated instead of relay 49STT, as will be described hereinafter.

Relay 49STT interrupts, at its armature 1 and back contact, the circuit of transmitter clutch release magnet 35–21. It connects ground through its armature 3 and front contact, and conductors 48–18, 49–19 and 49–21 to the winding of relay 49RC. Relay 49RC repeats operations previously described, namely the release of relays 49DA and 49DB, the former releasing relay 50–SR. Relay 49STT operates relay 51–AC in a circuit traced from battery through the winding of the latter relay, conductors 51–04 and 51–06, back contact and armature 1 of relay 40–RS, conductor 40–12, front contact and armature 7 of relay 49STT to ground. The winding of relay 40–AE is also connected to the back contact associated with armature 1 of relay 40–RS, and relays 51–AC and 40–AE both operate.

Armatures 1 to 5 of relay 51–AC are connected to a group of five conductors 51–07 which, as represented by dot-and-dash lines 51–08 and 38–22, extend to armatures 6 to 10 of relay 38G. From the corresponding front contacts of relay 38G, a group of five conductors 38–23 connects to a group of five conductors 38–24. Conductors 38–24, represented by dot-and-dash line 38–26, extend to the distributor contacts operable by distributor shaft 35–37. The front contacts of relay 51–AC extend paths through armatures 1 to 5 and back contacts of relay 51–AD and armatures 1 to 5 of relay 51–PR to associated back contacts. The back contacts of armatures 1, 4 and 5, corresponding to the code combination having elements 1, 4 and 5 of marking nature which represents the character B, are connected to conductor 51–08, from which a path extends over conductors 50–34 and 38–27, front contact and armature 23 of relay 38G, and conductor 38–28 to armature 1 of relay 38BL. That armature is also connected to the common return path for the transmitter contacts in Fig. 35. Relay 51–AC thus codes the first character of the office or routing code on the distributor contacts.

Relay 38BL operates about the same time as relay 51–AC, in a circuit traced from battery through the winding of relay 38BL, conductors 38–29 and 37–16, back contact and armature 5 of relay 36H, conductor 36–33, armature 16 and front contact of relay 38G, conductors 38–30, 49–29 and 49–31, and the front contact and armature 5 of relay 49STT to ground. Relay 38BL connects the marking potential for cross-office transmission through its armature 1, and thus to the distributor contacts. The distributor contact common or return path is traced over conductor 35–46, make contacts 2 controlled by armature 1 of relay 38BL to negative battery, and through make contacts 3 controlled by the same armature, conductor 38–31 included in the group bracketed to Fig. 41, in which conductor 38–31 reappears, one of the crossbar switch contacts closed by select magnet 41–01 and hold magnet 41–03 to conductor 27–06, over which a path has been extended, as previously traced, to the grid of signal repeating tube 27–04.

Relay 40–AE, previously described as operated by relay 49STT, operates distributor clutch release magnet 35–34, over a path from the winding of the magnet, conductors 35–33 and 35–47, right-hand armature and front contact of relay 38BL, armature 15 and front contact of relay 38G, conductor 38–32, back contact and armature 1 of relay 39TA, conductors 39–03, 39–04 and 40–13, armature 3 and front contact of relay 40–AE, and back contact and armature 4 of relay 40–DIS to ground.

Shaft 35–37 is released and begins to rotate, closing the distributor contacts in succession. During the closure of the distributor contacts, representing code elements 1, 4 and 5, the marking battery is connected through to the grid of tube 27–04, impressing a marking signal on selector magnet 25–02 of reperforator 25–01. When the marking battery is withheld at the back contacts associated with armatures 2 and 3 of relay 51PR, only the spacing battery of negative polarity is connected through to the grid of tube 27–04, and a spacing signal is impressed on reperforator 25–01. During the rotation of shaft 35–37, distributor auxiliary contacts 35–39 close and connect ground over conductors 35–41, 36–32 and 37–12, armature 17 and front contact of relay 38G, conductors 38–16, 49–09 and 49–11, armature 1 and back contact of relay 49STL, armature 2 and front contact of relay 49STT, conductors 49–32 and 49–33, armature 2 and back contact of relay 39TB, and winding of relay 39TA to battery. Relay 39TA establishes a connection through its front contact and armature 2 and a resistor to battery in parallel with its own winding to slow its release, and interrupts, at its armature 1, the energizing circuit for distributor clutch release magnet 35–34 which arrests shaft 35–37 at the end of one revolution. Relay 39TA prepares a locking circuit for itself including in series the winding of relay 39TB, traced through the front contact and armature 3 of relay 39TA, the winding of relay 39TB, conductors 39–06, 39–07 and 39–08, back contact and armature 3 of relay 40–DIS, conductors 40–14 and 49–34, and front contact and armature 3 of relay 49RC to ground, that relay having been operated by relay 49STT. Upon the opening of the distributor auxiliary contacts before shaft 35–37 comes to rest, the ground from which relay 39TA was energized is disconnected and relay 39TA locks over the circuit just traced, relay 39TB operating in that circuit.

Relay 39TB operates relay 51–AD over a circuit from the winding of that relay, conductor 51–09, armature 4 and front contact of relay 40–AE, conductor 40–16, and front contact and armature 3 of relay 39TB to ground.

Relay 51–AD locks through its front contact and armature 6 to the energizing circuit for relay 51–AC, specifically through conductor 51–04 to conductor 51–06. Relay 51–AD disconnects the group of five conductors 51–07 from the armatures 1 to 5 of relay 51PR and connects them instead to the front contacts associated with its common armatures 1 to 5. The first and second of those front contacts are connected to conductor 51–08, and the remaining three are unconnected. The effect of this is to code on the distributor contacts the code combination for the character A, having elements Nos. 1 and 2 of marking nature and elements Nos. 3, 4 and 5 of spacing nature. This is the second of the two characters comprising the office designating code, the characters being BA, which are indicated in Fig. 1 as the routing code which the switching center transmits to remote switching centers as a multiple address office identification or routing code. Another office identification or routing code associated with the same outgoing trunk channels in Fig. 1 is the code PA which is used as an office identification code to accompany urgent or priority messages, as will be described hereinafter.

Relay 39TB reoperates distributor clutch release magnet 35–34 by extending its energizing circuit, previously traced to include conductor 38–32, over conductors 39–09, 39–11 and 39–12, back contact and armature 1 of relay 49CL, conductor 49–36, back contact and armature 2 of relay 39TC, and front contact and armature 4 of relay 39TB to ground. Distributor shaft 35–37 operates to transmit the second character of the routing code to reperforator 25–01. Distributor auxiliary contacts 35–39, upon closing, connect ground over conductors 35–41, 36–32 and 37–12, armature 17 and front contact of relay 38G, conductors 38–16, 49–09 and 49–11, armature 1 and back contact of relay 49STL, armature 2 and front contact of relay 49STT, conductors 49–32 and 49–33, armature 2 and front contact of relay 39TB, armature 1 and back contact of relay 39TD, and winding of relay 39TC to battery. Relay 39TC operates, connects a resistor in shunt with its winding to impart a slow-release characteristic, and prepares a locking circuit through the winding of relay 39TD to the locking circuit for relays 39TA and 39TB which includes conductors 39–07 and 39–08. Relay 39TC interrupts, at its armature 2 and back contact, the energizing circuit for distributor clutch release magnet 35–34, and shaft 35–37 is arrested at the end of one revolution. Before the shaft comes to rest the distributor auxiliary contacts 35–39 open, rendering effective the locking circuit for relay 39TC, in which relay 39TD operates.

Relay 39TD establishes an energizing circuit for relay 51–AF, traced through the winding of the latter relay, armature 7 and front contact of relay 51–AD, conductor 51–11, front contact and armature 4 of relay 39TD, conductors 39–18 and 39–13, and front contact and armature 6 of relay 49STT to ground. Relay 51–AF operates and locks through its front contact and armature 6 to conductor 51–06. The front contacts associated with armatures 1 to 5 of relay 51–AF are connected to the front contacts associated with armatures 1 to 5 of relay 51–AC. Armatures 1 to 5 of relay 51–AF are connected over conductor 51–12 to conductor 51–08, thus connecting all of the conductors 51–07 to conductor 51–08 and thereby coding on the distributor contacts the letters signal in which elements 1 to 5 are of marking nature. This code combination masks the code combination impressed on conductors 51–07 at the armatures 1 to 5 of relay 51–AD so that the fact that the latter relay remains locked has no effect on the code combination impressed on the distributor contacts. Relay 39TD reestablishes an energizing circuit for distributor clutch release magnet 35–34, including conductors 38–32, 39–09, 39–11 and 39–14, front contact and armature 5 of relay 40–AE, conductor 40–17, armature 2 and back contact of relay 39TE, armature 2 and front contact of relay 39TD and conductors 39–16 and 39–01, front contact and armature 13 of relay 38G, conductors 38–13 and 37–01, back contact and armature 8 of relay 37TX, armature 1 and back contact of relay 37AL, armature 3 and back contact of relay 37DS, and conductor 35–19 to the closed transmitter stop contacts 35–18. Shaft 35–37 is set in rotation and transmits a letters signal following the office designating code BA.

During the cycle of distributor shaft 35–37 in which the letters signal is transmitted, the distributor auxiliary contacts 35–39 close and connect ground over a path previously traced to armature 1 of relay 39TD. The ground is extended through the front contact associated with that armature to the winding of relay 39TE which operates. At its armature 2, relay 39TE interrupts the energizing circuit for distributor clutch release magnet 35–34 to cause shaft 35–37 to be arrested at the end of a cycle. At its armature 3, the relay 39TE connects a resistor in shunt with its winding to impart a slow-release characteristic. At its armature 4, the relay 39TE prepares a locking circuit for itself traced through conductor 39–17, armature 2 and front contact of relay 40–AE, winding of relay 40–TG, conductor 40–18, front contact and armature 2 of relay 39TC, and front contact and armature 4 of relay 39TB to ground. When the distributor auxiliary contacts open, the locking circuit becomes effective and relay 40–TG operates. Relay 40–TG operates relay 40–DIS which locks through its armature 1 and front contact, conductors 40–19 and 39–13, and front contact and armature 6 of relay 49STT to ground.

At its armature 3 and back contact, relay 40–DIS disconnects ground from conductor 39–08 thereby interrupting the locking circuits for relays 39TA, 39TB, 39TC, 39TD, 39TE and 40–TG and those relays release, the relays 39TA, 39TC and 39TE releasing slowly. When the six relays have released, the relay 40–RS operates in a circuit traced from its winding through the front contact and armature 2 of relay 40–DIS, armature 1 and back contact of relay 40–TG, conductor 40–21, back contact and armature 1 of relay 39TE, armature 1 and back contact of relay 39TC, back contact and armature 1 of relay 39TB, armature 4 and back contact of a relay 39TA, back contact and armature 4 of relay 39TD and conductor 39–18 to conductor 39–13 which is grounded through the front contact and armature 6 of relay 49STT. Relay 40–RS locks through its front contact and armature 2 to conductor 40–19 over which relay 40–DIS is locked. It interrupts, at its armature 1 and back contact, the energizing circuits of relays 40–AE and 51–AC and the locking circuits of relays 51–AD and 51–AF, and those relays release. With relay 40–AE released, the relay 51–TS operates in a circuit traced from its winding over conductor 51–13, back contact and armature 7 of relay 39TB, conductor 39–19, armature 3 and front contact of relay 40–RS, and back contact and armature 6 of relay 40–AE to ground.

Figure 50:
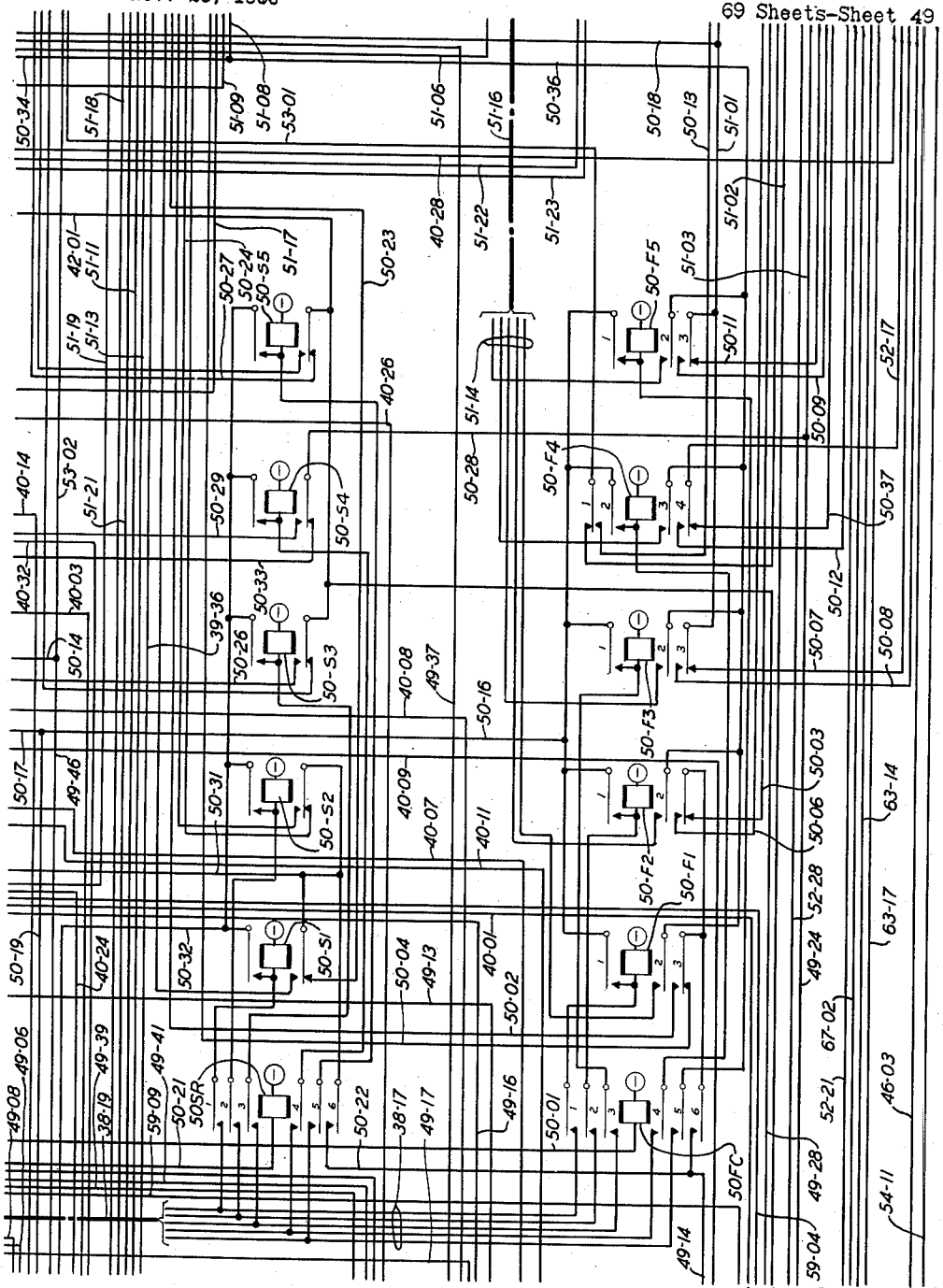
Figure 51:
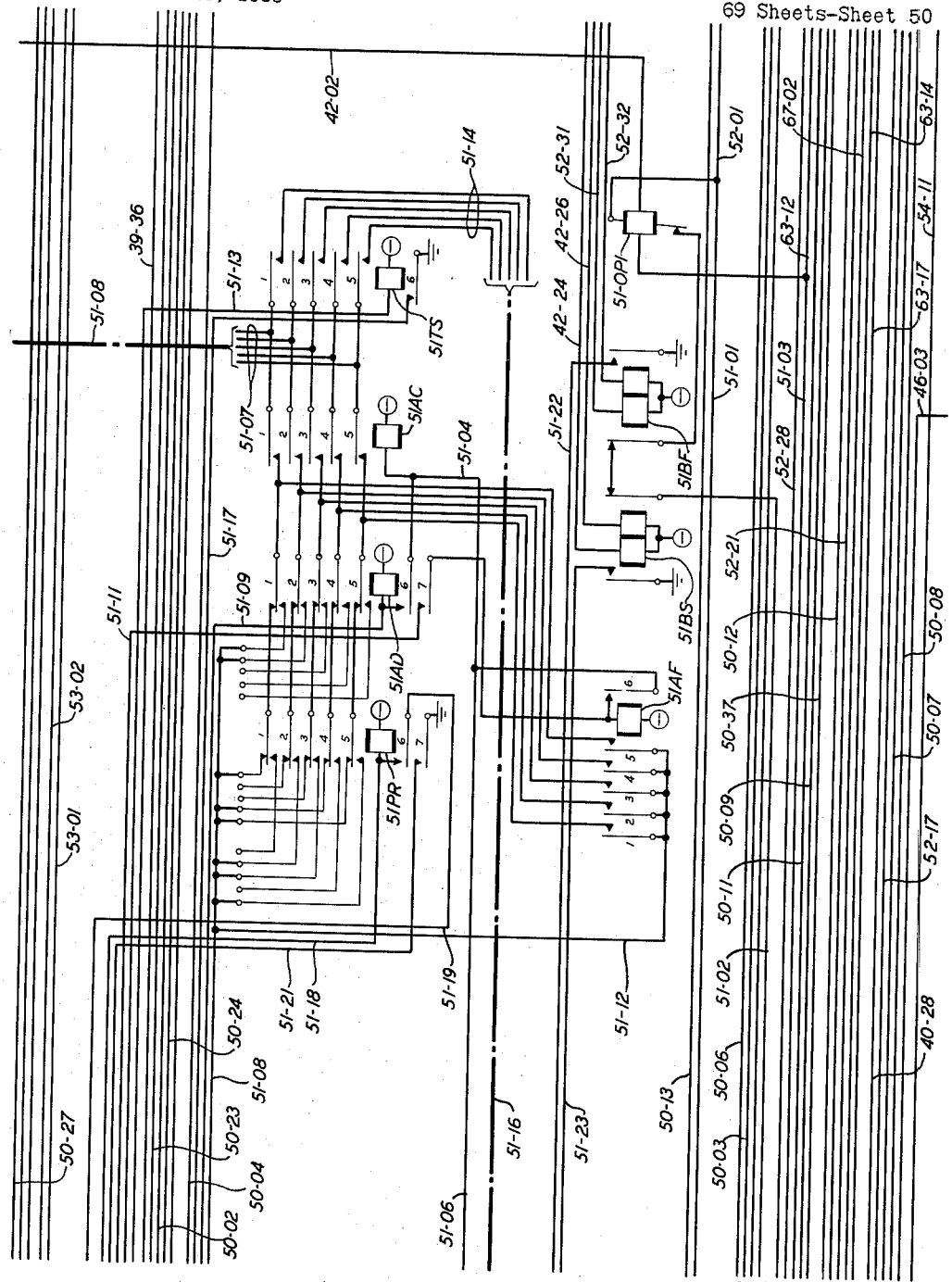

At its armatures 1 to 5, the relay 51–TS connects the group of five distributor contact conductors 51–07 to a group of five conductors 51–14, which are represented as a group by dot-and-dash line 51–16, extending to Fig. 50 where four of the five conductors are connected to the front contacts associated with the armatures 2 of relays 50–F1, 50–F2, 50–F3, and 50–F5, and one is connected to the front contact associated with armature 3 of relay 50–F4. It will be remembered that the latter relays are energized in accordance with the first character of the address code BS of a station served by switching center 1–37, and accordingly relays 50–F1, 50–F4 and 50–F5 are operated. The paths are extended through the aforementioned armatures of those three relays and over conductor 50–36 to conductor 50–34, over which a path has previously been traced to armature 1 of relay 38BL. Relay 51–TS thus codes on the distributor contacts the signal representing the first character of the address code which is stored on the first fan circuit relays 50–F1 to 50–F5. Relay 51–TS connects ground through its armature 6 and front contact, conductors 51–17, 39–04 and 39–03, armature 1 and back contact of relay 39TA, conductor 38–32, front contact and armature 15 of relay 38G, front contact and armature 4 of relay 38BL, and conductors 35–47 and 35–33 to the winding of distributor clutch release magnet 35–34 which operates. Distributor shaft 35–37 operates to transmit to reperforator 25–01 the code signal stored on relays 50–F1 to 50–F5. During the transmission of the code combination, distributor auxiliary contacts 35–39 close and again operate relay 39TA. This relay restricts distributor shaft 35–37 to a single revolution by interrupting the circuit of magnet 35–34. When the distributor auxiliary contacts open, relay 39TB operates in the locking circuit for relay 39TA. Relay 39TB interrupts, at its armature 7, the energizing circuit for relay 51–TS. It completes the energizing circuit for relay 38TR, the circuit being traced from the winding of the latter relay over conductor 38–33, armature 8 and back contact of relay 37D, conductors 37–17 and 37–18, front contact and armature 19 of relay 38G, conductors 38–34 and 39–21, back contact and armature 1 of relay 40–AE, conductors 40–22 and 39–22, and front contact and armature 6 of relay 39TB to ground. Relay 38TR interconnects conductor groups 35–42 and 38–24, thereby connecting the transmitter contacts in Fig. 35 to the distributor contacts, to code on the latter contacts the second code combination of the address code BS, which is stored on the transmitter contacts. In addition to operating relay 38TR, relay 39TB reoperates distributor clutch magnet 35–34 to cause the second code combination of the address code to be transmitted to reperforator 25–01.

During the transmission of that code combination the distributor auxiliary contacts operate relay 39TC which releases the distributor clutch magnet. When the distributor auxiliary contacts open, relay 39TC locks, and relay 39TD operates in the locking circuit. Relay 39TD now operates transmitter clutch magnet 35–21 in a circuit traced from the winding of that magnet over conductor 35–24, armature 4 and back contact of relay 36TO, back contact and armature 3 of relay 36LT3, conductors 36–29 and 37–11, armature 14 and front contact of relay 38G, conductors 38–12 and 49–02, back contact and armature 1 of relay 49CR, conductors 49–03 and 49–37, back contact and armature 5 of relay 40–AE, conductor 40–17, armature 2 and back contact of relay 39TE, armature 2 and front contact of relay 39TD, conductors 39–16 and 39–01, front contact and armature 13 of relay 39G, conductors 38–13 and 37–01, back contact and armature 8 of relay 37TX, armature 1 and back contact and armature back contact of relay 37AL, back contact and armature 3 of relay 37DS and conductor 35–19 to contacts 35–18 through which ground is supplied. In addition to operating the transmitter clutch release magnet 35–21, relay 39TD operates relay 49CRA through the left-hand winding of that relay, conductor 49–38, armature 3 and front contact of relay 39TD, conductor 39–23, and front contact and armature 7 of relay 40–ON1 to ground. Relay 49CRA performs no function that is immediately of interest.

Transmitter shaft 35–23, set in operation by clutch magnet 35–21, causes the transfer of the letters signal following the address code BS to the transmitter contacts. Transmitter auxiliary contacts 35–28 close and complete the circuit of relay 49CR which operates and locks through its front contact and armature 3, and the armature 1 and front contact of relay 49CRA to conductor 49–38 over which the latter relay was operated. Relay 49CR locks relay 49CRA through the front contact and armature 4 of relay 49CR and the right-hand armature and front contact and right-hand winding of relay 49CRA. Relay 49CR also releases transmitter clutch magnet 35–21. Shaft 35–23 closes distributor clutch trip contacts 35–31, causing distributor clutch magnet 35–34 to be operated to initiate the transmission of the letters signal to reperforator 25–01. Incident to the operation of distributor shaft 35–37, the distributor auxiliary contacts 35–39 close and complete the circuit of relay 39TE which operates. When the distributor auxiliary contacts open relay 39TE locks, this time including the winding of relay 39TF instead of relay 40–TG, because relay 40–AE is not operated. The locking circuit is traced over conductor 39–17, armature 2 and back contact of relay 40–AE, conductor 40–23, and winding of relay 39TF to conductor 39–08 over which relays 39TA, 39TB, 39TC and 39TD are locked.

Figure 52:
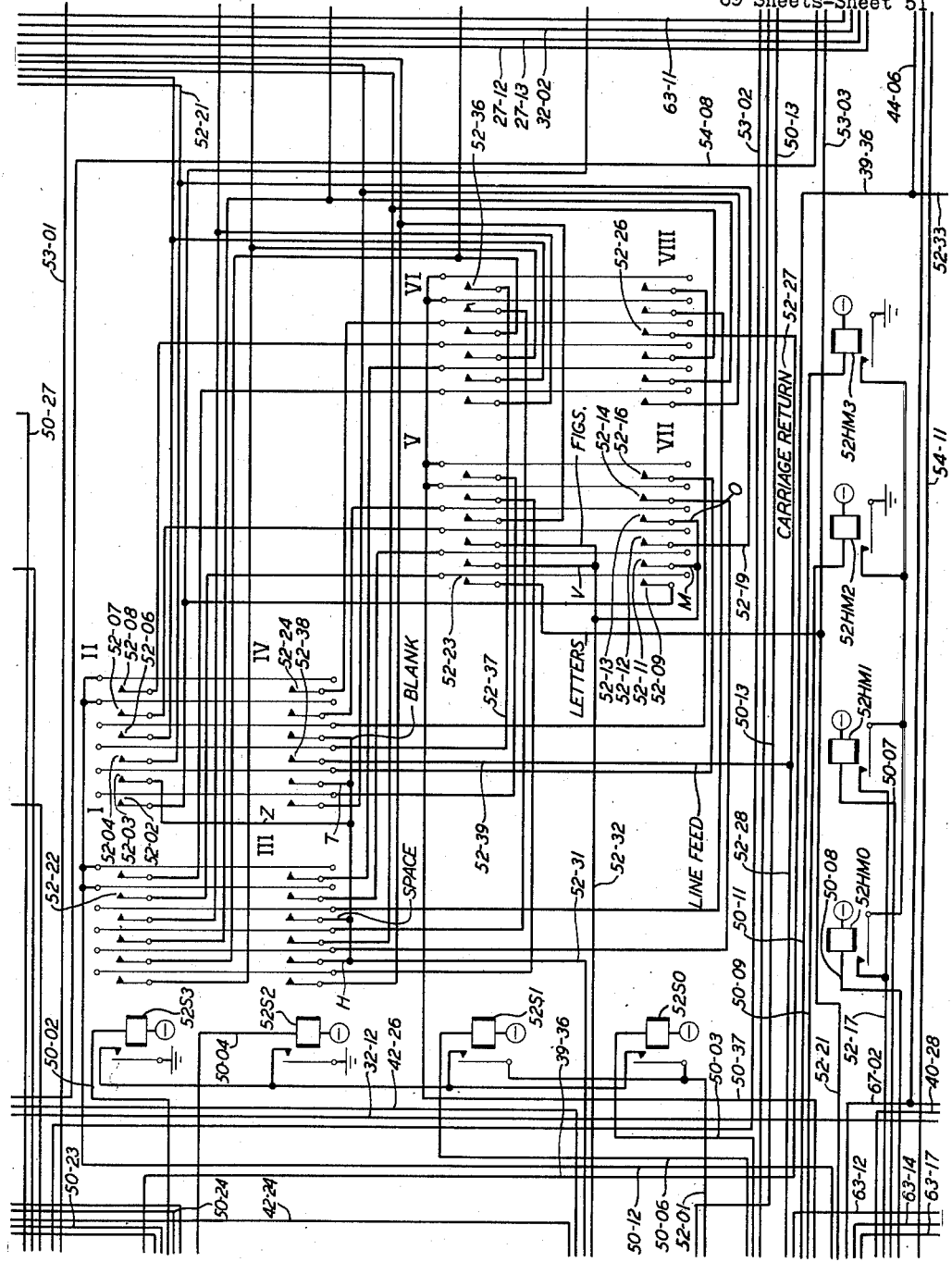
Figure 53:
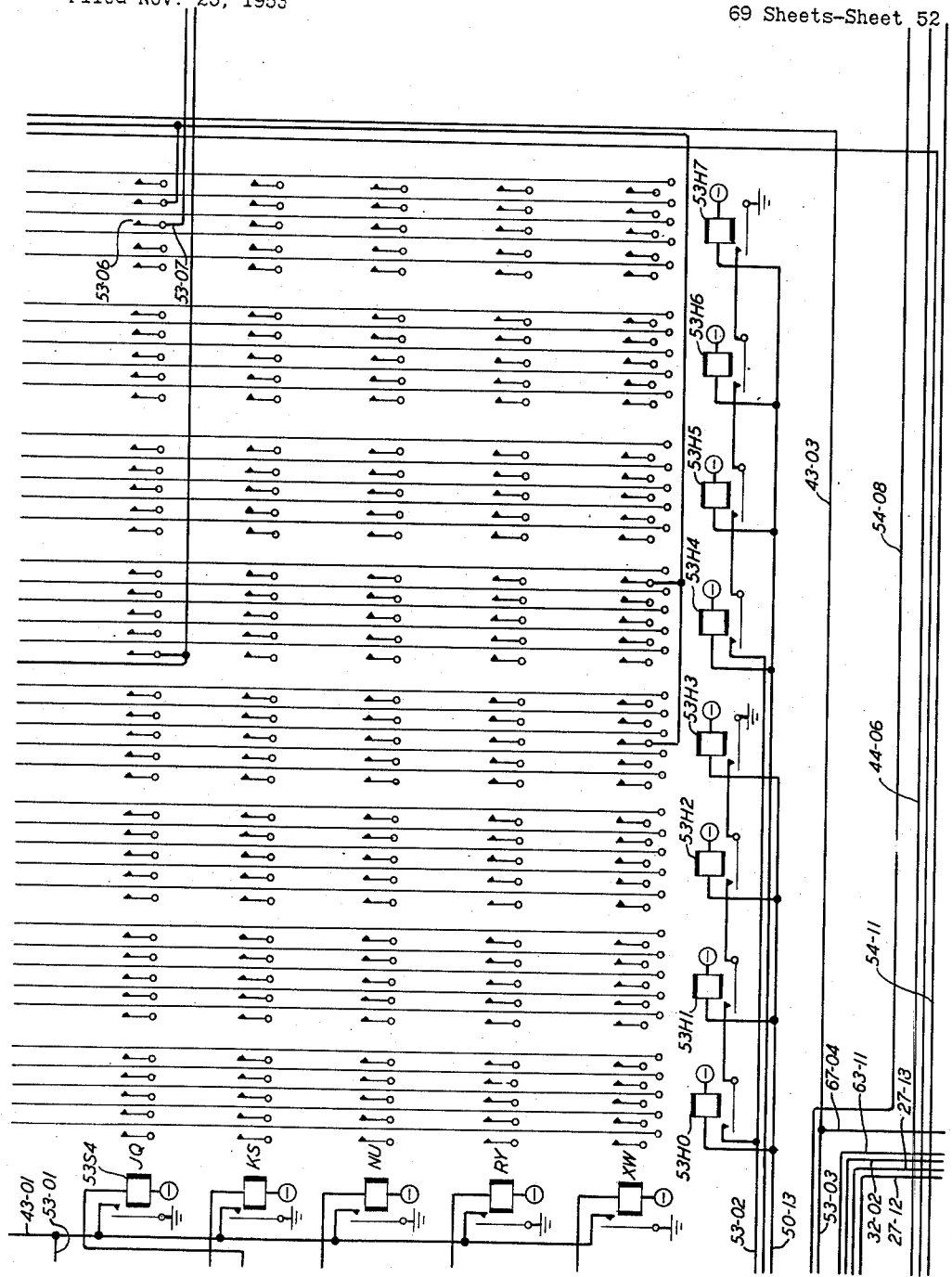
Figure 54:
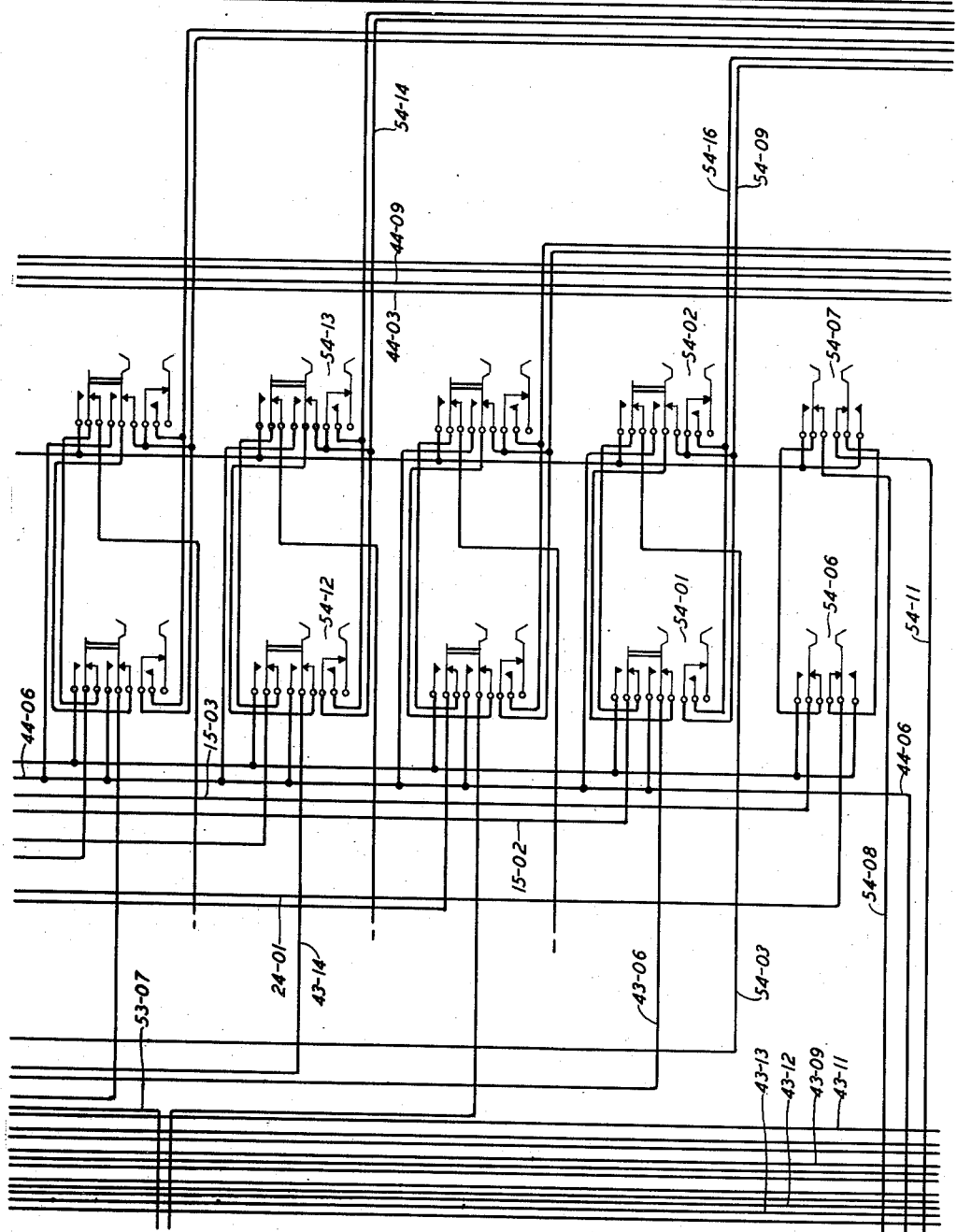
Figure 55:
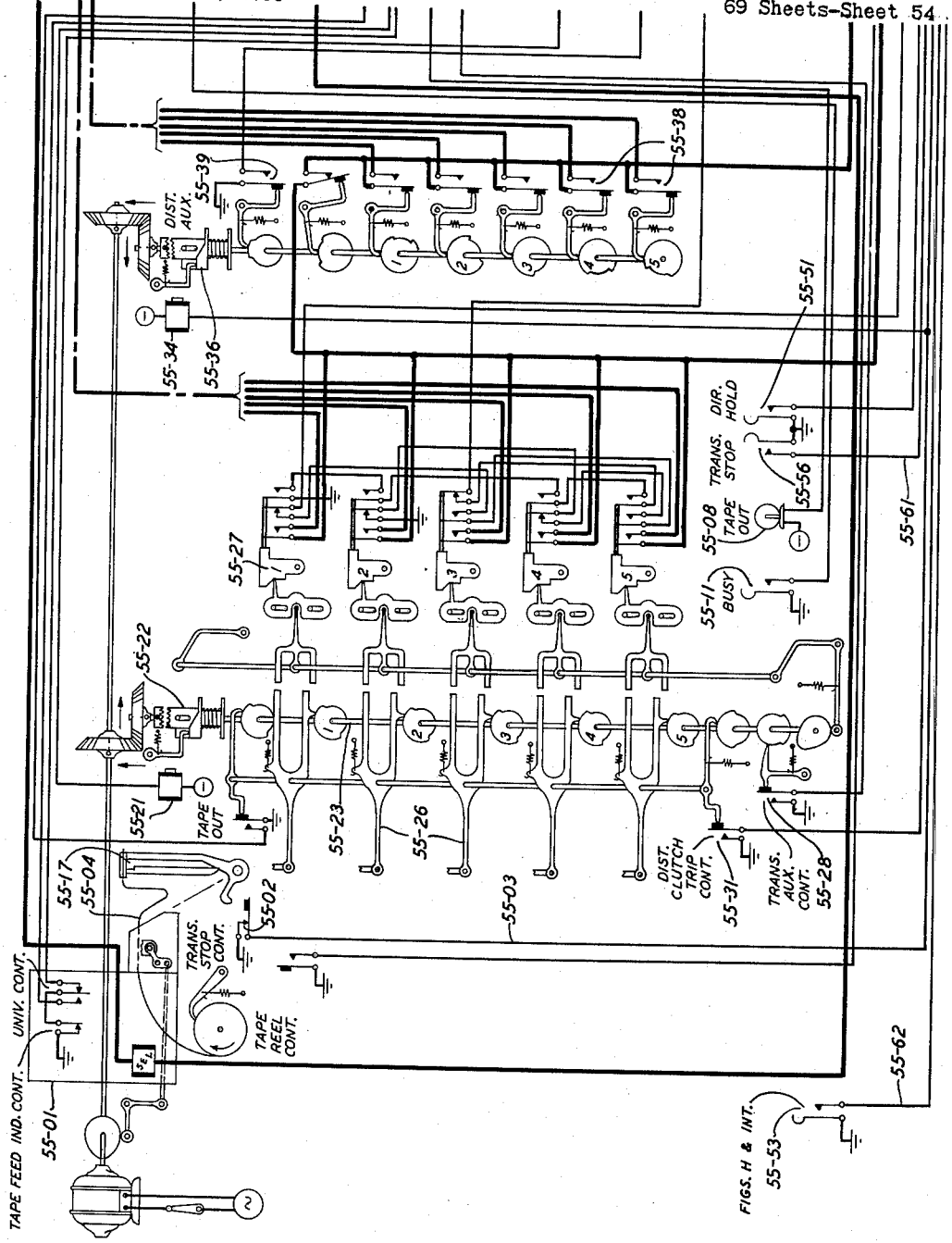
Figure 56:
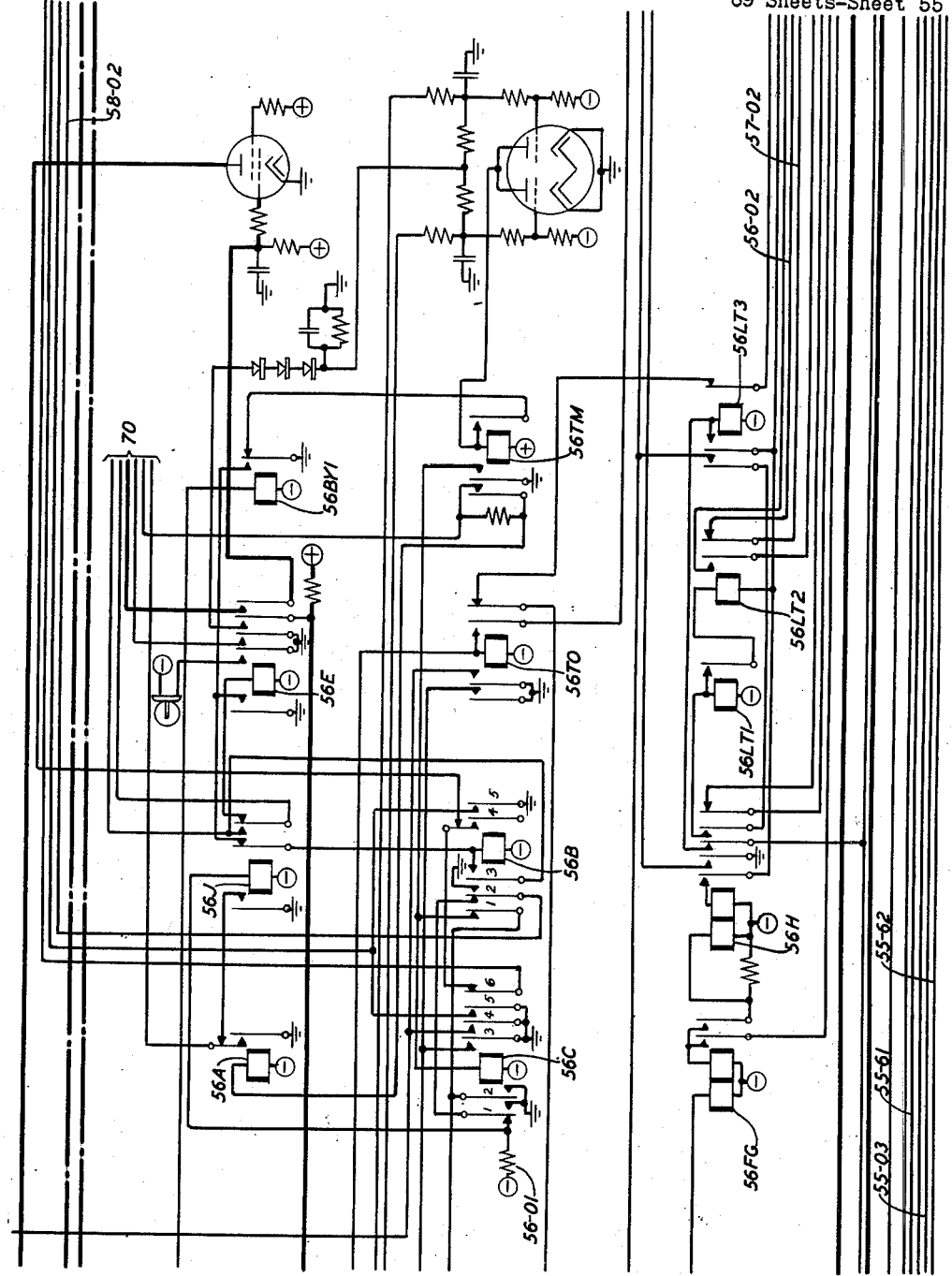
Figure 57:
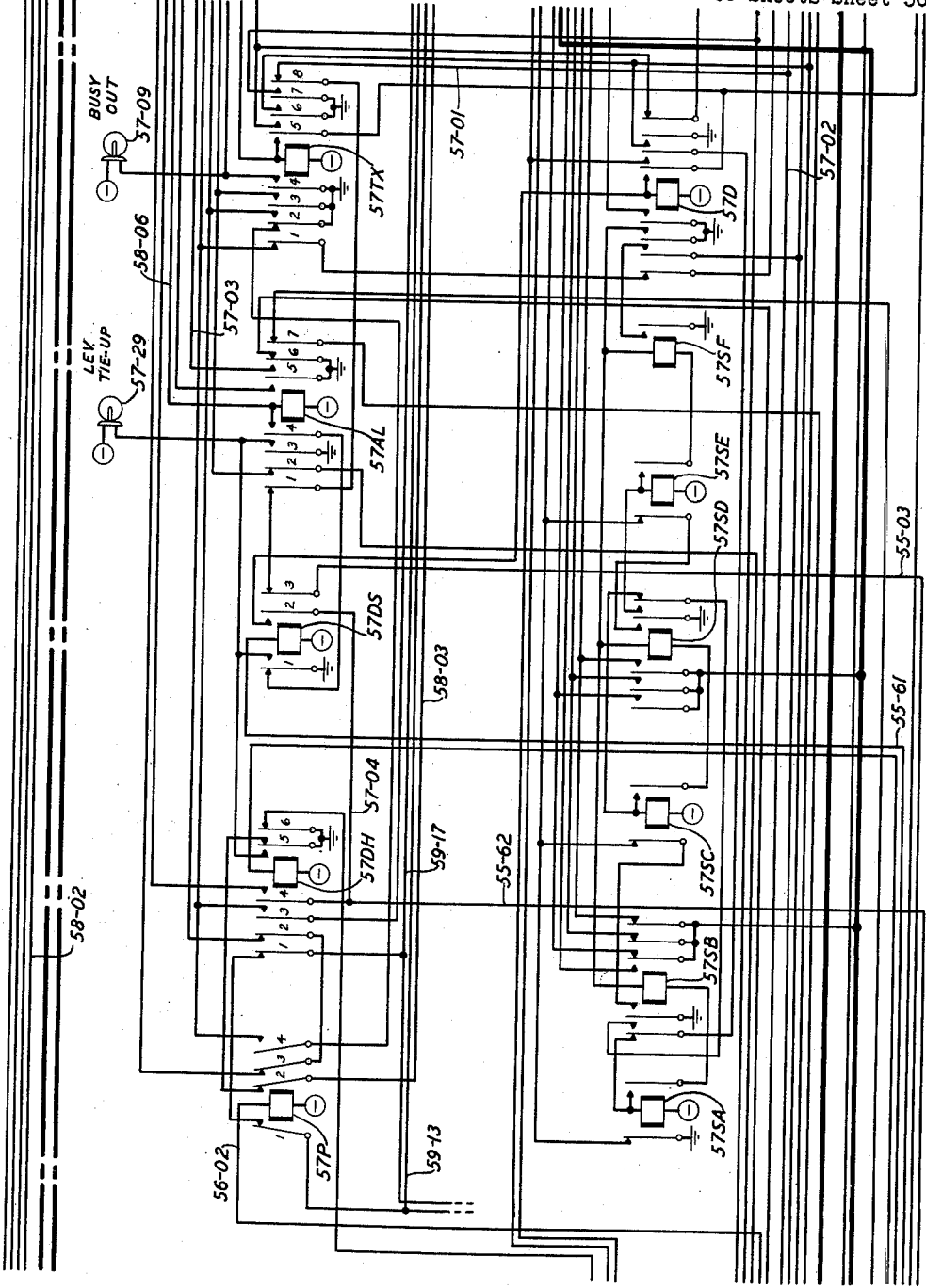
Figure 58:
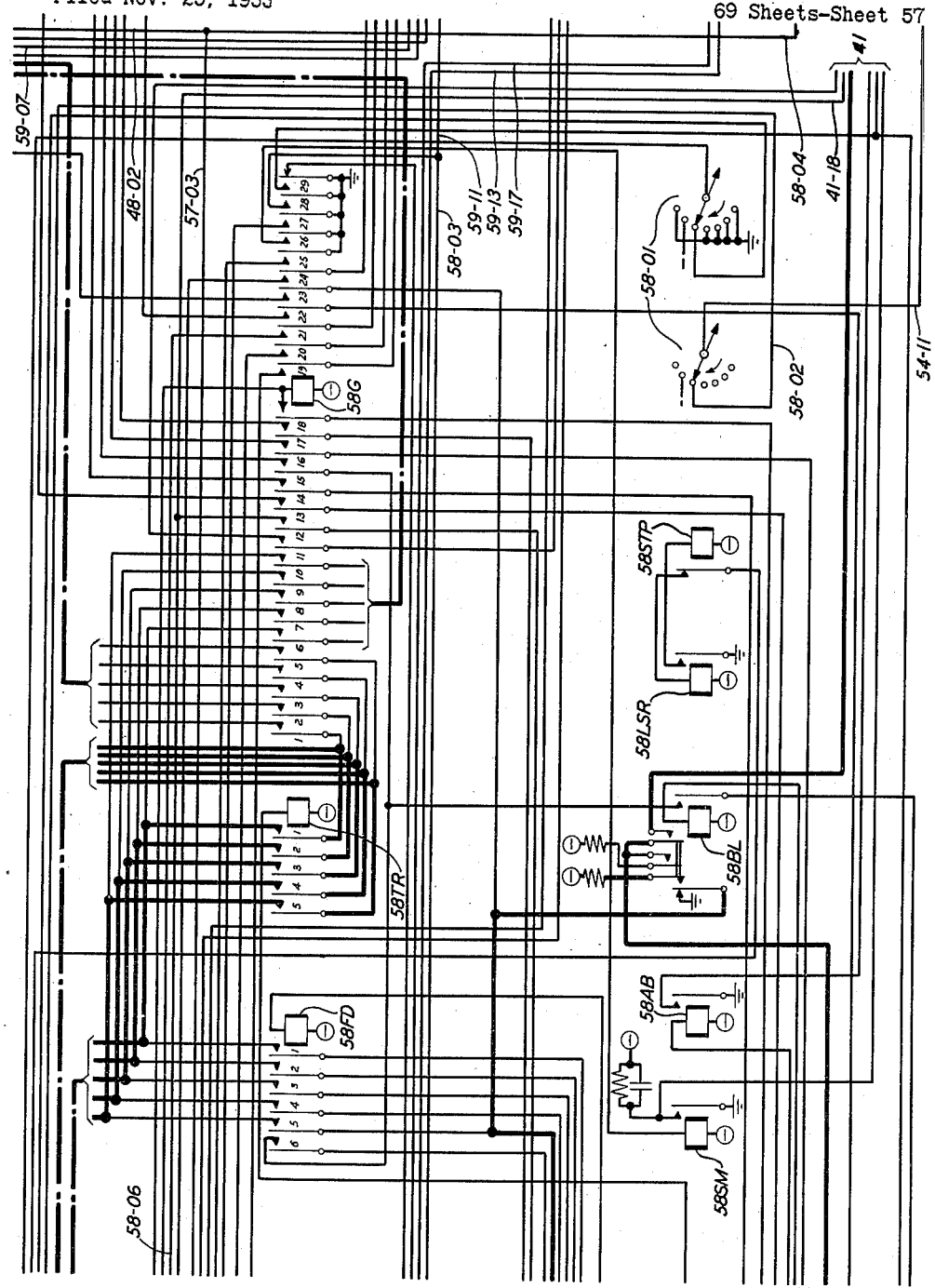
Figure 59:
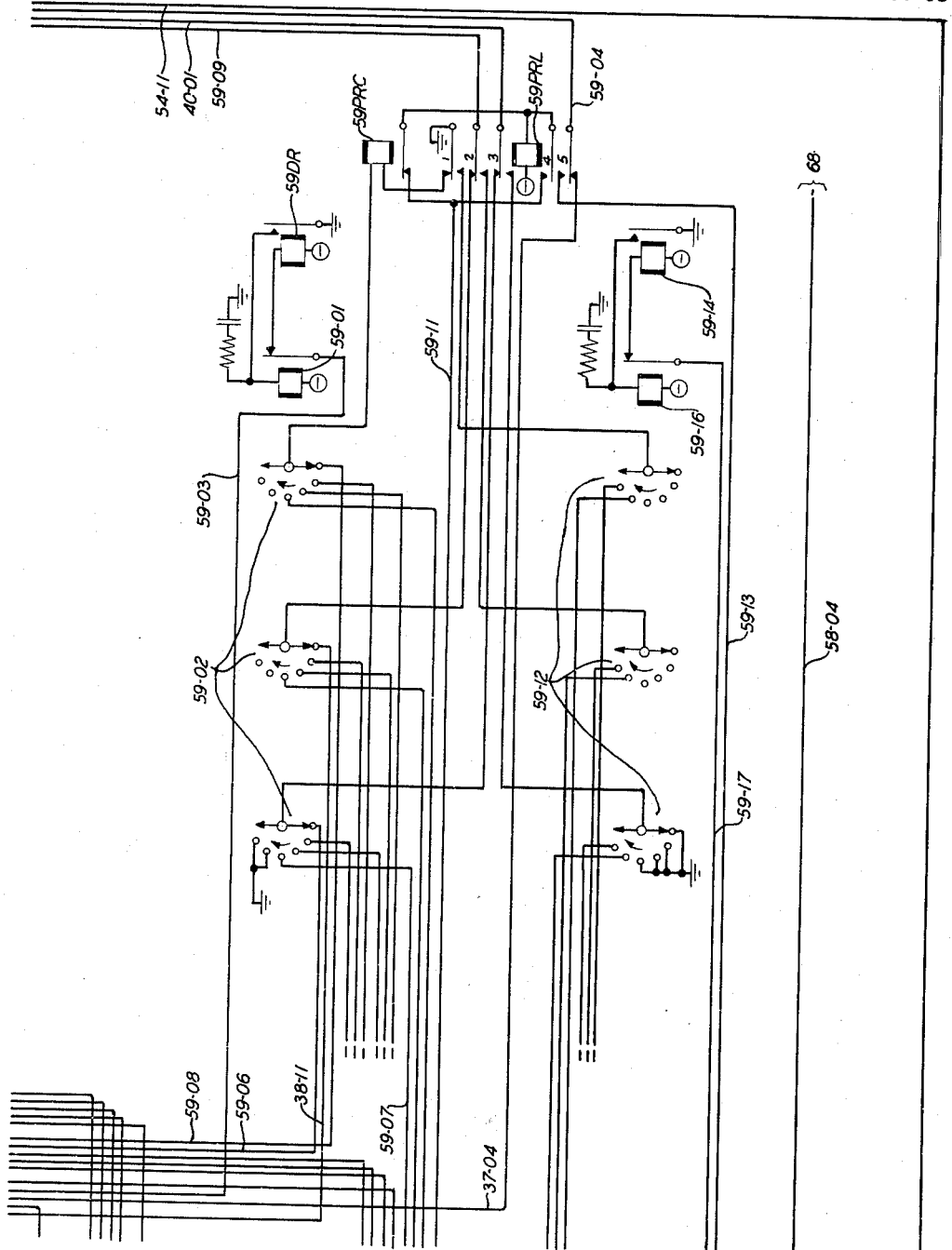

During the transmission of the office identification code and the station address code, the hold magnets in Figs. 42, 52 and 53 have remained operated. This has been the case because a locking circuit has been maintained for relays 50–F1 to 50–F5, that circuit being traced through their front contacts and locking armatures, conductors 50–16 and 50–17, armature 5 and front contact of relay 40–FL, and front contact and armature 9 of relay 40–ON1 to ground. With relay 39TF operated, the circuits of hold magnets 52HM1 and 52HM2 are interrupted, these magnets having the common portion of their circuits traced from the armature 3 of relays 50–F3 and 50–F5 over conductor 50–18 extending upwardly from conductor 51–01 at the right-hand side of Fig. 50, to the back contact associated with armature 3 of relay 39TF where the circuit is now interrupted. These hold magnets, upon releasing, disconnect ground from conductor 52–17 which is in the energizing circuit for select magnet 43S9, and that magnet 43S9 removes ground from conductor 53–01 which is included in the energizing circuit of hold magnets 53H0, 52H1, 53H2 and 53H3, and those magnets release.

The hold magnets disconnect ground from conductor 53–02, thereby releasing relay 40–FL. The relay interrupts the locking circuit of relay 40–FLA which also releases, and disconnects ground from the lower armature of relays 50–S1 and 50–S2 thereby releasing select magnets 42S6 and 42S5. With the select magnets released, ground is disconnected from conductor 42–01 and thus from the windings of hold magnets 42HM4 and 42HM7 which release.

With hold magnets 53H0, 53H1, 53H2 and 53H3 released the crossbar switch contacts in Fig. 43 that select magnet 43S9 prepared and the four hold magnets operated, are released, and ground is removed from the final code point and thus from the locking circuit of relay 27LD2 in the seized outgoing trunk circuit, and that relay releases. At its armature 4, relay 27LD2 disconnects the grid of tube 27–04 from transmission conductor 27–06 to blind reperforator 25–01 to other address codes not intended for transmission over the particular trunk circuit. Relay 27LD2 also interrupts, at its armature 1 and front contact, the original energizing path for relay 27BC1, thereby permitting the locking circuit for the latter relay, including the winding of relay 27BC2 to become effective, and relay 27BC2 operates. This relay prepares a path over its lower armature and front contact for operation of a relay in the multiple address director circuit, as will be described hereinafter. With relays 27LD2 and 27BC2 in the outgoing trunk circuit operated, ground is disconnected from conductor 27–12 and thus from conductor 63–14 extending to the winding of relay 49STT, and that relay releases. Relay 49STT interrupts the circuits of relays 38BL and 49RC which release. Relay 49RC releases relay 39TA, 39TB, 39TC, 39TD, 39TE and 39TF. Relays 39TB, 39TD and 39TF release immediately, and relays 39TA, 39TC and 39TE release after the delay interval produced by the resistors connected in shunt with their windings. Relay 39TD releases relay 49CR which in turn releases relay 49CRA. Relay 39TB releases relay 38TR, disconnecting the distributor contacts from the transmitter contacts associated with reperforator 35–02. Relay 49RC also interrupts the locking circuits for relays 50–F1 to 50–F5 and 50–S1 to 50–S5 thus dropping the code combinations stored on those relays. Since those code combinations have been transmitted to reperforator 25–01 they are no longer needed. In this way, the multiple address circuit is restored to the condition that it had prior to decoding the first address code BS.

The next signals appearing in tape 35–04 have been assumed to be the address code BU representing another station served by the switching center 1–37, this address code being followed by the letters signal. With relays 49RC and 49STT released, the circuit of transmitter clutch magnet 35–21 is completed to ground through the contacts 35–18, and the decoding of the address code BU proceeds in the same manner as the decoding of the address code BS. Select magnet 43S9 and hold magnets 53H0, 53H1, 53H2 and 53H3 are operated as before. The ground for selecting the outgoing trunk to the switching center that serves the station identified by the address code BU is applied by the second fan circuit in Fig. 42 to conductor 42–23 and through contacts 43–07 to conductor 43–06. This conductor is included in the path over which the trunk circuit was previously seized, which path extends to the front contact associated with armature 2 of relay 27LA2, but since the trunk has already been seized and relay 27LA2 is operated, the path is extended at once to the winding of relay 27LD2 which operates. Relay 27LD2 locks as before, and reconnects transmission conductor 27–06 to the grid of tube 27–04. The original energizing circuit for relay 27BC1 is now open at the front contact and upper armature of relay 27BC2, so that the locking circuit for relay 27BC1 and the operating circuit for relay 27BC2, which did not become effective until after the release of relay 27LD2, is not affected by the reoperation of relay 27LD2, and relay 27BC2 remains operated. With relay 27LD2 reoperated, a ground connection is extended through the back contact and armature 3 of relay 27LC2, armature 3 and front contact of relay 27LD2, and armature 1 and front contact of relay 27BC1 to the lower armature of relay 27BC2. Because that relay is now operated, the ground connection is extended over conductor 27–13, armature 5 and back contact of relay 63–05, conductors 63–16 and 63–17 and winding of relay 49STL to battery, and that relay operates. Relay 49STL connects ground through its armature 3 and front contact and conductors 49–19 and 49–21 to operate relay 49RC, an operation which relay 49STT performed when it was operated as previously described. Relay 49STL also completes the energizing circuit for relay 38BL, traced from the winding of that relay over conductors 38–29 and 37–16, back contact and armature 5 of relay 36H, conductor 36–33, armature 16 and front contact of relay 38G, conductors 38–30, 49–29 and 49–31, front contact and armature 7 of relay 49STL to ground. This operation was also performed by relay 49STT. Finally, relay 49STL completes the circuit of relay 51–TS, traced from the winding of the latter relay over conductor 51–13, back contact and armature 7 of relay 39TB and conductor 39–24, and the front contact and armature 4 of relay 49STL to ground. Relay 51–TS operates to initiate the transmission of the address code BU to reperforator 25–01. It is to be noted that whereas relay 49STT caused the operation of relays 40–AE and 51–AC to initiate the transmission of the office identification code to the seized trunk before causing the operation of relay 51–TS, relay 49STL by-passes the sequence of operations initiated by relays 40–AE and 51–AC because the office code need not be transmitted to a trunk that has already been seized and has received that code. After the address code BU has been transmitted to the reperforator 25–01, the letters signal is transmitted, whereupon relay 27LD2 is again released, the fan circuits are restored to normal and relay 49STL is released, and various other relays are released under its control as previously described with respect to the release of relay 49STT.

It was next assumed that the tape 35–04 contains the address code GJ representing one of the stations on the multistation line. The multiple address director circuits decodes the first code representing the character G and as a result thereof operates select magnet 43S5. Because the fourth element of the code for the character G is of marking nature, hold magnets 53H0, 53H1, 53H2 and 53H3 will be operated as before and the ground connection supplied through the second fan circuit, in Fig. 42, will be extended over conductor 43–08, inner upper break contacts controlled by intercept keys 44–01 and 44–02, conductor 44–03, to the back contact associated with armature 2 of relay 62–02. The outgoing line circuit for the multistation line has not been shown in detail because it would be almost identical with the outgoing trunk circuit shown in Figs. 20 to 23 and 25 to 28. It might or it might not include a third level of storage for urgent messages, corresponding to the arrangement shown in Figs. 30 to 33, to be described hereinafter. In such outgoing line circuit relays corresponding to relays 22LA1, 22LD1 and 22LE1, or relays corresponding to the relays 27LA2, 27LD2 and 27LE2 would be operated, depending upon which level was available in accordance with the plan of delivery of messages to the two levels alternately under the control of relays corresponding to relays 22BR and 27BM. In the case of an outgoing multi-station or single station the conductor corresponding to conductor 27–12 for operating relay 49STT is not used and the two contacts associated with the lower armature of the relay corresponding to relay 27BC2 are connected together and to the conductor corresponding to conductor 27–13. Thus upon the initial seizure of an outgoing line as well as upon each reseizure and unblinding of the reperforator to transmit address codes preceding a message the relay 49STL in the multiple address circuit is operated to omit the transmission of the switching center identification code. Otherwise the operation is the same, the multiple address circuit transmitting to the seized outgoing line the address code followed by the letters signal, then blinding the reperforator of the outgoing line and releasing the selecting circuits by which the line was seized.

It has been assumed that no other address codes follow the address code GJ. Accordingly, when the transmitter clutch magnet 35–21 is reoperated following the transmission of the letters signal, the code combination for carriage return is sensed and is transferred to the transmitter contacts. At this time the relays 37P, 40–ON, 40–ON1 and 38SM are operated but not locked and relay 38G is locked operated. With transmitter shaft 35–23 operating, the transmitter auxiliary contacts 35–28 operate relay 49CR as before and that relay locks, interrupting the circuit of the transmitter clutch magnet 35–21 to restrict the operation of transmitter shaft 35–23 to a single revolution. During that revolution, distributor clutch trip contacts 35–31 close to operate distributor clutch magnet 35–34. The distributor contacts are not connected to the transmitter contacts so that the carriage return signal will not be transmitted to seized outlets in that revolution of shaft 35–37. The distributor auxiliary contacts 35–39 close and operate relay 49DA as before. Relay 49DA in turn operates relay 50FC to connect the first fan circuit relays 50–F1 to 50–F5 to the transmitter contacts. The carriage return signal has only the element No. 4 of marking nature so that relay 50–F4 operates and the other four relays remain unoperated. Upon the reopening of the distributor auxiliary contacts, relay 49DB operates in the locking circuit of relay 49DA. It causes the select magnets of the first fan circuit to be operated and since elements Nos. 1 and 2 of the carriage return code are spacing the select magnets 52S2 and 52S0 will be operated. These select magnets provide a ground for operating hold magnets in Fig. 52 and since elements Nos. 3 and 5 of the carriage return signal are of spacing nature hold magnets 52HM1 and 52HM3 will be operated. The ground connection applied by the two operated hold magnets to conductor 52–17 is traced through the armature 4 and front contact of relay 50–F4, conductor 50–12 to crossbar switch contacts 52–24 in contact set IV, operated under the joint control of select magnets 52–S2 and 52HM1, and contacts 52–26 in contact set VIII, operated under the joint control of select magnet 52S0 and hold magnet 52HM3, and thence over conductors 52–27 and 52–28, armature 2 and front contacts of relay 49DA and winding of relay 49CL to battery. Relay 49CL operates and locks through its front contact and armature 7, conductor 49–39 and front contact and armature 4 of relay 40–ON to ground.

Relay 49CL interrupts at its back contact and armature 12 the energizing circuit for relay 50–FC which releases. The circuits of relay 50–F4 and of the select magnets and hold magnets in Fig. 52 are interrupted by relay 50–FC and they release. Relay 49CL provides a locking circuit for relay 40–ON1 traced through the front contact and armature 5 of the latter relay, conductor 40–24 and front contact and armature 9 of relay 49CL to ground. Relay 49CL completes the circuit of relay 38TR, traced from the winding of the latter relay over conductor 38–33, armature 8 and back contact of relay 37D, conductors 37–17 and 37–18, front contact and armature 19 of relay 38G, conductors 38–34 and 39–21, back contact and armature 1 of relay 40–AE, conductors 40–22 and 39–26, front contact and armature 3 of relay 49CL, conductor 49–41, and front contact and armature 3 of relay 49–ON to ground. Relay 38TR reconnects the distributor contacts to the transmitter contacts in preparation for the transmission of the carriage return code combination that is stored on the latter contacts.

Relay 49CL completes the circuit of relay 38BL, traced from the winding of the latter relay, over conductors 38–29 and 37–16, back contact and armature 5 of relay 36H, conductor 36–33, armature 16 and front contact of relay 38G, conductors 38–30 and 49–31, and front contact and armature 11 of relay 49CL to ground. Relay 38BL reconnects the transmission potentials for the transmission of signals to reperforator 25–01 and the reperforator of the seized storage level of the outgoing multistation line. Relay 49CL also operates relay 40–LC in a circuit traced from battery through the winding of the latter relay, conductor 40–26, front contact and armature 5 of relay 49DB, and front contact and armature 10 of relay 49CL to ground. Relay 40–LC connects ground over conductors 40–27 and 32–03, front contact and armature 1 of relay 27LA2, break contacts controlled by armature 2 of relay 27LC2, and winding of that relay to battery. There would also be connections from conductor 32–03 to all other outgoing trunk circuits and all outgoing line circuits, both single and multistation lines, to operate the relay corresponding to relay 27LC2 or 22LC1 in any such outlet having a relay corresponding to relay 22LA1 or 27LA2 operated. Relay 27LC2 locks through its front contact and armature 2, and the armature 1 and back contact of relay 27LB2 to ground. It interrupts at its armature 5 and back contact, the locking circuit for relay 27BM which releases. It interrupts at its back contact and armature 3, the locking circuit for relays 27BC1 and 27BC2, and those relays release. It establishes a connection from transmission conductor 27–06 through its armature 1 and front contact to the grid of receiving tube 27–04, omitting break contacts of any other relays in Fig. 27 so that relay 27LC2 has sole control over the portion of the transmission path shown in Fig. 27. Relay 27BM transfers multiple address busy test conductor 32–01 from Fig. 27 to Fig. 22 for the purpose of routing the next multiple address message for the same outlet to Fig. 22, if the multiple address circuit attempts to seize the same outlet while the message is being repeated by tube 27–04 to reperforator 25-01. In the event that one of the regular directors seizes the upper level in Fig. 22 before the multiple address circuit makes another attempt at seizure of the outlet, relay 27BM would be reoperated.

The ground connection supplied from armature 10 of relay 49CL to armature 5 of relay 49DB is also extended over the armature 4 and front contact of the latter relay, armature 5 and front contact of relay 49CL, conductors 49-42 and 39-03, armature 1 and back contact of relay 39TA, conductor 38-32, front contact and armature 15 of relay 38G, front contact and armature 4 of relay 38BL, and conductors 35-47 and 35-33 to distributor clutch magnet 35-34. Shaft 35-37 operates to transmit the carriage return signal that is set on the transmitter contacts. Again the distributor auxiliary contacts operate relay 39TA which releases the distributor clutch magnet 35-34. When the distributor auxiliary contacts open, relay 39TB operates in the locking circuit of relay 39TA. Relay 39TB operates relay 37TX over a circuit traced from the winding of the latter relay, conductor 37-19, front contact and armature 20 of relay 38G, conductors 38-36 and 49-43, armature 4 and front contact of relay 49CL, conductor 49-44, and front contact and armature 5 of relay 39TB to ground. Relay 37TX operates and locks over its front contact and armature 5, conductors 37-22, 37-23 and 38-37, which is included in a group of conductors bracketed to Fig. 41, in which conductor 38-37 reappears, and the path is continued over the lowermost crossbar switch contacts operated jointly by select magnet 41-01 and hold magnet 41-03 to the front contact associated with the upper armature of hold magnet 41-03 and through the armature to ground.

Relay 37TX initiates the transmission of the message from tape 35-04 and releases the director circuit to render it available to other levels of the multiple address circuit. At its armature 6 and front contact, it supplies ground over conductor 37-17, back contact and armature 8 of relay 37D, and conductor 38-33 for holding relay 38TR operated to maintain connections between the transmission contacts and the distributor contacts. It also supplies ground over its armature 7 and front contact, conductors 37-21 and 38-29 for holding relay 38BL operated. At its armature 8 and front contact, relay 37TX completes the circuit of transmitter clutch release magnet 35-21, traced from the winding of the magnet over conductor 35-24, armature 4 and back contact of relay 36TO, back contact and armature 3 of relay 36LT3, conductors 36-29 and 37-24, front contact and armature 8 of relay 37TX, armature 1 and back contact of relay 37AL, back contact and armature 3 of relay 37DS, conductor 35-19, and transmitter stop contacts 35-18 to ground. This path does not include any break contacts of the multiple address director circuit, so that the path is subject to interruption only under the control of relays in the level of the multiple address circuit contained in Figs. 35 to 38. Accordingly, transmitter clutch magnet 35-21 is energized uninterruptedly, and transmitted shaft 35-23 rotates continuously, transferring the code combinations in tape 35-04, one after another, to the transmitter contacts. In each revolution of shaft 35-23, distributor clutch trip contacts 35-31 close and energize distributor clutch magnet 35-34 to cause the distributor to transmit the code combination on the transmitter contacts. In this way the line feed signal, the letters signal and the text of the message following is transmitted to the seized outlets. No control circuits are closed by transmitter auxiliary contacts 35-28 or by distributor auxiliary contacts 35-39 during the transmission of the text of the message.

A further operation performed by relay 37TX is the interruption, at its armature 8 and back contact, of the energizing circuit for relay 37P. That relay interrupts, at its armature 3 and front contact, a path also interrupted at the armature 1 and back contact of relay 37TX, over which relay 38G has been locked, and that relay releases. Relay 37P also releases relay 59PRC.

Relay 38G releases relay 40-ON and relay 38SM. The latter relay releases select magnet 41-01. Relay 40-ON releases relays 39TA, 39TB and 49CL. The release of relay 39TA is delayed somewhat by the shunting resistor, and the other two relays release immediately. Relay 49CL releases relay 40-LC and 40-ON1. The latter relay releases relays 49DA, 49DB and 49CR. The multiple address director circuit has by these releasing operations been restored to normal and is available for seizure by another level.

From the foregoing description it is apparent that the initiation of message transmission and the dismissal of the multiple address director circuit resulted from the decoding of the carriage return signal, and that the line feed signal following the carriage return signal is not decoded but is merely retransmitted to the seized outlets following the carriage return signal. It may happen that the line feed signal precedes the carriage return signal, although it is the usual custom to transmit those signals in the sequence of carriage return followed by line feed because the carriage return function usually requires more time for completion than the line feed function, and the carriage return function can be completed while the line feed function is being performed. The multiple address director circuit is equipped to initiate text transmission and to dismiss itself in response to the line feed signal when that signal precedes the carriage return signal. The line feed signal has all elements of spacing nature except the second element, which is marking. When that signal is stored on relays 50-F1 to 50-F5, the select magnets in the first fan circuit in Fig. 52 that are operated are the magnets 52S2 and 52S1 and the hold magnets that are operated are magnets 52HM1 and 52HM3. This results in the closure of contact sets IV and VI. Since the fourth element of the signal is spacing, the path of entry to the first fan circuit is conductor 50-37, and the path is continued through contacts 52-36, conductor 52-37, contacts 52-38 in contact set IV, and conductor 52-39 to conductor 52-28 which is the conductor that was grounded through the first fan circuit in response to the carriage return signal, to cause the operation of relay 49CL. From this it is apparent that the latter relay is operated in response to the carriage return signal or the line feed signal.

*Disconnection of multiple address circuit from seized outlets*

During the transmission of the text of the message any occurrence of the figures signal will cause the operation of relay 36FG, over conductor 35-48 from ground supplied over a path through the maze contacts controlled by transmitter contact operating members 35-27. If any other character than H follows the figures signal, relay 36FG will be released when such following code combination is transferred to the transmitter contacts. When the H signal follows the figures signal that sequence represents the disconnect signal, as previously stated, and ground is extended through a path established in the maze contacts in accordance with the H signal, and over conductor 35-49, back contact and armature 7 of relay 37AL, conductor 37-26 and armature 1 and front contact of relay 36FG to lock that relay, and through the front contact and armature 2 of relay 36FG and the left-hand winding of relay 36H, shunted by a resistor to battery and relay 36H operates. It locks through its right-hand winding and front contact and armature 1, conductors 36-37, 36-38, and 36-34, armature 2 and back contact of relay 37AL and front contact and armature 3 of relay 37TX to ground. Upon the closure of transmitter auxiliary contacts 35-28 in the next cycle of shaft 35-23, in which the letters signal following the H signal is transferred to the transmitter contacts, ground is extended over conductor 35-29, armature 3 and front contact of relay 36H, and winding of relay 36LT3 to battery. Relay 36LT3 operates and locks to the holding circuit for relay 36H. Relay 36LT3, at its armature 3 and back contact, interrupts the circuit of transmitter clutch release magnet 35–21 which releases and arrests transmitter shaft 35–23 at the end of the cycle in which the letters signal is transferred. Upon the transfer of the letters signal to the transmitter contacts, the maze circuit path, over which the locking circuit for relay 36FG extends, is interrupted, and relay 36FG releases. In the accompanying cycle of distributor shaft 35–37, initiated by distributor clutch trip contacts 35–31, the distributor auxiliary contacts 35–39 connect ground over conductor 35–41, front contact and armature 1 of relay 36LT3, armature 4 and front contact of relay 36H, and winding of relay 36LT1 to battery, and that relay operates. Relay 36LT1 prepares a locking circuit for itself through the winding of relay 36LT2, and upon the opening of the distributor auxiliary contacts, the relay 36LT1 locks, and relay 36LT2 operates. It opens, at its back contact and armature 2, the energizing circuit of relay 37P, to delay the reoperation of the latter relay beyond the release of relay 37TX, at the armature 8 and back contact of which the circuit of relay 37P is also open. Relay 36LT2 operates relay 38AB in a circuit traced from the winding of that relay, conductors 38–38 and 37–27, armature 1 and front contact of relay 36LT2, conductor 36–36, and back contact and armature 6 of relay 37AL to ground.

Figure 27:
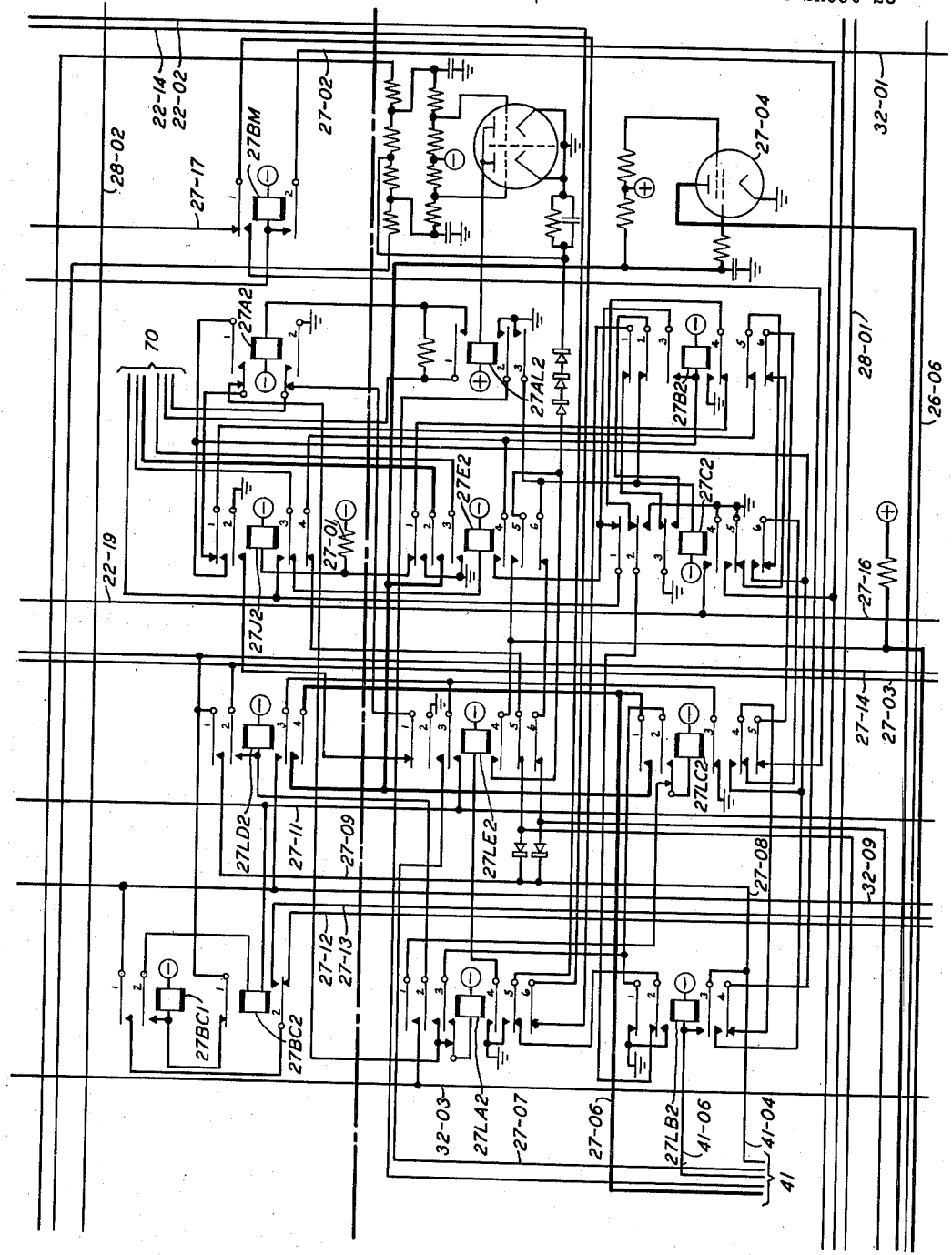
Figure 28:
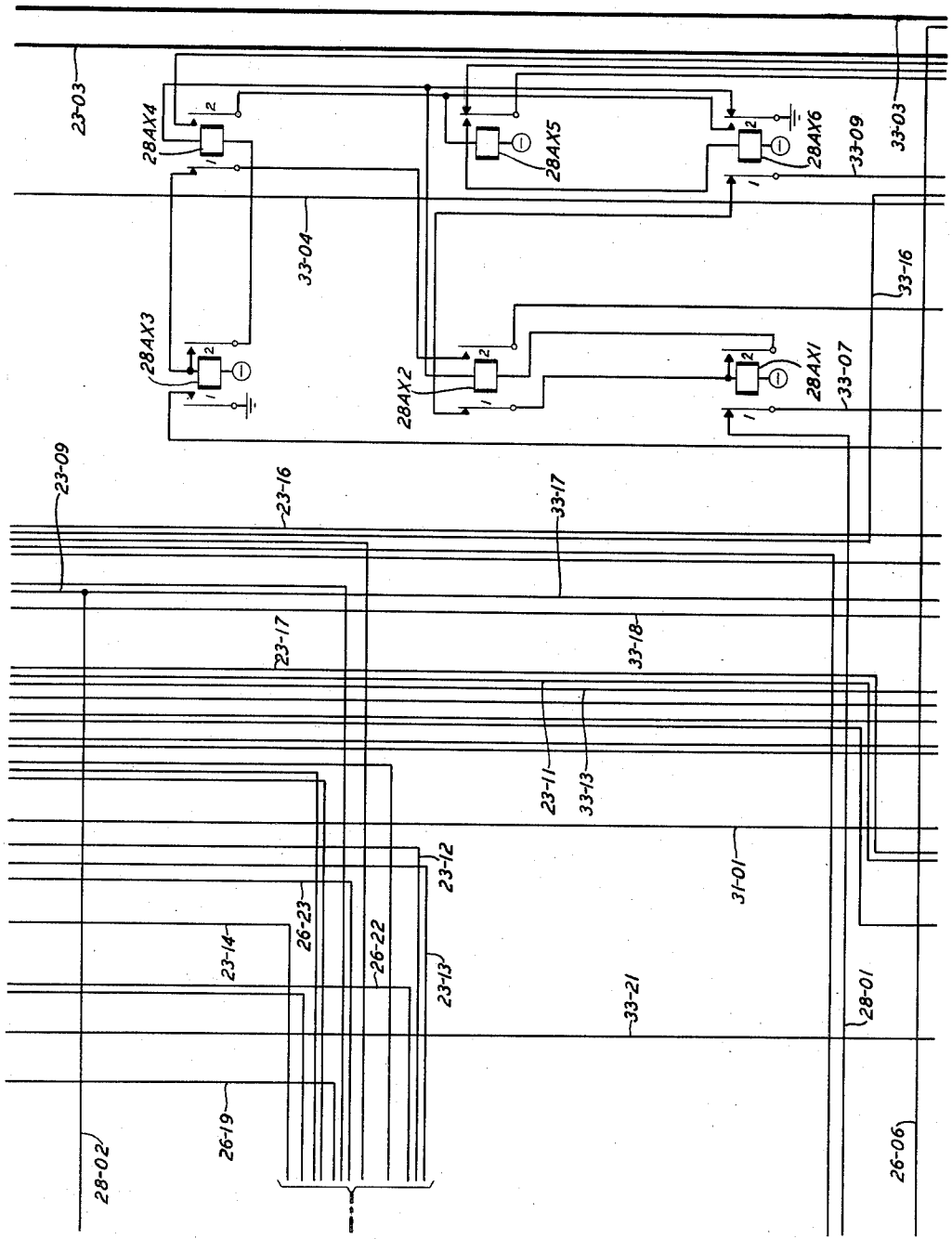
Figure 29:
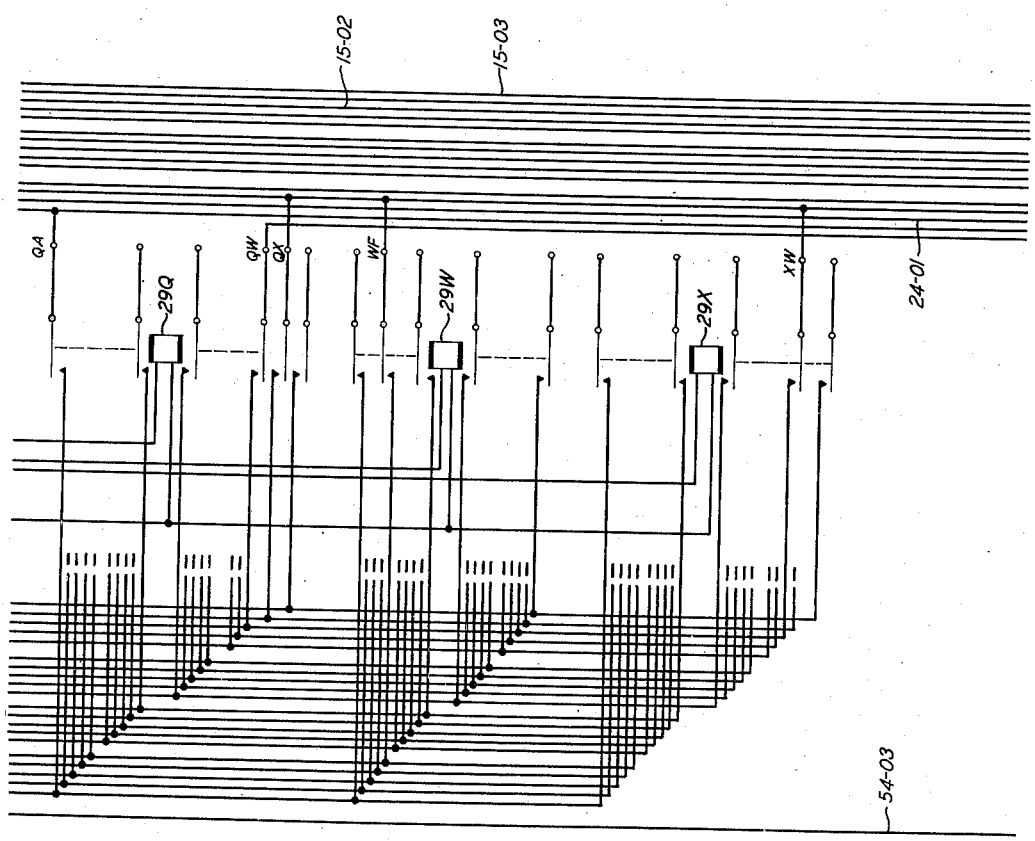

Relay 38AB extends ground over conductor 38–39 which is one of the group of conductors bracketed to Fig. 41, and is connected through crossbar switch contacts operated by select magnet 41–01 and hold magnet 41–03 to conductor 41–06 included in the group of conductors bracketed to Fig. 27, in which conductor 41–06 reappears, and is connected to the winding of relay 27LB2 which operates. Relay 27LB2 locks through its front contact and armature 3, and conductor 41–04 which is grounded at the lower armature and front contact of hold magnet 41–03 in the link circuit. Relay 27LB2 releases relays 27LA2 and 27LC2. Relay 27LA2 releases relay 27LE2 which disconnects ground from conductor 27–07, thereby releasing hold magnet 41–03 in the multiple address link circuit. The hold magnet disconnects ground from conductor 41–04, thereby unlocking relay 27LD2 which releases. That portion of the second level of the outgoing trunk circuit that relates to the transmission of a message into storage in reperforator 25–01 is restored to normal, the message including the disconnect signals having been recorded by the reperforator.

The release of hold magnet 41–03 results in the disconnection of ground from the locking circuit for relay 37TX at the upper armature and front contact of relay 41–03. Relay 37TX releases relays 38TR, 38BL, 36H, 36LT1, 36LT2 and 36LT3. Relay 36LT2 releases relay 38AB. That portion of the first level of the multiple address circuit that relates to retransmission of a stored message is thus restored to normal, and in the event that another message has been stored in reperforator 35–02, contacts 35–18 will remain closed, and the operations for seizure of the multiple address director circuit and decoding of the address codes preceding that message will be initiated.

*Routing of priority message*

It will be supposed that the outgoing trunk circuit to which the multiple address message had been transmitted is in the process of transmitting the single address message from the upper level so that the second level does not gain access to the outgoing transmission channel immediately, and that a priority message for the same outgoing trunk circuit is received, it being the message assumed to be received from switching center 1–34 addressed to the subscriber station identified by the address code BU. As previously set forth, the message will comprise the signals for the characters PQ, which is the priority office identification code used by the switching center 1–34 preceding any priority message transmitted from that switching center, this code being automatically substituted for the priority message code PC preceding the message as received from the originating subscriber station.

The director circuit associated with the incoming trunk circuit from switching center 1–34, decoding the code combination for the character P in the first fan circuit in Fig. 14, connects ground over conductor 14–03 to operate relay 24P. The second fan circuit, in Fig. 18, decoding the code combination for the character Q connects busy test relay 17BT over conductors 18–06 and 19–03 to the front contact associated with armature PQ of relay 24P and over conductor 24–01, lower break contacts of intercept keys 54–06 and 54–07, and conductor 54–11 to the contactor associated with the left-hand contact bank of stepping switch 58–01. Switch 58–01 is similar to switch 38–01 and its function is to seek an idle level of storage in the multiple address circuit assigned to priority messages. One of two levels for priority message storage has been shown in Figs. 55 to 58, the other level being indicated merely by stub connections to the sixth terminals of the two contact banks of stepping switch 58–01. As in the case of stepping switch 38–01, the contactors of the switch do not come to rest in any position in which the contactor of the right-hand contact bank finds ground, unless all levels allocated to priority message handling are busy. It will be assumed that the first level of priority message storage is idle, and that the contactors are engaging the contacts associated with that level, which is the fifth contact in each contact bank. Accordingly, the busy test path, traced to the contactor associated with the left-hand contact bank of switch 58–01, will be extended over conductor 58–02, armature 2 and back contact of relay 56B, armature 1 and back contact of relay 56C through resistor 56–01, and in parallel therewith through the winding of relay 56J to negative battery. The termination of the path at battery rather than ground is indicative of the fact that the level is idle and available, and relay 56J operates. It initiates a series of operations, identical with those described with reference to the first level of storage of the multiple address circuit, leading to connection of the transmitter associated with incoming trunk reperforator 11–02 to priority message reperforator 55–01, the transmission of the message thereto, preceded by the priority code PQ, and the disconnection of the transmission path following reception of the end-of-message signal, reperforator 55–01 being rendered available to any other regular director circuit. The sequence of operations has been fully described previously, and will not be repeated with respect specifically to the priority message storage level contained in Figs. 55 to 58.

The presence of message tape being emitted from reperforator 55–01 and containing a message awaiting transmission, is evidenced by the closure of transmitter stop contacts 55–02 which connect ground over conductor 55–03, armature 3 and back contact of relay 57DS, back contact and armature 1 of relay 57AL, armature 8 and back contact of relay 57TX, conductors 57–01 and 57–02, outer armature and back contact of relay 56LT2, conductor 56–02 and winding of relay 57P to battery, and the relay 57P operates. This relay is shown operated because contacts 55–02 are shown in the closed condition. It completes a circuit for relay 59PRL, traced from the winding through the armature and back contact of relay 59PRC, conductors 59–11 and 58–03, armature 2 and front contact of relay 57P, and back contact and armature 5 of relay 57DH to ground. It will be apparent from the fact that the energizing circuit for relay 59PRL includes an armature and back contact of relay 59PRC that a priority message storage level having a message awaiting transmission cannot gain access to the multiple address director circuit while that circuit is serving one of the regular multiple address storage levels. As previously described, the relay 59PRC releases as part of the process of dismissing the director circuit in response to the carriage return or line feed signal following the last address code preceding a multiple address message. Relay 59PRL locks through its armature 4 and front contact and conductors 59–11 and 58–03 to the same ground from which relay 59PRL was operated. At its armature 1, the relay 59PRL disconnects ground from a path through the winding of relay 59PRC to the contactor associated with the right-hand contact bank of stepping switch 59–02, and connects the ground instead directly to the contactor associated with the right-hand contact bank of stepping switch 59–12. At its armature 2 relay 59PRL transfers conductor 59–09 from the contactor associated with the middle contact bank of stepping switch 59–02 to the contactor associated with the middle contact bank of stepping switch 59–12. At its armature 3, relay 59PRL transfers conductor 40–01 from the contactor associated with the left-hand contact bank of stepping switch 59–02 to the contactor associated with the left-hand contact bank of stepping switch 59–12. At its armature 5, the relay 59PRL transfers conductor 59–04 from a path including conductor 37–04 that extends to the armature 1 of relay 37P, relay 47P and corresponding relays in other regular multiple address storage levels to conductor 59–13 which extends to armature 1 of relay 57P and corresponding relays in other priority message storage levels. With relays 57P and 59PRL operated, an energizing path for stepping magnet control relay 59–14 for stepping switch 59–12 is traced from the winding of the relay, back contact and armature of stepping magnet 59–16, conductor 59–17, armature 1 and back contact of relay 57DH, front contact and armature 1 of relay 57P, conductor 59–13, front contact and armature 5 of relay 59PRC, conductor 59–04, armature 1 and back contact of relay 40–ON1, conductor 40–01, armature 3 and front contact of relay 59PRL to the contactor associated with the left-hand contact bank of stepping switch 59–12. If the contactor is engaging a grounded contact, relay 59–14 will be energized to operate the stepping magnet 59–16, and the relay and stepping magnet will cooperatively advance the contactors over successive grounded contacts until the contactor encounters an ungrounded contact. Priority storage levels that have ungrounded contacts are those that are awaiting access to the multiple address director circuit, as evidenced by unoperated condition of the relay corresponding to relay 57TX and operated condition of the relay corresponding to relay 57P. It will be assumed that the contactor finds the fifth contact ungrounded and relay 59–14 will release, suspending advancement of the contactors. Thereupon the association of the multiple address director circuit with the particular level of priority message storage and the decoding of the first address code, this being the code PQ, proceeds as described for the regular multiple address message, select magnets and hold magnets in Figs. 42, 52 and 53 being operated to establish a path to a final code point over conductor 43–09 selected under the joint control of select magnet 43S5 and hold magnet 53H6 under the control of the code for the character P and by select magnets and hold magnets in Fig. 42 under the control of the character Q. Conductor 43–09 is traced to the right-hand winding of relay 67TK1 and thence to the winding of relay 67PST, and the two relays operate in series. Relay 67TK1 operates relay 67TC1 which locks through its front contact and right-hand armature, and the armature and back contact of relay 67RLS to ground. Relay 67TC1 connects ground through its inner left-hand armature and front contact, conductor 67–01, armature and front contact of relay 67PST, conductor 67–02 and the winding of relay 39PST to battery, and that relay operates. Relay 39PST operates relay 51PR in a path from the winding of the latter relay over conductor 51–18, and the front contact and armature 2 of relay 39PST to ground.

Relay 51PR locks through its front contact and armature 6, conductor 51–19, and the front contact and armature 10 of relay 40–ON1 to ground. Relay 51PR connects its armatures 2, 3 and 5 through their front contacts to conductor 51–08 to change the coding of the first character of the routing or office identification code from B to P, the latter having signal elements 1 and 4 of spacing nature and 2, 3 and 5 of marking nature. Upon the seizure of any trunk the office identification code for priority messages will be generated and transmitted to the trunk circuit for retransmission. That code will be effective at the remote switching center to route the message to the multiple address circuit in which priority messages are handled as now being described. Relay 51PR connects ground through its armature 7 and front contact, and conductor 51–21 to the winding of relay 39UR to operate that relay, and through the front contact and armature 1 of relay 39PST, conductors 39–27 and 49–23, and the winding of relay 49DC to battery. Relay 49DC initiates a previously described sequence of operations in which the office identification code PQ of switching center 1–34, which routed the message into a priority level of the multiple address circuit, and the letters signal following, are discarded. Upon the release of the fan circuits, incident to the discarding of the office identification code, relay 39PST releases.

Figure 32:
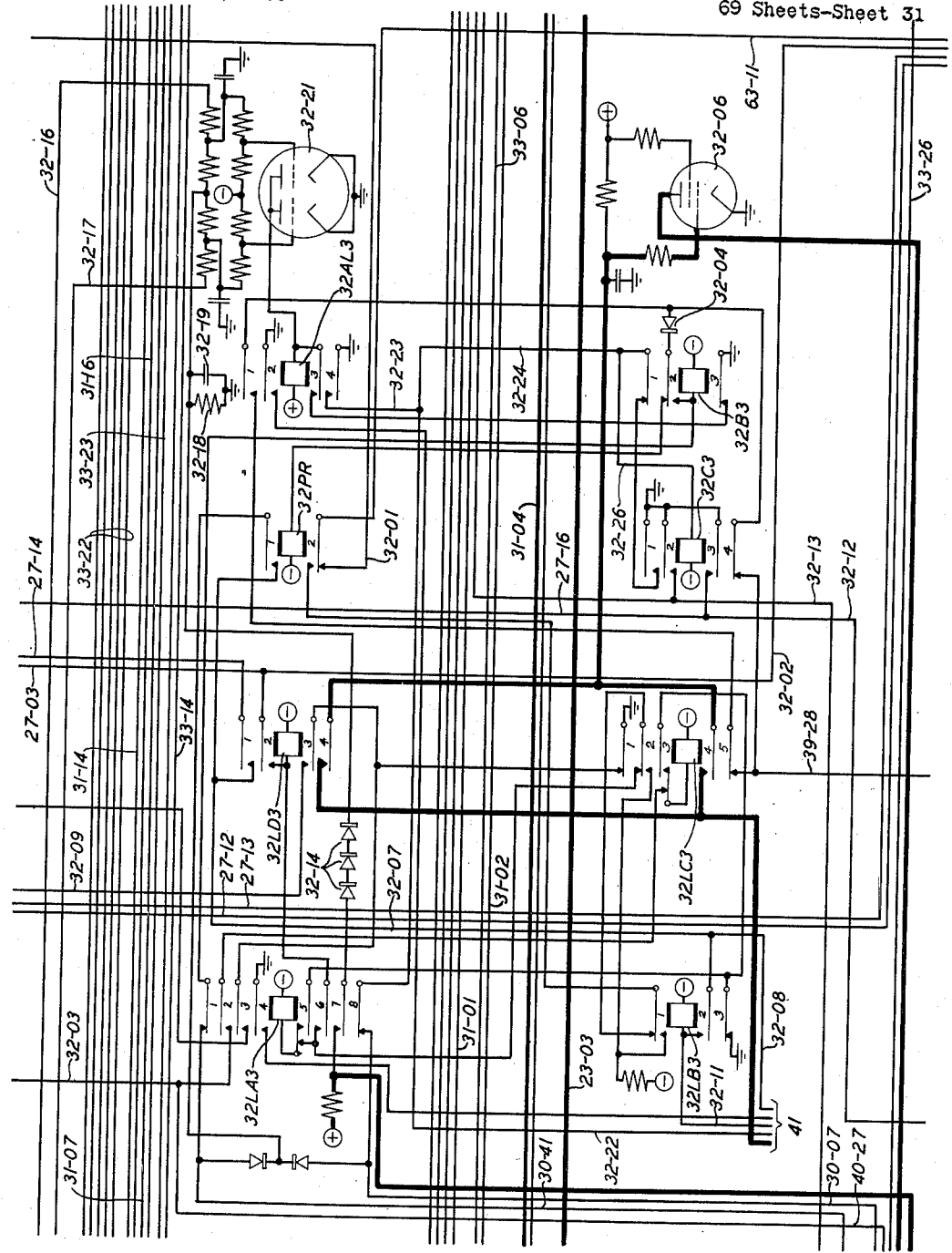
Figure 33:
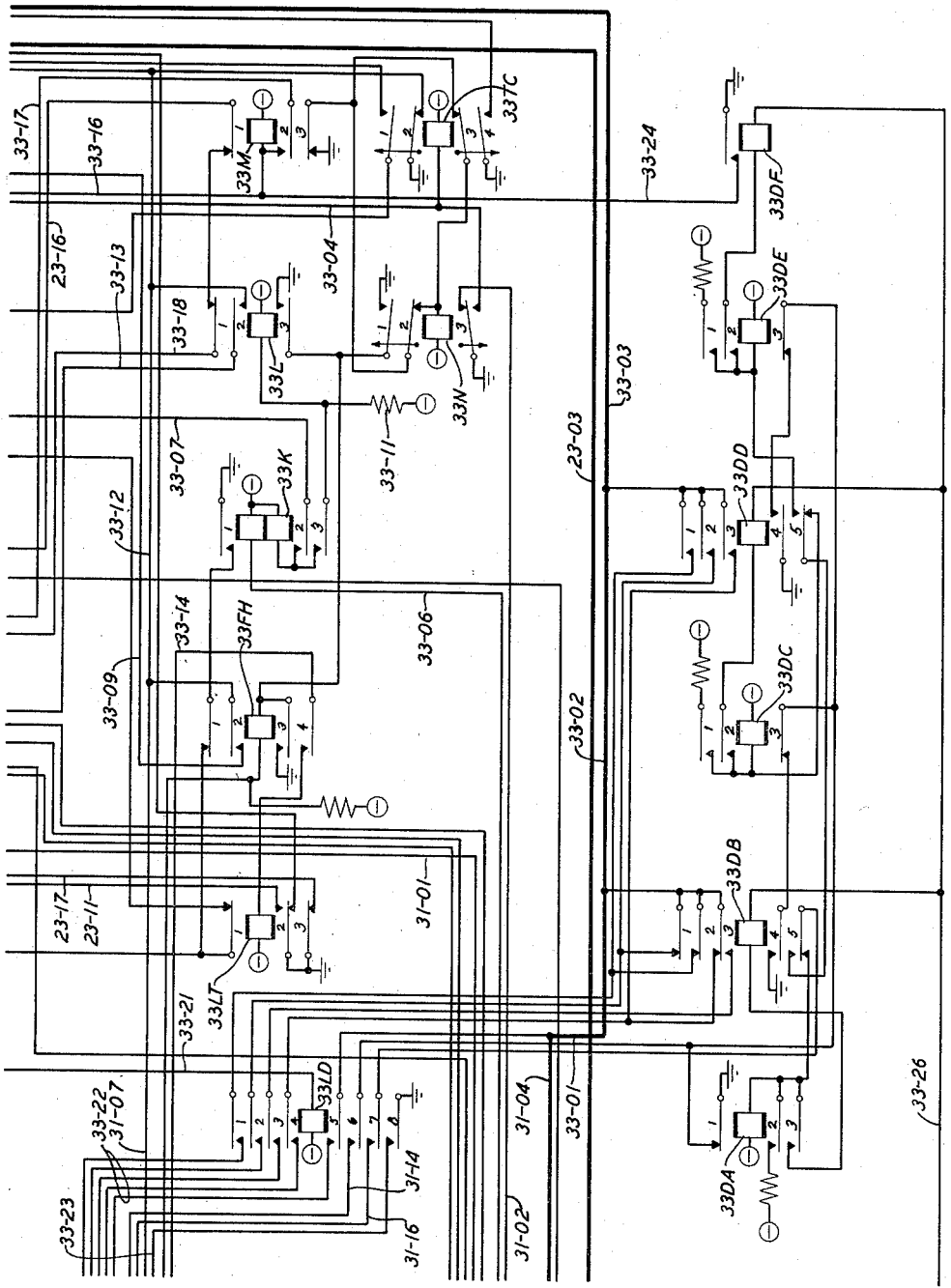
Figure 34:
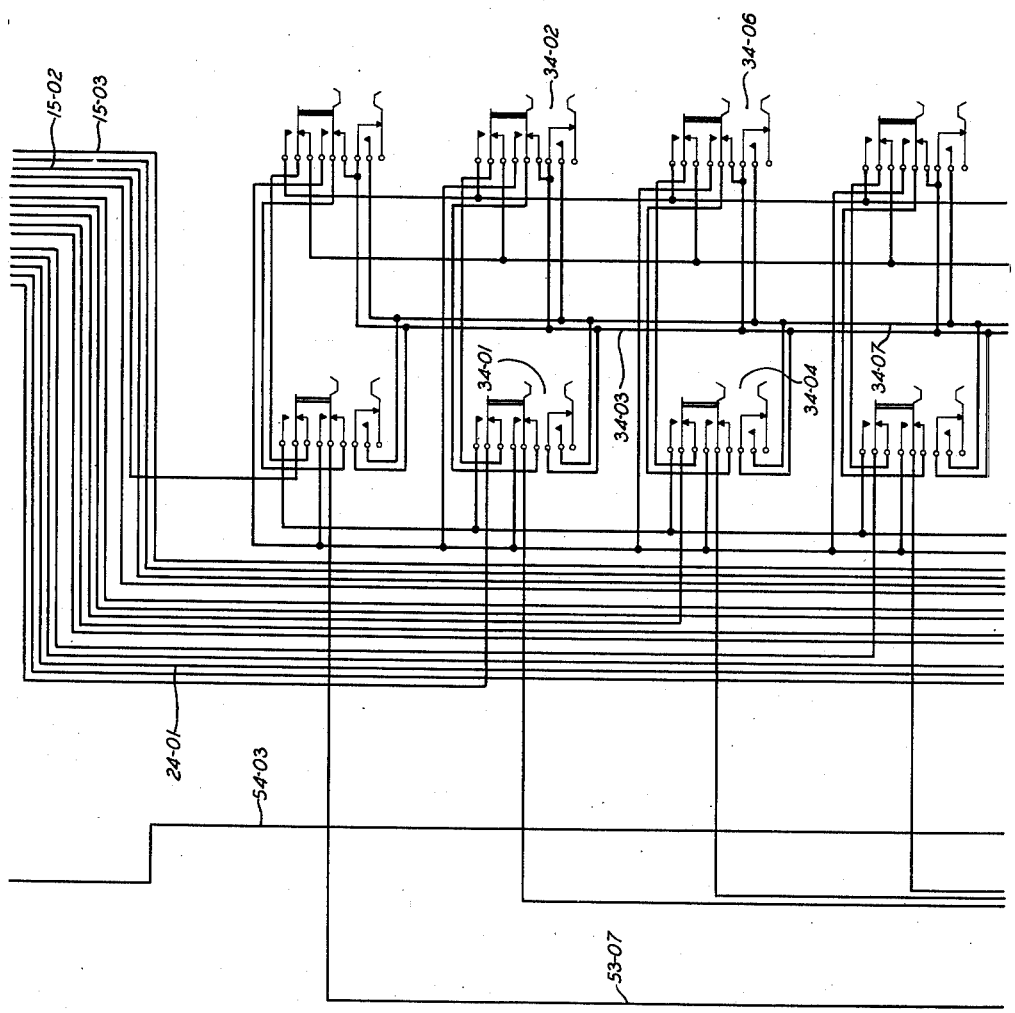
Figs. 34, 44 and 54 show the intercept key circuit.

Relay 39UR connects ground over conductor 39–28, back contact and armature 4 of relay 32C3, varistor 32–04, armature 2 and back contact of relay 32B3, and winding of relay 32PR to battery, and relay 32PR operates. As indicated in Fig. 32, conductor 39–28 is multipled to the priority message storage levels of all other outgoing line and single outgoing trunk circuits to operate the relay in each of them corresponding to relay 32PR, providing the conditions of relays, corresponding to 32LC3, 32C3, 32B3 and 32AL3, are such as to establish a path to the equivalent of relay 32PR. Relay 32PR, and corresponding relays in other outlets, transfer into the priority levels of the respective outlets the busy test conductors over which the multiple address director circuit makes a busy test of the outlets.

After the office code PQ and letters signals have been discarded, the multiple address director circuit decodes the address code BU, and connects ground through the final code point corresponding to that code, and over a path previously traced, entering the outlet on conductor 63–11 and over armature 2 and front contact of relay 32PR, armature 1 and back contact of relay 32LB3, armature 2 and back contact of relay 32LC3, back contacts controlled by armature 5 of relay 32LA3, and winding of that relay to battery. Relay 32LA3 operates and locks through its front contact and armature 5, and the armature 3 and back contact of relay 32LB3 to ground. Relay 32LA3 operates relay 32LD3 through its front contact and armature 6, and relay 32LD3 locks to conductor 32–02. Relay 32LD3 has the same function as relay 27LD2, connecting the grid of tube 32–06 to the transmission conductor. Relay 32LA3 performs directly operations that relay 27LE2, operated by relay 27LA2, perform, including operation of a hold magnet in the multiple address link circuit to establish a transmission connection to the grid of tube 32–06 and control paths previously described. With relay 32LD3 and a hold magnet operated, an operating circuit for relay 27BC1 is established, traced from the winding of that relay through the back contact and armature 1 of relay 27BC2, conductor 27–14, armature 1 and front contact of relay 32LD3 and conductors 32–07 and 32–08, the latter of which is contained in a group of conductors bracketed to Fig. 41, in which the conductor reappears and is traced to ground through the front contact and lower armature of hold magnet 41–07 operated by relay 32LA3. Upon the operation of relay 27BC1, ground through the armature 1 and back contact of relay 32LC3 is connected through the armature 3 and front contact of relay 32LD3, conductor 32–09, armature 1 and front contact of relay 27BC1, and armature 2 and back contact of relay 27BC2 to conductor 27-12. This ground extends, as previously traced, to the winding of relay 49STT which operates to cause the transmission, to the grid of vacuum tube 32-06 and thus to reperforator 30-01, of the office identification code PA. The multiple address director circuit generates and transmits a letters signal following the office identification code, and then transmits the address code BU, the code combination for the character B being stored in relays 50-F1 to 50-F5, and the code combination for the character U being registered on the transmitter contacts in Fig. 55. A letters signal is transmitted following the address code BU, after which the multiple address director circuit disconnects ground from the path leading to conductor 32-02 which is included in the locking circuit for relay 32LD3, thereby releasing it. With relay 32LD3 released the original energizing circuit for relay 27BC1 is interrupted, and its locking circuit, including the winding of relay 27BC2, becomes effective. Relay 27BC2 interrupts the original energizing circuit for relay 27BC1 and prepares for the extension of ground over conductor 27-13.

The multiple address director circuit next decodes the carriage return signal. Incident to the decoding of the carriage return signal, relay 49CL in the multiple address director circuit operates, in turn operating relay 40LC. That relay connects ground over conductor 40-27, and through the front contact and armature 2 of relay 32LA3 to relay 32LC3 which operates and locks through its front contact and armature 3, and the armature 3 and back contact of relay 32LB3 to ground. Relay 32LC3 releases relays 27BC1 and 27BC2, and reconnects the grid of tube 32-06 to the transmission conductor to cause tube 32-06 to respond to the carriage return signal and the signals that follow, namely line feed, letters and the text of the message. The multiple address director circuit proceeds to disconnect itself from the priority message level and relay 40-ON1 releases, in turn releasing relay 51PR. Relay 51PR releases relay 39UR which disconnects ground from conductor 39-28, thereby releasing relay 32PR to extend the busy test conductor over which the multiple address circuit tests the outgoing trunk circuit to the other levels of the trunk circuit. It should be noted that if the same priority storage level in the multiple address circuit or another has another message for the same outgoing trunk circuit, it will reoperate relay 32PR, but the multiple address director circuit will suspend further action until disconnection at the end of the message has occurred.

When the priority storage level of the multiple address circuit that is transmitting a message to reperforator 30-01 decodes the disconnect signal under the control of its relays 56FG and 56H, the relay 58AB operates in the same manner as relay 38AB, previously described, to connect ground through closed contacts of the multiple address link circuit in Fig. 41 to the conductor extending to the winding of relay 32LB3, designated 32-11, thereby operating the latter relay. Relay 32LB3 locks to conductor 32-08 through its front contact and armature 2. Relay 32LB3 releases relays 32LA3 and 32LC3. The latter relay disconnects the grid of tube 32-06 from transmission conductors, thereby blinding reperforator 30-01. Relay 32LA3 interrupts the circuit of hold magnet 41-07, which disconnects ground from conductor 32-08, thereby releasing relay 32LB3. The priority storage level of the outgoing trunk circuit is thus restored to normal. The priority storage level of the multiple address circuit also restores to normal in the same manner as previously described with reference to the first regular message storage level of the multiple address circuit.

It was stated previously with reference to the seizure of the multiple address director circuit by one of the priority storage levels of that circuit by operation of relay 59PRL that the relay locks over conductors 59-11 and 58-03 which is the original energizing circuit, and is traced to ground through armature 2 and front contact of relay 57P, and back contact and armature 5 of relay 57DH. An additional connection to ground at the junction of conductors 58-03 and 59-11 is supplied through armature 28 and front contact of relay 58G while that relay is operated in connection with the routing of a message to an outlet. Conductor 58-03 is multipled to the armatures 2 of the relays in all priority storage levels corresponding to relay 57P, so that as long as any priority level has a message waiting to be served by the multiple address director circuit, relay 59PRL remains operated. Since this relay disables the energizing circuit for relay 59PRC, no regular multiple address message storage level can gain access to the multiple address director circuit as long as any priority message storage level has a message in storage that has not yet been served by the multiple address director circuit. In the case of the regular multiple address storage levels, the multiple address director circuit is not actually seized until the contactors of stepping switch 59-02 have found a regular multiple address storage level at which a message is awaiting the attention of the director circuit and have thus completed an energizing circuit for relay 59PRC. On the contrary, the relay 59PRL is operable when any priority message storage level evidences a waiting message and before stepping switch 59-12 has found a level at which a message is waiting, the operation of relay 59PRL precluding operation of relay 59PRC, even though stepping switch 59-02 may be seeking a level at which a regular multiple address message is waiting. In this way, the routing of all waiting priority messages to outlets as indicated by address codes, before the routing of any regular multiple address message, is assured.

*Retransmission of priority messages*

The description of the routing of messages has proceeded to a point where a single address message is stored in tape 20-04 emitted by reperforator 20-01 in the outgoing trunk circuit, and the message is in the process of being retransmitted, a multiple address message has been routed to several outlets including reperforator 25-01 in the second level of the outgoing trunk circuit, the message being stored in tape 25-03 emitted by reperforator 25-01, and a single address priority message has been routed to reperforator 30-01 in the priority storage level of the outgoing trunk, and is being stored in tape 30-03. The accumulation of a loop of tape 25-03 causes the closure of transmitter stop contacts 25-04, thereby connecting ground over conductor 20-06, armature 2 and back contact of relay 26S2, back contact and armature 1 of relay 26T2, varistor 26-14, and winding of relay 26P2 which operates.

Relay 26P2 is unable to establish an energizing circuit for relay 26H2 because any possible path for completing the energizing circuit of that relay is open. For example, a path may be traced from the winding of relay 26H2 over conductors 26-16 and 26-17, armature 3 and front contact of relay 26P2, and conductor 26-18 to the back contact associated with the armature of relay 21P1. The path ends there because the first level is transmitted to the outgoing trunk channel, and relay 21P1 is operated. An alternate path is traced over conductors 26-16 and 26-19, the latter being included in a group bracketed to Fig. 28, front contact and armature 2 of relay 23J which is operated to allot the next transmitting turn to the second level, conductor 23-12, included in the group bracketed to Fig. 26, armature 1 of relay 26P2 to the associated front contact. The path branches at that point, one path extending over conductor 26-21 to the back contacts associated with the armatures of relay 31P3. Since the second regular level has been assumed to have received a message before the priority level received one, relay 26P2 may be assumed to have operated ahead of relay 31P3 and the path would continue over armature 2 of relay 31P3, conductors 31-01 and 23-02, to the break contacts associated with armature 6 of relay 21H1, where the path terminates because relay 21H1 is operated. With the recording of a priority message in reperforator 30-01, tape 30-03 closes the contacts 30-04, extending ground over conductor 30-06, armature 2 and back contact of relay 31S3, back contact and armature 1 of relay 31T3, varistor 31-09 to the winding of relay 31P3, operating that relay. Accordingly, the path for relay 26H2 must be sought, from the front contact of armature 2 of relay 26P2 over the other branch path 26-22, which is included in the group bracketed to Fig. 28, armature 4 and front contact of relay 23J, and conductor 23-02 to the break contacts associated with armature 6 of relay 21H1. It follows that relay 26H2 cannot operate until relay 21H1 releases. It also follows that relay 31P3, whether operated or released, does not deprive relay 26H2 of an operating path when relay 23J is operated.

With relay 31P3 operated, the priority level transmitter is bidding for access to the outgoing trunk transmission channel. The operating path for relay 31H3 of that level is traced from the winding of the relay over conductors 31-11 and 26-23, the latter being included in the group of conductors bracketed to Fig. 28, to armature 6 of relay 23J. It will be apparent that relay 31H3 cannot operate until relay 23J releases. The latter relay releases when the transmitter of the second regular storage level gains access to the outgoing trunk transmission channel, as will be described hereinafter, so that with the second level awaiting access to the transmission channel, it will gain access ahead of the transmitter of the priority message storage level.

The operations involved in the restoration of the first level to normal, responsive to the disconnect signal, including the release of relay 21H1, has been previously described. As set forth at the end of that description, relays 33N, 33TC, 33FH, 28AX1, 28AX2 and 23J are energized. These relays are held by locking circuits, with the exception of relay 33TC which is held over its energizing circuit. In addition, it has now been assumed that relays 26P2 and 31P3 have operated.

Upon the release of relay 21H1 the energizing path for relay 26H2, traced to the break contacts associated with armature 6 of relay 21H1, closes and extends the path over conductor 21-09, break contacts controlled by armature 6 of relay 26H2, conductor 26-01, break contacts controlled by armature 5 of relay 31H3, conductor 31-02, and front contact and armature 3 of relay 33N and relay 26H2 operates. Relay 21H1 could not have reoperated in preference to relay 26H2 because the energizing circuit for relay 21H1 is interrupted at the back contact and armature 7 of relay 23J. Relay 26H2 locks through its armature 6 and front contact, conductor 26-01, break contacts controlled by armature 5 of relay 31H3 and conductor 31-02 to ground on the armature 3 of relay 33N. Relay 26H2 releases relay 23J by interrupting a locking circuit for the latter relay, the circuit including the lower winding, front contact and armature 3 of relay 23J, conductor 23-13, armature 2 and front contact of relay 26P2, and back contact and armature 10 of relay 26H2. If relay 26P2 had not operated at the time of release of relay 21H1, there would have been no locking circuit for relay 23J and that relay would have released, rendering the outgoing trunk transmission channel again available to the first level transmitter, if it had another message in storage, unless there should have been at the time a message in storage in the priority level awaiting transmission, evidenced by the operated condition of relay 31P3 in which case relay 31H3 would operate, as will be described hereinafter, and the first level transmitter would not immediately regain access to the channel.

Relay 26H2 also releases relay 33TC, at its armature 1 and back contact. Relay 33TC, upon releasing, completes an energizing circuit for relay 26G2, traced from the winding of that relay through the front contact and armature 4 of relay 26H2, back contact and armature 1 of relay 26S2, armature 1 and back contact of relay 26D2 and conductors 26-04 and 26-06, and the back contact and armature 4 of relay 33TC. Relay 26G2 performs the same operations for the second regular storage level that relay 21G1 performs for the first level, these operations having been described previously, and having the purpose and effect of initiating the transmission of the message stored in tape 25-03 to the outgoing trunk transmission channel. At the end of the message the disconnect signal causes the restoration of the second level to normal, including the release of relay 26H2. If no further messages have been recorded by reperforator 25-01, relay 26P2 will release when contacts 25-04 open, but if one or more additional messages are in storage those contacts will not open and relay 26P2 will remain operated.

Figure 26:
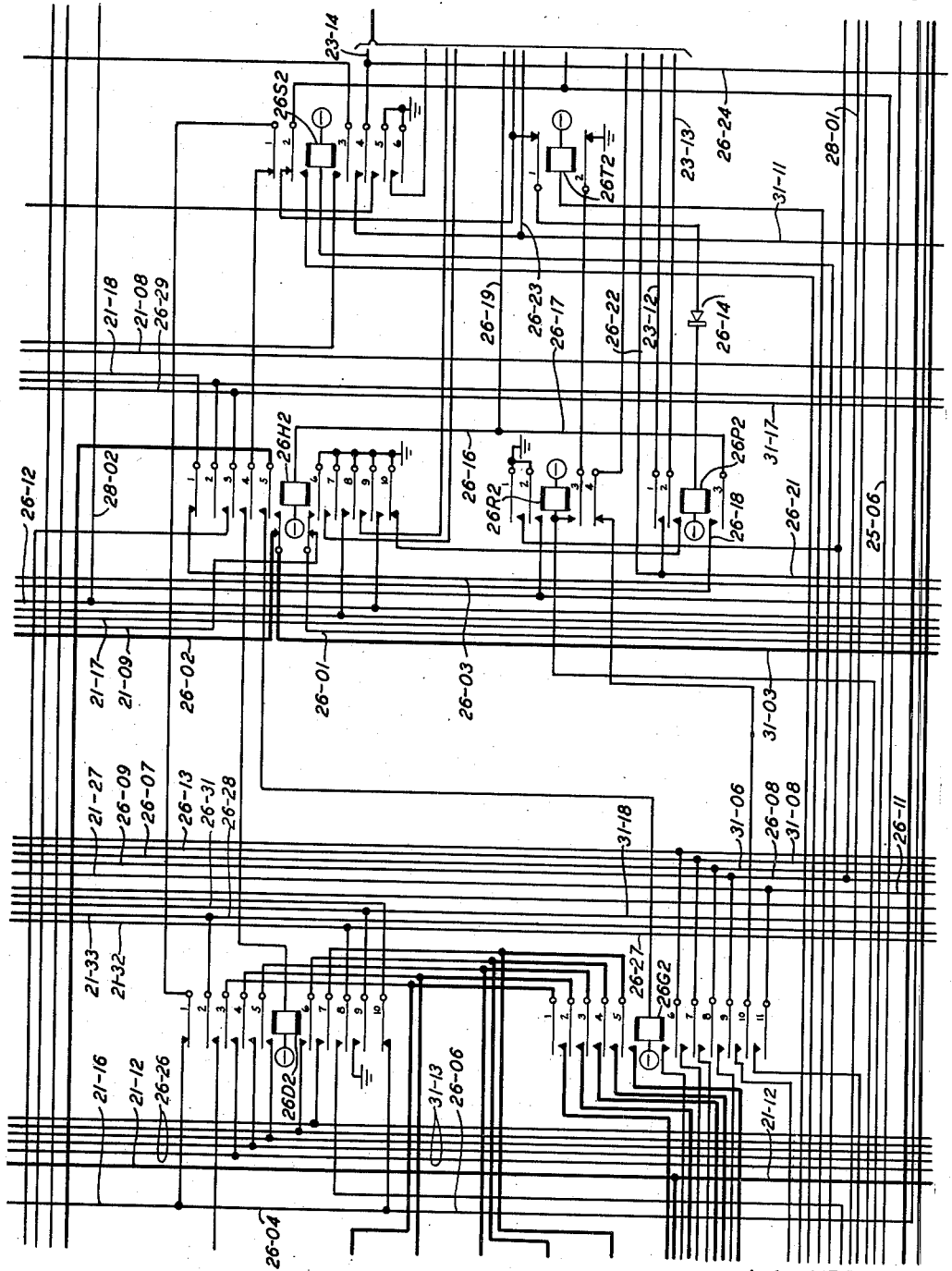

At the time of release of relay 23J, the energizing path for relay 31H3, previously traced to armature 6 of relay 23J, is extended through the back contact, conductor 23-14 included in the group bracketed to Fig. 26, conductor 26-24, front contact and armature 2 of relay 31P3, conductors 31-01 and 23-02, break contacts controlled by armature 6 of relay 21H1, conductor 21-09 to the break contacts associated with armature 6 of relay 26H2, where the path terminates because relay 26H2 is operated. Upon the restoration of the second level to normal in response to the disconnect signal, relays 31P3, 33FH, 33N, 33TC, 28AX1 and 28AX2 remain operated and either or both of the relays 21P1 and 26P2 may be operated if the respective levels have messages to transmit.

Upon the release of relay 26H2 incident to the restoration of the level to normal, the energizing circuit of relay 31H3 is extended over conductor 26-01, break contacts controlled by armature 5 of relay 31H3, conductor 31-02, and front contact and armature 3 of relay 33N to ground. Relay 31H3 locks through its armature 5 and front contact, and conductor 31-02. It releases relay 33TC and operates relay 31G3, and in the manner previously described outgoing transmission is initiated. The transmission proceeds, and at the end of the message the disconnect signal causes restoration of the priority level to normal in the same manner as either of the other levels.

If the priority level has other message material awaiting transmission relay 31P3 remains operated and the level does not lose control of the outgoing transmission channel upon restoring to normal in response to the disconnect signal as do the other levels. It will be assumed that when the priority level restores to normal with relay 31P3 remaining operated relays 21P1 and 26P2 are operated. The energizing path for relay 21H1 is traced from its winding, conductors 21-04 and 21-06, back contact and armature 5 of relay 23J, conductors 23-01 and 21-07, front contact and armature of relay 21P1, and conductor 21-08 to armature 1 of relay 31P3. Armature 1 of relay 31P3 has no front contact and with the relay operated relay 21H1 cannot operate. Similarly, with relay 23J operated, the energizing path for relay 21H1 terminates at the back contact associated with armature 5 of relay 23J. The energizing path for relay 26H2, when relay 23J is unoperated and relay 21P1 is unoperated, is traced over conductors 26-16 and 26-17, armature 3 and front contact of relay 26P2, conductor 26-18, back contact and armature of relay 21P1 and conductor 21-08 to armature 1 of relay 31P3 where the path terminates, or when relay 21P1 is operated the path extends over conductors 26-16 and 26-19 to the front contact associated with armature 2 of relay 23J where the path terminates. Since relay 31H3 is not prevented from reoperating by either of the relays 21H1 and 26H2, it will reoperate and transmit message after message as long as the priority level has any messages in storage and until such time as relay 31P3 is unoperated when relay 31H3 releases.

The circuits above-described provide for access of the three levels to the outgoing trunk transmission channel according to a definite pattern. If neither of the regular storage levels is bidding for access to the outgoing trunk transmission channel the priority level will, upon bidding, gain immediate access, and retain control until all the messages that it has in storage have been transmitted. If the first level is transmitting, it will lose control of the outgoing channel at the end of the message unless neither of the other levels is bidding for access. If, when the first level loses control the second level is bidding it will gain access whether or not the priority level is also bidding. If, when the second level loses control the third or priority level is bidding it will gain access whether or not the first level is also bidding. If, when the third level loses control the first level is bidding it will gain access whether or not the second level is also bidding. If either the regular storage levels has a succession of messages, it can retain access for the transmission of those messages provided neither the priority level nor the other regular level bids for access. In the case of the first level having a succession of messages and neither of the other levels bidding, relay 23J releases each time relay 21H1 releases because relay 23J does not lock unless relay 26P2 is operated. In that event, relay 23J reoperates each time relay 21H1 reoperates. In the case of repetitious bidding for access by the second level with neither of the other levels bidding, relay 23J releases incident to transmission of one message, and with relay 21P1 remaining released, relay 26H2 can reoperate through the back contact and armature of relay 21P1.

Routing of group code message

One of the typical messages referred to in the introductory portion of the specification as exemplifying a mode of operation contemplated by the invention was assumed to be a message received from switching center 1–34 and addressed by the single group code BR. It was set forth that the signals comprising the message would include the office identification code BQ by which switching center 1–34 designates a message retransmitted to a remote switching center for handling by the multiple address circuit of the latter switching center, in which group code messages are also handled, the address code BR designating a group of stations to receive the message, the signals for carriage return, line feed and letters, the text of the message and the disconnect signals.

The office identification code BQ, as received by reperforator 11–02 and as decoded by the regulator director circuit allocated to the incoming channel of trunk 1–33, causes the message to be routed to one of the four storage levels of the multiple address circuit. When that level gains access to the multiple address director circuit in the manner hereinbefore described, the address code BQ is decoded, and ground is supplied through the final fan circuit in Fig. 42 and through contacts controlled jointly by select magnet 43S9 and hold magnet 53H2 to conductor 43–11 which represents the final code point for the code BQ. The ground is extended over conductor 43–11 and through the left-hand winding of relay 67TK1, and winding of relay 67RST to battery. Relay 67TK1 operates as it did in the case of reception of a priority message from switching center 1–34 and operates relay 67TC1 as before. With relay 67TC1 operated, ground is extended through its inner left-hand armature and front contact, conductor 67–03, armature and front contact of relay 67RST, conductor 67–04 to the junction of conductors 43–03 and 53–03, and then over a path including the latter conductor and conductors 52–21 and 49–23 to cause the operation of relay 49DC, which results in the discarding of the office identification code BQ in the manner previously described.

The multiple address director circuit next decodes the group code BR and, under the control of the second fan circuit in Fig. 42, connects ground to conductor 43–12 through contacts closed under the control of select magnet 43S9 and hold magnet 53H2. The ground is extended over conductor 43–12 to the winding of relay 66C3 which operates and locks through its front contact and lower armature, conductors 66–01 and 63–12, and the winding of relay 51–OP1 to conductor 42–02 over which ground was applied through the final fan circuit and the final code point corresponding to the group code BR, to operate relay 66C3.

Relay 66C3 initiates the seizure of all outlets to which the message must be routed in order to cause the forwarding of the message to stations designated by the group code BR. It does this by grounding five conductors designated 66–02, 66–03, 66–04, 66–06 and 66–07 through its upper armatures and front contacts. The ground on conductor 66–02 is extended over conductor 66–08 to the winding of relay 62–02 which operates. The function of relay 62–02 is to seize one of the storage levels of the outgoing multistation line because, as indicated in Fig. 1, receiving reperforator 1–16, designated by the individual address code GX is also designated by the group code BR. The ground on conductor 66–03 is extended over conductor 66–09 to the winding of relay 62–03, which is allocated to the seizure of one of the storage levels of the single station line, since that station is designated by group code BR as well as by individual address code BG, as indicated in Fig. 1. The ground on conductor 66–04 is extended over conductors 66–11 and 66–12 to the armature of relay 67T1. Relay 67T1 is energizable from the outer left-hand armature of relay 67TC1 and accordingly is operated, since the latter relay has been operated by relay 67TK1 and is locked under the control of relay 67RLS. The back contact associated with the armature of relay 67T1 is connected over conductor 67–06 to the winding of relay 62–04. The function of relay 62–04 is to effect the seizure of one of the storage levels of the outgoing trunk circuit for remote switching center 1–34.

The message has been received from that switching center, and has been transmitted by that switching center to any station served by that switching center so that the message should not be retransmitted to it. The operation of relay 67T1 under the control of relay 67TK1 prevents the operation of relay 62–04, and thus the revertive retransmission of the message to the switching center from which it was received. It may be noted at this point that relays 67TK2 and 67TK3 are operable in response to the office identification codes BE and BD, respectively, to cause the operation of relays 67TC2 and 67TC3, respectively. Office identification code BE originates in switching center 1–37 and through relays 67TK2, and 67TC2 operates relay 67T2 to prevent the operation of relay 63–05 which is allocated to the seizure of one of the regular storage levels of the outgoing trunk circuit for switching center 1–37. Office identification code BD originates with switching center 1–26 and effects, through relays 67TK3 and 67TC3, the operation of relay 67T3 to prevent the operation of relay 63–08, the function of which is to select one of the channels 1–27, 1–28 and 1–29 of the multichannel trunk extending to switching center 1–26. It will be noted that relay 67T3 is operable by either of the relays 67TC2 and 67TC3. This may be described as preventing the retransmission, from the switching center being described in detail herein, to switching center 1–26, of a group code message received from that switching center or from switching center 1–37. The reason for this is that switching centers 1–26 and 1–37 are directly interconnected by trunk 1–38. It is therefore not necessary for transmission from either one of those two switching centers to the other to be relayed through a third switching center. Specific routing operations may be established among the several switching centers by correspondingly and selectively subjecting relays 67T1, 67T2 and 67T3 to control by relays 67TC1, 67TC2 and 67TC3 as in the case of relay 67T3.

Returning to consideration of circuits established by relay 66C3, the ground applied to conductor 66-06 is extended over conductors 66-13 and 66-14, armature and back contact of relay 67T2, conductor 67-07 and winding of relay 63-05, this relay being allocated to the selection of reperforator 20-02 or 25-01 of the outgoing trunk circuit to switching center 1-37. The ground on conductor 66-07 is extended over conductor 66-16 to the winding of relay 63-06 which is allocated to the selection of local outlet 3-07 which responds to the group code BR as well as to the individual address code GD. As indicated in Fig. 1, it has been assumed that no station served by switching center 1-26 is identified by the group code BR so that relay 66C3 does not ground a path traced over conductors 66-17 and 66-18, armature and back contact of relay 67T3 and conductor 67-08 to the winding of relay 63-08 which is allocated to the selection of an outgoing channel of the multi-channel trunk extending to switching center 1-26.

Of the operated relays 62-02, 62-03, 62-05 and 62-06 only the relay 63-05 has complete circuits shown in the drawings and the operations performed by the latter relay will be described. It completes the circuit of relay 63G1, traced from the winding of that relay, conductors 63-18, 63-19 and 63-20, armature 4 and front contact of relay 63-05 to ground. At its armature 9, the relay 63G1 operates relay 63-08C in a circuit traced from the winding of the latter relay, conductor 63-21, front contact and armature 9 of relay 63G1, break contacts controlled by armature 4 of relay 63-08, which is not operated, to ground. Similarly, relay 63-07C operates over conductor 63-22, armature 8 and front contact of relay 63G1, and break contacts controlled by armature 4 of relay 63-07. Because relays 63-05 and 63-06 are operated, relay 63G1 does not complete circuits for relays 63-05C and 63-06C at its front contacts and armatures 6 and 7, but circuits for those relays are prepared at armatures and front contacts of relays 63-05 and 63-06. Nor does relay 63G1 operate relays 62-02C and 62-03C, since relays 62-02 and 62-03 are operated. It does operate relay 62-04C because relay 62-04 is not operated.

At its armature 1, relay 63G1 connects ground over conductor 62-23 to the winding of relay 62GC. The latter relay has a slow operate characteristic and operates after a delay interval. When it does operate, it completes thte circuit of relay 62-01C, traced from the winding of that relay, front contact and armature of relay 62GC, conductor 62-11, front contact and armature 2 of relay 63G1, conductor 63-24, and break contacts controlled by armature 3 of relay 62-01 to ground. The armatures and front contacts of relays 62-01C to 63-08C are connected in a chain circuit beginning with ground on the armature of relay 62-01C, and the circuit will not be completed until relays 62-02C, 62-03C, 63-05C and 63-06C operate.

Returning to consideration of relay 63-05, at its armature 2, it connects ground to conductor 63-11 which extends to armature 2 of relay 32PR in the outgoing trunk circuit, and is the busy test conductor over which the multiple address circuit bids for access to either of the regular storage levels of the trunk circuit outgoing to switching center 1-37. Similarly, relays 62-02, 62-03 and 63-06 test for availability of their respective outlets. Assuming that one of the regular levels of the outgoing trunk circuit is idle it responds in the manner previously described, and evidences the response by connecting ground to armature 2 of relay 27BC2, which is extended over conductor 27-12 or, in case of an outlet other than a trunk circuit, over a conductor corresponding to conductor 27-13, to armatures 5 and 6, respectively, of relay 63-05. Front contacts associated with those armatures are connected to the winding of relay 63-05C which operates. Similarly, other outlets are seized if idle or when they become idle, to cause the operation of relays 62-02C, 62-03C and 63-06C. This completes the previously-described chain circuit, and a ground is extended over conductors 63-26 and 63-27 to conductor 63-14, and thence over a previously-traced path to the winding of relay 49STT in the multiple address director circuit. This relay causes the generation and transmission of the office identification code BA to all seized outlets, whether trunks, single station or multistation lines, or local outlets. In the case of trunks, the office identification code serves the previously-described purpose of routing the message to the multiple address circuit and preventing revertive retransmission of the message or transmission thereof to a switching center by two or more other switching centers. In the case of other types of outlets the office identification code serves no purpose but does no harm. It would complicate the system needlessly to blind seized non-trunk outlets while transmitting the office identification code to trunk outlets and then to unblind the non-trunk outlets prior to transmission of the group code to both types of outlets.

Following thte office identification code BA the group code BR and the code for letters signals are transmitted to all of the seized outlets. It has been assumed that only the single group address code BR preceded the message. Incident to transmission of the letters signal following the group code, relay 39TF in the multiple address circuit operates and initiates the release of the select magnets and hold magnets in Figs. 52, 43, 53 and 42, in that order. The hold magnets in Fig. 53 remove ground from the final code point for code BR, interrupting the original energizing circuit for selecting relay 66C3 of the group code circuit. The hold magnets in Fig. 42 remove ground from the locking circuit of relay 66C3, which releases. Relay 66C3 releases relays 62-02, 62-03, 63-05 and 63-06. These relays release relays 62-02C, 62-03C, 63-05C and 63-06C, respectively. Relays 62-02, 62-03, 63-05 and 63-06 disconnect ground from busy test leads to the seized outlets, such as conductor 63-11, and from the locking paths for the LD-relays in the seized outlets, such as conductor 32-02 in the locking circuit for relays 22LD1 and 27LD2. Conductor 63-11 is part of the energizing circuit for relays 22LA1 and 27LA2, but those relays lock to relays 22LB1 and 27LB2, respectively, and are unaffected by the removal of ground from conductor 63-11. Relay 22LD1 or relay 27LD2, released, disconnects the transmission path from the grid of tube 22-11 or 27-04, respectively, thereby blinding reperforator 20-02 or 25-01.

Relays 62-02, 62-03, 63-05 and 63-06 also release relay 63G1, which releases relays 62GC, 62-04C, 63-07C and 63-08C. Upon release of any one of the relays 62-01C through 63-08C the chain circuit, over which relay 49STT in the multiple address director circuit was operated, is interrupted and relay 49STT releases.

The release of relay 49STT initiates the decoding of the next code combination by the multiple address director circuit. It has been assumed that the tape contained only the group address code BR. Accordingly the multiple address director circuit finds as the next signal the carriage return code combination, indicating that there are no further address codes. Responsive to that code combination the multiple address director circuit proceeds, in the manner previously described, to unblind the seized outlets, initiate text transmission, and restore itself to normal. At the end of the message the disconnect signal causes the outlets to be disconnected and restored to normal.

Among the operations performed by the multiple address director circuit responsive to the carriage return signal is the energization of relay 49CL from the first fan circuit in Fig. 43. This relay in turn operates relay 40-LC over conductor 40-26. Relay 40-LC grounds conductor 40–27 to unblind the storage levels of the seized outlets, as mentioned above, by operating relays corresponding to relays 22LC1 and 27LC2. Relay 40-LC also grounds conductor 40–28 traced to the winding of relay 67RLS. This relay interrupts the locking circuit of relay 67TC1 which deenergizes, and releases relay 67T1. The group code circuit is thereby restored to normal.

Had the foregoing message originated in a station served by the switching center herein described, for example a subscriber station, or the originating station in the switching center, the message would have been routed into the multiple address circuit by the address code BC instead of BQ. As previously described, the multiple address circuit supplies ground for operating discard relay 49DC to conductor 53–03 over conductor 43–03 in response to the multiple address code BC instead of over conductor 67–04 which receives ground when any one of the relays 67TK1, 67TK2 and 67TK3 operates in response to one of the routing or office identification codes. With none of the relays 67TC1, 67TC2 and 67TC3 operated, none of the trunk outlets is excluded from seizure in response to a group code.

The next message was assumed to be a multiple address message including a group code received from switching center 1–34, the message being addressed to station 1–07 on a multistation line, having the address code QW, to stations assigned the group code CF, this being the subscriber station 1–08 on the party line, the station 1–19 on the single station line and stations served by switching centers 1–26 and 1–37, and to local outlet 3–01 having the individual address code CR. The signals comprising this message, as transmitted from switching center 1–34, will be office identification code BQ followed by a letters signal address code QW followed by a letters signal, the group code CF followed by a letters signal, the address code CR followed by a letters signal, the signals for carriage return line feed and letters, the text of the message and the disconnect signal comprising figures, H and letters. This message will be received by reperforator-transmitter 11–02, and under the control of the director circuit associated therewith, will be retransmitted to one of the levels of the multiple address circuit. The multiple address director circuit, upon being associated with the storage level of the multiple address circuit that records the message, decodes the address code BQ, and in the manner previously described operates relays 67TK1 and 67RST, the former operating relay 67TC1 which in turn operates relay 67T1, and relay 67TC1 locks. The circuit of relay 49DC is completed by relays 67TC1 and 67RST, and relay 49DC operates to initiate the discarding of the office identification code BQ. The multiple address director circuit next decodes the address code QW, and the first fan circuit, in response to the Q signal, operates select magnet 53S4 and hold magnets 53H4, 53H5, 53H6 and 53H7. In response to the W signal, the second fan circuit connects ground through contacts 53–06 to conductor 53–07. The ground connection is extended over this conductor, break contacts of intercept keys 34–01 and 34–02 to conductor 34–03, and then to conductor 44–03 which has previously been identified as the busy test conductor over which the multiple address director circuit tests the outgoing multistation line circuit, shown only in diagrammatic form in Fig. 2, and having reperforator-transmitter units 2–08 and 2–09. If one of the storage levels of that outgoing line circuit is available, or when one becomes idle, the outgoing line circuit extends a ground connection over the conductor corresponding to conductor 27–13, for operating relay 49STL to acknowledge seizure of a level of the outgoing line circuit and to initiate retransmission to that level, of the address code QW, not preceded by the office identification code BA, since the seized outlet is an outgoing line rather than an outgoing trunk. After the letters signal following the address code QW has been transmitted to the seized outlet, the outlet is blinded, and the multiple address director circuit decodes the group code CF. In response to the code for the character C, which has its fourth signal element of marking nature, select magnet 43S8 and hold magnets 53H0, 53H1, 53H2 and 53H3 are operated. In response to the code for the character F, a ground connection is extended by the second fan circuit through contacts closed under the joint control of select magnet 43S8 and hold magnet 53H1, to conductor 43–13, over which the ground is extended to the winding of relay 66C4 which operates and locks to conductor 66–01.

Relay 66C4 extends a ground connection over conductor 66–09 to operate relay 62–03 for seizing the single station line. It extends a ground connection over conductor 66–08 to operate relay 62–02 for seizure of the multistation line. It extends ground over conductor 66–14, the armature and back contact of relay 67T2, and conductor 67–07 to operate relay 63–05 to effect the seizure of one of the storage levels of the outgoing trunk circuit to switching center 1–37. It connects ground over conductors 66–17 and 66–18 for operating relay 63–08 through the armature and back contact of relay 67T3, and conductor 67–08 to effect the seizure of one of the outgoing channels of the multichannel trunk extending to switching center 1–26. Relays 62–03, 63–11 and 63–08 cause the seizure of their respective outlets in the manner previously described with respect to relay 63–05 and the trunk circuit outgoing to switching center 1–37. With regard to the multistation line, it should be noted that a storage level of that outgoing line circuit has already been seized in response to the individual address code QW. The operation of relay 62–02 does not result in the seizure of another storage level of the outgoing line circuit, but results merely in the unblinding of the level already under seizure by the multiple address circuit. The manner in which this is accomplished will be described with respect to Figs. 22 and 27 of the outgoing trunk circuit as if those figures represented the seizure controlling relays of two storage levels of the outgoing multistation line. It will be assumed that the first level was seized in response to the address code QW, and that the second level is idle. The condition of relays in Fig. 22 would be that relays 22LA1, 22BR, 27BC1 and 27BC2 are operated and locked, that relay 22LE1 is operated from relay 22LA1, and that relay 22LD1 had been operated and locked but was released following the transmission of the letters signal to blind the reperforator 20–02. With relay 62–02 operated, ground is connected through the front contact and armature 2 to conductor 62–12. The corresponding conductor for relay 63–05 is conductor 63–11. The ground connection is traced over conductor 63–11, armature 2 and back contact of relay 32PR, conductor 32–01, armature 1 of back contact of relay 27BM which remains unoperated and prevents seizure of the second level by the multiple address director circuit until the transmission of the text of the message to the first level has been initiated, the path continuing through the back contact associated with that armature of relay 27BM, conductor 27–17, armature 4 and back contact of relay 22LB1, armature 1 and back contact of relay 22J1, break contacts controlled by armature 1 of relay 22A1, front contact and armature 2 of relay 22LA1, which is operated, and the winding of relay 22LD1 which operates. Relay 22LD1 unblinds signal repeating tube 22–11 to prepare the tube to respond to the group code CF. Thus the seizure of a plurality of storage levels of an outlet for reception of a multiple address message or group code message is prevented.

In the manner previously described the chain circuit for operating relay 49STT when all of the outlets designated by the group code have been seized is completed. That relay initiates the transmission of the office identification code BA, followed by the group code CF, and all outlets, including the multistation line and the single station line, receive the office identification code, although it serves no purpose with respect to those lines. The letters signal following the address code CF is transmitted to the outlets, following which the outlets are blinded, and relay 66C4 in the group code circuit is released, but relays 67TC1 and 67T1 remain operated.

The multiple address director circuit next decodes the address code CR, and extends a ground connection over conductor 43–14, break contacts of intercept keys 54–12 and 54–13, conductor 54–14, and back contact and armature 2 of relay 63–07 to conductor 63–28. Conductor 63–28 is the busy test conductor for local outlet 3–01, and the grounding of that conductor results in the seizure of one of the recorders 3–04 and 3–06 of that local outlet. The address code CR is transmitted to the seized recorder together with the following letters signal and the recorder is then blinded. It has been assumed that the message has no additional address codes so that the multiple address director circuit next decodes the carriage return signal. In response to that signal, relay 67RLS in the group code circuit is operated to release relay 67TC1, and through it relay 67T1, the multiple address director circuit is restored to normal and is released, and the several outlets are unblinded to render them responsive to the carriage return and succeeding signals, and transmission of the text of the message is initiated. In response to the disconnect signal at the end of the message the several outlets are disconnected.

The next message assumed to be received by the switching center is a priority multiple address message including a group code. Specifically, the message has been assumed to arrive over a trunk from switching center 1–34, and being a priority message it will be preceded by the priority office identification code for switching center 1–34 which is the code PQ. It has further been assumed that accompanying the message are the individual station address code BU and the group code BR.

The message will be routed by the regular director circuit to one of the priority storage levels of the multiple address circuit in the manner hereinbefore described. When the particular priority level gains access to the multiple address director circuit, the address code PQ will be decoded and discarded, and relay 51PR will be operated and locked to cause the generation of the priority office identification code PA, instead of the regular office identification code BA, upon the seizure of any outgoing trunk circuit in response to an individual address code or upon the seizure of any outlet in response to a group code. Since the individual address code BU that precedes the message identifies a station served by switching center 1–37, reached over trunk 1–36, the decoding of that address code will cause the seizure of the priority message storage level of the trunk outlet, contained in Figs. 30 to 33, and the priority office identification code PA will be generated and transmitted to reperforator 30–01 ahead of the address code BU. Following the transmission of the address code BU, the multiple address director circuit decodes the group code BR. In response to that address code, relay 66C3 in the group code circuit operates to effect the seizure of the several outlets to which the group code BR pertains. One of those outlets is the outgoing trunk circuit that has been seized in response to the address code BU. Relay 32PR in the priority storage level of that outlet remains operated until the multiple address director circuit has been dismissed after all address codes have been decoded. Accordingly, the only effect of the decoding of the group code BR, upon that outlet, is the unblinding of tube 32–06 to enable it to repeat the address code BR to reperforator 30–01. The path over which relay 32PR in the priority storage level was operated includes conductor 39–28 which is multipled to the energizing circuits of corresponding relays of the priority storage levels of all outlets. It follows from this that upon the seizure of any outlets having priority storage levels in response to the group code BR, the priority storage levels will be seized, whereas one or the other of the regular storage levels of outlets not having priority storage levels will be seized. In the manner previously described, the seizure of outlets under the control of group code relay 66C3 results in the generation of the office identification code and transmission of that code to all outlets seized or unblinded under the control of relay 66C3. Because relay 51PR of the multiple address director circuit remains operated until the decoding of address codes is completed, the office identification code transmitted to the outlets seized in response to the group code BR will be the priority code PA. Reperforator 30–01 will receive and record the identification code PA, preceding the group code BR, although it has received that identification code preceding the individual address code BU. The reason for this, as previously stated, is that there is no provision for preventing the unblinding of a previously seized outlet until after the office identification code has been transmitted, to enable the outlet to receive only the group code following the office identification code.

In response to the carriage return signal that follows the last address code, the multiple address director circuit is dismissed, and text transmission to all of the seized outlets is initiated. When the transmission of the text of the message to the outlets is completed and the disconnect signal is decoded and transmitted to the outlets, they will be disconnected from the priority storage level transmitter and will be rendered available for other messages.

This completes the description of the circuits and methods of handling and routing the various types of messages that were assumed to be typical of those occurring in actual traffic service. It included consideration of non-priority messages having only a single address code, multiple address messages having a plurality of address codes, each identifying only a single station, group code messages having no individual station address codes but only group codes, priority messages having only single station address codes, regular multiple address messages having both individual station address codes and group codes, and priority messages having individual address codes and group codes.

Multiple address intercept

Patent 2,766,318, hereinbefore mentioned, includes intercept arrangements for the interception of regular single address messages and multiple address messages. Moreover, the interception of either type of message may occur under either of two conditions. One of those conditions is that traffic for a particular station or group of stations or for a particular line or trunk is being intentionally intercepted because the station is shut down or is out of order or the line or trunk is out of order. This type of interception has been designated as a wilful intercept and the routing of messages into the wilful intercept is controlled by manually operable locking keys individually allocated to the subscriber stations served by a switching center or to the trunks outgoing to remote switching centers. It is, of course, understood that the intercept keys are located in the switching center. As disclosed in the above-identified patent, each wilful intercept comprises a reperforator and associated transmitter for automatically reintroducing intercepted messages into the switching system.

The other type of intercept has been designated as miscellaneous intercept and serves as a destination for messages preceded by faulty address codes, the fault residing in the condition that either the first or second character code combination of the address has become garbled or that the address code is unassigned. The miscellaneous intercept is provided with a reperforator but without the transmission means. The reason for this is that the faulty address codes require intelligent attention by an operator to the end that correct address codes may be substituted for faulty ones in order that the messages may be routed to the proper destination. These two types of intercept are provided for individual address messages.

As disclosed in the above-identified patent, the multiple address circuit also has an intercept. It serves in the dual capacity of wilful and miscellaneous intercept for multiple address messages only and is not provided with automatic message retransmitting and directing equipment because the attention of the operator is required as in the case of messages with faulty address codes. Whereas in that patent each wilful miscellaneous intercept or multiple address intercept had only a single reperforator, each such intercept in the present system may include a plurality of reperforators that are available for seizure on a rotational basis as long as any remains idle. This new type of intercept will be described only as employed in the service of multiple address intercept in the present system, it being understood that when employed as wilful or miscellaneous intercept, it operates in the manner of the intercept now to be described and is seizable by a regular director circuit in the manner described in the above-identified patent.

The operation of the multiple address intercept circuit in its capacity as a miscellaneous intercept will be described first. It was set forth in the description of the theory of operation of the first and second fan circuits of the multiple address circuit and with reference to Table A, that 20 of the 32 code combinations available in the 5-unit code are employed as first or second character of address codes, and those 20 characters are designated accompanying 20 crossbar switch verticals in Fig. 43 and also accompanying the select magnets in Figs. 43 and 53. This leaves 12 code combinations that are not used as address codes, either because they are employed for other purposes or are especially liable to error. Eliminating the 20 address codes from Table A it may be found that the remaining 12 are the codes for Z, H, T, O, M, V, space, line-feed, blank, letters, figures and carriage return. Of these, it is only necessary to detect codes for Z, H, T, O, M, V, space, blank and figures as possible erroneous first-character codes of an address code. The reason for this is that of the remaining 3, letters occurs accompanying each address code, and may be repeated but is always detected as a letters signal and never as the first character of an address code. Carriage return, and its companion code, line-feed, are employed to signify end-of-address codes and to effect the release of the multiple address director circuit so that they should not be employed to cause the routing of a message to intercept. Any one of the other 9, if appearing in a place among the codes preceding a message, such that the multiple address director circuit would interpret it as the first code of a 2-character address code, may be assumed to have resulted from the garbling of a correct address code and should cause the interception of the message. Accordingly, the paths selected in the first fan circuit, Fig. 52, have been designated by these 9 codes, and those paths are connected to either of two conductors 52–31 and 52–32, the paths which emerge from crossbar switch contact groups I, II, III and IV being connected to conductor 52–31, and those which emerge from contact groups V, VI, VII and VIII being connected to conductor 52–32. When either of the conductors 52–31 or 52–32 is selected in a decoding operation, a select relay, Fig. 43 or 53, will not be operated, but the ground connection will be extended through one or the other of the windings of relay 51BF to operate that relay. The relay extends ground over conductor 51–22 to operate relay 39IA. This relay locks through its front contact and armature 2, conductor 39–29, armature 2 and back contact of relay 39TF, conductor 39–31, and front contact and armature 6 of relay 40–ON1 to ground. It should be noted that in the condition of the multiple address director circuit in which it is decoding the first character of an address code, relays that are operated, but not locked, are the relays 59PRC, 37P, 38SM, 40–ON, 40–ON1, 49DB and 50–FC. Relays that are operated and locked are relays 38G, 49CR, 49DA and those of the relays 50–F1 to 50–F5 that correspond to marking elements of the code stored on those relays. In addition, two of the four select magnets and two of the four hold magnets in Fig. 52 are operated in correspondence with the code combination stored on relays 50–F1 to 50–F5.

Relay 39IA prepares an energizing circuit for relay 39IB, and at its armature 1 and front contact, it extends ground over conductors 39–32, 49–46 and 50–14 to operate relay 40–FL. This relay performs a number of operations previously described including the locking of relays 50–F1 to 50–F5, the locking of the two operated hold magnets in Fig. 52, the release of relay 50–FC which releases the operated select magnets in Fig. 52, the provision of a holding circuit for relay 40–OP2 and the operation of relay 49RC. Relay 49RC releases relay 49CR, which in turn releases relays 49DA and 49DB. Relay 49DB, released, completes the operating circuit for relay 40–FLA over a path previously traced, and also completes the circuit of relay 39IB prepared by relay 39IA, the path being traced from the left-hand winding of relay 39IB through the front contact and armature 3 of relay 39IA, conductor 39–33, and the back contact and armature 2 of relay 49DB. Relay 39IB locks to its right-hand winding and its front contact and armature 2 to conductor 39–29 over which relay 39IA is locked.

Relay 40–FLA releases relay 49RC which initiates the operation of decoding the second character of the address code as previously described. This code combination is transferred to the relays 50–S1 to 50–S5, and the relay 49DA having operated when the distributor auxiliary contacts close, relay 49DB operates when those contacts open before the distributor shaft comes to rest. With relay 49DB operated, the circuit for relay 39IC is completed, the circuit being traced from the left-hand winding of the relay through the front contact and armature 3 of relay 39IB, conductor 39–34, and front contact and armature 2 of relay 49DB to ground. Relay 49DB also operates two of the select magnets in Fig. 42 in accordance with the code combination stored on relays 50–S1 to 50–S5.

The two select magnets, of the four in Fig. 42, that are operated in accordance with the signal storage condition of relays 50–S1 to 50–S5 extend ground for operating two of the four hold magnets in Fig. 42. Assuming that a valid address character code is stored in the relays 50–S1 to 50–S5, one of the twenty paths extending from the second fan circuit in Fig. 42 to Fig. 43 will be completed. However, the path will not be extended through any of the crossbar switch contacts in Figs. 43 and 53 because none of the select magnets in those figures has been operated.

Relay 39IC, operated and locked as previously stated, extends ground from its armature 1 through the front contact, armature 1 and back contact of relay 39WI, conductors 39–36 and 52–33, break contacts controlled by armature 1 of relay 61H2 to the contactor associated with the lower contact bank of stepping switch 61–01 in the multiple address intercept circuit.

It will be assumed that the contactor of the lower contact bank is engaging the first contact, from which a path is traced through the armature 1 and back contact of relay 61B and break contacts controlled by armature 2 of relay 61LA to the winding of the latter relay, and that relay operates. Relay 61LA locks through its front contact and armature 2, and the back contact and right-hand armature of relay 61LB to ground. At its armature 4, relay 61LA connects ground over a path to the winding of relay 61EA which operates. At its armature 5, relay 61LA connects ground through its associated front contact, back contact and armature 4 of relay 61LC and lower winding of relay 61H2, and that relay operates, locking to conductor 52–33 through its front contact and armature 2 and upper winding. With relays 61LA and 61H2 operated, relay 61LD operates in a circuit traced from its winding through the front contact and armature 6 of relay 61LA, back contact and armature 3 of relay 61LC, and front contact and armature 1 of relay 61H2 to conductor 52–33, over which relay 61LA was energized and over which relay 61H2 is locked. Relay 61LD locks through its inner armature and front contact, conductors 61–12 and 61–13, armature 2 and back contact of relay 62–01 to conductor 63–12, and leftwardly along that conductor to Fig. 51, and through the winding of relay 51–OP1 and conductor 42–02 to ground supplied by the operated hold magnets of the second fan circuit in Fig. 42. Current does not flow at this time in this locking circuit, because the operating circuit for relay 61LD is still active.

With relay 61EA operated by relay 61LA, ground on the armature 4 of relay 61EA is extended through the associated front contact, first contact and contactor of the upper contact bank of stepping switch 61–01, to conductor 61–04. One branch of that conductor extends to the armature 7 of relay 61EA where the path terminates because the relay is operated. The other branch extends to armature 7 of relay 65EA, and multiple connections are indicated by a stub to corresponding armatures of corresponding relays of other levels of the multiple address intercept circuit, the level containing relay 61EA being considered as the first level, and the one containing relay 65EA being considered as the last level. Assuming relay 65EA is unoperated, the ground connection will be extended over the back contact associated with armature 7, back contact and armature 2 of relay 65B and conductor 61–03, which has branching connections to armature 2 of relay 61B and corresponding armatures of corresponding relays of other levels, and the path continuing from conductor 61–03 through break contacts of stepping magnet 61–02 of stepping switch 61–01, and winding of relay 61–OS to battery. This provides an operating circuit for relay 61–OS and any levels in which relays corresponding to the relays 65B and 65EA are unoperated, indicating that the level is idle, will provide such a path interconnecting the upper stepping switch bank contactor and the winding of relay 61–OS. Relay 61–OS completes an energizing circuit for stepping magnet 61–02 which operates, interrupting the energizing circuit for relay 61–OS, which in turn causes the release of stepping magnet 61–02 and advancement of the contactors of stepping switch 61–01 to the next position at which the contactor of the upper contact bank is ungrounded, the intercept storage level corresponding to such ungrounded contact being thereby indicated as idle and available. When there are fewer levels of the multiple address intercept circuit than the number of contacts in the contact banks of stepping switch 61–01, the unassigned contacts of the upper contact bank are grounded. This provides for advancement of the contactors past those contacts, seeking the first idle level. When all of the levels are busy, all of the relays corresponding to 61EA will be operated, and there will be no path through the armatures 7 of those relays so that contactors of stepping switch 61–01 will be capable of advancing only when there is at least one idle level to which they may advance and stop.

Further functions of relay 61EA are the operation, at the armature 2 and front contact, of busy lamp 61–06 for the particular level and the operation of audible alarm controlling relay 68ST in the alarm circuit, the path being traced from ground through the armature 3 and front contact of relay 61EA, break contacts controlled by the right-hand armature of relay 61S, conductors 61–07 and 65–01, and normally closed key 68–09. The audible alarm may be silenced by the operation of key 68–07 which extends ground over conductors 68–11 and 65–02, front contact and armature 6 of relay 61EA, and break contacts controlled by the left-hand armature of relay 61S to the winding of that relay. Relay 61S operates, removes ground from conductor 61–07 thereby releasing audible alarm relay 68ST, and locks through its front contact and left-hand armature, and through the front contact and armature 3 of relay 67EA to ground.

An operation performed by relay 61LA, not previously described, is the connection of ground on its armature 3 to conductor 61–11 which is included in a group of conductors bracketed to Fig. 41, in which conductor 61–11 reappears and is connected to the winding of hold magnet 41–12 of the multiple address link circuit. As in the case of the previously described operation of the multiple address circuit, the select magnet operates following the operation of relay 38G before the first address code is decoded so that select magnet 41–01 will have operated, and hold magnet 41–12 closes contacts prepared by select magnet 41–01 to establish transmission and control connections from the multiple address storage level which has encountered the faulty address code to the first level of the multiple address intercept circuit. At its upper armature and front contact, hold magnet 41–12 extends a ground into the multiple address circuit over conductor 38–37 for locking either of the relays 37D or 37TX. At its lower armature, hold magnet 41–12 grounds conductor 41–13 included in the group of conductors bracketed to Fig. 41, in which the conductor is traced to the left-hand armature of relay 61LB as a prepared locking circuit for that relay.

Figure 49:
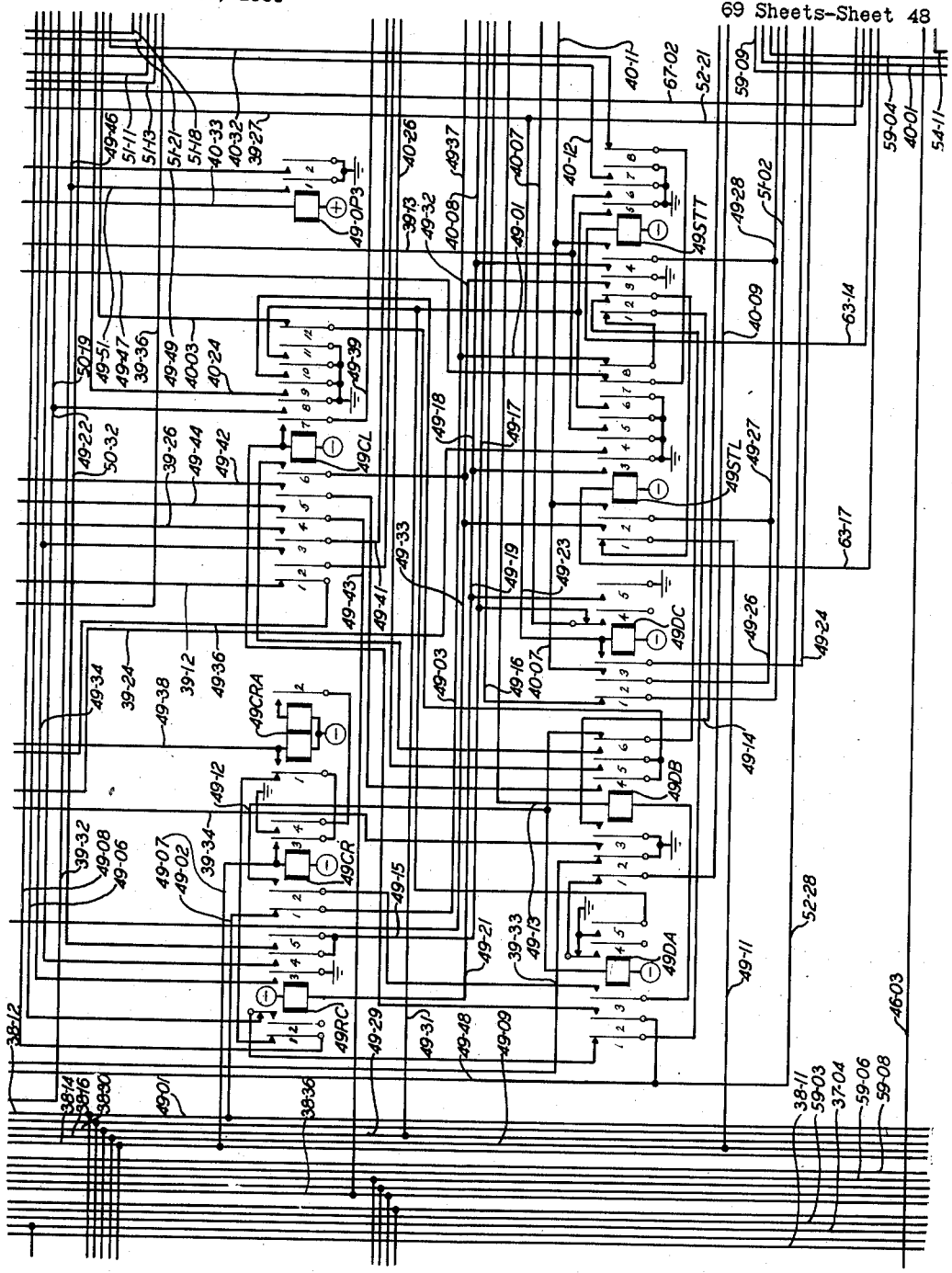

Relay 61LD, which was operated by relay 61LA, extends ground through its front contact and outer left-hand armature, conductors 61–08 and 61–09, armature 4 and back contact of relay 62–01 to conductor 63–17, and leftwardly along that conductor to Fig. 49 and to the winding of relay 49STL which operates. As has been noted previously, relay 49STL initiates the transmission, to a seized outlet, of an address code unaccompanied by the office identification code. The reason for not including the office identification code is that the message is being routed into the multiple address intercept circuit, in the capacity of that circuit as a miscellaneous intercept, under the control of a faulty address code. The services of an operator are required to examine the message tape as it will be produced in the multiple address intercept reperforator to determine, if possible, where the message is to be routed and to correct the address signals and supply office identification code signals if necessary. The transmission path entering the multiple address link circuit from the multiple address circuit is conductor 38–31, and the path is extended through the uppermost contacts controlled jointly by select magnet 41–01 and hold magnet 41–12, conductor 41–14 included in the group bracketed to Fig. 61, to the grid of signal repeating tube 60–02. Tube 60–02 repeats signals through its discharge circuit including the path from the anode through the windings of relays 60–N and 60–L, and the winding of select magnet 60–03 of reperforator 60–04 to positive battery. Reperforator 60–04 is not equipped with a retransmitting mechanism or a director circuit, since a message will require the attention of an operator, so that the tape produced by the reperforator feeds into a receptacle.

The multiple address director circuit operates in the manner previously described to transmit the invalid first character, that caused the interception of the message, the valid second character of the address code and the letters signal following those codes.

As in the case of the previously described operation of the multiple address director circuit relay 39TF operates, upon the opening of the distributor auxiliary contacts 35–39 in the cycle of distributor shaft 35–37 in which the letters signal is transmitted. When relay 39TF operates it interrupts, at its armature 2 and back contact, the locking circuits for relays 39IA, 39IB and 39IC, and those relays release. Relay 39TF also releases those of the first fan circuit hold magnets in Fig. 52 that are operated. Relay 39IA releases relay 40–FL, which interrupts the locking circuit for relay 40–FLA, the locking circuit for those of the select magnets in Fig. 42 that are operated and the operating circuit for those of the hold magnets that are operated in the same figure. Relay 40–FLA and the magnets release. With relay 39IC and the hold magnets in Fig. 42 released, ground is removed from conductors 63–12 and 52–33 and thus from the locking circuit of relay 61LD. Relay 61LD releases, but relay 61LA remains locked and in turn holds relay 61H2 operated. Relay 61LD removes ground from conductor 63–17, and thus interrupts the circuit of relay 49STL which releases. A previously described sequence of relay releasing operations ensues, clearing out the stored first and second character codes that caused the seizure of the multiple address intercept and conditioning the multiple address director circuit to scan and decode the next code.

The seized intercept circuit remains connected and records all address codes following the one that caused its seizure. If any of those codes require, as antecedent, the office identification code, the intercept circuit will record that code also. After all of the address codes have been recorded, the multiple address director circuit decodes the end-of-address code which is the code for carriage return. A series of operations previously described occurs, including operation of relay 40–LC. That relay connects ground over conductors 40–28 and 61–14, and through the front contact and armature 1 of relay 61LA to the winding of relay 61LC which operates.

At its armature 1 and front contact, relay 61LC completes the circuit of the right-hand winding of relay 61B which operates. At its armature 2, relay 61LC locks through the back contact and right-hand armature of relay 61LB. At its armatures 3 and 4, it interrupts the paths to the windings of relay 61H2, and that relay releases, but is still subject to operation under the control of other levels of the multiple address intercept circuit. Relay 61B, at its armature 7 and front contact, puts a ground on the first contact of the upper contact bank of stepping switch 61–01, supplementing the one supplied through armature 4 and front contact of relay 61EA.

The seized level of the multiple address intercept circuit remains in this condition, with relays 61LA, 61LC, 61B and 61EA operated during the transmission of the text of the message. When the storage level of the multiple address circuit that is transmitting the message decodes the end-of-message signal, the relay 38AB operates as previously described, and grounds conductor 38–39 which is included in the group bracketed from Fig. 39 to Fig. 41, the connection being extended through crossbar switch contacts closed by select magnet 41–01 and hold magnet 41–12 to conductor 41–16 which is included in a group of conductors bracketed to Fig. 61, in which the path is traced to the winding of relay 61LB, which operates and locks to conductor 41–13 which is grounded at the lower armature of hold magnet 41–12. Relay 61LB interrupts the locking circuit for relays 61LA and 61LC, and provides a locking path for relay 61B through the armature 5 and front contact and the right-hand winding of that relay. Relay 61LA releases relay 61EA, which in turn releases relay 61S and extinguishes busy lamp 61–06. With relay 61EA released and relay 61B operated, a circuit for activating a tape feed-out mechanism for reperforator 60–04 is completed, the circuit being traced from ground on the armature 3 of relay 61EA through the associated back contact, front contact and armature 3 of relay 61B and conductor 61–16 to the winding of relay 60–F1 which operates. Relay 60–F1 completes a circuit of tape feed-out magnet 60–F0 in the perforator 60–04, traced from ground through the winding of that magnet, front contact and lower armature of relay 60–F1, and back contact and armature 3 of relay 60–F3 to battery. Relay 60–F1 also disconnects ground from a timing circuit associated with the grid of discharge tube 60–06, and comprising condenser 60–07, resistors 60–08 and 60–09 and positive battery.

In addition to releasing relay 61EA, relay 61LA disconnects ground from conductor 61–11, thereby releasing hold magnet 41–12 to disconnect the multiple address intercept circuit from the level of the multiple address circuit that had seized it. The hold magnet disconnects ground from conductor 41–13 of the locking circuit for relay 61LB, thereby releasing that relay. Relay 61B does not release, however, because it has a holding circuit traced from its right-hand winding through the front contact and armature 4, conductor 61–17, and front contact and armature of relay 60–F4 to ground.

While the timing circuit for tube 60–06 is timing out, reperforator 60–04 is rapidly feeding out tape to provide a length of tape well beyond the disconnect code at the end of the message, so that the tape may be severed and reintroduced into the switching system by placement of the tape in the transmitter of the originating station circuit after the tape has been edited to correct defective address codes and to eliminate the address codes of stations to which the message was transmitted, as will be described hereinafter. When the potential of the grid of tube 60–06 has been raised sufficiently by condenser 60–07 to render the tube conductive, relay 60–F2 in the plate circuit of the tube operates and completes the circuit of relay 60–F3 which operates. Relay 60–F3 locks through its armature 2 and front contact, and the front contact and upper armature of relay 60–F1 to ground. Relay 60–F3 interrupts the energizing circuit for tape feed-out magnet 60–F0, which releases and terminates the tape feeding operation. Relay 60–F3 also discharges condenser 60–07, to cut off tube 60–06 and releases relay 60–F2, and interrupts the circuit of relay 60–F4. Relay 60–F4 has a slow-release characteristic, and upon releasing it unlocks relay 61B. The latter relay releases relay 60–F1, which unlocks relay 60–F3. Relay 60–F3 releases and reoperates relay 60–F4 to prepare a circuit for locking relay 61B the next time that relay operates.

Consideration will now be given to the operation of the multiple address circuit under the circumstance that the first character of an address code is valid, but that the second character is garbled. The decoding of the first character will proceed in the manner hereinbefore described, including the storing of the code combination representing the first character in relays 50–F1 to 50–F5, the operation of two of the select magnets and two of the hold magnets in Fig. 52, the operation of one of the select magnets in Figs. 43 and 53, and the operation of one or the other of the sets of four hold magnets in the latter figure. Any one of the twelve code combinations not used as address codes, and previously identified, may occur as the invalid second character of an address code. The twelve fan circuit paths that are selected in the second fan circuit in response to their respective code combinations have been identified in Fig. 42 in the same manner as the nine paths were identified in Fig. 52, and they are connected over conductors 42–24 and 42–26 to the windings of relay 51BS, so that upon the completion of a path from ground through any one of those twelve paths to one of the windings of that relay it will be operated to connect ground over conductors 51–23, 40–29 and 40–31 to the left-hand winding of relay 39IC to operate that relay. Relay 39IC initiates the sequence of operations previously described, by means of which the multiple address intercept circuit is seized, this operation involving operation of relay 61H2 and erlays 61LA, 61LD and 61EA in the case of the first level of the multiple address intercept circuit or corresponding relays of other levels. After a multiple address intercept level has been seized the corresponding hold magnet in the multiple address link circuit is operated to establish transmission and control paths between the seizing level of the multiple address circuit and the seized level of the multiple address intercept circuit. Thereupon, relay 49STL is operated under the control of the multiple address intercept circuit to initiate the transmission, without accompanying office identification code, of the address code having the invalid second character. After that address code has been transmitted the letters signal is transmitted, relay 61LD, or a corresponding relay in some other level in the multiple address intercept circuit, and relays 51BS, 39IC and 49STL in the multiple address circuit, are released, and the multiple address director circuit proceeds with the decoding of additional address codes, if there are any, the transmission of the end-of-address codes and the text of the message, followed by the disconnect signals, all of this material being recorded by the multiple address intercept level that was seized.

Unless a switching system of the type disclosed herein is large enough to have all of the 400 possible address codes assigned to stations, there will be some unassigned codes. Accordingly, it may happen that an operator preparing message tape may include unassigned address codes, or valid and assigned address codes may become garbled and converted to unassigned address codes. In either case, it is desirable that a message having any such code, be recorded in the multiple address intercept. To accomplish this a strapping terminal 43-14 is provided in Fig. 43, and any of the 400 crossbar switch contacts in Figs. 43 and 53 that correspond to unassigned address codes should be strapped to that terminal. A conductive path is traced from terminal 43-14 over conductors 43-16, 40-29 and 40-31 to the lefthand winding of relay 39IC, to effect the energization of that relay, as in the case of an address code having the second character invalid, and the resultant seizure of an intercept level to record the unassigned address code, all following address codes, and the text of the message.

Another circumstance under which the multiple address intercept circuit is seized is that designated as wilful interception, involving an operated intercept key. For the purpose of illustrating this, it will be assumed that among address codes preceding a multiple address message being processed by the multiple address director circuit, the address code CD appears designating the receiving teletypewriter at station 1-09 on the multistation line. In response to that address code the first fan circuit, decoding the code combination for the character C, would operate select magnet 43S8, and hold magnets 53H0 to 53H3 would be operated. The second fan circuit, decoding the address character D, would extend ground over the path designated D in Fig. 43, and through contacts closed under the joint control of select magnet 43S8 and hold magnet 53H0 to conductor 43-17. The path continues over that conductor to intercept key 44-04 and through make contacts of that key, if operated, to conductor 44-06, or, if key 44-04 is unoperated, through break contacts of that key and make contacts of intercept key 44-07 and conductor 44-08 to conductor 44-06. One or the other of the keys 44-04 and 44-07 must be operated in order to effect the interception, on a wilful or intentional basis, all messages addressed to station 1-09 by address code CD. Accordingly, the ground connection extended to conductor 44-06 is continued over that conductor and conductor 52-33, through the break contacts controlled by armature 1 of relay 61H2 in the multiple address intercept circuit, to the contactor associated with the lower contact bank of stepping switch 61-01. Assuming that one of the storage levels of the intercept circuit is idle, the contactor will be engaging a contact of such level, perhaps the last level, in which case the ground connection would be extended over conductor 61-18, armature 1 and back contact of relay 65B and break contacts controlled by armature 2 of relay 65LA to the winding of that relay to cause its operation and the seizure of that level of the multiple address intercept circuit. The address code CD will be transmitted to the seized multiple address intercept level, followed by all other address codes with their letters signals, the carriage return and line feed signals, the text of the message and the disconnect signals and all of those signals will be recorded by the multiple address intercept reperforator, in the case of the level assumed to have been seized, reperforator 64-02.

A different sort of wilful interception of a message may be effected, within the discretion of a switching center attendant, when the multiple address director circuit is waiting for a particular outlet to become idle, and although the particular outlet or a station reached through that outlet is not under interception due to operation of its intercept key. As previously stated, when the multiple address circuit tests an outlet designated by an address code decoded by the multiple address director circuit and the storage levels of that outlet are busy, a ground connection for operating relay 49STL or 49STT will be withheld at the designated outlet and the multiple address director circuit will suspend operation and await the application of ground to the energizing circuit of the proper one of the relays 49STL and 49STT when one of the levels in the outlet becomes idle. An attendant of the switching center can eliminate the delay and permit the multiple address director circuit to proceed with the processing of following address codes by operating the director hold key of the particular storage level of the multiple address circuit with which the director circuit is cooperating. It will be assumed that the first level is the one involved and the director hold key is designated by the reference numeral 35-51. Ground is extended through that key and over conductor 35-52 and winding of relay 37DH to battery, and that relay operates. Relay 37DH has no locking circuit but director hold key 35-51 is a locking key and maintains the circuit for the relay. Relay 37DH prepares or completes a number of circuits which will not interfere with the message in progress but which will prevent the multiple address director circuit from being seized by another level after it has been released by the particular level with which it is cooperating, as will be described later. With director hold key 35-53 designated "Figures, H and Intercept" which connects ground over conductor 35-54, armature 4 and front contact of relay 37DH, conductor 37-28, front contact and armature 21 of relay 38G, conductors 38-41 and 39-37 to the lefthand winding of relay 39WI which operates. Relay 39WI locks through its right-hand winding, front contact and armature 2, armature 1 and back contact of relay 39TF, conductor 39-38, and front contact and armature 7 of relay 40-ON1 to ground.

Relay 39WI completes an energizing circuit for relay 39IC, traced from the left-hand winding of relay 39IC, over conductor 40-31, front contact and armature 4 of relay 40-FLA, which is operated because both characters of the address code have been decoded and the outlet selected but not seized, and address characters are stored in relays 50-F1 to 50-F5 and 50-S1 to 50-S5, the path continuing from armature 4 of relay 40-FLA over conductor 40-32, back contact and armature 8 of relay 49STT, armature 7 and back contact of relay 49STL, conductor 49-47, front contact and armature 3 of relay 39WI, conductors 39-42 and 39-34, and front contact and armature 2 of relay 49DB, that relay having operated incident to the selection of the outlet in response to the second character of the address code. Relay 39IC initiates a sequence of operations, previously described, for seizing one of the storage levels of the multiple address intercept circuit after which the address code of the outlet that was busy will be transmitted to intercept and the multiple address director circuit will proceed to process any additional address codes, seizing the outlets, transmitting those address codes to the multiple address intercept also, after which the transmission of the message text will be initiated and the multiple address director circuit will be dismissed. The multiple address director circuit will be unavailable to any other level of the multiple address circuit as long as director hold key 35–51 remains operated, it being a locking key. Accordingly, the attendant should release that key, after the key 35–53 has been operated to cause the seizure of the multiple address intercept circuit, since it has not been the intention to take the multiple address intercept circuit out of service but merely to permit completion of the processing of address codes without waiting for seizure of a busy outlet. The manner in which the resulting tape produced in the multiple address intercept circuit is to be processed will be described later.

Another circumstance under which the seizure of a storage level of the multiple address intercept circuit is required is that messages for a station on a multistation line are being intentionally intercepted due to operation of the intercept key for that station, and the multiple address director circuit processes a message including, among the address codes, a group code which designates the particular station, among others. It will be assumed, for example, that the previously considered typical message, including individual station address code QW, group code CF and individual address code CR, is processed at a time when messages for the station having the address code GA are being intercepted, the latter code identifying the receiving teletypewriter, but not the receiving reperforator at station 1–08 on the multistation line. As shown in Fig. 1, it has been assumed that the receiving teletypewriter and the reperforator at that station are both designated by the address code CF.

Messages addressed by the address code GA are intercepted by operation of one or the other of the intercept keys 34–04 and 34–06. As previously described, the decoding of the group code CF results in the operation and locking of relay 66C4 in the group code circuit. That relay in turn operates relays 62–02, 62–03, 63–05 and 63–08. With either of keys 34–04 and 34–06 operated, a connetcion is established through the lower break contacts thereof from conductor 34–03 to conductor 34–07. Conductor 34–03 is connected in Fig. 44 to conductor 44–03, and conductor 34–07 is connected in Fig. 44 to conductor 44–09. Conductors 44–03 and 44–09 are traced to Fig. 62 where conductor 44–09 is grounded through the front contact and armature 7 of relay 62–02, and conductor 44–03 is connected through the front contact and armature 1 of that relay, and varistors 62–13 to the winding of relay 62–01 which operates due to the interconnection of the two conductors at intercept key 34–04 or 34–06. Ground is connected through the front contact and armature 1 of relay 62–01, to conductor 62–14 which extends to Fig. 61, and to the front contacts of relay 61H2. Grounding this conductor has the same effect as the grounding of conductor 52–33 which is also connected to those front contacts, namely the operation of relay 61LA or relay 65LA or a corresponding relay in one of the intermediate storage levels of the multiple address intercept circuit for seizure of the multiple address intercept circuit.

It will be assumed that the last level is the one into which the ground connection is extended through the contactor of the lower contact bank of stepping switch 61–01 and over conductor 61–18, armature 1 and back contact of relay 65B and break contacts controlled by armature 2 of relay 65LA which operates. The previously-described sequence of operations ensues, including operation of relays 65EA, 61H2 and 65LD. Relay 65LD locks through its front contact and inner armature, and conductors 65–03 and 61–13 to ground through armature 2 and front contact of relay 62–01. Relay 65LD also connects ground through its outer armature and front contact, and conductors 65–04 and 61–09, armature 4 and front contact of relay 62–01 to the armature of relay 62GC. In the meantime, the group code circuit proceeds with the seizure of the several outlets designated by the group address code CF and, as the outlets are seized, ground connections are returned from the outlets, operating relays 62–02C, 62–03C, 63–05C and 63–08C. Relay 63G1 is operated by relays 62–02, 62–03, 63–05 and 63–08 which immediately operates relays 62–04C, 63–06C and 63–07C corresponding to outlets not seizable in response to the address code CF. Relay 63G1 also completes the circuit of slow-operate relay 62GC, and when the latter relay operates it completes the circuit of relay 62–01C if, as has been assumed, a storage level of the multiple address intercept circuit has been seized. With relay 62–01C operated, ground is applied through the previously-described chain circuit to conductor 63–26, and over conductors 63–27 and 63–14 to operate relay 49STT. This relay initiates the transmission of the address code CF preceded by the office identification code BA, whereupon relay 66C4 is unlocked and released, that relay releasing relays 62–02, 62–03, 63–05 and 63–08, the relay 62–02 releasing relay 62–01. With these relays released, relay 63G1 releases, and in turn releases relay 62GC and all of the relays 62–01C to 62–04C and 63–05C to 63–08C. These relays release the relay 49STT, and the multiple address director circuit proceeds with the decoding of the next address code. The multiple address intercept circuit remains connected along with the seized outlets, and will record all remaining address codes and the text of the message.

It should be noted that the seizure of the multiple address intercept circuit, under the control of operated intercept key 34–04 or 34–06 for the station having the individual address code GA, did not prevent the seizure of the outgoing line circuit for the multistation line. It will be apparent that the seizure of the multistation line should not have been prevented because reperforator 1–16 of station 1–08 is represented by the group code CF, and the message should not be withheld from the reperforator because the receiving teletypewriter identified by the address code GA is under interception. As a matter of fact, the group code circuit does not distinguish whether an operated intercept key for a station on a multistation line corresponds to a station on the line that is included in the group code or whether it is the intercept key for some other station on the line. It will be noted that if intercept key 34–01 or 34–02 for the station 1–07, identified by the address code QW but not by the group code CF, or intercept key 44–01 or 44–02 corresponding to the address code GJ of station 1–10, also not designated by the address code CF, had been operated instead of intercept key 34–04 or 34–06, conductors 34–03 and 34–07, and their extensions 44–03 and 44–09, would have been interconnected to cause the operation of multiple address intercept seizing relay 62–01 upon the operation of relay 62–02.

It will now be supposed that none of the intercept keys for the stations of the multistation line was operated at the time of processing of the assumed message by the multiple address director circuit, but that the trunk outgoing to switching center 1–34 was out of service due to a trouble condition perhaps, or that all of the storage levels of that outlet were out of service so that traffic to switching center 1–37 should be intercepted. This is accomplished by operation of intercept key 54–01 or 54–02. Upon the operation of relay 63–05 by relay 66C4, relay 63–05C operates without awaiting the operation of relay 63G1, the operating path being traced from the winding of relay 63–05C, conductor 63–29, varistor 63–31, front contact and armature 8 and armature 1 and front contact of relay 63–05, conductor 54–09, lowermost make contacts of intercept key 54–01 or 54–02, conductor 54–16, and front contact and armature 7 of relay 63–05 to ground. The same ground connection is applied through the front contact and armature 1 of relay 63–05, varistor 63–32 and conductor 63–33 to the winding of relay 62–01, to cause the seizure of one of the storage levels of the multiple address intercept circuit. Although the relay 63–05 connects ground through its front contact and armature 2 to conductor 63–11, which is the conductor over which the outlet is tested for availability of a storage level, it is the practice, with all traffic for an outgoing trunk or single station line or local outlet, to make all storage levels of the outlet test busy by operation of busy keys individual to the storage levels prior to operation of the intercept key so that a storage level of the outlet will not be seized. Although the trunk would actually test busy, by failing to return a ground connection over conductor 27–13 for the purpose of operating relay 63–05C, that relay has already been operated under the control of the operated intercept key so that the address code, preceded by the office identification code, will be transmitted to the seized storage level of the multiple address intercept circuit instead of to the outlet that is under interception.

As previously stated, the tapes emerging from the reperforators of the multiple address intercept circuit require the attention of an operator in order to correct or eliminate address codes. In the case of interception of a message because the first or second character of an address code is garbled, the full addresses of the stations to which the message is to be transmitted, appearing after the carriage return and line feed signals that follow the address codes, must be inspected to determine what the address code that became garbled should have been. When this has been ascertained, the operator also inspects all of the address codes following the garbled one, since all the address codes following the one that causes interception are recorded by the intercept reperforator. The purpose of this is to determine which, if any, of those address codes were under interception at the time that the message was being processed by the multiple address director circuit and was routed into intercept. The message should not be retransmitted to any destination except those that were under interception because it was transmitted to the outlets representing all but the exceped destinations concurrently with the transmission into intercept. Having determined what address codes should precede the message in order to effect its retransmission to destinations to which it has not yet been transmitted, the operator may prepare, on a keyboard perforator in the switching center, such as the one contained in the originating station circuit, a new address fragment of tape containing the multiple address code BC, or the priority address code PC, in case the operator can determine from the text of the message that it was originally designated as a priority message, followed by the address codes which have been determined to be needed. This fragment may be substituted for the address code portion of the tape produced by the intercept reperforator and spliced to that tape. The tape is then placed in the transmitter of the originating station circuit, and the director circuit associated with that transmitter proceeds with the routing of the message into the multiple address circuit where it will be processed for retransmission to the outlets designated by the address codes. If any of the designated outlets are still under interception, a storage level of the multiple address intercept circuit will again be seized and the message recorded in intercept, in addition to its transmission to outlets that are no longer under interception.

When a message is recorded in multiple address intercept due to the wilful interception of one of the address codes preceding the message, the same procedure is followed by the operator except that it is not necessary to correct an invalid address code. The address codes appearing in the intercept tape must be checked against the interception records to eliminate address codes in response to which the designated outlets were seized and the message transmitted thereto. It is not necessary at any time for consideration to be given to address codes that may have preceded the one that caused seizure of an intercept storage level, because those address codes may be assumed to have effected the seizure of the appropriate outlets. When, in correcting and eliminating address codes in a multiple address intercept tape preparatory to reintroducing the tape into the switching system at the originating station circuit, all but one address code is eliminated, it is not necessary to provide the multiple address code BC preceding the address code corresponding to the single remaining destination of the message, since the message can be routed directly from the originating station circuit to the outlet by the originating station director circuit as a single address message. An exception would, of course, be a message determined from the text to have a priority classification, it being necessary to route such message into the multiple address circuit by the priority code PC in order to assure retransmission of the message to the priority level of the designated outlet, even in the case of a single address message.

*Trouble alarm conditions in multiple address message transmitting circuits*

Following the description of the recording of a message in a storage level of the multiple address circuit the alarm functions, under the conditions of low tape supply and machine trouble in the reperforator, were described. Alarm and supervisory control conditions involved in the transmitting portions of the storage levels and in the multiple address director circuit will now be described.

Stopping of transmission is controlled by the transmitter stop key, such as key 35–56 in the first level. The transmitting portion of a multiple address storage level may be in any of three conditions which are, (1) the level is idle; (2) the multiple address director circuit is connected; and (3) the multiple address director circuit is not connected and the level is in the text transmitting condition. In any of the three conditions, key 35–56 connects ground over conductor 35–37 and operates relay 37DS. In each of the three conditions, the relay 37DS lights the level tie-up lamp 37–29 in a circuit through armature 1 and front contact of the relay, prepares a path for relay 37D at its armature 2 and front contact, and interrupts the energizing path for transmitter clutch release magnet 35–21 at its armature 3 and back contact. In addition, when the condition of the level is that the multiple address director circuit is connected, relay 37DS interrupts, at its armature 3 and back contact, the energizing circuit for relay 37P, and when the condition is that the level is idle the relay 37DS prevents, at its armature 3 and back contact, the completion of an energizing circuit for relay 37P.

One of the circumstances under which the transmitter stop key may be operated is to initiate a manual disconnect operation. There are two conditions under which this function may be desirable, one being manual disconnection prior to the seizure of any outlet, and the other being manual disconnection during text transmission. It will be assumed that the manual disconnect function is initiated under the first of those two conditions. The scanning of address codes in the tape is initiated by the operation of relay 37P upon the closure of transmitter stop contacts 35–18, the operation of relays 59PRC and 38G, the latter relay operating relay 38SM, which in turn operates the select magnet for the particular level in the multiple address link circuit, that being select magnet 41–01. Select magnet 41–01 will have operated relay 40–ON which in turn will have operated relay 40–ON1, and the latter relay will have operated transmitter clutch release magnet 35–21. The first step in the manual disconnect is the operation of transmitter stop key 35–56 which, as previously stated, operates relay 37DS, releases relay 37P and releases transmitter clutch magnet 35–21. The operator then momentarily closes the Figures, H and Intercept key 35–53. This key extends ground over conductor 35–54, armature 2 and front contact of relay 37DS to operate relay 37D. Relay 37D interrupts, at its armature 1 and back contact, the locking circuit for relay 38G, which includes conductor 38–06. The latter relay releases relay 40–ON which releases relay 49–ON1, and also releases relay 38SM which releases select magnet 41–01. Relay 37D operates relay 38BL in a circuit traced from the winding of the latter relay, through conductor 38–29 and armature 7 and front contact of relay 37D. Relay 37D also operates relay 38FD in a circuit traced from the winding of the latter relay through conductor 38–42, and the front contact and armature 4 of relay 37D. The function of relay 38FD is to initiate the generation and transmission of the disconnect signal. If no outlets have been seized, as has been assumed, there is no occasion for actual transmission of the disconnect signal. The transmission of that sequence of signals would require that relay 37D remain operated beyond the interval of the momentary operation of key 35–53 and would thus require a locking circuit for relay 37D. Upon the operation of relay 37D such a locking circuit is established, traced through its front contact and armature 5, conductors 37–23 and 38–43 and front contact and armature 28 of relay 38G to ground. That locking circuit is interrupted upon the release of relay 38G so that relay 37D does not remain locked under the control of relay 38G. Another possible locking circuit for relay 37D is traced from conductor 37–23 over conductor 38–37, which is included in a group of conductors bracketed to Fig. 41. That conductor receives ground through any hold magnet that may become operated. Since it has been assumed that no outlet has been seized, there will be no such ground and relay 37D will release, releasing relays 38BL and 38FD.

It will now be assumed that text is being transmitted and that a manual disconnect operation is to be initiated. In this condition the multiple address director circuit is disconnected from the storage level and only the relays 38BL, 38TR and 37TX are operated. The operator operates the transmitter stop key 35–56 as before, this being a locking key and causing the operation of relay 37DS and the release of transmitter clutch magnet 35–21, and then operates the Figures, H and Intercept key 35–53 momentarily, which operates relay 37D in a circuit prepared by relay 37DS. This time relay 37D locks through conductors 37–23 and 38–37 to ground on the upper armatures of those of the hold magnets in Fig. 41 that are operated, the ground being extended through crossbar switch contacts common to select magnet 41–01 and the operated hold magnets. Relay 37D interrupts, at its armature 8 and back contact, the energizing circuit for relay 38TR. This relay releases, disconnecting the distributor contacts from the transmitter contacts in Fig. 35. Relay 38FD codes a figures code combination, which is the first code of the disconnect signal, on the distributor contacts. The front contacts associated with its armatures 1 to 5 are connected to a group of conductors 35–24 which are represented by dot-and-dash line 38–26 extending to Fig. 35 where the five conductors reappear and are connected to the individual distributor contacts 35–38. The figures signal has elements 1 and 2 and 4 and 5 of marking nature and element 3 of spacing nature. Armatures 1, 2 and 4 of relay 38FD are connected over conductors 38–44, 38–46 and 38–47, respectively, to back contacts associated with armatures 3, 4 and 5 of relay 37SB, and those armatures are connected over conductors 37–10, 37–13, 37–14 and 38–21 to armature 1 of relay 38BL, which, being operated, impresses the marking potential on the corresponding transmitting contacts. Armature 5 of relay 38FD is connected over conductor 38–21 to armature 1 of relay 38BL, thereby connecting the No. 5 transmitting contact to the marking potential. Armature 3 of relay 38FD is connected to conductor 38–48, which is connected to a front contact of relay 37SB, and thus does not apply a marking potential to the No. 3 contact of the distributor, thereby providing for the transmission of a spacing condition as the third element of the figures code combination. At its armature 6 and front contact, relay 38FD completes the circuit of distributor clutch magnet 35–34, traced from the winding of the magnet, over conductors 35–33 and 35–47, right-hand armature and front contact of relay 38BL, front contact and armature 6 of relay 38FD, conductors 38–49, 37–31 and 37–32 and back contact and left-hand armature of relay 37SA to ground. The distributor clutch magnet sets shaft 35–37 in operation for the transmission of the figures code combination.

When distributor auxiliary contacts 35–39 close, they connect ground over conductors 35–41, 36–32 and 37–33, front contact and armature 6 of relay 37D, armature 1 and back contact of relay 37SB to the winding of relay 37SA which operates. Relay 37SA interrupts the previously traced energizing circuit for distributor clutch release magnet 35–34 and prepares a locking circuit for itself through the winding of relay 37SB. When the distributor auxiliary contacts open, this circuit becomes effective, traced through the front contact and right-hand armature of relay 37SA, the winding of relay 37SB and the front contact and armature 3 of relay 37D to ground. Relay 37SB codes the signal for the character H on the armatures of relay 38FD. This signal has elements 1, 2 and 4 of spacing nature and elements 3 and 5 of marking nature. Relay 37SB accomplishes the conversion of the figures code combination to the H code combination by disconnecting the marking potential from conductors 38–44, 38–46 and 38–47 and by connecting it to conductor 38–48 which is connected to armature 3 of relay 38FD. Armature 5 still receives the marking potential directly from the armature 1 of relay 38BL. Relay 37SB reconnects ground to conductor 37–31 through its armature 2 and front contact, and the left-hand armature and back contact of relay 37SC. It also interrupts, at its armature 1, the original energizing circuit for relay 37SA and prepares an energizing circuit for relay 37SC, traced from the front contact associated with armature 1 of relay 37SB through armature 5 and back contact of relay 37SD to the winding of relay 37SC. The ground reconnected to conductor 37–31 is extended to the winding of distributor clutch release magnet 35–34 which initiates the transmission of the H signal. The distributor auxiliary contacts close to complete the circuit of relay 37SC which prepares a locking circuit through the winding of relay 37SD and, when the distributor auxiliary contacts open, that circuit becomes effective and relay 37SD operates in the locking circuit for relay 37SC through the front contact and armature 3 of relay 37D to ground. Relay 37SC interrupts, at its left-hand armature, the energizing circuit for the distributor clutch release magnet 35–34 which arrests distributor shaft 35–37 following the transmission of the H signal.

Relay 37SD codes a letters signal on the armatures of relay 38FD by connecting the marking potential through its armatures 1, 2 and 3 to conductors 38–44, 38–46 and 38–47. A marking potential remains applied to conductor 38–48 through armature 3 and front contact of relay 37SB and on the armature 5 of relay 38FD directly from the left-hand armature of relay 38BL. Relay 37SD reconnects ground to conductor 38–49 through its armature 4 and front contact and the left-hand armature and back contact of relay 37SE, and transfers the path from the distributor auxiliary contacts from the winding of relay 37SC to the winding of relay 37SE. The distributor transmits the letters signal and, upon the closure of the distributor auxiliary contacts, operates relay 37SE which prepares a locking circuit through the winding of relay 37SF and interrupts the circuit of the distributor clutch release magnet. Upon the opening of the distributor auxiliary contacts, relay 37SF operates in the locking circuit of relay 37SE. Relay 37SF completes an operating circuit for relay 38AB, traced from ground through the armature and front contact of relay 37SF, front contact and armature 2 of relay 37D and conductor 38–38 to the winding of relay 38AB which operates. In the manner previously described, relay 38AB extends a ground over conductor 38–39 to all of the seized outlets to cause their release. When all of the seized outlets have released, including the release of the hold magnets in Fig. 41, ground is disconnected from conductor 38–37 and thus from conductor 37–23, releasing relays 37D and 37TX. Relay 37D interrupts the locking circuits for relays 37SA, 37SB, 37SC, 37SD, 37SE and 37SF, and those relays release. In addition, relay 37D releases relays 38BL and 38FD.

The storage level of the multiple address circuit may be restored to normal by releasing transmitter stop contacts 35–56 which releases relay 37DS. Before this is done, the attendant should clear out any trouble condition that prompted the operation of transmitter stop contacts 35–56. It is to be presumed that part of a message has been transmitted to the seized outlets, terminated by a disconnect signal generated in the multiple address storage level independently of the disconnect signals in the tape. The message tape should be reset in the transmitter sensing mechanism to the beginning of the address codes before transmitter stop contacts 25–18 are released, any defect that may have existed in the tape first being remedied, in order that the complete message may be retransmitted to the designated outlets.

An alarm action that is provided for in the multiple address circuit is the processing of a section of tape produced by the reperforator of a multiple address storage level and comprising a sequence of address codes followed by the disconnect signal without the intervening end-of-address codes comprising carriage return and line feed signals and without text. Such a tape might be produced as a result of a manual disconnect action taken by an operator after some or all of the outlets represented by the address codes accompanying a multiple address message had been seized, but before the end-of-address codes had been processed by the multiple address director circuit. The address codes would have been transmitted to the appropriate seized outlets, preceded by the office identification code in the case of the seizure of outgoing trunks, the address codes being followed by the disconnect signal generated in the multiple address level as a result of the manual disconnect operation and transmitted to the seized outlets, followed by disconnection of those outlets from the multiple address circuit. The various outlets would in turn retransmit the address codes followed by the disconnect signal and at remote switching centers the received office identification codes would route the textless message to a storage level of the multiple address circuit which would proceed to process the address codes and seize the appropriate outlets. After the multiple address director circuit has completed the transmission of the letters signal following the last address code, it encounters the disconnect signal comprising figures, H and letters instead of the carriage return and line feed which it should encounter, and it treats the disconnect sequence as an address code having both the first and second characters invalid.

The condition of the circuit at this time, referring to the first level, is that relay 38G is locked and relays 59PRC, 37P, 38SM, 40–ON and 40–ON1 are operated. In addition, one or more hold magnets in Fig. 41 will be operated. As may be discovered by a review of the sequence of operations involved in the processing of address codes by the multiple address director circuit, the transmission of the letters signal is accompanied by the release of relay 49RC which results in the reestablishment of an energizing circuit for transmitter clutch release magnet 35–21. The magnet initiates the operation of shaft 35–23 to effect the transfer of the code combination, assumed to be figures, the first code of the disconnect signal, to the transmitter contacts. As previously described, the transmitter auxiliary contacts complete the circuit of relay 49CR which locks and interrupts the circuit of transmitter clutch magnet 35–21. The distributor clutch trip contacts 35–31 are operated by shaft 35–23 to operate distributor clutch magnet 35–34 which initiates a cycle of shaft 35–37. The distributor auxiliary contacts close and operate relay 49DA which operates relay 50–FC. With the figures code combination transferred by contact controlling members 35–27, the maze contacts establish a circuit under the control of the figures code combination for relay 36FG which operates. Also, the relays 50–F1 to 50–F5 are energized in accordance with the figures code combination as a nonvalid first character. When the distributor auxiliary contacts open they complete a locking circuit for relay 49DA, including the winding of relay 49DB which operates. Relay 49DB extends ground into the first fan circuit in Fig. 52, the select magnets and hold magnets of which are operated in accordance with the invalid address code, resulting in the completion of a circuit over conductor 52–32 to the right-hand winding of relay 51BF which operates. As in the case of the previously described operation in response to an invalid first code, relay 39IA operates and locks, operating relay 40–FL which maintains a locking circuit for relays 50–F1 to 50–F5 releasing relay 50–FC and operates relay 49RC. Relay 49RC releases relay 49CR which releases relays 49DA and 49DB. Relay 49DB operates relay 39IB which locks and, with relays 49DA and 49DB released, relay 40–FLA operates and locks. Relay 40–FLA releases relay 49RC which initiates another cycle of transmitter shaft 35–23 by operating transmitter clutch release magnet 35–21.

In the cycle of rotation of shaft 35–23 the next signal, assumed to be the H code combination of the disconnect code, is transferred to the contacts controlled by members 35–27. Transmitter auxiliary contacts 35–28 close and again operate relay 49CR which interrupts the energizing circuit for transmitter clutch magnet 35–21. Before shaft 35–23 comes to rest, transmitter auxiliary contacts 35–28 open, leaving relay 49CR operated through its locking circuit, and distributor clutch trip contacts 35–31 close and reopen, operating distributor clutch magnet 35–34. The latter magnet releases distributor shaft 35–37 which causes the closure of distributor auxiliary contacts 35–39. As in the previous cycle those contacts complete the operating circuit for relay 49DA.

In the meantime, the H code combination in the maze contacts extends ground over conductor 35–49, back contact and armature 7 of relay 37AL, conductor 37–26, armature 1 and front contact of relay 36FG and right-hand winding of that relay, to hold it energized, since the original energizing circuit through conductor 35–48 has been interrupted with the resetting of the maze contacts in accordance with the H signal, supplanting the figures signal. The ground connection is extended from the front contact associated with armature 1 of relay 36FG through the front contact and armature 2 of that relay, and left-hand winding of relay 36H which operates. Relay 36H locks through its right-hand winding, front contact and armature 1, conductors 36–37, 36–38 and 36–34, armature 2 and back contact of relay 37AL, conductors 37–36 and 37–37, and front contact and armature 25 of relay 38G to ground. Because of the fact that the multiple address director circuit is still associated with the multiple address storage level, there being no carriage return or line feed signal to release it, relay 38G is still operated and relay 36H locks over armature 25 of relay 38G, as described. Relay 36H completes an energizing circuit for alarm relay 37AL, traced from the winding of that relay over conductor 37–34, front contact and armature 12 of relay 38G, conductor 38–51 and front contact and armature 2 of relay 36H to ground, and relay 37AL operates. It locks through its front contact and armature 4, and the back contact and armature 1 of relay 37DS to ground.

At its armature 1, relay 37AL interrupts the energizing circuit of relay 37P which releases. This relay extends a ground on armature 2 of relay 37TX over the back contact associated with that armature, armature 4 and back contact of relay 37P, conductors 37–06 and 59–06 to the first contact of the left-hand contact bank of stepping switch 59–02 to cause that position on the stepping switch and thus the first level of the multiple address circuit to test busy when the director is subsequently released and rendered available to other levels that are awaiting its services.

At its armature 7 and back contact, relay 37AL interrupts the previously traced holding circuit for relay 36FG and operating circuit for relay 36H. At its armature 2 and back contact, relay 37AL interrupts the previously traced locking circuit for relay 36H. Resistor 36–39, in parallel with the left-hand winding of relay 36H, imparts a slow-release characteristic to that relay. Relay 37AL connects ground through its armature 3 to the level tie-up lamp 37–29 to light that lamp, and extends ground on its armature 6 through the associated front contact, and conductors 37–38, 48–02 to 58–04, which is bracketed from Fig. 59 to Fig. 68, the path being extended to the winding of relay 68D to operate that relay and bring in an alarm in the manner previously described.

Relay 37AL operates relay 49CL in a circuit traced from the winding of that relay through the front contact and armature 2 of relay 49DA, which was operated through the distributor auxiliary contacts, as previously described, conductor 49–48, armature 1 and front contact of relay 39IB that was operated and locked as a result of the detection, in the first fan circuit, of an invalid code, conductors 39–39 and 39–41, armature 24 and front contact of relay 38G, conductor 38–52, and front contact and armature 5 of relay 37AL to ground. Upon the release of relay 36H which is slow, as previously stated, and with relay 49CL operated, an energizing circuit for relay 38BL, to unblind the seized outlets, is traced from the winding of that relay over conductors 38–29 and 37–16, back contact and armature 5 of relay 36H, conductor 36–33, armature 16 and front contact of relay 38G, conductors 38–30, 49–29 and 49–31, and front contact and armature 11 of relay 49CL to ground.

Relay 49CL also completes the circuit of relay 38TR, traced from the winding of that relay over conductor 38–33, armature 8 and back contact of relay 37D, conductors 37–17 and 37–18, front contact and armature 19 of relay 38G, conductors 38–34 and 39–21, back contact and armature 1 of relay 40–AE, conductors 40–22 and 39–26, front contact and armature 3 of relay 49CL, conductor 49–41, and front contact and armature 3 of relay 40–ON to ground. Relay 38TR interconnects the transmitter contacts and the distributor contacts. When the distributor auxiliary contacts 35–39, previously described as having been closed by shaft 35–37, open, relay 49DB operates in the locking circuit of relay 49DA. This relay causes the operation and locking of relay 39IC, the operation of relay 40–LC and the reenergization of distributor clutch release magnet 35–34. The circuit of relay 39IC is traced through its left-hand winding, front contact and armature 3 of relay 39IB, conductor 39–34, and armature 2 and front contact of relay 49DB to ground. The relay locks through its right-hand winding, front contact and armature 2, conductor 39–29, armature 2 and back contact of relay 39TF, conductor 39–31, and front contact and armature 6 of relay 40–ON1 to ground. The operating circuit for relay 40–LC is traced from its winding through conductor 40–26, front contact and armature 5 of relay 49DB, and front contact and armature 10 of relay 49CL to ground. The energizing circuit for distributor clutch magnet 35–34 is traced over conductors 35–33 and 35–47, right-hand armature and front contact of relay 38BL, armature 15 and front contact of relay 38G, conductor 38–32, back contact and armature 1 of relay 39TA, conductors 39–03 and 49–42, front contact and armature 5 of relay 49CL, front contact and armature 4 of relay 49DB, and front contact and armature 10 of relay 49CL to ground.

Relay 39IC, which has operated and locked, extends ground over armature 1 and back contact of relay 39WI, conductors 39–36 and 52–33 to the front contacts of relay 61H2 in the multiple address intercept circuit to effect the seizure of one of the storage levels if one is idle. Assuming that the first level might be idle, relay 61LA would be operated, followed by the operation of relay 61LD. Relay 40–LC extends ground over conductor 40–27 to all seized outlets, and assuming that the second level of the outgoing trunk circuit to switching center 1–37 had been seized, the ground connection would be extended over conductor 32–03, front contact and armature 1 of relay 27LA2 which would be operated, and break contacts controlled by armature 2 of relay 27LC2 to the winding thereof, that relay operating and locking through its front contact and armature 2, and armature 1 and back contact of relay 27LB2. Relay 27LC2 interrupts, at its armature 4 and back contact, the circuit of relay 27LD2, and in all other seized outlets the relay corresponding to relay 27LC2 is operated and the energizing circuit for the relay corresponding to relay 27LD2 is released.

Distributor clutch magnet 35–34, having been operated by relay 49CL, releases shaft 35–37, and distributor auxiliary contacts 35–39 close, extending ground over conductors 35–41, 36–32 and 37–12, armature 17 and front contact of relay 38G, conductors 38–16, 49–09 and 49–11, armature 1 and back contact of relay 49STL, armature 2 and back contact of relay 49STT, armature 6 and front contact of relay 49DB, front contact and armature 6 of relay 49CL, conductor 49–33, armature 2 and back contact of relay 39TB, and winding of relay 39TA to battery, and that relay operates. Relay 39TA interrupts, at its armature 1, the energizing circuit for distributor clutch magnet 35–34 which releases and arrests the distributor shaft at the end of one revolution. When distributor auxiliary contacts 35–39 open, they permit relay 39TB to operate in the locking circuit for relay 39TA. Relay 39TB completes the circuit of relay 37TX, traced from the winding of that relay over conductor 37–19, front contact and armature 20 of relay 38G, conductors 38–36 and 49–43, armature 4 and front contact of relay 49CL, conductor 49–44, and front contact and armature 5 of relay 39TB to ground. Relay 37TX locks through its front contact and armature 5, conductors 37–22, 37–23 and 38–37 which is grounded in Fig. 41 through the upper armature and front contact of hold magnets corresponding to the outlets that have been seized. Relay 37TX interrupts, at its armature 1 and back contact, the locking circuit for relay 38G which releases. At its armature 2 and front contact, relay 37TX connects ground to conductor 59–06, and thus to the first contact of the left-hand contact bank of stepping switch 59–02 to maintain the busy indication for the first storage level of the multiple address circuit. At its armature 6 and front contact, relay 37TX extends ground over conductor 37–17, back contact and armature 8 of relay 37D, conductor 38–33, to the winding of relay 38TR to hold that relay operated. At its armature 7 and front contact, relay 37TX connects ground over conductors 37–21 and 38–29 to the winding of relay 38BL to hold that relay operated. At its armature 1, relay 37TX interrupts a circuit previously traced which begins at battery through the winding and locking contacts of relay 38G, namely the front contact and armature 18 and ends at ground through the winding of relay 59PRC and the back contact and armature 1 of relay 59PRL, releasing relays 38G and 59PRC. Relay 38G releases relays 40–ON and 38SM. The latter relay releases the select magnets in Fig. 52 that had been operated in accordance with the figures code combination of the disconnect sequence of codes. Relay 40–ON releases relay 49CL. The latter relay releases relays 39TA, 39TB and 40LC. Relay 49CL also unlocks and releases relay 40–

ON1. The latter relay releases those of the relays 50–F1 to 50–F5 that were operated in accordance with the figures code combination and also releases relays 49DA, 49DB, 49CR, 39IC, 39IB, and those of the hold magnets in Fig. 52 that were operated in accordance with the figures code combination. Relay 39IC disconnects ground from conductor 39–36 over which a level of the multiple address intercept circuit was seized, thereby releasing that level. The released hold magnets in Fig. 52 release relay 51BF, which in turn releases relay 39IA. Relay 39IA releases relay 40–FL which releases relay 40–FLA. This completes the release of the multiple address director circuit, rendering that circuit available to any other storage level of the multiple address circuit that may have a message waiting to be processed. It leaves the level of the multiple address circuit that has just released the director circuit, assuming that to be the first level, tied up with relays 37AL and 37TX operated and locked. It also leaves all of the outlets that were seized in response to address codes connected to that level of the multiple address circuit, awaiting further transmission. None of the seized outlets receives the disconnect signal that has resulted in the tying up of the storage level of the multiple address circuit because they have been blinded during the time that the figures signal was being decoded and the succeeding H signal was placing the storage level in the tied-up condition through detection of that signal in the maze contacts. The tied-up storage level of the multiple address circuit may be restored to service, and the seized outlets may be released by the initiation of a manual disconnect operation, previously described. This operation is initiated by operation of the transmitter stop key 35–56 followed by momentary operation of the Figures, H and Intercept key 35–53 to cause the generation and transmission of a disconnect signal to the seized outlets.

Another condition that may give rise to an alarm involves the relay 40–0P2, which was previously mentioned, but the function of which was not described. That relay is operable under the control of operated select magnets in the first fan circuit, in Fig. 52, to initiate a timing operation of condenser 40–06 which is connected to the grid of tube 40–04. The condition of the multiple address director circuit at the time of operation of relay 40–0P2 is that relays 40–ON, 40–ON1, 50–FC and 49CR are operated but not locked, and relays 49CR, 49DA and one or more of the relays 50–F1 to 50–F5 are operated and locked, the locking circuit for relay 49DA including the winding of relay 49DB, the relays 50–F1 to 50–F5 being operated in accordance with the first character of an address code. Two select magnets and two hold magnets in the first fan circuit are operated in accordance with that character. In the normal sequence of operations, they operate one of the ten select magnets in Figs. 43 and 53 and four of the eight hold magnets in Fig. 53 to cause the operation of relay 40–FL and the decoding of the second character. If for any reason one select magnet and four hold magnets fail to operate, relay 40–FL will not be operated and the decoding of the second character will be delayed. Relay 40–0P2 will remain operated, and at the end of an interval that is considered adequate for normal response of relay 40–FL, perhaps of the order of ten seconds, condenser 40–06 becomes charged and renders tube 40–04 conductive.

The cathode of tube 40–04 is grounded, and the anode is connected through conductor 40–33 and the winding of relay 49–0P3 to positive battery. Relay 49–0P3 operates and connects ground over its armature 2 and front contact, and conductor 49–49 to the winding of relay 39WI which operates. The latter relay locks through its right-hand winding, front contact and armature 2, armature 1 and back contact of relay 39TF, conductor 39–38, and front contact and armature 7 of relay 40–ON1 to ground. Relay 49–0P3 also operates relay 40–FL in a circuit including its armature 1 and front contact, conductors 49–51, 49–46 and 50–14 to the winding of relay 40–FL. Relay 40–FL performs a number of operations previously described, including the holding of relay 40–0P2 operated, the release of relay 50–FC, which releases the select magnets in the first fan circuit, and the operation of relay 49RC. Relay 49RC releases relay 49CR which releases relays 49DA and 49DB. Relay 49DA operates relay 40–FLA which locks and releases relay 49RC. Relay 49RC completes the circuit for transmitter clutch magnet 35–21 which activates shaft 35–23 to effect the transfer of the second character of the address code to the contacts controlled by contact operating members 35–27. Transmitter auxiliary contacts 35–28 close to complete the circuit of relay 49CR which operates and locks. The distributor clutch trip contacts 35–31 also close and operate distributor clutch magnet 35–34 which initiates a cycle of distributor shaft 35–37. Distributor auxiliary contacts 35–39 close and operate relay 49DA. The latter relay operates relay 50–SR, which causes the operation of relays 50–S1 to 50–S5 in accordance with the code combination representing the second character of the address code. When the distributor auxiliary contacts 35–39 open, relay 49DB operates in the locking circuit of relay 49DA and operates two of the four select magnets in the second fan circuit in accordance with the condition of relays 50–S1 to 50–S5, and those select magnets cause the operation of two of the four hold magnets in the second fan circuit. Relay 49DB also completes the energizing circuit for relay 39IC, traced from the left-hand winding of that relay over conductor 40–31, front contact and armature 4 of relay 40–FLA, conductor 40–32, back contact and armature 8 of relay 49STT, armature 7 and back contact of relay 49STL, conductor 49–47, front contact and armature 3 of relay 39WI, which was operated by relay 49–0P3, conductors 39–42 and 39–34, and front contact and armature 2 of relay 49DB to ground. Relay 39IC effects the seizure, in the manner previously described, of a storage level of the multiple address intercept circuit, if a level is idle, including the operation of the hold magnet in the link circuit in Fig. 41, corresponding to the seized level of the multiple address intercept circuit. The multiple address intercept circuit responds in the manner previously described by returning a ground connection to operate relay 49STL. That relay in turn operates relay 38BL, to unblind the seized level of the multiple address intercept circuit and relays 59RC and 51TS. Relay 49RC releases relay 49CR, which releases relays 49DA and 49DB. Relay 51TS connects the distributor contacts to relays 50–F1 to 50–F5 to code the character stored in the latter relays on the distributor contacts, and operates distributor clutch magnet 35–34 to initiate the transmission of the first character of the address code to the multiple address intercept. The distributor auxiliary contacts 35–39 close and operate relay 39TA which releases the distributor clutch magnet 35–34. When the distributor auxiliary contacts open, relay 39TB operates in the locking circuit of relay 39TA, releasing relay 51TS, operating relay 38TR to connect the transmitter contacts to the distributor contacts, and reenergizing the distributor clutch magnet 35–34 to initiate the transmission of the second character of the address code to the multiple address intercept. In the manner previously described, the transmission of the second character of the address code is completed and the letters signal following the second character is transmitted, relay 39TF operating in the locking circuit for relay 39TE when the distributor auxiliary contacts 35–39 open at the end of transmission of the letters signal, relays 39TC and 39TD having operated incident to transmission of the second character of the address code.

If there had been no trouble in the decoding of the first character and the closure of final code contacts in Figs. 43 or 53 corresponding to the selection, relay 40–FL would have operated in the manner previously described and would have initiated the decoding of the second character to complete a path through one of the operated final code points to the outlet corresponding to those contacts, the circuit including the winding of relay 51–0P1, as previously described. If, because of a trouble condition, the path should be open at some point, relay 51–0P1 would fail to operate, and the circuit of relay 40–0P2 would remain closed through the armature and contact of relay 51–0P1 until condenser 40–06 had timed out and activated tube 40–04 to cause the operation of relay 49–0P3. Whereas, in the previously described operation of relay 49–0P3, the relay 40–FL was not operated prior to the operation of relay 49–0P3 it will, under the second set of circumstances, have operated prior to the operation of relay 49–0P3. Relay 40–FLA will have been operated by relay 40–FL and will have prepared, at its front contact and armature 4, the energizing circuit for relay 39IC so that that relay will operate as soon as relay 39WI operates, to effect the seizure of an idle level of the multiple address intercept circuit. The transmission of the two characters of the address code to the seized level of the multiple address intercept circuit then takes place in the manner previously described, accompanied by the operation of relays 39TA, 39TB, 39TC, 39TD, 39TE and 39TF.

Relay 39TF interrupts, at its armature 3 and back contact, the circuit established by relay 40–FL for holding relay 40–0P2 operated, the circuit being traced from the winding of the latter relay, conductor 49–16, back contact and armature 1 of relay 49DC, conductor 51–02, right-hand armature and back contact of relay 51BS, back contact and left-hand armature of relay 51BF, back contact and armature of relay 51–0P1, conductors 51–01 and 50–18, back contact and armature 3 of relay 39TF, conductor 39–02, front contact and armature 3 of relay 40–FL, conductor 40–07, break contacts controlled by armature 4 of relay 49DC, conductor 49–17, and front contact and armature 4 of relay 40–ON1 to ground. Relay 40–0P2 releases and discharges condenser 40–06, thereby cutting off tube 40–04. With the tube cut off, relay 49–0P3 releases, and in turn releases relay 40–FL. Relay 40–FL releases relays 40–FLA and 50–SR, and the operated hold magnets of the first fan circuit in Fig. 52 and operated select magnets and hold magnets of the second fan circuit in Fig. 42. Relay 50–SR releases those of the relays 50–S1 to 50–S5 that have been operated in accordance with the second character of the address code.

Relay 39TF also interrupts, at its armature 1 and back contact, the locking circuit for relay 39WI and at its armature 2 and back contact, the locking circuit for relay 39IC, and both relays release. Relay 39IC releases the relay in the seized level of the multiple address intercept circuit that corresponds to relay 61LD or 65LD, leaving relays 61LA or 65LA and 61H2 operated. Relay 61LD or 65LD in the multiple address intercept circuit releases relay 49STL in the multiple address director circuit, which in turn releases relays 38BL and 49RC. Relay 49RC releases relays 39TA, 39TB, 39TC, 39TD, 39TE and 39TF, the first, third and fifth of these relays releasing slowly because of resistors connected in parallel with their windings. Relay 49RC also releases relays 50–F1 to 50–F5 in which the first character of the address code has been stored. Relay 39TB releases relay 38TR, and relay 39TD releases relays 49CR and 49CRA. The latter relays were operated incident to the transmission of the letters signal.

The multiple address intercept circuit remains connected and the multiple address director circuit is now in condition for decoding any further address codes that need precede the message to effect the selection of corresponding outlets of if there are no other address codes, to decode the carriage return or line feed signal, initiate text transmission and release itself from association with the particular level of the multiple address circuit. The seized level of the multiple address intercept circuit records any such additional address codes and the next of the message and disconnect signal.

The multiple address circuit is subject to control due to trouble or alarm conditions arising in outlets that have been seized. An example of such a trouble condition is failure of the reperforator-transmitter of a seized storage level of an outlet to respond to signals. It will be assumed that the priority message storage level of the outgoing trunk circuit to switching center 1–37, that level being shown in Figs. 30 to 33, inclusive, is connected to the priority message storage level of the multiple address circuit contained in Figs. 55 to 58, inclusive, and that, because of a machine trouble in reperforator 30–01, the reperforator fails to respond to signals, or the supply of tape in the reperforator becomes exhausted, or the tape jams and discontinues feeding. If reperforator 30–01 does not respond to signals, the universal contacts 30–11 fail to operate, and if the tape fails to feed properly, the tape feed indicator contacts 30–12 will open.

As previously set forth, when a storage level of the outgoing line circuit, such as the priority level, is under seizure of the multiple address circuit, relay 32LA3 is operated. The circuit of selector magnet 30–08 is connected through the front contact and armature 7 of relay 32LA3 and varistors 32–14 to the center point of a series of resistors, the ends of which are connected over ocnductors 32–16 and 32–17 to the two contacts in reperforator 30–01 comprising with the associated swinger, the universal contacts 30–11. The center point of the series of resistors is also connected through resistor 32–18, shunted by condenser 31–19, to ground. The series of resistors above-mentioned is part of a resistor network associated with discharge tube 32–21, the function of which is to detect trouble conditions, and the arrangement is identical with the control circuit for tube 36–13 in the first level of the multiple address circuit hereinbefore described. The front contact associated with armature 7 of relay 32LA3 is connected to the circuit over which tube 32–06 controls the selector magnet 30–08 of reperforator 30–01 so that the potential at the front contact, associated with armature 7 of relay 43LA3, rises and falls as the tube 32–06 is cut off or conducts in response to signals. Condenser 32–19 is repetitiously charged in response to received spacing signals, and varistors 32–14 prevent the charge from leaking off. As long as contacts 30–12 are closed, continuously indicative of proper advancement of the tape, and universal contacts 30–11 close on one side or the other repetitiously, ground will be connected over conductors 32–16 and 32–17 to discharge the condensers associated with the grids of tube 32–21. When the tape fails to feed properly, contacts 30–12 open and both condensers charge, or when the universal contacts fail to operate, one condenser is held discharged but the other charges, and after an interval, tube 32–21 is rendered conductive in one or both triodes, thereby operating alarm relay 43AL3 included in the anode circuit of the tube.

Relay 32AL3 locks through its armature 3 and front contact, and the back contact and armature 3 of relay 32B3. At its armature 2, relay 32AL3 connects ground to conductor 32–22 which is included in the group bracketed to Fig. 41, in which conductor 32–22 appears as one of the crossbar switch verticals associated with hold magnet 41–07, and assuming that contacts of the link circuit in Fig. 41 common to select magnet 41–17 and hold magnet 41–07 are operated, the ground will be extended over conductor 41–18 in the group of conductors bracketed to Fig. 58, conductor 58–06 and winding of relay 57AL to battery, operating that relay. Relay 32AL3 also connects ground over its armature 4 and front contact, conductors 32–23, 32–24 and 32–26 to the winding of relay 32C3 which operates and locks through its armature 1 and front contact, back contact and armature 1 of relay 32B3 and conductor 32–26. Relay 32C3 connects ground over its armature 2 and front contact, and conductors 32–13 and 31–12 to light alarm lamp 30–38 associated with the outgoing trunk priority storage level containing reperforator 30–01. Relay 32C3 also connects ground through its armature 3 and front contact, conductors 32–12, 60–01 and 64–01 to operate alarm relay 68-OL in the alarm circuit. Relay 57AL in the multiple address priority storage level from which transmission has been assumed to be taking place, having been operated by relay 32AL3, locks through its front contact and armature 4, and armature 1 and back contact of relay 57DS to ground. At its armature 1, relay 57AL interrupts the energizing circuit for transmitter clutch magnet 55–21, which releases, suspending transmission. At its armature 3 and front contact, relay 57AL completes the circuit of level tie-up lamp 57–29 which lights. At its armature 6 and front contact, relay 57AL connects ground over conductors 57–03 and 58–04, and winding of relay 68D in the alarm circuit to bring in an alarm in the manner previously described. An attendant responds to the alarm given and to the suspension of transmission resulting from the opening of the energizing circuit for transmitter clutch magnet 55–21 by operating transmitter stop key 55–56, which is a locking key, and by momentarily operating the Figures, H and Intercept key 55–53. Key 55–56 connects ground over conductor 55–61, and winding of relay 57DS to battery, and that relay operates. Relay 57DS interrupts the locking circuit for relay 57AL which remains operated over its original energizing path. The Figures, H and Intercept key, upon being operated momentarily, connects ground over conductors 55–62 and 57–04, armature 2 and front contact of relay 57DS, and winding of relay 57D to battery, and that relay operates. It initiates a sequence of operations, previously described, in connection with the first level of the multiple address circuit for generating and transmitting to the seized outlets the disconnect signal comprising figures, H and letters. The disconnect signal will release the seized outlets, rendering all of them available for other messages except the one where the machine trouble or tape feed trouble occurred. The storage level of that outlet that was in trouble will be indicated as busy until the trouble has been cleared. In the priority message storage level of the multiple address circuit, relay 57DS remains operated until the transmitter stop key 55–56 is released. Before releasing that key, the attendant should reset the message tape in tape sensing head 55–17 to the beginning of the addresses preceding the message, the transmission of which was interrupted, so that the outlets that were disconnected after receiving part of the message may be reseized and the complete message retransmitted to them.

In the storage level of the outlet where the trouble was assumed to have occurred, the priority storage level in Figs. 30 to 33, the attendant closes busy key 30–39, connecting ground over conductor 30–41 to the back contact associated with armature 1 of relay 32LA3. In response to the disconnect signals generated in the multiple address circuit, relays 32LA3 and 32LC3 release. The circuit of selector magnet 30–08 is disconnected, at the armature 7 and front contact of relay 32LA3, from resistor 32–18 and condenser 32–19 and from the grid circuits of tube 32–21, and the triode section of that tube that was conducting is cut off, releasing relay 32AL3. That relay releases relay 32C3 which extinguishes tape-out lamp 30–38 and removes ground from conductor 32–12 extending to the alarm circuit. Upon the release of relay 32LA3, the ground connection on the back contact associated with its armature 1 is extended through that armature to the winding of relay 32B3. That relay operates and locks through varistor 32–04, and the armature 4 and back contact of relay 32C3, if there is a ground on conductor 39–28 incident to a priority message handling operation then in progress by the multiple address director circuit. In preparing its locking circuit relay 32B3 opens the possible energizing path for relay 32PR, thereby preventing the operation of that relay. During the time that relay 32B3 remains operated and prevents the operation of relay 32PR, any priority message for the outgoing trunk circuit to switching center 1–37 will be routed to either of the regular storage reperforators 20–02 and 25–01 of that outlet. After the trouble has been cleared in reperforator 30–01, the attendant releases busy key 30–39 which releases relay 32B3, if there is no ground on conductor 39–28 or when the multiple address director circuit removes such ground, thereby restoring the priority storage level of the outlet to normal condition in which it is again available for the storage of priority messages.

A machine trouble or a tape feed difficulty may occur in a storage level of an outlet which is under seizure by a regular director and is receiving a message. The manner in which an alarm is given will be described with reference to the first regular storage level of the outgoing trunk circuit, contained in Figs. 20 to 23. As in the case of the reperforator 30–01 of the priority level, a machine trouble in reperforator 20–02 will result in failure of the universal contact swinger to engage alternately its two contacts, or a tape feed trouble will result in the opening of the tape feed indicator contacts 20–42. At the time of occurrence of such a trouble during message reception by reperforator 20–02, relays 22A1, 22B1, 22E1, 22BR and 27BM will be operated. With relay 22E1 operated, a connection from the anode circuit of tube 22–11 is extended over conductor 22–26, front contact and armature 4 of relay 22E1, varistors 22–27 to the junction of a network of resistors associated with the grid circuit of twin triode discharge tube 22–22 and to one terminal of condenser 22–28, the other terminal of which is grounded. Condenser 22–28 is shunted by resistor 22–29. The contacts of universal contact 20–43 that the swinger alternately engages are connected over conductors 20–44 and 20–46 to the grid circuits of tube 22–22. This ararngement is the same as that of the previously described trouble detecting circuits comprising tube 32–21 in the priority storage level of the same outlet and tube 36–13 in the first regular storage level of the multiple address circuit. Upon the failure of ground to be connected alternately to conductors 20–44 and 20–46, one or the other or both triodes of tube 22–22 will be rendered conductive to operate relay 22AL1 which is included in the anode circuit of the tube. Relay 22AL1 connects ground through its front contact and armature 3 to the winding of relay 22C1 which operates. Relay 22C1 interrupts, at its armature 1 and back contact, the energizing circuit for relay 22B1 which releases. Upon the release of relay 22B1, a locking circuit is completed for relay 22C1, traced from its winding through the armature 1 and back contact of relay 22B1 and its own front contact and armature 3 to ground. It lights tape-out lamp 20–38 in a path traced from the lamp over conductors 21–29 and 22–17, and its front contact and armature 6. At its armature 2 and front contact, relay 22C1 connects ground to the energizing circuit for relay 22BR, and at its front contact and armature 5, it connects ground to the energizing circuit of relay 27BM to cause those relays to remain energized after relay 22B1 releases. At its armature 4 and front contact, relay 22C1 connects ground over conductors 22–18, 22–19 and 27–16 to conductor 32–12 from which a path extends as previously traced, to the alarm circuit in Fig. 68 for the purpose of bringing in an alarm.

In addition to operating relay 22C1, relay 22AL1 short-circuits, at its armature 1 and front contact, resistor 22–06 which is included in the energizing circuit for relay 22A1 that extends to the director circuit which has seized the outlet and is supervising message transmission thereto, perhaps the director circuit contained in Figs. 12 to 19, 24 and 29. In that director circuit the circuit includes the winding of relay 17MA, and that relay operates on the increased current due to the shunting of resistor 22–06 by the make contacts of relay 22AL1 and operates to bring in a director tie-up alarm and to suspend transmission to the outlet. The manner in which the alarm is registered in the director circuit is described in Patent 2,766,318, granted October 9, 1956, and is similar to the registration of a machine trouble alarm in the multiple address circuit, hereinbefore described. It includes the suspension of transmission to the connected outlet and resultant placing of the transmission path to that outlet in steady marking condition. The steady current in tube 22–11 of the outgoing trunk circuit that holds selector magnet 20–01 in the marking condition produces a steady voltage drop across resistor 22–13, and condenser 22–28 is enabled to discharge, cutting off tube 22–22. This releases relay 22AL1 which removes the shunt across resistor 22–06, releasing relay 17MA which need not remain operated because the alarm registration has been locked into the director circuit.

As described in Patent 2,766,318, and in a manner similar to that previously described for the restoration of a multiple address storage level following such an alarm, an attendant restores the director circuit by operating the director stop key, which is a locking key, followed by the momentary operation of the Figures, H and Intercept key. This causes the generation and transmission of the disconnect signal, restoring the director circuit to normal except for the operated director stop key, which may be restored after the message tape has been reset preparatory to reseizure of the outlet and retransmission of the complete message.

In the outgoing trunk circuit, the disconnect signal results in the release of relays 22A1 and 22E1. The relays 22C1, 22BR and 22BM remain operated. Relay 22E1 disconnects condenser 22–28 from the anode circuit of tube 22–11, thereby assuring the cutting off of tube 22–22 and the release of relay 22AL1. After the attendant has cleared the trouble in reperforator 20–02 that caused the alarm, busy key 20–39 is operated. This key extends ground over conductor 20–41, back contact and armature 5 of relay 22LE1 now released, back contact and armature 4 of relay 22J1, and winding of relay 22B1 to battery, and that relay operates. Relay 22B1 provides ground connections for holding relays 22BR and 27BM operated, and interrupts the locking circuit of relay 22C1 which releases. Relay 22C1 disconnects from conductor 22–18 the ground connection that was extended to the alarm circuit and extinguishes tape-out lamp 20–38. Following this, the attendant releases busy key 20–39 which releases relay 22B1. If at this time the second regular storage level of the outlet is idle, relays 22BR and 27BM will lock.

When the tape supply in a reperforator runs low while a message is being received, as for example in reperforator 20–02, tape reel contacts 20–36 close, connecting ground over conductor 20–37 to the front contact associated with armature 6 of relay 22LE1. If a multiple address message is being received, relay 22LE1 will be operated and the path terminates. If a regular message is being received, relay 22LE1 is unoperated, but relay 22E1 will be operated and the path terminates at the back contact associated with armature 5 of relay 22E1. Either relay releases in response to the disconnect signal and extends the path to the winding of relay 22C1 which operates. Relay 22C1 extends ground through its armature 6 and front contact, and conductors 22–17 and 21–29 to operate tape-out lamp 20–38, as previously described. When a regular message is being received, relay 22B1 is locked through the armature 1 and back contact of relay 22C1, and upon the operation of relay 22C1 relay 22B1 releases, locking relay 22C1 through armature 1 and back contact of relay 22B1, and the front contact and armature 3 of relay 22C1. When the message is a multiple address message, relay 22B1 is not operated, and relay 22C1 locks through the same path. Relay 22C1 also connects ground over armature 4 and front contact, and conductors 22–18, 22–19, 27–16, 32–12, 60–01 and 64–01 to operate alarm circuit relay 68–OL. The operation of this relay to bring in an alarm, and the manner in which the relay ultimately releases, have been described previously.

Before replenishing the supply of tape the operator closes busy key 20–39, connecting ground over conductor 20–41, back contact and armature 5 of relay 22LE1, back contact and armature 4 of relay 22J1, and winding of relay 22B1 to impose a busy condition on the first level of the outgoing trunk circuit, thereby preventing attempted seizure of that level by a director circuit. Relay 22B1 holds relays 22BR and 27BM operated, to route regular and multiple address mesages to the second level. Relay 22C1 remains operated only until contacts 20–36 open, because its locking circuit is interrupted by relay 22B1. Upon replenishment of the supply of tape and release of busy key 20–39, tape-out contacts 20–36 release relay 22C1 which releases relay 68–OL and busy key 20–39, upon being restored releases relay 22B1, and the first level is restored to service and rendered available.

When the priority level reperforator 30–31 develops a low tape supply condition, the tape reel contacts 30–36 close and connect ground over conductor 30–07 to the back contact associated with armature 8 of relay 32LA3. In response to the disconnect signal, relay 32LB3 operates, and releases relays 32LA3 and 32LC3. Relay 32LA3 extends ground over its armature 8 and back contact to the winding of relay 32C3 which operates. Relay 32C3 grounds the path to tape-out lamp 30–38 over conductors 32–13 and 31–12, and the lamp lights. Relay 32C3 grounds conductor 32–12 in the operating path for relay 68–OL in the alarm circuit. Relay 32C3 interrupts at its armature 4 and back contact the circuit of relay 32PR. The latter relay, when operated, has the previously-described function of diverting the busy test conductor of the multiple address director circuit from regular storage levels of the outgoing trunk circuits to the priority level. Relay 32PR being disabled by relay 32C3, any priority messages for this outgoing trunk circuit will be routed to the first or second storage level while the priority level remains out of service because of the low tape supply. As before, the operator closes busy key 30–39 which connects ground over conductor 30–41, back contact and armature 1 of relay 32LA3, and winding of relay 32B3 which operates. Relay 32B3 opens the locking path for relay 32C3, and further interrupts the path for relay 32PR. Upon the replenishment of the tape supply and the release of busy key 30–39, relays 32B3 and 32C3 release, restoring the priority level to service.

Another condition under which an alarm is given in an outgoing line or trunk circuit is that the third code combination of the disconnect code, namely the letters signal, does not follow the H signal as recorded by the reperforator, but that some other character follows that signal. It will be assumed for the purpose of this description that a message stored in tape 20–04 of the first level of the trunk circuit outgoing to switching center 1–37 is being transmitted. Under this circumstance, relays 21H1, 23J and 33N are operated and locked, relays 21P1 and 21G1 are operated but not locked, and relay 23AB follows the signals being transmitted. When the figures code combination of the disconnect code is sensed by tape sensing levers 20–23, and is transferred to the transmitter and maze contacts, the relay 33K is operated from ground supplied through the maze contacts in response to the figures signal, the path having been previously traced.

When the maze contacts are set in accordance with the H code combination, relay 33L operates over a path also previously traced, which includes the left-hand armature and back contact of relay 28AX1. Relay 33L completes the energizing circuit of relay 33FH which operates and locks through its armature 3 and front contact. When the code combination following the H code, assumed to be any other character than letters, is transferred to the transmitter and maze contacts, the transmitter auxiliary contacts 20–32 close under the control of shaft 20–22 and connect ground over conductor 20–33, front contact and armature 11 of relay 21G1, conductors 21–27, 26–11 and 31–07, armature 2 and front contact of relay 33FH, conductor 33–09, left-hand armature and back contact of relay 28AX6, back contact and left-hand armature of relay 28AX2, and winding of relay 28AX1 to battery, and that relay operates. The ground connection is also extended over conductor 33–12, front contact and armature 2 of relay 33L, conductor 33–13, and winding of relay 23AT to battery, and that relay operates. Relay 23AT locks through its front contact and armature 4, conductors 23–09, 28–02 and 26–12, and front contact and armature 10 of relay 21H1 to ground. Relay 23AT interrupts, at its armature 1 and back contact, the energizing circuit for transmitter clutch magnet 20–17 which releases. Relay 28AX1 interrupts the locking circuits for relays 33K and 33L, and those relays release, relay 33L releasing slowly because resistor 33–11 is connected in parallel with its winding. When the transmitter auxiliary contacts 20–32 open, relay 28AX2 operates in a locking circuit for relay 28AX1, traced from the winding of the latter relay through the front contact and right-hand armature, winding of relay 28AX2, and back contact and right-hand armature of relay 28AX6 to ground. Relay 33FH prepared, at its armature 4 and front contact, an energizing circuit for relay 33LT which the maze contacts will complete when they are set in accordance with the letters code combination. Since it has been assumed that some other code than letters follows the H signal, relay 33LT will remain released. Because of the fact that relay 33LT does not operate, a circuit for operating relay 23AL is completed upon the delayed release of relay 33L, the circuit being traced from battery through the winding of relay 23AL, conductor 23–16, upper armature and back contact of relay 33M, back contact and armature 1 of relay 33L, conductor 33–18, armature 6 and front contact of relay 23AT, conductor 23–17, and back contact and armature 3 of relay 33LT to ground.

Relay 23AL lights tape-out lamp 20–38 in a circuit traced from the lamp over conductors 21–29, 22–17 and 22–31, armature 1 and front contact of relay 23AL, conductor 23–18, and front contact and armature 9 of relay 21H1 to ground. Relay 23AL also connects ground over conductors 23–19, 22–19 and 27–16 to conductor 32–12 from which a path has been previously traced to the alarm circuit for giving an alarm. Outgoing transmission over the trunk is thus suspended without the transmission of a letters signal as part of the disconnect signal, and with the outgoing transmission channel remaining under seizure by the transmitter distributor of the first storage level of the outgoing trunk circuit. An alarm has been given, and a sequence of operations initiated by the momentary operation of line release key 20–47 which connects ground over conductor 20–48, front contact and armature 2 of relay 21H1 and conductor 21–31 through the winding of release relay 23RLS which operates. The relay locks over its armature 1 and front contact, conductor 23–21, front contact and armature 1 of relay 21H1, conductor 21–18, armature 1 and front contact of relay 26H2, conductor 26–03, and back contact and armature 9 of relay 31H3 to ground. Relay 23RLS operates relay 33LD in a circuit traced from the winding of that relay over conductor 33–21, and front contact and armature 5 of relay 23RLS to ground.

At its armatures 1, 2, 3, 4 and 5, relay 33LD extends connections from various contacts of relays 33DA, 33DB, 33DC, 33DD, 33DE and 33DF to a group of five conductors 33–22 which connect through a group of five conductors 31–13 and 26–26 to front contacts associated with armatures 3, 4, 5, 6 and 7 of relay 21D1. Those armatures are connected to a group of five conductors 21–21 which are connected to distributor contacts 20–24. The function of relays 33DA, 33DB, 33DC, 33DD, 33DE and 33DF, when they are operated in succession following the operation of relay 21D1, as will be described, is to code on the distributor contacts a complete disconnect signal comprising the codes for figures, H, and letters. Relay 33LD also extends paths from the distributor clutch magnet 20–29 and from distributor auxiliary contacts 20–49 to the disconnect signal-generating relay circuit. The path from the distributor clutch magnet is traced over conductors 20–28 and 20–51 to the front contact associated with armature 8 of relay 21D1, the remainder of the path extending from that armature over conductors 21–32, 26–27 and 31–14 to the front contact associated with armature 6 of relay 33LD. The path from distributor auxiliary contacts 20–49 is traced over conductor 20–52 to the front contact associated with armature 2 of relay 21D1, the remainder of the path extending over conductors 21–33, 26–28 and 31–16 to the front contact associated with armature 7 of relay 33LD. At its armature 8 and front contact, relay 33LD extends ground over conductors 33–23, 31–17 and 26–28, and armature 3 and front contact of relay 21H1 to the winding of relay 21D1 which operates. The circuits involved in the generation of the disconnect signal will not be traced in detail because they are similar to the disconnect signal generating circuits involving relays 37SA, 37SB, 37SC, 37SD, 37SE and 37SF in the first level of the multiple address circuit, the operation of which was previously described. With relay 21D1 operated, the circuit of relay 21G1 is interrupted at the armature 1 and back contact of relay 21D1 to remove from the distributor contacts the code now set on the transmitter contacts controlled by contact operating members 20–16. Relay 21D1 also completes the energizing circuit for distributor clutch magnet 20–29, and that magnet initiates a cycle of distributor shaft 20–11. Before any of the six relays in the disconnect signal-generating relay circuit operates, a figures signal is coded on the distributor contacts through back contacts of the disconnect signal coding relays, and that signal is transmitted over the outgoing transmission channel. When distributor auxiliary contacts 20–49 close, they complete the circuit of relay 33DA which interrupts the energizing circuit for distributor clutch magnet 20–29. When the distributor auxiliary contacts open, they remove a shunt around the winding of relay 33DB, which operates in series with relay 33DA in the locking circuit for that relay. Relay 33DB codes an H signal on the distributor contacts and reoperates distributor clutch magnet 20–29, initiating a cycle of shaft 20–11 in which the figures signal is transmitted. Distributor auxiliary contacts complete the circuit of relay 33DC which interrupts the circuit of distributor clutch magnet 20–29. When the distributor auxiliary contacts open, relay 33DD operates in the locking circuit of relay 33DC and codes the letters signal on the distributor contacts. It also reoperates distributor clutch magnet 20–29 which initiates a third cycle of distributor shaft 20–11 in which the letters signal is transmitted. In that cycle of the distributor shaft, the distributor auxiliary contacts complete the circuit of relay 33DE which operates and releases distributor clutch magnet 20–29. When the distributor auxiliary contacts open before shaft 20–11 comes to rest, relay 33DF operates in the locking circuit of relay 33DE.

Relay 33DF connects ground over conductor 33–24 to the winding of relay 33M which operates. Relay 33M locks over conductors 33–17, 28–02 and 26–12, and the front contact and armature 10 of relay 21H1 to ground. At its armature 1, relay 33M interrupts the circuit of relay 23AL, which releases. The latter relay extinguishes lamp 20-38 and disconnects the ground from the previously traced path leading to the alarm circuit. At its armature 3, relay 33M interrupts the locking circuit for relay 33N which has a slow-release characteristic. Upon releasing, the relay 33N reoperates relay 33TC and unlocks relay 21H1, which releases. Relay 21H1 releases relay 23RLS, which in turn releases relay 33LD. Relay 21H1 also releases relay 21D1. Relays 33DA, 33DB, 33DC, 33DD, 33DE and 33DF locked to relay 21D1 over conductors 33-26, 31-18 and 26-31, and armature 9 and front contact of relay 21D1 to ground. Accordingly, the six relays of the disconnect signal-generating circuit release. Relays 33DA, 33DC and 33DE have slow-release characteristics because armatures and front contacts of those relays connect resistors in parallel with their windings. Upon the release of relay 33DF, the energizing circuit for relay 33M is interrupted and as the locking circuit for that relay was interrupted when relay 21H1 released the relay 33M releases, reoperating relay 33N which locks. Relay 33DF also removes a ground connection extended through the front contact and armature 2 of relay 33M and conductors 33-17 and 23-09, the latter being in the locking circuit of relay 23AT so that that relay releases when relay 33DF releases, the ground connection of the primary locking circuit of relay 23AT having been interrupted when relay 21H1 released. In this way a complete disconnect code has been transmitted over the outgoing trunk channel, and that channel has been released from the first storage level of the outgoing trunk circuit and is available to other levels.

Another trouble condition that may occur in any one of the storage levels of the outgoing trunk circuit is that the message tape, such as tape 20-04, may become torn. A sensing lever 20-53 controlled by cam 20-54 on transmitter cam shaft 20-22 senses for the presence or absence of tape in transmitter head 20-06 each time the code sensing levers 20-23 are presented for sensing of a code combination. When there is tape in the tape sensing head 20-06, the sensing lever 20-53 will be arrested short of closure of tape-out contacts 20-56. However, when the tape tears, it will be advanced step by step until the torn end is fed out of the tape sensing head, whereupon tape-out contacts will close, connecting ground over conductor 20-57 to operate relay 21R1. This relay locks through its front contact and armature 3, and armature 2 and back contact of relay 21T1 to ground. At its armature 1, the relay 21R1 connects ground over conductors 21-34 and 21-29 to light tape-out lamp 20-38. It connects ground through its armature 2 and front contact, and conductors 21-36, 21-37, 22-19 and 27-16 to conductor 32-12 from which a path extends, as previously traced, to the alarm circuit to operate the audible alarm device. At its armature 4, the relay 21R1 interrupts the circuit of transmitter clutch magnet 20-17 which releases the magnet and suspends operation of transmitter shaft 20-22.

After the tape has been repaired and reinserted in tape sensing head 20-06, the attendant closes transmitter hold key 20-58 momentarily, connecting ground over conductor 20-59 to operate relay 21T1. This relay has no locking circuit and remains operated only as long as key 20-58 is closed. At its upper armature, it interrupts the energizing circuit for relay 21P1 which releases, but as soon as relay 21T1 releases, relay 21P1 reoperates. At its lower armature, relay 21T1 releases relay 21R1, and the circuit is thus restored to normal.

It may be desirable to stop transmission in order, perhaps, to make some adjustment of apparatus or circuit elements, and this may be accomplished at any time when transmission is in progress by the operation of transmitter stop key 20-61, which is a locking key. This key connects ground over conductor 20-62 to operate relay 21S1. At its armature 2 and back contact, relay 21S1 interrupts the energizing circuit for relay 21P1 and for transmitter clutch magnet 20-17, and the magnet and relay release. At its armature 1 and back contact, relay 21S1 releases relay 21G1. At its armature 4 and front contact, relay 21S1 extends a ground over conductors 21-14 and 23-06 for lighting busy-out lamp 23-05, this ground supplementing the one supplied through the armature 8 and front contact of relay 21H1 and over conductor 21-13 to conductor 21-14. When transmission is to be resumed, the operator releases transmitter stop key 20-61 which releases relay 21S1. That relay permits relay 21P1 and transmitter clutch magnet 20-17 to reoperate.

In the description of various phases of operations of the outgoing trunk circuit, the operation of relays 28AX1 and 28AX2 has been mentioned. The circuits contained in Figs. 20 to 23, 25 to 28 and 30 to 33 are usable for outgoing multistation lines as well as for outgoing single-station lines and outgoing single trunks. When used for a multistation line a transmitter start circuit, represented diagrammatically at 2-17 in Fig. 2, has access to the distributors of the regular storage levels for the purpose of transmitting transmitter start patterns of signals for controlling the starting of transmitters at outlying stations. The manner in which the transmitter start circuit uses the distributors of the outgoing line circuit is shown and described in the Bacon et al. patent hereinbefore identified. Relays 28AX1 and 28AX2, and four additional relays designated 28AX3, 28AX4, 28AX5 and 28AX6, have the function of preventing the transmitter start circuit from gaining access to a distributor between code combinations of certain critical sequences, among these being the station identifying or call-directing two-character codes followed by a letters signal, and the disconnect signal comprising the codes for figures, H and letters. The manner in which this is accomplished is fully described in Patent 2,766,318, in which relays 20-29, 20-28, 20-33, 20-34 and 20-32 of Fig. 20 correspond to and perform the function of the six relays enumerated above. When the circuits are used for a single outgoing trunk, the relays 28AX1, 28AX2, 28AX3, 28AX4, 28AX5 and 28AX6 perform no useful function but merely operate idly.

Relays 23AC and 23AD, not previously referred to herein, are used to control the seizure of the second regular storage level only of an outgoing line or trunk by a special code selective intercept circuit for the recording of certain kinds of messages on a controlled basis, the seizure being regulated in accordance with certain traffic conditions of the two regular storage levels of the outgoing line or trunk. An arrangement for accomplishing this is fully described in Patent 2,766,318, and that arrangement includes relays 24-36 and 24-59 in Fig. 24 of that application which are additionally designated in the drawings "AD" and "AC" to which relays 23AD and 23AC of the present specification and drawings correspond. Accordingly, no description of this feature is included herein.

Figure 60:
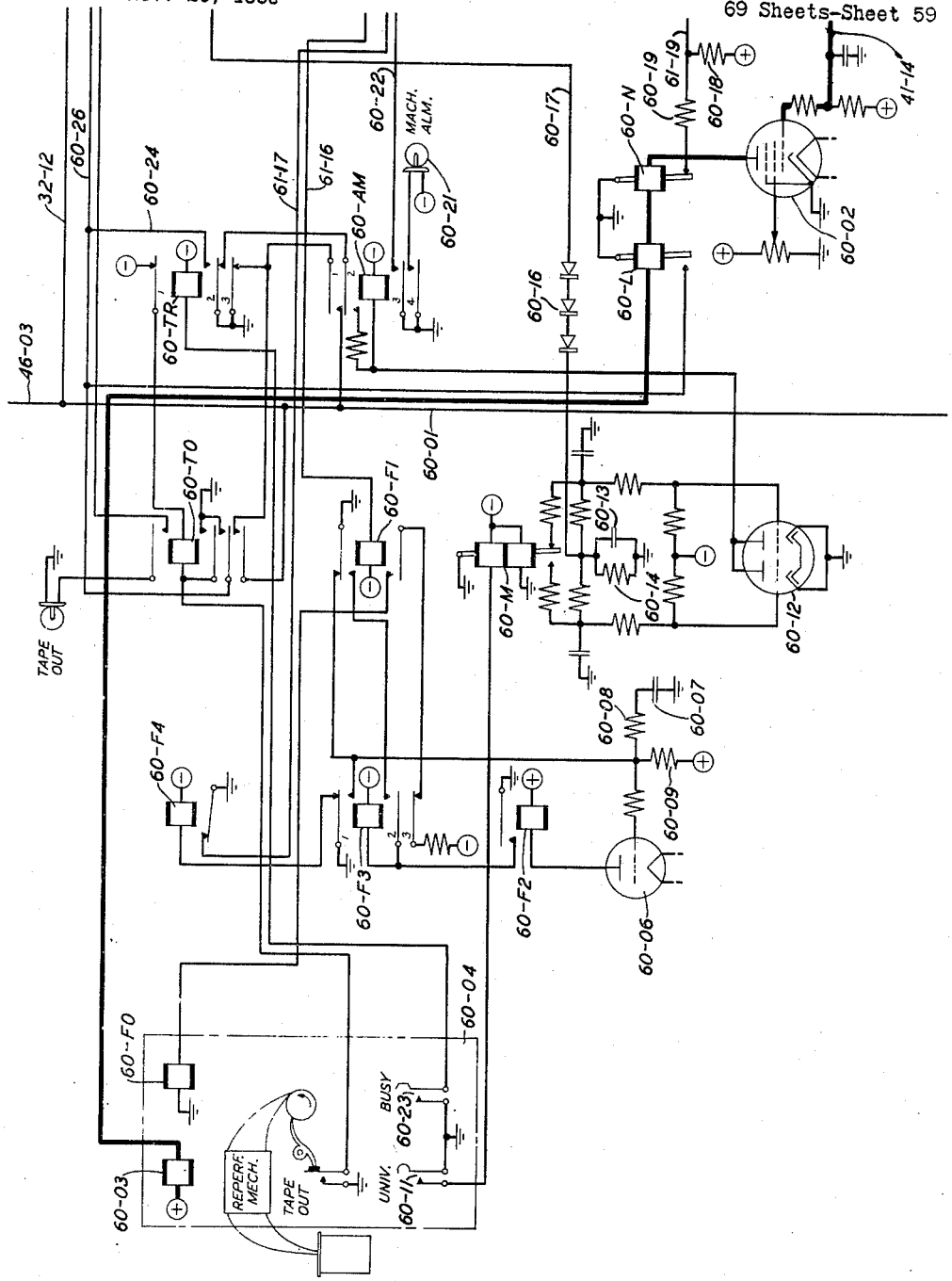
Figs. 60, 61, 64 and 65 show a multiple address intercept circuit.
Figure 61:
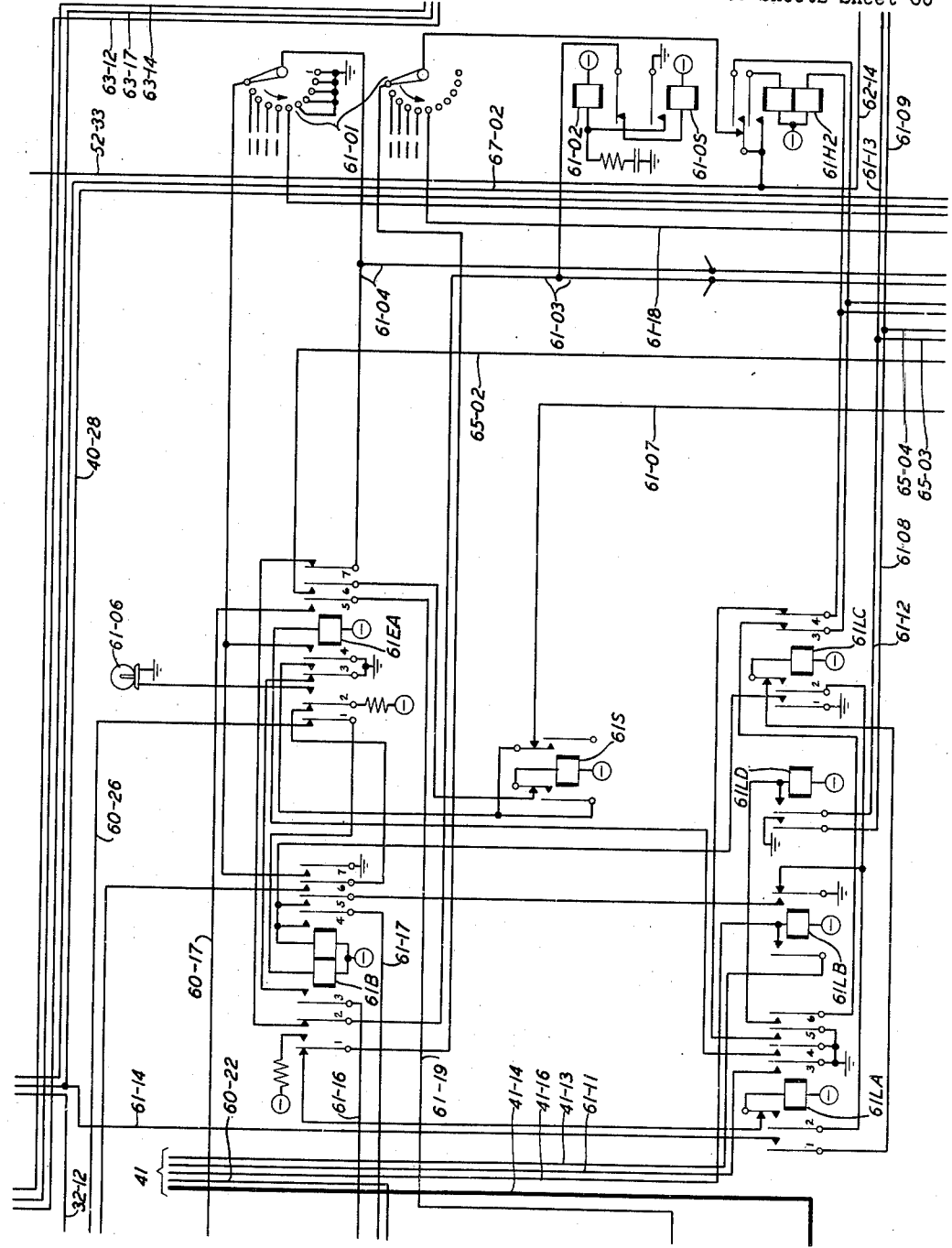
Figure 62:
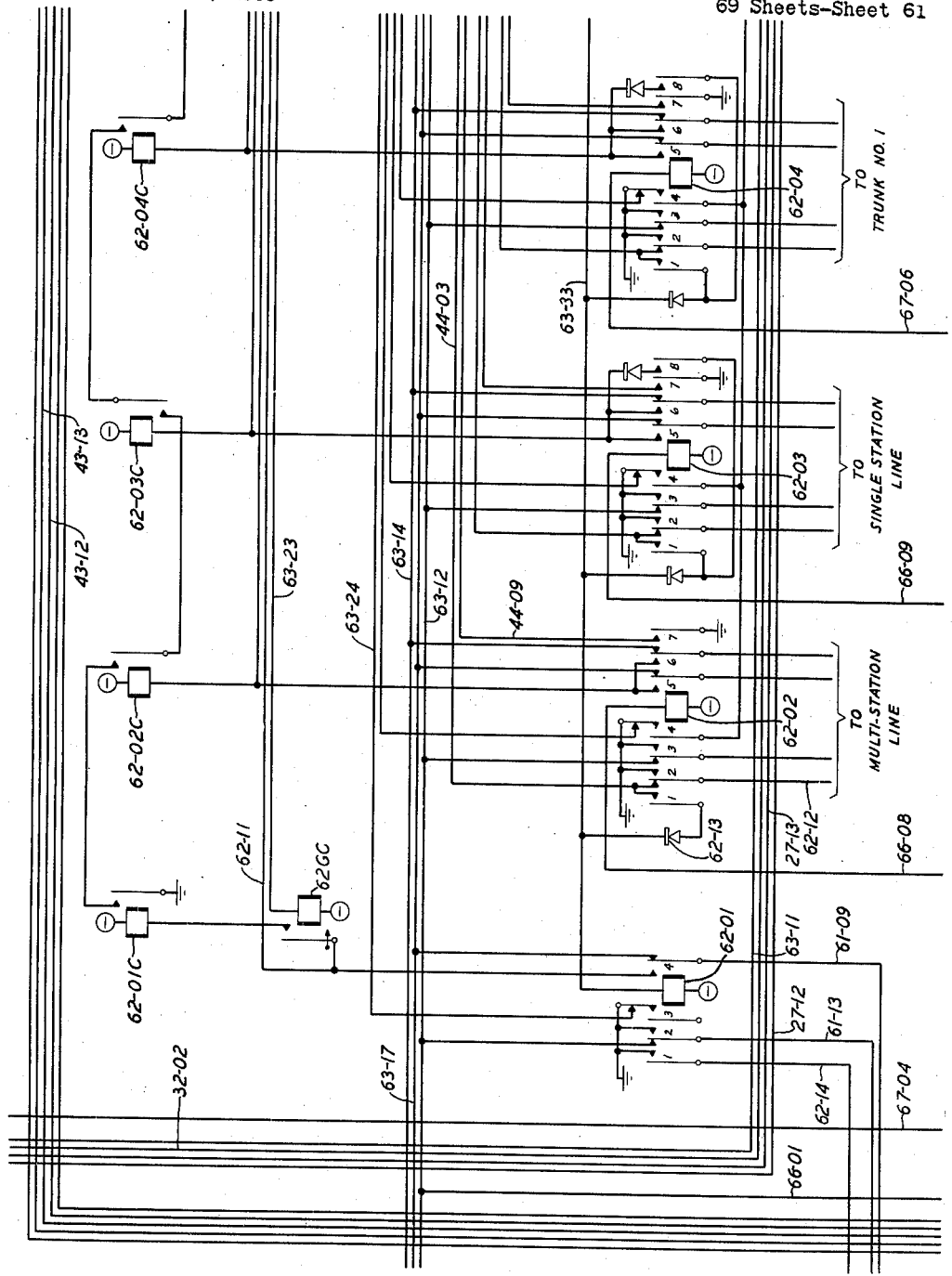
Figs. 62, 63, 66 and 67 show the group code circuit.
Figure 63:
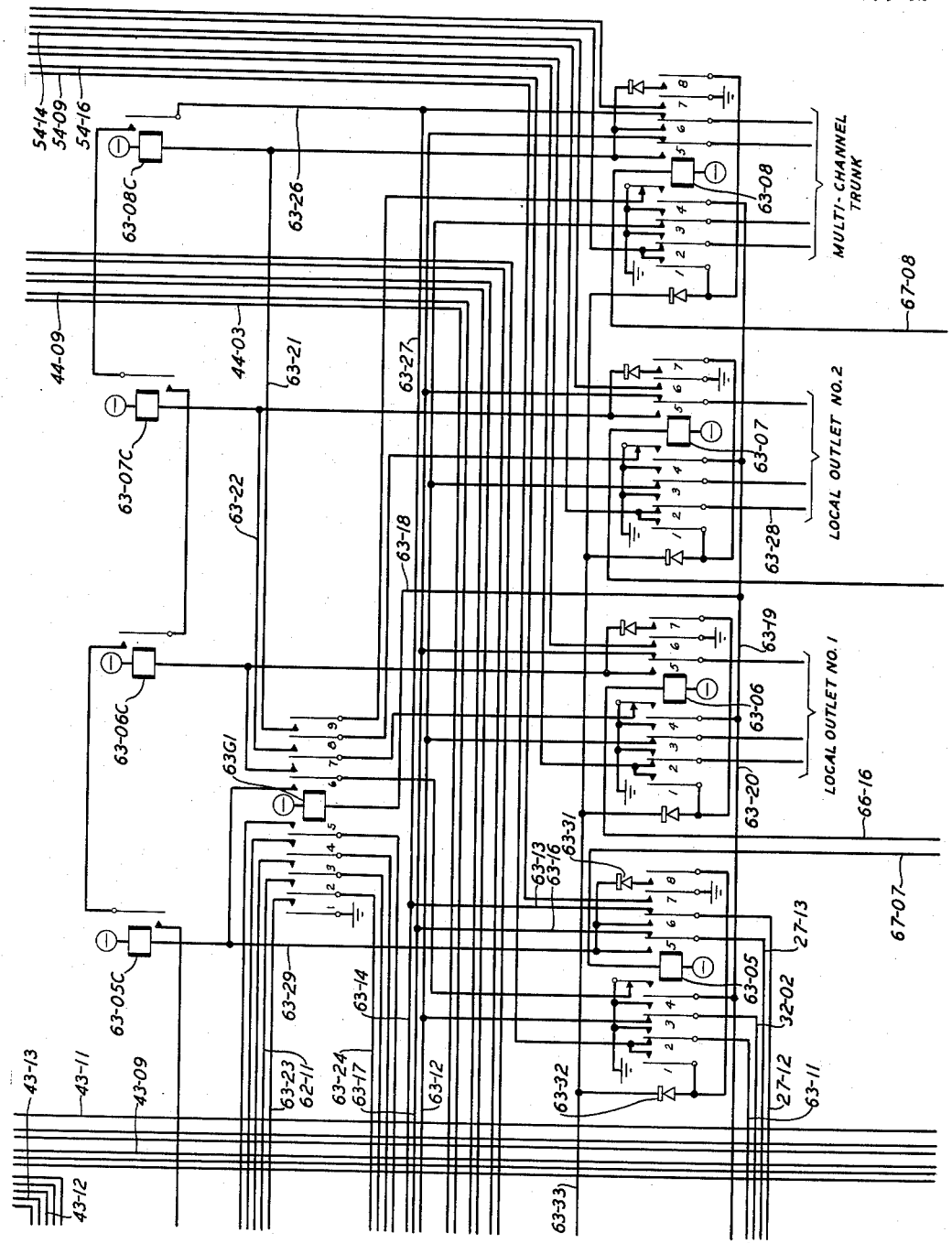
Figure 64:
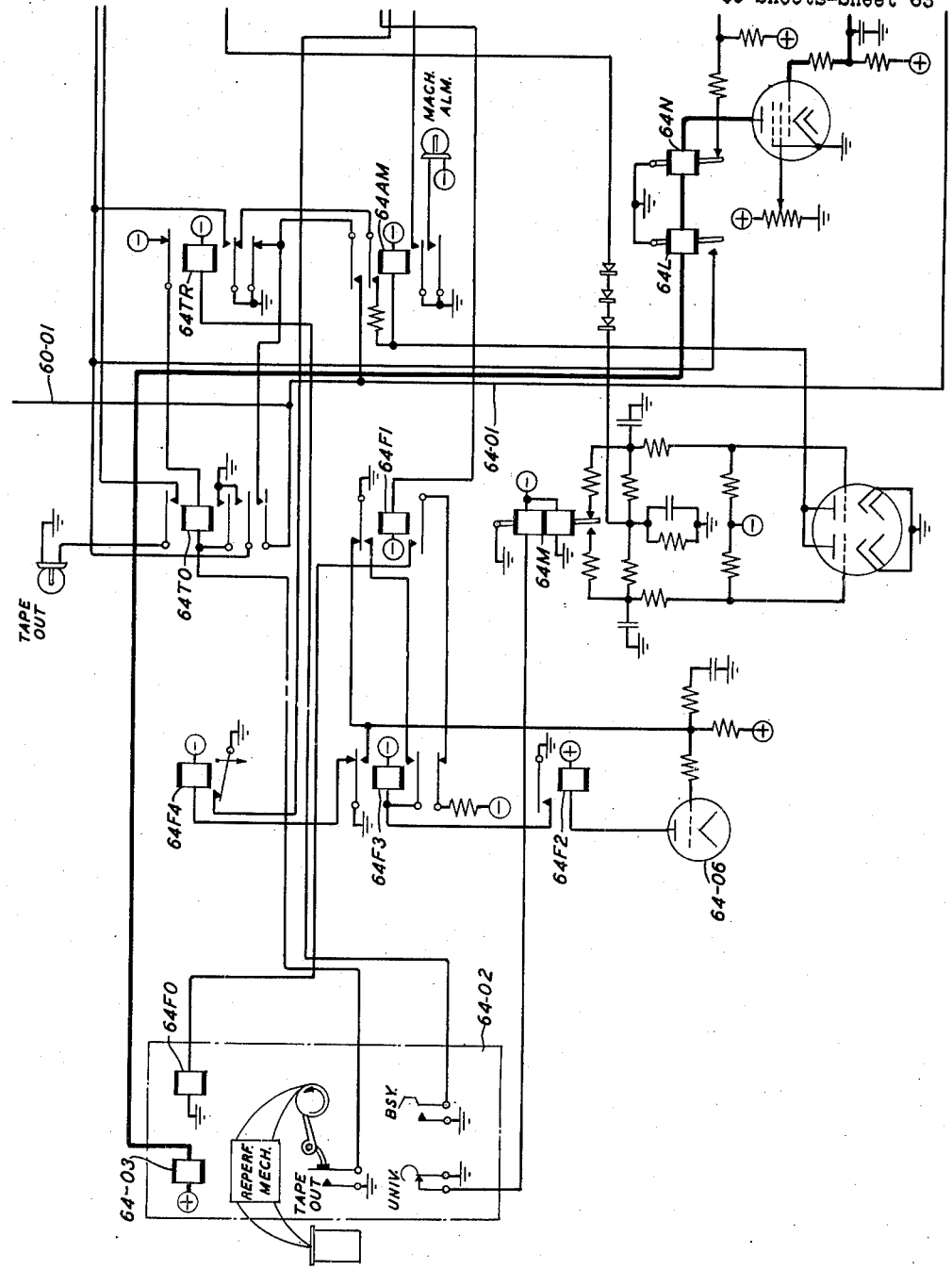
Figure 65:
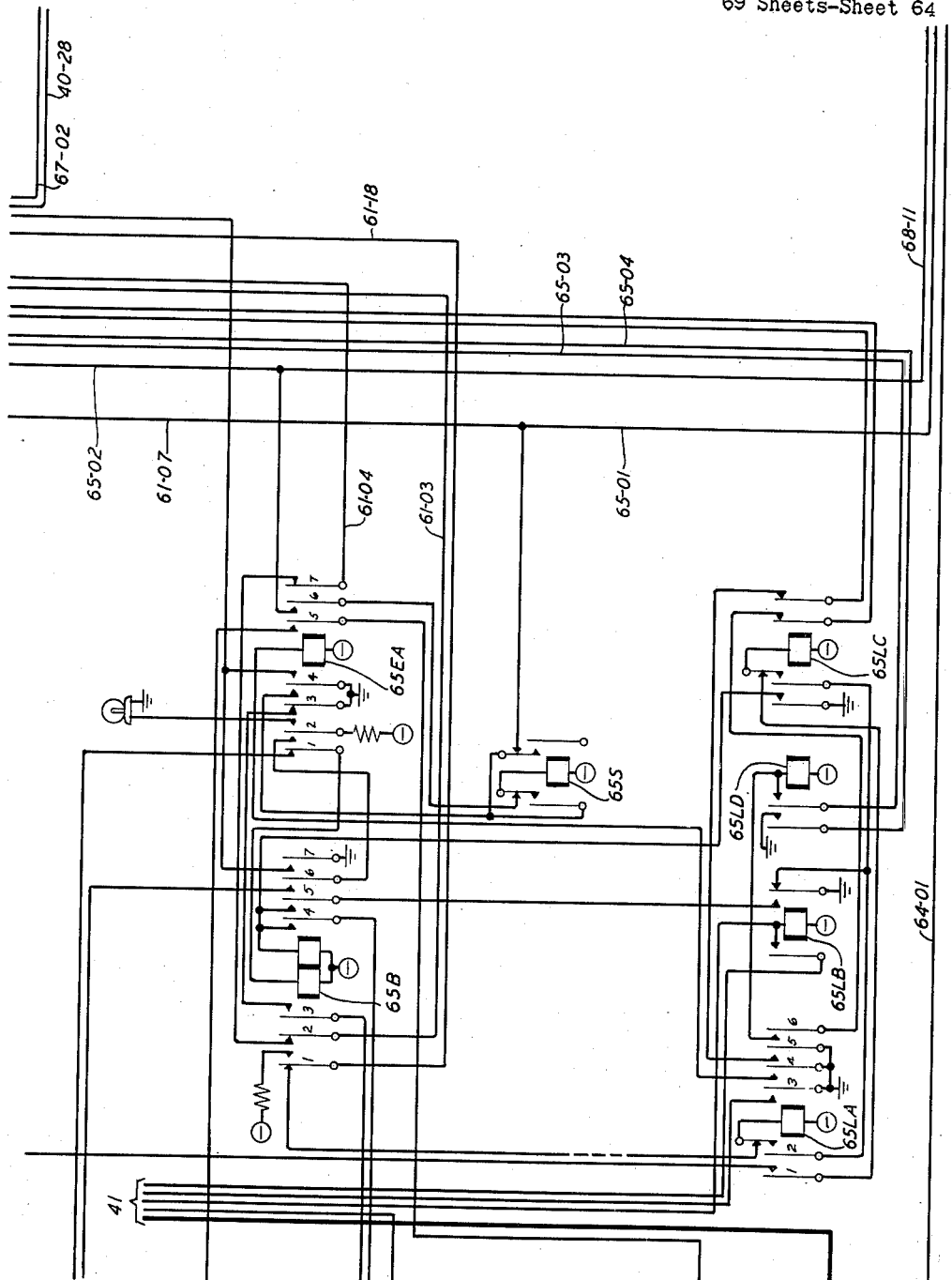
Figure 66:
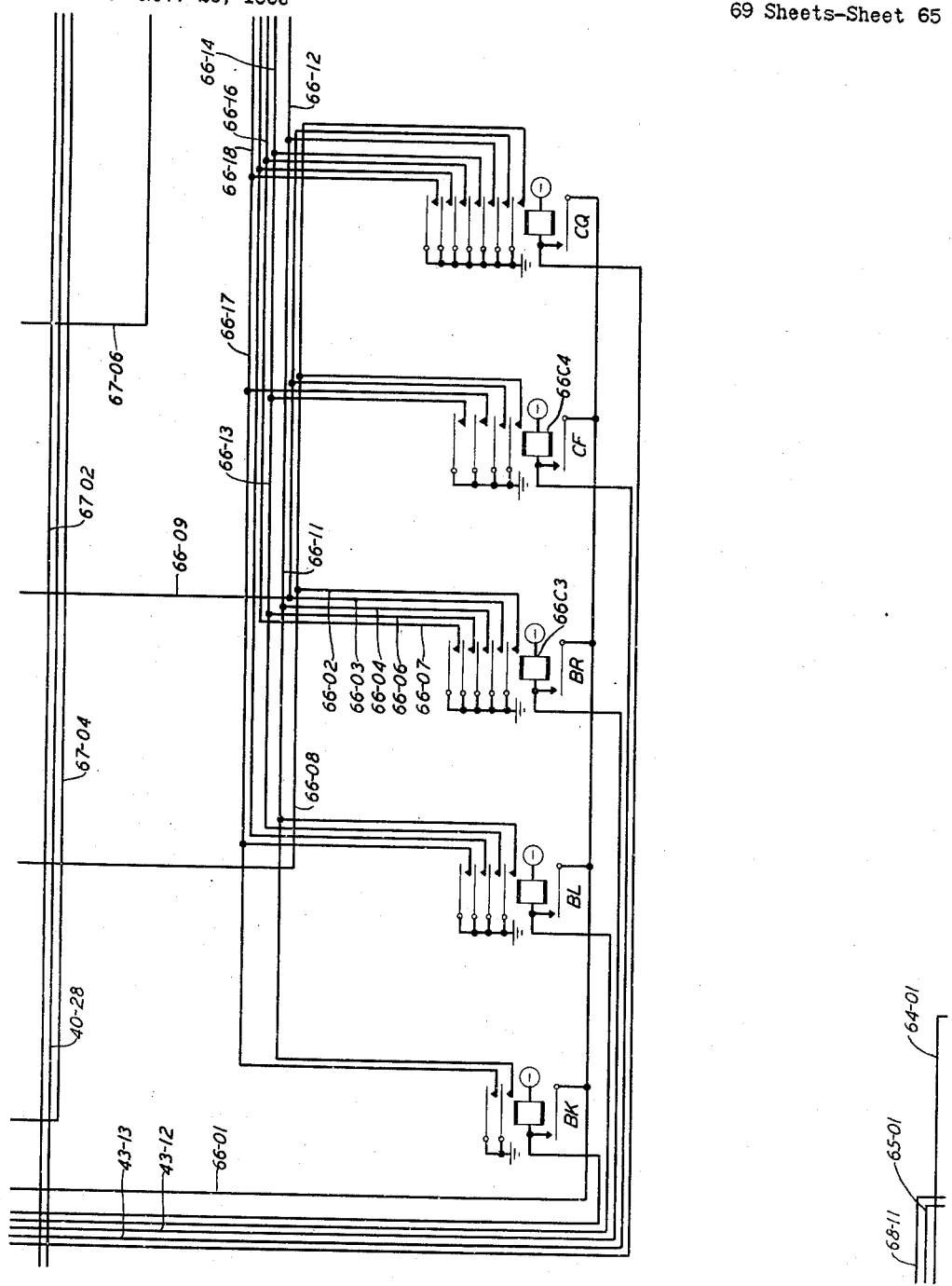
Figure 67:
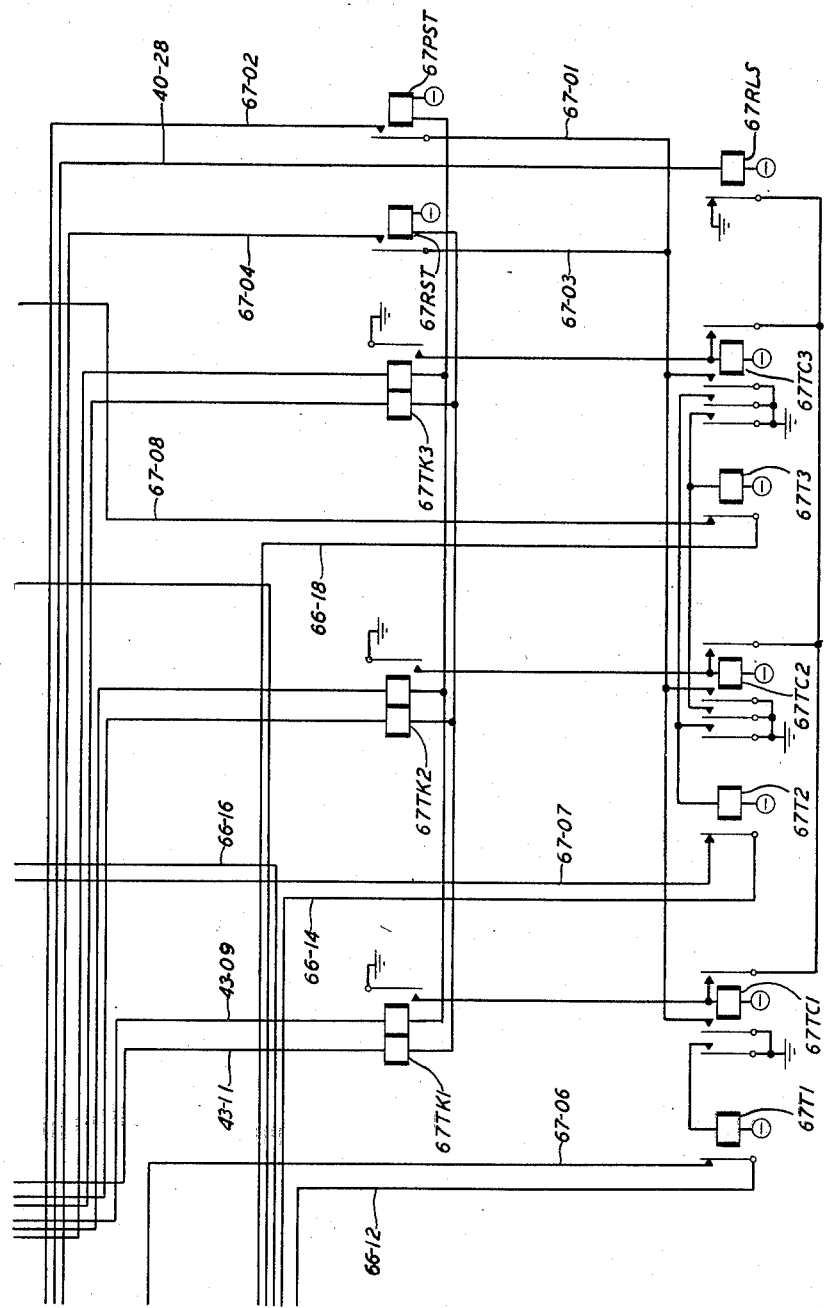
Figure 68:
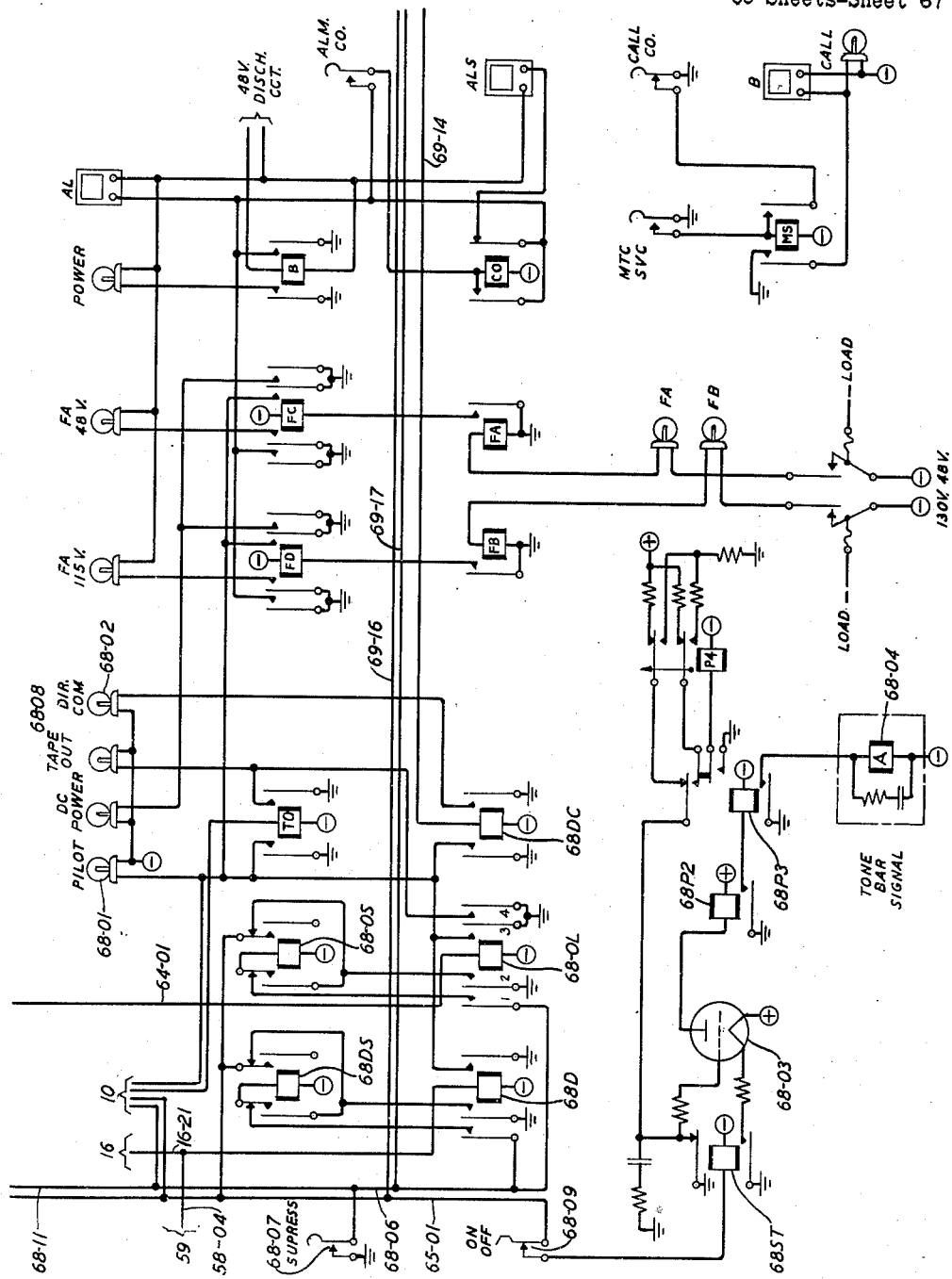
Fig. 68 shows an alarm circuit.

The multiple address intercept circuit is also provided with apparatus for responding to trouble conditions and giving an alarm. Referring to Fig. 60, one of the possible trouble conditions may be a machine trouble in reperforator 60-04. The reperforator has universal contacts 60-11 which close in each receiving cycle of the reperforator. When the contacts close they connect ground to the upper winding of relay 60M, causing the armature of that relay to transfer from its right-hand to its left-hand contact during the interval in which universal contacts 60-11 are closed. The two contacts of relay 60M are connected to the grid circuits of the twin triode tube 60-12 in the same manner that the outer contacts of the universal contacts of reperforator-transmitters are connected to the grid circuits of an alarm tube, an example of such an arrangement hereinbefore described being the universal contacts in the reperforator-transmitter unit of the first multiple address storage level, and the tube 36–13 which those contacts control jointly with the contact tongue. The network of resistors associated with the grids of tube 60–12 includes a junction point from which a condenser 60–13 is connected to ground, with a resistor 60–14 in parallel. There is also a connection from that junction point through varistors 60–16 and conductor 60–17, front contact and armature 5 of relay 61EA when that relay is operated, conductor 61–19 to a junction point from which one path is traced through resistor 60–18 to positive battery, and another path is traced through resistor 60–19 and contact and armature of relay 60–N to ground. When current is flowing in tube 60–02 to repeat a marking condition to selector magnet 60–03 of reperforator 60–04, the armature of relay 60–N is engaging its single contact and providing a potential at the junction of resistors 60–18 and 60–19 which is not sufficiently positive as applied to condenser 60–13 to render either triode section of tube 60–12 conductive although the left-hand contact of relay 60–M is ungrounded. When a spacing signal is impressed upon the grid of tube 60–02 the tube cuts off, the armature of relay 60–N moves out of engagement with its contact and the potential at the junction of resistors 60–18 and 60–19 rises to a positive value and causes condenser 60–13 to charge through varistors 60–16, the varistors preventing condenser 60–13 from discharging through conductor 60–17 when a marking signal again operates the armature of relay 60–N into engagement with its contact. This arrangement differs from those previously described only in that the charging circuit for condenser 60–13 is not directly associated with the anode circuit of tube 60–02, but is controlled from that circuit indirectly through relay 60–N. When a machine trouble occurs in reperforator 60–04 and universal contacts remain open steadily or closed steadily, the armature of relay 60–M remains on one or the other of its contacts while condenser 60–13 is repeatedly charged as tube 60–02 continues to respond to marking and spacing signals, and one or the other of the condensers associated with the grid circuits of tube 60–12 will become sufficiently charged to render one of the triodes conductive. The anode circuit of relay 60–12 includes alarm relay 60–AM which operates. Relay 60–AM locks through its front contact and armature 2, and the back contact and armature 2 of relay 60–TR to ground. At its armature 4, relay 60–AM completes the circuit of machine alarm lamp 60–21 which lights. At its armature 1, relay 60–AM extends ground supplied through the armature 3 and back contact of relay 60–TR to conductor 60–01, and over conductor 64–01 to the alarm circuit to operate alarm relay 68–OL. At its armature 3, relay 60–AM extends a ground connection over conductor 60–22 which is included in the group of conductors bracketed to Fig. 41, in which conductor 60–22 reappears, and assuming that the particular level of the multiple address intercept circuit is connected to the first level of the multiple address circuit, the crossbar switch contacts controlled jointly by select magnet 41–01 and hold magnet 41–12 will be closed, and the ground connection will be continued over conductor 41–19 which is included in a group of conductors bracketed to Fig. 38, in which conductor 41–19 reappears and was traced over conductor 37–34 to the winding of alarm relay 37AL. The result in the multiple address circuit is the same as that previously described in the case of a machine trouble alarm from a seized outlet. The attendant initiates a manual disconnect in the multiple address circuit which causes the transmission of the disconnect signal to the several seized outlets including the particular level of the multiple address intercept circuit. The outlets are thereupon released, and the attendant resets the tape in the multiple address storage level and initiates reseizure of the outlets designated by the codes preceding the message. In the level of the multiple address intercept circuit which is in trouble the operator closes busy key 60–23. Key 60–23 completes the circuit of relay 60–TR which operates. At its armature 3, relay 60–TR removes ground from conductor 60–01 to restore the alarm circuit, and at its armature 2 it unlocks relay 60–AM which releases. The ground connection on armature 2 of relay 60–TR is extended over conductors 60–24 and 60–26 to the back contact associated with armature 1 of relay 61EA.

As part of the disconnecting operation the multiple address circuit operates relay 61LB, as previously described. This relay locks under the control of the operated hold magnet in the multiple address link circuit, and releases relays 61LA and 61LC. Relay 61LB also provides a holding circuit for relay 61B, traced from ground through the right-hand armature and front contact of relay 61LB, and armature 5 and front contact and right-hand winding of relay 61B. Relay 61LA, released, releases relay 61EA and the hold magnet in the multiple address link circuit, also as previously described. The hold magnet releases relay 61LB which interrupts the circuit just traced for holding relay 61B operated. However, when relay 60–TR was operated by busy key 60–23 and ground was applied over the armature 2 and front contact of that relay, and conductors 60–24 and 60–26 to the back contact associated with armature 1 of the relay 61EA, that ground connection is extended, upon the release of relay 61EA, to the left-hand winding of relay 61B to hold that relay operated. This maintains a busy indication on this level of the multiple address intercept circuit so that it will not be subject to seizure by the multiple address circuit.

Incident to the release of relay 61EA as described, and with relay 61B remaining operated, relay 60–F1 will be operated, as previously described, to cause the energization of tape feed-out magnet 60–FO and initiation of a tape feed-out operation. Due to the machine trouble, that operation may not be accomplished and, in any case, it is not important since a complete message has not been recorded. When tube 60–06 becomes conductive, relay 60–F2 will operate, operating relay 60–F3 which locks to relay 60–F1. Relay 60–F3 releases feed-out magnet 60–FO and relay 60–F4, and cuts off tube 60–06 which releases relay 60–F2.

When the machine trouble has been remedied, the attendant releases the busy key 60–23. This releases relay 60–TR, which in turn releases relay 61B. The latter relay removes the busy indication, rendering this level of the multiple address intercept circuit available for seizure by the multiple address circuit. It also releases relay 60–F1 which holds tube 60–06 cut off, and also releases relay 60–F3 which reoperates relay 60–F4. In this manner, the multiple address intercept circuit is restored to normal.

It was hereinbefore stated that the circuit which has been described as being employed for the interception of multiple address messages, comprising a plurality of storage levels and a stepping switch for seizing the next idle level of the multiple address intercept circuit upon a bid by the multiple address director circuit, is also employed for miscellaneous intercept and wilful intercept service, these types of intercepts being indicated diagrammatically at 3–17, 3–18 and 3–36 in Fig. 3. In addition, substantially the same type of circuit employing a plurality of receiving-only teletypewriter recorder levels or typing reperforator levels and a stepping switch for causing the seizure of those levels in succession upon the basis of seizure of the next idle level may be employed for local outlet service, represented at 3–01 and 3–07 in Fig. 3. The same circuit is also usable for a multichannel outgoing trunk, represented at 2–39 in Fig. 2, in which each level comprises an outgoing trunk transmission path and a receiving-only teletypewriter recorder for monitoring outgoing traffic. These adaptations of the basic circuit comprising a plurality of levels and a rotary stepping switch for giving access to the next idle level, as described with reference to multiple address message interception by way of exemplifying the circuits, differ from the basic circuit for local outlet and multichannel trunk disclosed in Bacon et al. patent, 2,766,378, in which access to the various levels is gained through an open relay chain, as a result of which the levels associated with the head or beginning of the relay chain are seized more frequently than those located more remotely in the chain.

Although a specific embodiment of the invention has been shown in the drawings and described in the foregoing specification, it will be understood that the invention is not limited to the specific embodiment shown and described but is subject to modification, rearrangement and substitution of parts and elements without departing from the spirit of the invention.

What is claimed is:

1. In a teletypewriter switching system, a switching center having a plurality of incoming message transmission channels, a circuit having a plurality of message receiving means, signal responsive switching means connected to said incoming message transmission channels for routing messages incoming over said channels to said circuit, and rotary switch means for rendering the idle ones of said message receiving means successively available in predetermined and progressive order to receive messages.

2. In a teletypewriter switching system, a switching center having a plurality of incoming message transmission channels, a circuit having a plurality of message receiving means, signal responsive switching means connected to said incoming message transmission channels for routing messages incoming over said channels to said circuit, rotary switch means for rendering the idle ones of said message receiving means successively seizable to receive messages, and means responsive to the seizure of one of said message receiving means for operating said rotary switch means to preparatorily select the next receiving means to be seized.

3. In a teletypewriter switching system, a switching center having a plurality of incoming message transmission channels, a circuit having a plurality of message receiving means, signal responsive switching means connected to said incoming message transmission channels for routing messages incoming over said channels to said circuit, rotary switch means for rendering the idle ones of said message receiving means successively seizable to receive messages, switch operating means responsive to the seizure of one of said message receiving means for operating said rotary switch means to preparatorily select the next receiving means to be seized, means for precluding operation of said switch operating means upon seizure of the last idle receiving means, and means immediately effective when one of said levels thereafter becomes idle for initiating operation of said switch operating means.

4. In a teletypewriter switching system, a switching center having a plurality of incoming message transmission channels, a plurality of message storage circuits for storing messages preceded by message directing codes that are received over said channels, a message directing circuit for decoding said directing codes and routing the accompanying messages in accordance therewith, and rotary switch means for connecting said message directing circuit in succession with message storage circuits having messages in storage.

5. In a teletypewriter switching system, a switching center having a plurality of incoming message transmission channels, a plurality of message storage circuits for storing messages preceded by message directing codes that are received over said channels, a message directing circuit for decoding said directing codes and routing the accompanying messages in accordance therewith, means in each of said message storage circuits operable in response to storage of a message therein for registering a bid for connection with said message directing circuit, and rotary switch means for connecting said message directing circuit successively with message storage circuits having bids registered.

6. In a teletypewriter switching system, a switching center having a plurality of incoming message transmission channels, a plurality of message storage circuits for storing messages preceded by message directing codes that are received over said channels, a message directing circuit for decoding said directing codes and routing the accompanying messages in accordance therewith, means in each of said message storage circuits operable in response to storage of a message therein for registering a bid for connection with said message directing circuit, rotary switch means for connecting said message directing circuit successively with message storage circuits having bid registered, and means effective only when bids are in registration for operating said switch means.

7. In a teletypewriter switching system, a switching center having a plurality of incoming message transmission channels, a plurality of message storage circuits for storing messages preceded by message directing codes that are received over said channels, a message directing circuit for decoding said directing codes and routing the accompanying messages in accordance therewith, means in each of said message storage circuits operable in response to storage of a message therein for registering a bid for connection with said message directing circuit, rotary switch means for connecting said message directing circuit successively with message storage circuits having bids registered, and means effective upon completion of the decoding by said message directing circuit of address codes preceding a message in any of said storage circuits for operating said switch means to render said message directing circuit available to the next storage circuit having a bid registered.

8. In a teletypewriter switching system, a switching center having a plurality of incoming message transmission channels, a plurality of message receiving circuits each having a plurality of message storage means, signal responsive switching apparatus for routing to said circuits on a selective basis messages preceded by message directing codes that are received over said channels, a message directing circuit responsive to said routing for decoding said directing codes and further routing the accompanying messages in accordance therewith, and switch means for connecting said message directing circuit with any storage means of any of said message receiving circuits.

9. In a teletypewriter switching system, a switching center having a plurality of incoming message transmission channels, a plurality of message receiving circuits each having a plurality of message storage means, signal responsive switching apparatus for routing to said circuits on a selective basis messages preceded by message directing codes that are received over said channels, a message directing circuit for decoding said directing codes and routing the accompanying messages in accordance therewith, and switch means individual to said message receiving circuits for connecting said message directing circuit with any storage means of their respective message receiving circuit.

10. In a teletypewriter switching system, a switching center having a plurality of incoming message transmission channels, a plurality of message receiving circuits each having a plurality of message storage means, signal responsive switching apparatus for routing to said circuits on a selective basis messages preceded by message directing codes that are received over said channels, a message directing circuit for decoding said directing codes and routing the accompanying messages in accordance therewith, switch means for connecting said message directing circuit with any storage means of any of said message receiving circuits, and means for precluding connection of said message directing circuit with the storage means of one of said message receiving circuits while another message receiving circuit has a message in any storage means awaiting routing by said message directing circuit.

11. In a teletypewriter switching system, a switching center having a plurality of incoming message transmission channels, a plurality of message receiving circuits each having a plurality of message storage means, signal responsive switching apparatus adapted to selectively route messages incoming over said channels to one or another of said message receiving circuits under the control of predetermined directing codes of a plurality of directing codes accompanying the messages, a message directing circuit connectable with any of said message storage means for decoding others of said directing codes and routing the accompanying messages in accordance therewith, and means in said directing circuit operative in response to the routing of a message to a trunk channel outgoing to another switching center for generating other predetermined directing codes to cause the message to be routed to a corresponding message receiving circuit at said other switching center.

12. In a teletypewriter switching system, a switching center having a plurality of incoming message transmission channels, a plurality of message receiving circuits each having a plurality of message storage means, signal responsive switching apparatus adapted to selectively route messages incoming over said channels to one or another of said message receiving circuits under the control of predetermined directing codes of a plurality of directing codes accompanying the messages, a message directing circuit connectable with any of said message storage means for decoding others of said directing codes and routing the accompanying messages in accordance therewith, and means in said directing circuit operative in response to the routing of messages to a trunk channel outgoing to another switching center for generating other predetermined directing codes which differ for the different message receiving circuits to cause the routing of the messages to corresponding message receiving circuits at said other switching center.

13. In a teletypewriter switching system, a switching center having a plurality of incoming message transmission channels, a plurality of message receiving circuits each having a plurality of message storage means, signal responsive switching apparatus adapted to selectively route messages incoming over said channels to one or another of said message receiving circuits under the control of predetermined directing codes of a plurality of directing codes accompanying the messages, a message directing circuit connectable with any of said message storage means for decoding others of said directing codes and routing the accompanying messages in accordance therewith, and means in said directing circuit operative in response to the routing of messages to a trunk channel outgoing to another switching center for generating other predetermined directing codes which distinctively identify the switching center generating them and differ for the different message receiving circuits to cause the routing of the messages to corresponding message receiving circuits at said other switching center.

14. In a teletypewriter switching system, a switching center having a plurality of incoming message transmission channels, a plurality of message receiving circuits each having at least one message storage means, signal responsive switching apparatus for routing to said circuits on a selective bases messages preceded by message directing codes that are received over said channels, a message destination circuit having a plurality of message storage means, a message directing circuit connectable with the storage means of said message receiving circuits for decoding said directing codes and routing the accompanying messages in accordance therewith to destinations including said message destination circuit, and means in said message directing circuit for connecting any storage means of one of said message receiving circuits to any but one of the message storage means of said message destination circuit and for connecting any storage means of another of said message receiving circuits only to said one message storage means of said message destination circuit.

15. In a teletypewriter switching system, a switching center having a plurality of incoming message transmission channels, a message storing and retransmitting device and associated signal responsive message routing circuit terminating each of said channels, a plurality of message receiving circuits each having at least one message storage means adapted to receive messages selectively under the routing control of said message routing circuits, a message destination circuit having a plurality of message storage means, a message directing circuit connectable with the storage means of said message receiving circuits for routing the messages stored therein to destinations including said message destination circuit, means in said message routing circuits for connecting their associated message storing and retransmitting devices to any but one of the storage means of said message destination circuit, and means in said message directing circuit for connecting any storage means of one of said message receiving circuits to any but said one storage means of said message destination circuit and for connecting any storage means of another of said message receiving circuits only to said one storage means of said message destination circuit.

16. In a teletypewriter switching system, a switching center having a plurality of incoming message transmission channels, a plurality of outgoing message transmission channels including at least one having at least three message storage means serving as access thereto, a message handling circuit comprising message storage means in two sets whereof either set comprises at least one storage means, a message storing and retransmitting device and associated signal routing circuit terminating each of said channels for selectively routing messages under the control of accompanying directing codes to various points including: (a) any but one of the storage means of said one outgoing channel and (b) any storage means of either set of storage means of said message handling circuit, a signal responsive message directing circuit connectable with any storage means of said message handling circuit, and means in said message directing circuit for connecting any storage means of one of said sets to any but said one storage means of said one outgoing channel and for connecting any storage means of said other set to said one storage means of said one outgoing channel.

17. In a teletypewriter switching system, a switching center having a plurality of incoming message transmission channels, a plurality of outgoing message transmission channels including at least one having at least three message storage means serving as access thereto, a message handling circuit including a plurality of message storage means, means terminating said incoming channels for routing incoming messages under the control of accompanying directing codes to various points including: (a) any but one of the storage means of said outgoing channel and (b) any of the storage means of said message handling circuit, a signal responsive message directing circuit connectable with any storage means of said message handling circuit for routing stored messages under the control of accompanying directing codes to various poitns including any of the storage means of said outgoing channel.

18. In a teletypewriter switching swstem, a switching center having a plurality of incoming message transmission channels, a plurality of outgoing message transmission channels, and a message directing circuit for routing messages received over said incoming channels to said outgoing channels under the control of multielement permutation code signals accompanying said messages, said message directing circuit including a crossbar switch mechanism having certain select magnets and hold magnets thereof operable in response to the signal elements of said permutation code signals, contact sets operable cooperatively by said select magnets and hold magnets, and a network of fan circuit paths establishable by contacts of said sets beginning with an input apex point and ending at a plurality of terminal points of access to said outgoing channels.

19. In a teletypewriter switching system, a switching center having a plurality of incoming message transmission channels, a plurality of outgoing message transmission channels, and a message directing circuit for routing messages received over said incoming channels to said outgoing channels under the control of multielement permutation code signals accompanying said messages, said message directing circuit including a crossbar switch mechanism having certain select magnets and hold magnets thereof operable in response to the signal elements of said permutation code signals, contact sets operable cooperatively by said select magnets and hold magnets, a network of fan circuit paths establishable by contacts of said sets beginning with an apex point and ending at a plurality of terminal points, and a second crossbar switch having its select magnets connected to certain of said terminal points and having its hold magnets connected to be operated by any of its select magnets to selectively prepare paths of access to a plurality of said outgoing channels.

20. In a teletypewriter switching system, a switching center having a plurality of incoming message transmission channels, a plurality of outgoing message transmission channels, and a message directing circuit for routing messages received over said incoming channels to said outgoing channels under the control of two-state multielement permutation code signals accompanying said messages, said message directing circuit including a crossbar switch mechanism having certain select magnets and hold magnets thereof operable in response to the signal elements of said permutation code signals, contact sets operable cooperatively by said select magnets and hold magnets, a network of fan circuit paths establishable by contacts of said sets beginning with an apex point and ending at a plurality of terminal points, and a second crossbar switch having its select magnets connected to certain of said terminal points and having its hold magnets connected in groups to be selectively operated by any of its select magnets according to the state of one of the signal elements of said permutation code signals for selectively preparing one of a plurality of groups of paths of access to said outgoing channels.

21. In a teletypewriter switching system, a switching center having a plurality of incoming message transmission channels, a plurality of outgoing message transmission channels, and a message directing circuit for routing messages received over said incoming channels to said outgoing channels under the control of multielement permutation code signals accompanying said messages, said message directing circuit including a crossbar switch mechanism having certain select magnets and hold magnets therein operable in response to the signal elements of said permutation code signals, contact sets operable cooperatively by said select magnets and hold magnets, a network of fan circuit paths establishable by contacts of said sets beginning with an apex point and ending at a plurality of terminal points, a second crossbar switch having its select magnets connected to certain of said terminal points and having its hold magnets connected to be operated by any of its select magnets to selectively prepare paths of access to a plurality of said outgoing channels, and a duplication of said first-mentioned crossbar switch and network of fan circuit paths controllable in response to the signal elements of other permutation code signals accompanying said messages for selecting one of said prepared paths of access.

22. In a decoding system, a plurality of sets of contacts equal in number to the selective possibilities of two elements of a multielement permutation code signal, contact operating means responsive to each of said two elements for closing the contacts of one of said sets, a duplication of said sets of contacts and contact operating means for closing the contacts of one of the sets thereof according to the selective possibilities of two other elements of said code signal, entry paths to said plurality of sets of contacts and the duplication thereof, said entry paths equaling in number the selective possibilites of the remaining elements of said multielement code signal, interconnecting paths between contacts in the sets of said first-metioned plurality and in the duplication thereof reflecting the combined selective possibilities of said first-mentioned two elements and said second-mentioned two elements, and output paths equal in number to all possible code combinations of elements in said permutation code signal.

23. In a decoding system, a plurality of sets of contacts arranged in rows and columns, a row magnet individual to each row of sets of contacts and operable to condition for operation all of its row of sets of contacts, a column magnet individual to each column of sets of contacts and operable to operate any conditioned set of contacts in its column, code responsive means for selectively operating two out of four of said row magnets in response to two elements of a multielement permutation code signal, other code responsive means for selectively operating two out of four of said column magnets in response ot two other elements of said code signal, interconnections between the sets of contacts common to two of said four row magnets and two of said four column magnets on the one hand and the sets of contacts common to the other two row magnets and the other two column magnets on the other hand, said interconnections reflecting the combined selective possibilities of said first-mentioned two elements and said second-mentioned two elements, paths of entry to said contact sets equaling in number the selective possibilities of the remaining elements of said multielement code signal and output paths equal in number to all possible combinations of elements in said code signal and individually selectable over said entry paths and operated contact sets.

24. In a decoding system, a crossbar switch mechanism having certain select magnets and hold magnets thereof operable in response to the elements of a multielement permutation code signal and contact sets operable cooperatively by said select magnets and hold magnets, and a network of fan circuit paths establishable by contacts of said sets beginning with an input apex point and ending at a plurailty of terminal points equal in number to all of the possible code combinations of said elements.

25. In a decoding system, a crossbar switch mechanism having certain select magnets and hold magnets thereof operable in response to the elements of a multielement permutation code signal and contact sets operable cooperatively by said select magnets and hold magnets, a network of fan circuit paths establishable by contacts of said sets beginning with an input apex point and ending at a plurality of terminal points equal in number to all of the possible code combinations of said elements, and a second crossbar switch mechanism having its select magnets connected to certain of said terminal points to be operated over said paths.

26. In a decoding system, a crossbar switch mechanism having certain select magnets and hold magnets thereof responsive to the elements of a multielement permutation code signal, said elements being represented by either one of two signal states, contact sets in said crossbar switch mechanism operable cooperatively by said select magnets and hold magnets, a network of fan circuit paths establishable by contacts of said sets beginning with an input apex point and ending at a plurality of terminal points equal in number to all of the possible code combinations of said elements, and a second crossbar switch mechanism having its select magnets connected to pairs of said terminal points representing code combinations differing only in the signal state of a particular element thereof.

27. In a decoding system, a crossbar switch mechanism having certain select magnets and hold magnets thereof operable in response to the elements of a multielement permutation code signal, said elements being represented by either one of two signal states, contact sets in said crossbar switch mechanism operable cooperatively by said select magnets and hold magnets, a network of fan circuit paths establishable by contacts of said sets beginning with an input apex point and ending at a plurality of terminal points equal in number to all of the possible code combinations of said elements, and a second crossbar switch mechanism having its select magnets connected to pairs of said terminal points representing code combinations differing only in the signal state of a particular element thereof and having its hold magnets interconnected in two groups operable according to the signal state of said particular element of the code combination.

28. In a decoding system, a crossbar switch mechanism having certain select magnets and hold magnets thereof operable in response to the elements of a multielement permutation code signal, said elements being represented by either one of two signal states, contact sets in said crossbar switch mechanism operable cooperatively by said select magnets and hold magnets, a network of fan circuit paths establishable by contacts of said sets beginning with an input apex point and ending at a plurality of terminal points equal in number to all of the possible code combinations of said elements, a second crossbar switch mechanism having its select magnets connected to pairs of said terminal points representing code combinations differing only in the signal state of a particular element thereof and having its hold magnets interconnected in two groups operable according to the signal state of said particular element of the code combination, and a third crossbar switch mechanism responsive to the elements of a multielement permutation code signal and having fan circuit paths substantially duplicating those of the first-mentioned crossbar switch mechanism, the terminal points ending said paths being connected to contacts controlled by all of the select magnets of the second crossbar switch mechanism and by either of the two groups of hold magnets of said second crossbar switch mechanism.

29. In a signal responsive switching system, a set of relays equal in number to the elements of received multielement permutation code signals, said elements being represented by either one of two signal states, each of said relays energizable in response to one of the signal states of a different one of the elements of the code signal, a crossbar switch mechanism having select magnets operable according to the energized or non-energized condition of each of two of said relays, hold magnets in said crossbar switch mechanism operable according to the energized or non-energized condition of each of two others of said relays, contact sets jointly operable by said select magnets and said hold magnets and having interconnections comprising two fan circuit branches having entry paths selectable in accordance with the energized or non-energized condition of still another of said relays and ending in a plurality of terminal points the total of which is equal in number to all of the possible code combinations of said code elements, a second crossbar switch mechanism having select magnets selectively controllable from said terminal points and having hold magnets operable following the operation of any one of said select magnets and contact sets controllable jointly by said select magnets and hold magnets, a second set of relays responsive to another multielement permutation code signal in the same manner as the first-mentioned set, a third crossbar switch mechanism controlled by said second set of relays in the same manner as the first-mentioned crossbar switch mechanism and substantially duplicating the fan circuit paths thereof, connections from the terminal points of the fan circuits of said third crossbar switch mechanism to contacts of the contact sets controlled by all of the select magnets of said second crossbar switch mechanism, and selectable circuit systems connected to the contacts of said second crossbar switch mechanism and adapted to be activated from the terminal points of the third crossbar switch mechanism.

30. In a signal responsive switching system, a set of relays equal in number to the elements of a received multielement permutation code signal, said elements being represented by either one of two signal states, each of said relays energizable in response to one of the signal states of a different one of the elements of the code signal, a crossbar switch mechanism having select magnets operable according to the energized or non-energized condition of each of two of said relays, hold magnets in said crossbar switch mechanism operable under the control of the operated ones of said select magnets and in accordance with the energized or non-energized condition of each of two others of said relays, contact sets operable jointly by the operated ones of said select magnets and hold magnets, interconnections among said contact sets comprising two fan circuit branches having entry paths selectable in accordance with the energized or non-energized condition of still another of said relays and ending at terminal points equal in number to all of the possible code combinations of said elements, a second crossbar switch mechanism having select magnets connected to said terminal points and individually energizable under the control of said hold magnets over the fan circuit entry path selected by said other relay and the path selectively extended to a terminal point by the operated contact sets, said second crossbar switch mechanism also having hold magnets operable following the operation of any one of said select magnets and contact sets controllable jointly by said select magnets and hold magnets, a second set of relays responsive to another multielement permutation code signal in the same manner as the first-mentioned set, a third crossbar switch mechanism controlled by said second set of relays in the same manner as the first-mentioned cross bar switch mechanism and substantially duplicating the fan circuit paths thereof, connections from the terminal points of the fan circuit paths of said third crossbar switch mechanism to contacts of the contact sets controlled by all of the select magnets of said second crossbar switch mechanism, and selectable circuit systems connected to the contacts of said second crossbar switch mechanism and adapted to be activated from the terminal points of the third crossbar switch mechanism.

31. In a teletypewriter switching system, a switching center having a plurality of incoming message transmission channels, a plurality of outgoing message transmission channels including at least one having at least three message storage circuits serving as access thereto, a message handling circuit comprising message storage circuits in two sets whereof either set comprises at least one storage circuit, a message storing and retransmitting device and associated signal routing circuit connected to each of said channels for selectively routing messages under the control of accompanying directing codes to any storage circuit of either set of storage circuits of said message handling circuit, a message directing circuit operative in response to directing codes and connectable with any storage circuit of said message handling circuit, means in said message directing circuit for connecting any storage circuit of one of said sets to any but one of the storage circuits of said one outgoing channel and for connecting any storage circuit of said other set to said one storage circuit of said one outgoing channel, and means for disabling said one storage circuit of said one outgoing channel and for rendering its other storage circuits connectably available to the storage circuits of said other set of storage circuits of said message handling circuit.

32. In a teletypewriter switching system, a switching center having a plurality of incoming message transmission channels, a plurality of outgoing message transmission channels including at least one having at least three message storage circuits serving as access thereto, a message handling circuit comprising message storage circuits in two sets whereof either set comprises at least one storage circuit, a message storing and retransmitting device and associated signal routing circuit connected to each of said channels for selectively routing messages under the control of accompanying directing codes to any storage circuit of either set of storage circuits of said message handling circuit, a message directing circuit operative in response to directing codes and connectable with any storage circuit of said message handling circuit, means in said message directing circuit for connecting any storage circuit of one of said sets to a particular one only of the storage circuits of said one outgoing channel, and manually operable means for causing attempted connections to said one storage circuit to be diverted to any of the other storage circuits of said one outgoing channel.

33. In a teletypewriter switching system, a switching center having a plurality of incoming message transmission channels, a plurality of outgoing message transmission channels including at least one having at least three message storage circuits serving as access thereto, a message handling circuit comprising message storage circuits in two sets whereof either set comprises at least one circuit, a message storing and transmitting device and associated signal routing circuit connected to each of said channels for selectively routing messages under the control of accompanying directing codes to various points including: (a) any but one of the storage circuits of said one outgoing channel and (b) any storage circuit of either set of storage circuits of said message handling circuit, a message directing circuit operative in response to directing codes and connectable with any storage circuit of said message handling circuit for connecting any storage circuit of one of said sets to any but said one storage level of said one outgoing channel and for normally connecting any storage circuit of said other set to said one storage circuit of said one outgoing channel, and means operative under a condition of disability of said one storage circuit of said one outgoing channel for causing said message directing circuit to connect any storage circuit of said other set to any of the storage circuits of said one outgoing channel normally denied to said other set.

34. In a teletypewriter switching system, a switching center having a plurality of incoming message transmission channels, a plurality of outgoing message transmission channels including at least one having at least three message storing and retransmitting means serving as access thereto, a message handling circuit comprising message storage means in two sets whereof each set comprises at least one storage means, switching mechanism operative in response to signals for routing to either of said sets of storage means on a selective basis messages received over said incoming channels, a message directing circuit operative in response to signals and connectable with any storage means of said message handling circuit, means in said message directing circuit for routing stored messages from one of said sets of storage means to any but one of the storing and retransmitting means of said one outgoing channel and for routing stored messages from the other set of storage means to said one storing and retransmitting means of said one outgoing channel, and means for causing message retransmission to said one outgoing channel from its storing and retransmitting means in a predetermined order of succession giving said one storing and retransmitting means preferential access to said one channel.

35. In a teletypewriter switching system, a switching center having a plurality of incoming message transmission channels, a plurality of outgoing message transmission channels including at least one having at least three message storing and retransmitting means serving as access thereto, a message handling circuit comprising message storage means in two sets whereof each set comprises at least one storage means, operative in response to directing codes switching mechanism for routing to either of said sets of storage means on a selective basis messages received over said incoming channels, a message directing circuit operative in response to directing codes and connectable with any storage means of said message handling circuit, means in said message directing circuit for routing stored messages from one of said sets of storage means to any but one of the storing and retransmitting means of said one outgoing channel and for routing stored messages from the other set of storage means to said one storing and retransmitting means of said one outgoing channel, and means for causing message retransmission to said one outgoing channel from its storing and retransmitting means in a predetermined order of succession by turns in which all but said one storing and retransmitting means transmit in a turn only one message.

36. In a teletypewriter switching system, a switching center having a plurality of incoming message transmission channels, a plurality of outgoing message transmission channels including at least one having at least three message storing and retransmitting means serving as access thereto, a message handling circuit comprising message storage means in two sets whereof each set comprises at least one storage means, switching mechanism operative in response to directing codes for routing to either of said sets of storage means on a selective basis messages received over said incoming channels, a message directing circuit operative in response to directing codes and connectable with any storage means of said message handling circuit, means in said message directing circuit for routing stored messages from one of said sets of storage means to any but one of the storing and retransmitting means of said one outgoing channel and for routing stored messages from the other set of storage means to said one storing and retransmitting means of said one outgoing channel, and means for causing message retransmission to said one outgoing channel from its storing and retransmitting means in a predetermined order of succession by turns in which said one storing and retransmitting means transmits in a turn all messages in storage therein.

37. In a teletypewriter switching system, a switching center having a plurality of incoming message transmission channels, a plurality of outgoing message transmission channels including at least one having at least three message storing and retransmitting means serving as access thereto, a message handling circuit comprising message storage means in two sets whereof each set comprises at least one means, switching mechanism operative in response to directing codes for routing to either of said sets of storage means on a selective basis messages received over said incoming channels, a message directing circuit operative in response to directing codes and connectable with any storage means of said message handling circuit, means in said message directing circuit for routing stored messages from one of said sets of storage means to any but one of the storing and retransmitting means of said one outgoing channel and for routing stored messages from the other set of storage means to said one storing and retransmitting means of said one outgoing channel, and means for causing message transmission to said one outgoing channel from its storing and retransmitting means in a predetermined order of succession by turns in which said one storing and retransmitting means transmits in a turn all messages in storage therein and each other storing and transmitting means transmits in a turn only one message.

38. In a teletypewriter switching system, a plurality of incoming message transmission channels, a plurality of outgoing message transmission channels including at least one having at least three message storing and retransmitting circuits, switching mechanism operative in response to directing codes for routing messages received over said incoming channels to various points including any but one of the storing and retransmitting circuits of said one outgoing channel, and means connected to said message storing and retransmitting circuits for causing message retransmission to said one outgoing channel from its storing and retransmitting circuits in a predetermined order of succession by turns in which all but said one storing and retransmitting circuit transmit in a turn only one message.

39. In a teletypewriter switching system, a plurality of incoming message transmission channels, a plurality of outgoing message transmission channels including at least one having at least three message storing and retransmitting circuits, switching mechanism operative in response to directing codes for routing messages received over said incoming channels to various points including any but one of the storing and retransmitting circuits of said one outgoing channel, and means connected to said message storing and retransmitting circuits for causing message retransmission to said one outgoing channel from its storing and retransmitting circuits in a predetermined order of succession by turns in which said one storing and retransmitting circuit transmits in a turn all messages in storage therein.

40. In a teletypewriter switching system, a plurality of incoming message transmission channels, a plurality of outgoing message transmission channels including at least one having at least three message storing and retransmitting circuits, switching mechanism operative in response to directing codes for routing messages received over said incoming channels to various points including any but one of the storing and retransmitting circuits of said one outgoing channel, and means connected to said message storing and retransmitting circuits for causing message retransmission to said one outgoing channel from its storing and retransmitting circuits in a predetermined order of succession by turns in which said one storing and retransmitting circuit transmits in a turn all messages in storage therein and each other storing and transmitting level transmits in a turn only one message.

41. In a switching system, a plurality of functionally similar circuits, a functionally different circuit adapted to coact with any of said functionally similar circuits, means for qualifying said functionally similar circuits for coaction with said functionally different circuit, and means for establishing coaction between said functionally different circuit and qualified ones of said functionally similar circuits in rotational sequence among the functionally similar circuits.

42. In a teletypewriter switching system, a switching center having a plurality of incoming message transmission channels, a plurality of message destination circuits, a link circuit for establishing connections between said incoming message transmission channels and said message destination circuits, means for registering bids of said incoming message transmission channels for access to said link circuit, and automatic sequence circuit means for allotting access in rotational sequence to channels bidding for access to said link circuit.

43. In a teletypewriter switching system, a switching center having a plurality of incoming message transmission channels, a plurality of message destination circuits, a message directing circuit responsive to directing code signals accompanying received messages for selecting destination circuits to receive the messages, a link circuit for establishing transmission paths from said incoming channels to said destination circuits, means in said message directing circuit for registering a bid for access of an incoming channel to said link circuit, and sequence means for allotting access in rotational sequence to channels having bids registered.

44. In a teletypewriter switching system, a switching center having a plurality of incoming message transmission channels, a plurality of message destination circuits, a message directing circuit associated with each of said incoming channels for decoding address codes accompanying incoming messages and selecting message destination circuits designated by said codes, a link circuit for establishing transmission paths from said incoming channels to said destination circuits, means in said message directing circuits for registering bids for access of said incoming channels to said link circuit, and sequence means for allotting access in rotational sequence to channels having bids registered including means for registering the last message directing circuit accommodated by said sequence means.

45. In a teletypewriter switching system, a switching center having a plurality of incoming message transmission channels, a plurality of message destinations circuits, a message directing circuit associated with each of said incoming channels for decoding address codes accompanying incoming messages and selecting message destination circuits designated by said codes, a link circuit for establishing transmission paths from said incoming channels to said destination circuits, means in said message directing circuits for registering bids for access of said incoming channels to said link circuit, and sequence means comprising a closed ring of relay sets including a set for each of said message directing circuits adapted to allot access to said link circuit in rotational sequence to channels having bids registered and to register the last message directing circuit accommodated by said sequence means.

46. In a teletypewriter switching system, a switching center having a plurality of incoming message transmission channels, a plurality of message receiving circuits each having a plurality of message storage means, signal responsive switching apparatus for routing to said circuits on a selective basis messages received over said channels and preceded by message directing codes, a message directing circuit for decoding said directing codes and routing the accompanying messages in accordance therewith, switching means for connecting said message directing circuit with any storage means of any of said message receiving circuits, and means for precluding connection of said message directing circuit with the storage means of one of said message receiving circuits while a particular other message receiving circuit has a message in any storage means awaiting routing by said message directing circuit.

47. In a telegraph switching system automatically operable to route messages under the control of destination designating codes preceding the messages, a switching center having means including at least one signal storing recorder selectable to record messages and their destination designating codes in response to control signals preceding said destination designating codes, means including at least one other signal storing recorder selectable to record messages and their destination designating codes in response to other and different control signals preceding said message destination signals, signal decoding and message routing means common to and cooperable with said recorders for routing the messages to their designated destinations, and means for causing said decoding and message routing means to cooperate with one of said recorders on a preferential basis relative to the other.

48. In a teletypewriter switching system, a plurality of incoming message transmission channels, a plurality of outgoing message transmission channels including at least one having at least two message storing and retransmitting circuits, signal responsive switching mechanism for routing messages received over said incoming channels and accompanied in some but not all instances by distinctive signals to various points including in the case of messages accompanied by said signals a predesignated one of the storing and retransmitting circuits of said one outgoing channel, and means for causing message retransmission to said one outgoing channel from its storing and retransmitting circuits in a predetermined order of succession by turns in which all but said predesignated one of the storing and retransmitting circuits transmit in a turn only one message.

49. In a teletypewriter switching system, a plurality of incoming message transmission channels, a plurality of outgoing message transmission channels including at least one having at least two message storing and retransmitting circuits, signal responsive switching mechanism for routing messages received over said incoming channels and accompanied in some but not all instances by distinctive signals to various points including in the case of messages accompanied by said signals a predesignated one of the storing and retransmitting circuits of said one outgoing channel, and means for causing message retransmission to said one outgoing channel from its storing and retransmitting circuits in a predetermined order of succession by turns in which said predesignated storing and retransmitting circuit transmits in a turn all messages in storage therein.

50. In a teletypewriter switching system, a plurality of incoming message transmission channels, a plurality of outgoing message transmission channels including at least one having at least two message storing and retransmitting circuits, signal responsive switching mechanism for routing messages received over said incoming channels and accompanied in some but not all instances by distinctive signals to various points including in the case of messages accompanied by said signals a predesignated one of the storing and retransmitting circuits of said one outgoing channel, and means for causing message retransmission to said one outgoing channel from its storing and retransmitting circuits in a predetermined order of succession by turns in which said predesignated storing and retransmitting circuit transmits in a turn all messages in storage therein and each other storing and transmitting circuit transmits in a turn only one message.

References Cited in the file of this patent

UNITED STATES PATENTS

| | | |
|---|---|---|
| 1,547,964 | Semat | July 28, 1925 |
| 2,139,079 | Haselton | Dec. 6, 1938 |
| 2,454,301 | Bacon | Nov. 23, 1948 |
| 2,505,728 | Zenner | Apr. 25, 1950 |
| 2,546,627 | Blanton | Mar. 27, 1951 |
| 2,574,138 | Zenner | Nov. 6, 1951 |
| 2,575,329 | Blanton et al. | Nov. 20, 1951 |
| 2,611,026 | Blanton | Sept. 16, 1952 |
| 2,664,459 | Oberman | Dec. 29, 1953 |
| 2,666,095 | Zenner | Jan. 12, 1954 |
| 2,667,533 | Zenner | Jan. 26, 1954 |
| 2,673,235 | Light et al. | Mar. 23, 1954 |
| 2,677,011 | Burwell | Apr. 27, 1954 |
| 2,703,338 | Stiles | Mar. 1, 1955 |
| 2,754,361 | Kleinschmidt | July 10, 1956 |
| 2,766,318 | Bacon | Oct. 9, 1956 |